US010690915B2

(12) United States Patent
Popovich et al.

(10) Patent No.: US 10,690,915 B2
(45) Date of Patent: Jun. 23, 2020

(54) HOLOGRAPHIC WIDE ANGLE DISPLAY

(71) Applicant: Rockwell Collins, Inc., Cedar Rapids, IA (US)

(72) Inventors: Milan Momcilo Popovich, Leicester (GB); Jonathan David Waldern, Los Altos Hills, CA (US); Alastair John Grant, San Jose, CA (US); Wyatt L. Hendrick, San Diego, CA (US); James H. Stanley, Palo Alto, CA (US)

(73) Assignees: Rockwell Collins, Inc., Cedar Rapids, IA (US); SBG Labs, Inc., Sunnyvale, CA (US)

( * ) Notice: Subject to any disclaimer, the term of this patent is extended or adjusted under 35 U.S.C. 154(b) by 423 days.

(21) Appl. No.: 15/048,954

(22) Filed: Feb. 19, 2016

(65) Prior Publication Data
US 2016/0291328 A1 Oct. 6, 2016

Related U.S. Application Data

(63) Continuation of application No. 13/869,866, filed on Apr. 24, 2013, now Pat. No. 9,341,846.
(Continued)

(51) Int. Cl.
G02B 5/32 (2006.01)
G02B 27/01 (2006.01)
(Continued)

(52) U.S. Cl.
CPC ....... G02B 27/0172 (2013.01); G02B 5/3083 (2013.01); G02B 5/32 (2013.01);
(Continued)

(58) Field of Classification Search
CPC ........ G02B 6/00; G02B 6/006; G02B 6/0008; G02B 6/0036; G02B 6/0068;
(Continued)

(56) References Cited

U.S. PATENT DOCUMENTS 2,141,884 A 12/1938 Sonnefeld
3,620,601 A 11/1971 Waghorn
(Continued)

FOREIGN PATENT DOCUMENTS

CN 200944140 Y 9/2007
CN 101151562 A 3/2008
(Continued)

OTHER PUBLICATIONS

Final Office Action on U.S. Appl. No. 13/250,858, dated Jul. 11, 2016, 21 pages.
(Continued)

*Primary Examiner* — Stephone B Allen
*Assistant Examiner* — Jyotsna V Dabbi
(74) *Attorney, Agent, or Firm* — Donna P. Suchy

(57) ABSTRACT

An apparatus for displaying an image, including: an input image node configured to provide at least a first and a second image modulated lights; and a holographic waveguide device configured to propagate the at least one of the first and second image modulated lights in at least a first direction. The holographic waveguide device includes: at least a first and second interspersed multiplicities of grating elements disposed in at least one layer, the first and second grating elements having respectively a first and a second prescriptions. The first and second multiplicity of grating elements are configured to deflect respectively the first and second image modulated lights out of the at least one layer into respectively a first and a second multiplicities of output rays forming respectively a first and second FOV tiles.

20 Claims, 85 Drawing Sheets

Related U.S. Application Data

(60) Provisional application No. 61/687,436, filed on Apr. 25, 2012, provisional application No. 61/689,907, filed on Jun. 15, 2012.

(51) Int. Cl.
    *G02B 27/00*     (2006.01)
    *F21V 8/00*     (2006.01)
    *G02B 5/30*     (2006.01)
    *G02B 30/26*     (2020.01)
    *G02B 30/34*     (2020.01)
    *G03H 1/22*     (2006.01)

(52) U.S. Cl.
    CPC ........... *G02B 6/005* (2013.01); *G02B 6/0035* (2013.01); *G02B 6/0076* (2013.01); *G02B 27/0081* (2013.01); *G02B 27/0103* (2013.01); *G02B 27/0176* (2013.01); *G02B 30/26* (2020.01); *G02B 30/34* (2020.01); *G02B 6/0018* (2013.01); *G02B 2027/013* (2013.01); *G02B 2027/015* (2013.01); *G02B 2027/0112* (2013.01); *G02B 2027/0123* (2013.01); *G02B 2027/0174* (2013.01); *G03H 2001/2226* (2013.01); *G03H 2001/2239* (2013.01)

(58) Field of Classification Search
    CPC .......... G02B 6/0055; G02B 6/12; G02B 6/34; G02B 6/0035; G02B 6/0038; G02B 6/0075–0078; G02B 6/0026; G02B 6/10; G02B 6/2848; G02B 6/124; G02B 6/4214; G02B 6/262; G02B 6/1225; G02B 6/12004; G02B 6/4298; G02B 6/0016; G02B 6/0252; G02B 27/286; G02B 27/42; G02B 27/44; G02B 27/0172; G02B 27/4211; G02B 27/2214; G02B 27/4205; G02B 27/4233; G02B 27/4272; G02B 27/0101; G02B 27/01; G02B 27/017; G02B 27/0103; G02B 27/222; G02B 5/18; G02B 5/1814; G02B 5/1842; G02B 5/203; G02B 5/1871; G02B 5/1876; G02B 5/04; G02B 5/1828; G02B 5/1857; G02B 5/30; G02B 5/0252; G02B 5/1866; G02B 5/045; G02B 5/189; G02B 5/0808; G02B 5/1861; G02B 5/0001; G02B 5/0011; G02B 5/0013; G02B 5/0015; G02B 5/32; G02B 5/26; G02B 5/34; G02B 26/0808; G02B 26/08; G02B 3/10; G02B 17/02; G02B 23/08; G02B 2027/01; G02B 2027/0101; G02B 2027/0103; H04N 9/3197; H04N 9/3105; H04N 9/3108; H04N 13/0404; H04N 13/0497; G02F 1/1393; G02F 1/13306; G02F 1/133615; G02F 1/292; G02F 1/1334; G02F 1/1341; G02F 1/133526; G02F 1/2995; G02F 1/13471; G02F 1/035; G02F 1/2955; G02F 1/3132; G02F 1/3136; G02F 2001/133607; G02F 1/133616; G02F 1/1347; G02F 1/305; G02F 2201/307; G03B 21/132
    See application file for complete search history.

(56) References Cited

U.S. PATENT DOCUMENTS

| | | |
|---|---|---|
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,799,765 A | 1/1989 | Ferrer |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |

(56) References Cited

U.S. PATENT DOCUMENTS

| | | |
|---|---|---|
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,156,243 A | 12/2000 | Kosuga et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,560,019 B2 | 5/2003 | Nakai |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,624,943 B2 | 9/2003 | Nakai et al. |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 * | 12/2004 | Niv .................... G02B 5/32 |
| | | 359/15 |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |

(56) References Cited

U.S. PATENT DOCUMENTS

| | | | |
|---|---|---|---|
| 7,336,271 | B2 | 2/2008 | Ozeki et al. |
| 7,339,737 | B2 | 3/2008 | Urey et al. |
| 7,339,742 | B2 | 3/2008 | Amitai et al. |
| 7,375,870 | B2 | 5/2008 | Schorpp |
| 7,391,573 | B2 | 6/2008 | Amitai |
| 7,394,865 | B2 | 7/2008 | Borran et al. |
| 7,395,181 | B2 | 7/2008 | Foxlin |
| 7,397,606 | B1 | 7/2008 | Peng et al. |
| 7,401,920 | B1 | 7/2008 | Kranz et al. |
| 7,404,644 | B2 | 7/2008 | Evans et al. |
| 7,410,286 | B2 | 8/2008 | Travis |
| 7,411,637 | B2 | 8/2008 | Weiss |
| 7,415,173 | B2 | 8/2008 | Kassamakov et al. |
| 7,418,170 | B2 | 8/2008 | Mukawa et al. |
| 7,433,116 | B1 | 10/2008 | Islam |
| 7,436,568 | B1 | 10/2008 | Kuykendall, Jr. |
| 7,454,103 | B2 | 11/2008 | Parriaux |
| 7,457,040 | B2 | 11/2008 | Amitai |
| 7,466,994 | B2 | 12/2008 | Pihlaja et al. |
| 7,479,354 | B2 | 1/2009 | Ueda et al. |
| 7,480,215 | B2 | 1/2009 | Makela et al. |
| 7,482,996 | B2 | 1/2009 | Larson et al. |
| 7,483,604 | B2 | 1/2009 | Levola |
| 7,492,512 | B2 | 2/2009 | Niv et al. |
| 7,496,293 | B2 | 2/2009 | Shamir et al. |
| 7,500,104 | B2 | 3/2009 | Goland |
| 7,528,385 | B2 | 5/2009 | Volodin et al. |
| 7,545,429 | B2 | 6/2009 | Travis |
| 7,550,234 | B2 | 6/2009 | Otaki et al. |
| 7,567,372 | B2 | 7/2009 | Schorpp |
| 7,570,429 | B2 | 8/2009 | Maliah et al. |
| 7,572,555 | B2 | 8/2009 | Takizawa et al. |
| 7,573,640 | B2 | 8/2009 | Nivon et al. |
| 7,576,916 | B2 | 8/2009 | Amitai |
| 7,577,326 | B2 | 8/2009 | Amitai |
| 7,579,119 | B2 | 8/2009 | Ueda et al. |
| 7,588,863 | B2 | 9/2009 | Takizawa et al. |
| 7,589,900 | B1 | 9/2009 | Powell |
| 7,589,901 | B2 | 9/2009 | Dejong et al. |
| 7,592,988 | B2 | 9/2009 | Katase |
| 7,593,575 | B2 | 9/2009 | Houle et al. |
| 7,597,447 | B2 | 10/2009 | Larson et al. |
| 7,599,012 | B2 | 10/2009 | Nakamura et al. |
| 7,600,893 | B2 | 10/2009 | Laino et al. |
| 7,602,552 | B1 | 10/2009 | Blumenfeld |
| 7,616,270 | B2 | 11/2009 | Hirabayashi et al. |
| 7,618,750 | B2 | 11/2009 | Ueda et al. |
| 7,629,086 | B2 | 12/2009 | Otaki et al. |
| 7,639,911 | B2 | 12/2009 | Lee et al. |
| 7,643,214 | B2 | 1/2010 | Amitai |
| 7,656,585 | B1 | 2/2010 | Powell et al. |
| 7,660,047 | B1 | 2/2010 | Travis et al. |
| 7,672,055 | B2 | 3/2010 | Amitai |
| 7,675,684 | B1 | 3/2010 | Weissman et al. |
| 7,710,654 | B2 | 5/2010 | Ashkenazi et al. |
| 7,724,441 | B2 | 5/2010 | Amitai |
| 7,724,442 | B2 | 5/2010 | Amitai |
| 7,724,443 | B2 | 5/2010 | Amitai |
| 7,733,572 | B1 | 6/2010 | Brown et al. |
| 7,747,113 | B2 | 6/2010 | Mukawa et al. |
| 7,751,122 | B2 | 7/2010 | Amitai |
| 7,764,413 | B2 | 7/2010 | Levola |
| 7,777,819 | B2 | 8/2010 | Simmonds |
| 7,778,305 | B2 | 8/2010 | Parriaux et al. |
| 7,778,508 | B2 | 8/2010 | Hirayama |
| 7,847,235 | B2 | 12/2010 | Krupkin et al. |
| 7,864,427 | B2 | 1/2011 | Korenaga et al. |
| 7,865,080 | B2 | 1/2011 | Hecker et al. |
| 7,872,804 | B2 | 1/2011 | Moon et al. |
| 7,884,985 | B2 | 2/2011 | Amitai et al. |
| 7,887,186 | B2 | 2/2011 | Watanabe |
| 7,903,921 | B2 | 3/2011 | Ostergard |
| 7,907,342 | B2 | 3/2011 | Simmonds et al. |
| 7,920,787 | B2 | 4/2011 | Gentner et al. |
| 7,944,428 | B2 | 5/2011 | Travis |
| 7,969,644 | B2 | 6/2011 | Tilleman et al. |
| 7,970,246 | B2 | 6/2011 | Travis et al. |
| 7,976,208 | B2 | 7/2011 | Travis |
| 7,999,982 | B2 | 8/2011 | Endo et al. |
| 8,000,491 | B2 | 8/2011 | Brodkin et al. |
| 8,004,765 | B2 | 8/2011 | Amitai |
| 8,016,475 | B2 | 9/2011 | Travis |
| 8,022,942 | B2 | 9/2011 | Bathiche et al. |
| RE42,992 | E | 12/2011 | David |
| 8,079,713 | B2 | 12/2011 | Ashkenazi |
| 8,082,222 | B2 | 12/2011 | Rangarajan et al. |
| 8,086,030 | B2 | 12/2011 | Gordon et al. |
| 8,089,568 | B1 | 1/2012 | Brown et al. |
| 8,107,023 | B2 | 1/2012 | Simmonds et al. |
| 8,107,780 | B2 | 1/2012 | Simmonds |
| 8,132,948 | B2 | 3/2012 | Owen et al. |
| 8,132,976 | B2 | 3/2012 | Odell et al. |
| 8,136,690 | B2 | 3/2012 | Fang et al. |
| 8,137,981 | B2 | 3/2012 | Andrew et al. |
| 8,149,086 | B2 | 4/2012 | Klein et al. |
| 8,152,315 | B2 | 4/2012 | Travis et al. |
| 8,155,489 | B2 | 4/2012 | Saarikko et al. |
| 8,160,409 | B2 | 4/2012 | Large |
| 8,160,411 | B2 | 4/2012 | Levola et al. |
| 8,186,874 | B2 | 5/2012 | Sinbar et al. |
| 8,188,925 | B2 | 5/2012 | Dejean |
| 8,189,263 | B1 | 5/2012 | Wang et al. |
| 8,189,973 | B2 | 5/2012 | Travis et al. |
| 8,199,803 | B2 | 6/2012 | Hauske et al. |
| 8,213,065 | B2 | 7/2012 | Mukawa |
| 8,233,204 | B1 | 7/2012 | Robbins et al. |
| 8,253,914 | B2 | 8/2012 | Kajiya et al. |
| 8,254,031 | B2 | 8/2012 | Levola |
| 8,295,710 | B2 | 10/2012 | Marcus |
| 8,301,031 | B2 | 10/2012 | Gentner et al. |
| 8,305,577 | B2 | 11/2012 | Kivioja et al. |
| 8,306,423 | B2 | 11/2012 | Gottwald et al. |
| 8,314,819 | B2 | 11/2012 | Kimmel et al. |
| 8,321,810 | B2 | 11/2012 | Heintze |
| 8,351,744 | B2 | 1/2013 | Travis et al. |
| 8,354,806 | B2 | 1/2013 | Travis et al. |
| 8,355,610 | B2 | 1/2013 | Simmonds |
| 8,369,019 | B2 | 2/2013 | Baker et al. |
| 8,384,694 | B2 | 2/2013 | Powell et al. |
| 8,398,242 | B2 | 3/2013 | Yamamoto et al. |
| 8,403,490 | B2 | 3/2013 | Sugiyama et al. |
| 8,422,840 | B2 | 4/2013 | Large |
| 8,427,439 | B2 | 4/2013 | Larsen et al. |
| 8,432,363 | B2 | 4/2013 | Saarikko et al. |
| 8,432,372 | B2 | 4/2013 | Butler et al. |
| 8,472,119 | B1 | 6/2013 | Kelly |
| 8,472,120 | B2 | 6/2013 | Border et al. |
| 8,477,261 | B2 | 7/2013 | Travis et al. |
| 8,491,121 | B2 | 7/2013 | Tilleman et al. |
| 8,491,136 | B2 | 7/2013 | Travis et al. |
| 8,493,366 | B2 | 7/2013 | Bathiche et al. |
| 8,493,662 | B2 | 7/2013 | Noui |
| 8,508,848 | B2 | 8/2013 | Saarikko |
| 8,547,638 | B2 | 10/2013 | Levola |
| 8,578,038 | B2 | 11/2013 | Kaikuranta et al. |
| 8,581,831 | B2 | 11/2013 | Travis |
| 8,582,206 | B2 | 11/2013 | Travis |
| 8,593,734 | B2 | 11/2013 | Laakkonen |
| 8,611,014 | B2 | 12/2013 | Valera et al. |
| 8,619,062 | B2 | 12/2013 | Powell et al. |
| 8,633,786 | B2 | 1/2014 | Ermolov et al. |
| 8,639,072 | B2 | 1/2014 | Popovich et al. |
| 8,643,691 | B2 | 2/2014 | Rosenfeld et al. |
| 8,649,099 | B2 | 2/2014 | Schultz et al. |
| 8,654,420 | B2 | 2/2014 | Simmonds |
| 8,659,826 | B1 | 2/2014 | Brown et al. |
| 8,670,029 | B2 | 3/2014 | McEldowney |
| 8,693,087 | B2 | 4/2014 | Nowatzyk et al. |
| 8,736,802 | B2 | 5/2014 | Kajiya et al. |
| 8,736,963 | B2 | 5/2014 | Robbins et al. |
| 8,749,886 | B2 | 6/2014 | Gupta |
| 8,767,294 | B2 | 7/2014 | Chen et al. |
| 8,810,600 | B2 | 8/2014 | Bohn et al. |
| 8,814,691 | B2 | 8/2014 | Haddick et al. |

(56) References Cited

U.S. PATENT DOCUMENTS

| | | |
|---|---|---|
| 8,830,584 B2 | 9/2014 | Saarikko et al. |
| 8,938,141 B2 | 1/2015 | Magnusson |
| 8,964,298 B2 | 2/2015 | Haddick et al. |
| 9,244,280 B1 | 1/2016 | Tiana et al. |
| 9,341,846 B2 | 5/2016 | Popovich et al. |
| 9,366,864 B1 | 6/2016 | Brown et al. |
| 9,456,744 B2 | 10/2016 | Popovich et al. |
| 9,523,852 B1 | 12/2016 | Brown et al. |
| 9,632,226 B2 | 4/2017 | Waldern et al. |
| 9,933,684 B2 | 4/2018 | Brown et al. |
| 2001/0036012 A1 | 11/2001 | Nakai et al. |
| 2002/0021461 A1 | 2/2002 | Ono et al. |
| 2002/0127497 A1 | 9/2002 | Brown et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0047938 A1 | 3/2004 | Kosuga et al. |
| 2004/0075830 A1 | 4/2004 | Miyake et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0010135 A1* | 1/2009 | Ushiro ............... G03H 1/02 369/112.01 |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284180 A1* | 11/2010 | Popovich ............... G02B 5/32 362/231 |
| 2010/0296163 A1* | 11/2010 | Saarikko ............ G02B 5/1814 359/567 |
| 2010/0315719 A1 | 12/2010 | Saarikko |
| 2010/0321781 A1 | 12/2010 | Levola et al. |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1* | 2/2011 | Baker ............... G02B 6/0028 359/630 |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0232211 A1* | 9/2011 | Farahi ............... B32B 5/022 52/173.3 |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0294037 A1 | 11/2012 | Holman et al. |
| 2012/0300311 A1* | 11/2012 | Simmonds ......... G02B 27/0172 359/630 |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0250207 A1 | 9/2013 | Bohn |

(56) References Cited

U.S. PATENT DOCUMENTS

| | | |
|---|---|---|
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0178901 A1 | 6/2016 | Ishikawa |
| 2016/0209657 A1 | 7/2016 | Popovich et al. |
| 2016/0238772 A1 | 8/2016 | Waldern et al. |
| 2016/0274356 A1 | 9/2016 | Mason |
| 2016/0291328 A1 | 10/2016 | Popovich et al. |
| 2017/0031160 A1 | 2/2017 | Popovich et al. |
| 2018/0052277 A1 | 2/2018 | Schowengerdt et al. |
| 2018/0373115 A1 | 12/2018 | Brown et al. |

FOREIGN PATENT DOCUMENTS

| | | |
|---|---|---|
| CN | 101263412 A | 9/2008 |
| CN | 101589326 | 11/2009 |
| CN | 101688977 A | 3/2010 |
| CN | 101726857 A | 6/2010 |
| CN | 101881936 A | 11/2010 |
| CN | 101910900 A | 12/2010 |
| CN | 102608762 A | 7/2012 |
| CN | 104520751 A | 4/2015 |
| DE | 10 2006 003 785 | 7/2007 |
| EP | 0 822 441 | 2/1998 |
| EP | 2 110 701 | 10/2009 |
| EP | 2 196 729 | 6/2010 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2002-529790 A | 9/2002 |
| JP | 2002-311379 | 10/2002 |
| JP | 2004-157245 | 6/2004 |
| JP | 2006-350129 A | 12/2006 |
| JP | 2007-011057 A | 1/2007 |
| JP | 2007-094175 | 4/2007 |
| JP | 2007-219106 A | 8/2007 |
| JP | 2009-133999 A | 6/2009 |
| JP | 2016-030503 | 3/2016 |
| WO | WO-99/52002 | 10/1999 |
| WO | WO-00/28369 A2 | 5/2000 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |
| WO | WO-2016/044193 | 3/2016 |

OTHER PUBLICATIONS

Final Office Action on U.S. Appl. No. 14/044,676, dated Aug. 12, 2016, 23 pages.
Non-final Office Action on U.S. Appl. No. 13/250,858, dated Nov. 14, 2016, 18 pages.
Non-Final Office Action on U.S. Appl. No. 13/844,456, dated Aug. 16, 2016, 18 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.
Notice of Allowance on U.S. Appl. No. 14/168,173, dated Aug. 8, 2016, 8 pages.
Notice of Allowance on U.S. Appl. No. 14/814,020, dated Aug. 12, 2016, 15 pages.
Non-Final Office Action on U.S. Appl. No. 13/864,991, dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/260,943 dated Feb. 3, 2016, 19 pages.
Final Notice of Reasons for Rejection on Japanese Application No. JP2015-509120, dated Mar. 7, 2017, English Translation, 2 pages.
Final Office Action on U.S. Appl. No. 14/044,676, dated Jul. 13, 2017, 30 pages.
Final Office Action on U.S. Appl. No. 14/152,756, dated Jun. 7, 2017, 16 pages.
Final Office Action on U.S. Appl. No. 14/152,756, dated Oct. 12, 2016, 18 pages.
Final Office Action on U.S. Appl. No. 14/497,280, dated Mar. 10, 2017, 17 pages.
Final Office Action on U.S. Appl. No. 14/715,332, dated Aug. 11, 2017, 14 pages.
Final Office Action on U.S. Appl. No. 13/844,456, 19 pages (dated Jul. 10, 2017).
First Office Action on EPO Application No. 13765610.4, dated Apr. 18, 2017, 4 pages.
First Office Action on Japanese Application No. 2013-231450, dated Aug. 8, 2017, 5 pages.
Non-Final Office Action for U.S. Appl. No. 13/844,456 dated Oct. 6, 2017. 23 pages.
Non-Final Office Action on U.S. Appl. No. 13/844,456, with English translation, dated Dec. 29, 2016, 24 pages.
Non-Final Office Action on U.S. Appl. No. 14/152,756, dated Feb. 21, 2017, 18 pages.
Non-Final Office Action on U.S. Appl. No. 14/715,332, dated Mar. 9, 2017, 14 pages.
Non-Final Office Action on U.S. Appl. No. 14/754,368, dated May 8, 2017, 12 pages.
Non-Final Office Action on U.S. Appl. No. 15/005,507, dated Nov. 22, 2016, 7 pages.
Non-Final Office Action on U.S. Appl. No. 15/178,521, dated Aug. 24, 2017, 10 pages.
Non-Final Office Action on U.S. Appl. No. 15/136,841, 12 pages (dated Jul. 13, 2017).
Notice of Allowance on U.S. Appl. No. 13/250,858, dated Mar. 20, 2017, 8 pages.
Notice of Allowance on U.S. Appl. No. 13/864,991, dated Feb. 2, 2017, 10 pages.

(56) References Cited

OTHER PUBLICATIONS

Notice of Allowance on U.S. Appl. No. 13/892,057, dated Nov. 8, 2016, 10 pages.
Notice of Allowance on U.S. Appl. No. 14/820,237, dated Jan. 23, 2017, 10 pages.
Notice of Reasons for Rejection for Japanese Application No. 2015-509120, dated Nov. 1, 2016, 4 pages.
U.S. Notice of Allowance on U.S. Appl. No. 14/820,237 dated Jan. 23, 2017.
Chinese First Office Action for Chinese Patent Application No. 201610512319.1 dated Aug. 11, 2017. 16 pages.
Corrected Notice of Allowance for U.S. Appl. No. 14/044,676 dated Jan. 3, 2018. 2 pages.
European Office Action for European Patent Application No. 13192383.1 dated Oct. 16, 2017. 5 pages.
Final Office Action for U.S. Appl. No. 15/136,841 dated Oct. 27, 2017. 15 pages.
Non-Final Office Action for U.S. Appl. No. 14/715,332 dated Dec. 26, 2017. 8 pages.
Notice of Allowance for U.S. Appl. No. 14/044,676 dated Nov. 24, 2017. 18 pages.
Second Office Action for Chinese Patent Application No. 201310557623.4 dated Dec. 1, 2017. 21 pages.
U.S. Appl. No. 10/555,661, filed Nov. 4, 2005, Popovich et al.
U.S. Appl. No. 13/844,456, filed Mar. 15, 2013, Brown et al.
U.S. Appl. No. 61/344,748, filed Sep. 28, 2010, Unknown.
U.S. Appl. No. 61/457,835, filed Jun. 16, 2011, Unknown.
U.S. Appl. No. 61/573,066, filed Aug. 24, 2012, Unknown.
U.S. Appl. No. 61/573,082, filed Aug. 29, 2011, Unknown.
U.S. Appl. No. 61/573,121, filed Sep. 7, 2011, Unknown.
U.S. Appl. No. 61/573,156, filed Sep. 16, 2011, Unknown.
U.S. Appl. No. 61/573,175, filed Sep. 19, 2011, Unknown.
U.S. Appl. No. 61/573,176, filed Sep. 19, 2011, Unknown.
U.S. Appl. No. 16/573,196, filed Sep. 25, 2011, Unknown.
U.S. Appl. No. 61/627,202, filed Oct. 7, 2011, Unknown.
U.S. Appl. No. 61/687,436, filed Apr. 25, 2012, Waldern et al.
U.S. Appl. No. 61/689,907, filed Apr. 25, 2012, Waldern et al.
U.S. Appl. No. 61/796,795, filed Nov. 20, 2012, Unknown.
U.S. Appl. No. 61/850,856, filed Feb. 25, 2013, Unknown.
Amendment and Reply for U.S. Appl. No. 12/571,262, dated Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras et al., Exit Pupil Expander with a Large Field of View Based on Diffractive Optics, Journal of the SID, 2009, 6 pages.
Cameron, A., The Application of Holograhpic Optical Waveguide Technology to Q-Sight Family of Helmet Mounted Displays, Proc. of SPIE, vol. 7326, 73260H-1, 2009, 11 pages.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Extended European Search Report for European Application No. 13765610.4 dated Feb. 16, 2016, 6 pages.
Final Office Action in U.S. Appl. No. 13/864,991, dated Apr. 2, 2015, 16 pages.
Final Office Action on U.S. Appl. No. 13/869,866 dated Oct. 3, 2014, 17 pages.
Final Office Action on U.S. Appl. No. 13/250,858 dated Feb. 4, 2015, 18 pages.
Final Office Action on U.S. Appl. No. 13/250,940 dated Oct. 17, 2014, 15 pages.
Final Office Action on U.S. Appl. No. 13/892,026 dated Apr. 3, 2015, 17 pages.
Final Office Action on U.S. Appl. No. 13/892,057 dated Mar. 5, 2015, 21 pages.
Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 dated Jul., 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, 16 pages.
Non-Final Office Action on U.S. Appl. No. 13/844,456, dated Jan. 15, 2016, 16 pages.
Non-Final Office Action on U.S. Appl. No. 13/864,991 dated Oct. 22, 2014, 16 pages.
Non-Final Office Action on U.S. Appl. No. 13/869,866 dated May 28, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.
Non-Final Office Action on U.S. Appl. No. 14/044,676, dated Jan. 20, 2016, 21 pages.
Non-Final Office Action on U.S. Appl. No. 14/109,551 dated Jul. 14, 2015, 32 pages.
Non-Final Office Action on U.S. Appl. No. 14/168,173 dated Jun. 22, 2015, 14 pages.
Non-Final Office Action on U.S. Appl. No. 14/168,173 dated Mar. 10, 2016, 9 pages.
Non-Final Office Action on U.S. Appl. No. 14/225,062 dated May 21, 2015, 11 pages.
Non-Final Office Action on U.S. Appl. No. 13/250,858, dated Mar. 18, 2016, 20 pages.
Nordin, G., et al., "Diffraction properties of stratified vol. holographic optical elements," Journal of the Optical Society of America A., vol. 9, No. 12, Dec. 1992, pp. 2206-2217, 12 pages.
Notice of Allowance for U.S. Appl. No. 12/700,557, dated Oct. 22, 2013, 9 pages.
Notice of Allowance for U.S. Appl. No. 14/109,551, dated Nov. 20, 2015, 8 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Notice of Allowance on U.S. Appl. No. 13/355,360 dated Apr. 10, 2014, 7 pages.
Notice of Allowance on U.S. Appl. No. 13/432,662, dated Feb. 18, 2016, 10 pages.

(56) References Cited

OTHER PUBLICATIONS

Office Action for U.S. Appl. No. 12/571,262, dated Sep. 28, 2011, 5 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,621, dated May 21, 2013, 10 pages.
Office Action for U.S. Appl. No. 13/250,858 dated Feb. 19, 2014, 13 pages.
Office Action for U.S. Appl. No. 13/250,858, dated Oct. 28, 2013, 9 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Office Action for U.S. Appl. No. 13/355,360, dated Sep. 12, 2013, 7 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Office Action, USPTO, U.S. Appl. No. 10/696,507, dated Nov. 13, 2008, 15 pages.
Plastic has replaced glass in photochromic lens, www.plastemart.com, 2003, 1 page.
Press Release, "USAF Awards SBG Labs an SBIR Contract for Wide Field of View HUD", SBG Labs—DigiLens, Apr. 2013, 1 page.
Press Release: "Navy awards Sgb Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456, dated Sep. 12, 2014, 23 pages.
Restriction Requirement for U.S. Appl. No. 12/700,557, dated Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
Chinese Office Action issued in corresponding application No. 201310557623 dated Jan. 17, 2017.
Non-Final Office Action on U.S. Appl. No. 13/844,456, dated Dec. 29, 2016, 24 pages.
Non-Final Office Action on U.S. Appl. No. 14/044,676, dated Dec. 29, 2016, 26 pages.
Notice of Reasons for Rejection for Japanese Application No. 2015-509120, with English translation, dated Nov. 1, 2016, 4 pages.
Corrected Notice of Allowance for U.S. Appl. No. 14/044,676 dated Feb. 1, 2018. 2 pages.
Final Office Action for U.S. Appl. No. 13/844,456 dated Apr. 19, 2018. 24 pages.
International Search Report and Written Opinion for PCT/US18/12227, dated Mar. 14, 2018. 8 pages.
Non-Final Office Action for U.S. Appl. No. 14/152,756 dated Feb. 13, 2018. 17 pages.
Non-Final Office Action for U.S. Appl. No. 14/497,280 dated Mar. 19, 2018. 19 pages.
Non-Final Office Action for U.S. Appl. No. 15/136,841 dated Mar. 12, 2018. 12 pages.
Notice of Allowance for U.S. Appl. No. 15/005,507 dated May 23, 2017. 8 pages.
Notice of Allowance for U.S. Appl. No. 15/178,521 dated Jan. 31, 2018. 9 pages.
Final Office Action for U.S. Appl. No. 14/152,756 dated Aug. 30, 2018.
Final Office Action for U.S. Appl. No. 15/136,841 dated Aug. 31, 2018. 7 pages.
Non-Final Office Action for U.S. Appl. No. 13/844,456 dated Aug. 30, 2018. 17 pages.
Non-Final Office Action for U.S. Appl. No. 15/429,569 dated Sep. 17, 2018. 9 pages.
Supplemental Notice of Allowability on U.S. Appl. No. 13/892,026, dated Nov. 1, 2016, 2 pages.
Final Office Action for U.S. Appl. No. 14/465,763 dated Nov. 16, 2018.
Notice of Allowance for U.S. Appl. No. 15/136,841 dated Nov. 9, 2018.
Notice of Allowance for U.S. Appl. No. 15/439,597 dated Oct. 18, 2018.
Final Office Action for U.S. Appl. No. 14/497,280 dated Oct. 18, 2018.
Corrected Notice of Allowance for U.S. Appl. No. 14/715,332 dated Jul. 25, 2018. 2 pages.
Decision of Rejection for Japanese Patent Application No. 2013-231450 dated May 8, 2018. 4 pages.
Final Office Action for U.S. Appl. No. 14/465,763 dated Jun. 28, 2018. 4 pages.
Non-Final Office Action for U.S. Appl. No. 13/250,970 dated Jul. 30, 2013. 4 pages.
Non-Final Office Action for U.S. Appl. No. 15/460,076 dated Jul. 10, 2018. 15 pages.
Notice of Allowance for U.S. Appl. No. 14/715,332 dated May 14, 2018. 9 pages.
Notice of Allowance for U.S. Appl. No. 15/439,597 dated Jun. 15, 2018. 11 pages.
Second Office Action for Chinese Patent Application No. 201610512319.1 dated May 2, 2018. 9 pages.
Third Office Action for Chinese Patent Application No. 20130557623.4 dated May 22, 2018. 16 pages.
Non-Final Office Action for U.S. Appl. No. 13/844,456 dated Apr. 1, 2019.
Non-Final Office Action for U.S. Appl. No. 14/152,756 dated Feb. 27, 2019.
Notice of Allowance for U.S. Appl. No. 15/429,569 dated Jan. 22, 2019. 7 pages.
Final Office Action for U.S. Appl. No. 13/844,456 dated Dec. 17, 2018. 20 pages.
Final Office Action for U.S. Appl. No. 15/460,076, dated Dec. 3, 2018. 13 pages.
Third Office Action [With English translation] for CN Application No. 2016105123191 dated Nov. 1, 2018. 16 pages.
Notice of Allowance for U.S. Appl. No. 15/136,841 dated Feb. 1, 2019. 2 pages.
Corrected Notice of Allowance for U.S. Appl. No. 14/497,280 dated Aug. 7, 2019. 2 pages.
Final Office Action for U.S. Appl. No. 13/844,456 dated Aug. 16, 2019. 28 pages.
Japanese Office Action for JP Patent Application No. 2018-164677 dated Sep. 17, 2019. 4 pages.
Non-Final Office Action for U.S. Appl. No. 16/384,435 dated Aug. 7, 2019. 8 pages.
Preliminary Report on Patentability for PCT Application No. PCT/US2018/012227 dated Aug. 8, 2019. 7 pages.
Final Office Action for U.S. Appl. No. 14/152,756 dated Jun. 10, 2019. 18 pages.
Fourth Office Action for Chinese Patent Application No. 2016105123191 dated Apr. 25, 2019. 5 pages.

(56) References Cited

OTHER PUBLICATIONS

Notice of Allowance for U.S. Appl. No. 15/460,076 dated May 8, 2019. 10 pages.
Notice of Allowance for U.S. Appl. No. 14/465,763 dated Jun. 4, 2019. 8 pages.
Notice of Allowance for U.S. Appl. No. 14/497,280 dated May 22, 2019. 14 pages.
Third Office Action for Chinese Application No. 2016105123191 dated Jan. 16, 2019. 16 pages.
Non-Final Office Action for U.S. Appl. No. 13/844,456, dated Feb. 20, 2020, 21 pages.
Non-Final Office Action for U.S. Appl. No. 16/126,618 dated Dec. 19, 2019. 9 pages.
Notice of Allowance for U.S. Appl. No. 16/020,125, dated Feb. 25, 2020, 10 pages.
Notice of Allowance for U.S. Appl. No. 16/384,435, dated Feb. 26, 2020, 7 pages.

* cited by examiner

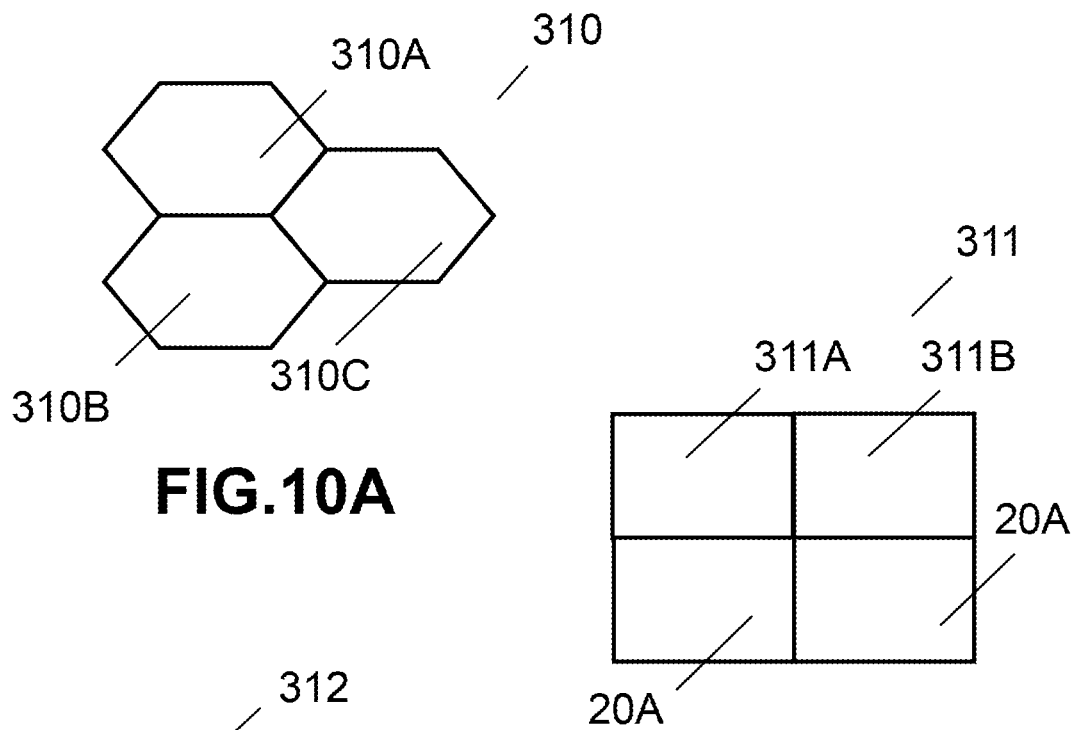
FIG.10A
FIG.10B
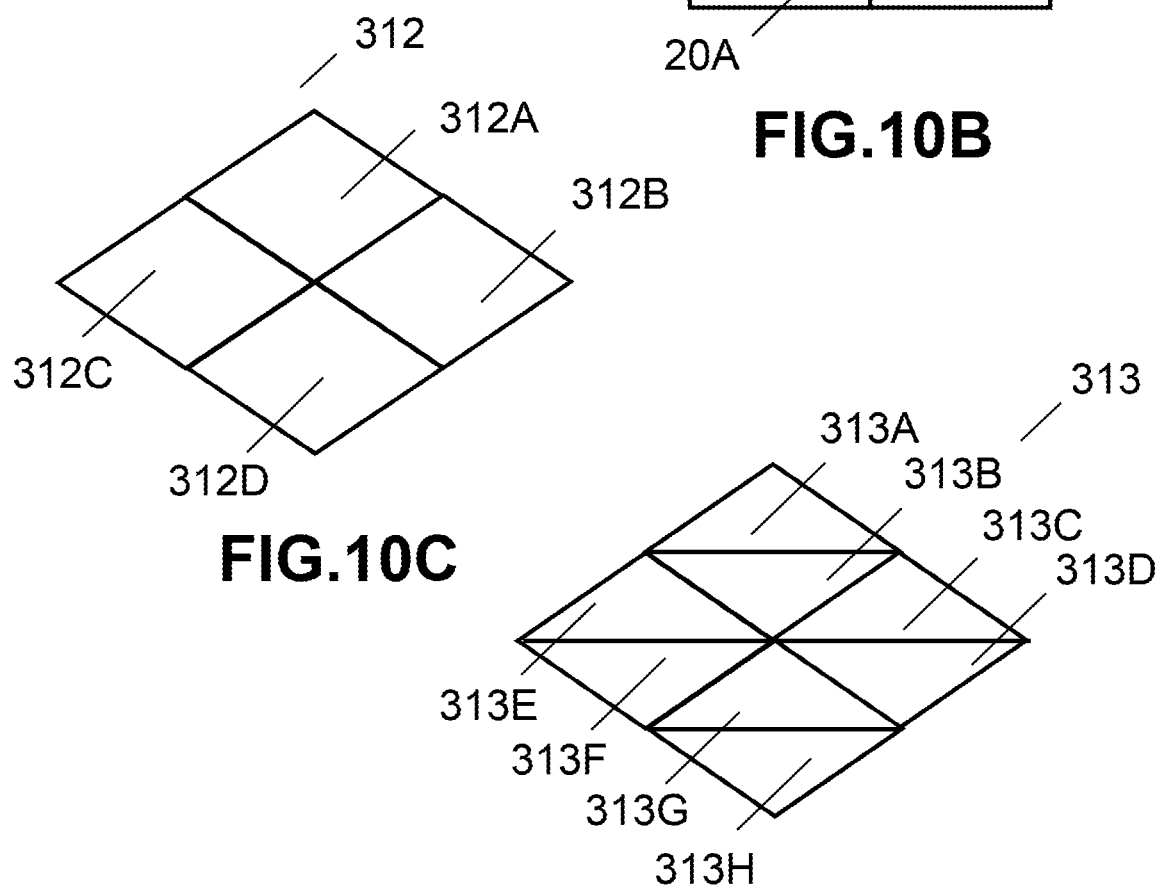
FIG.10C
FIG.10D

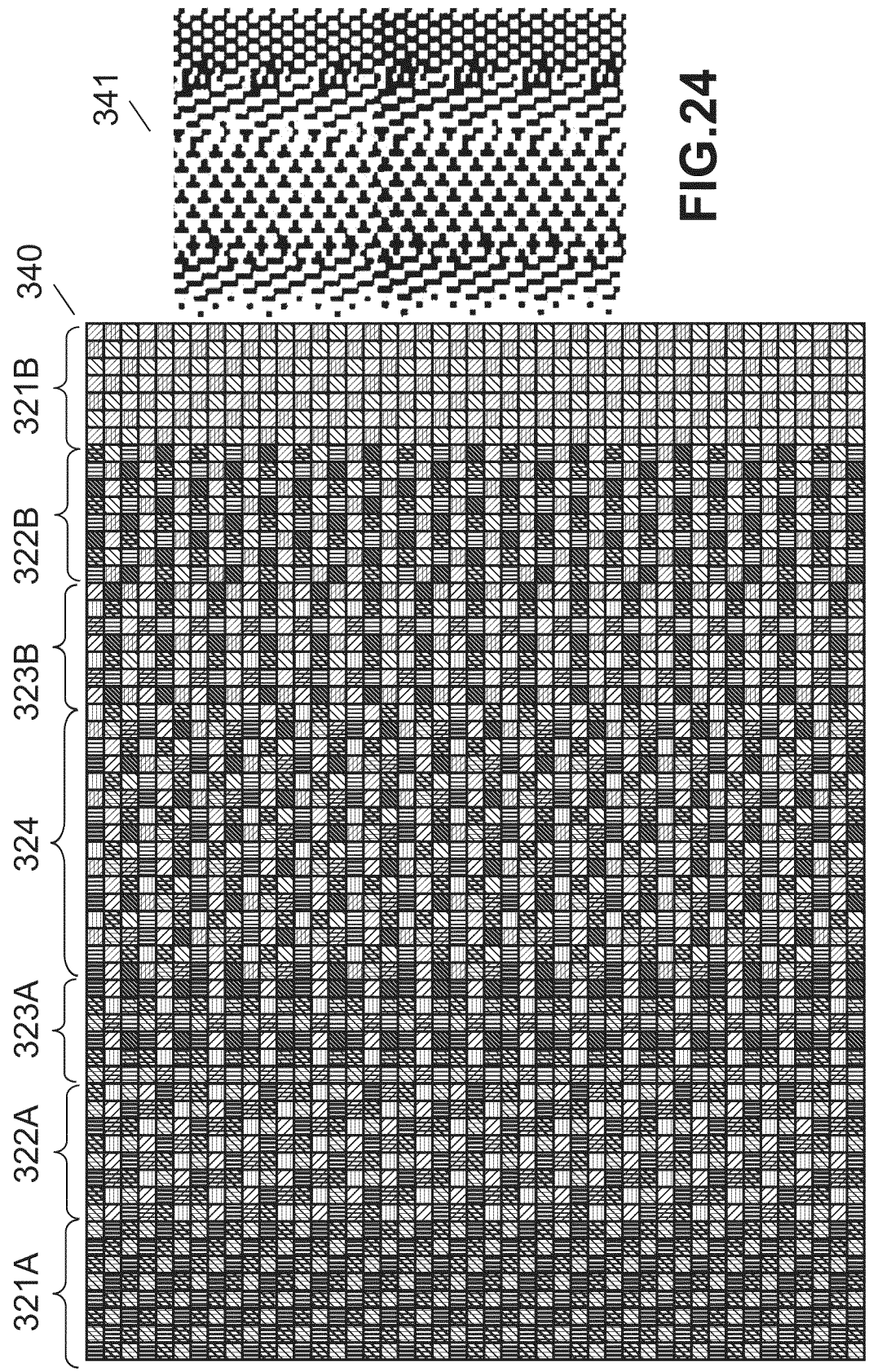

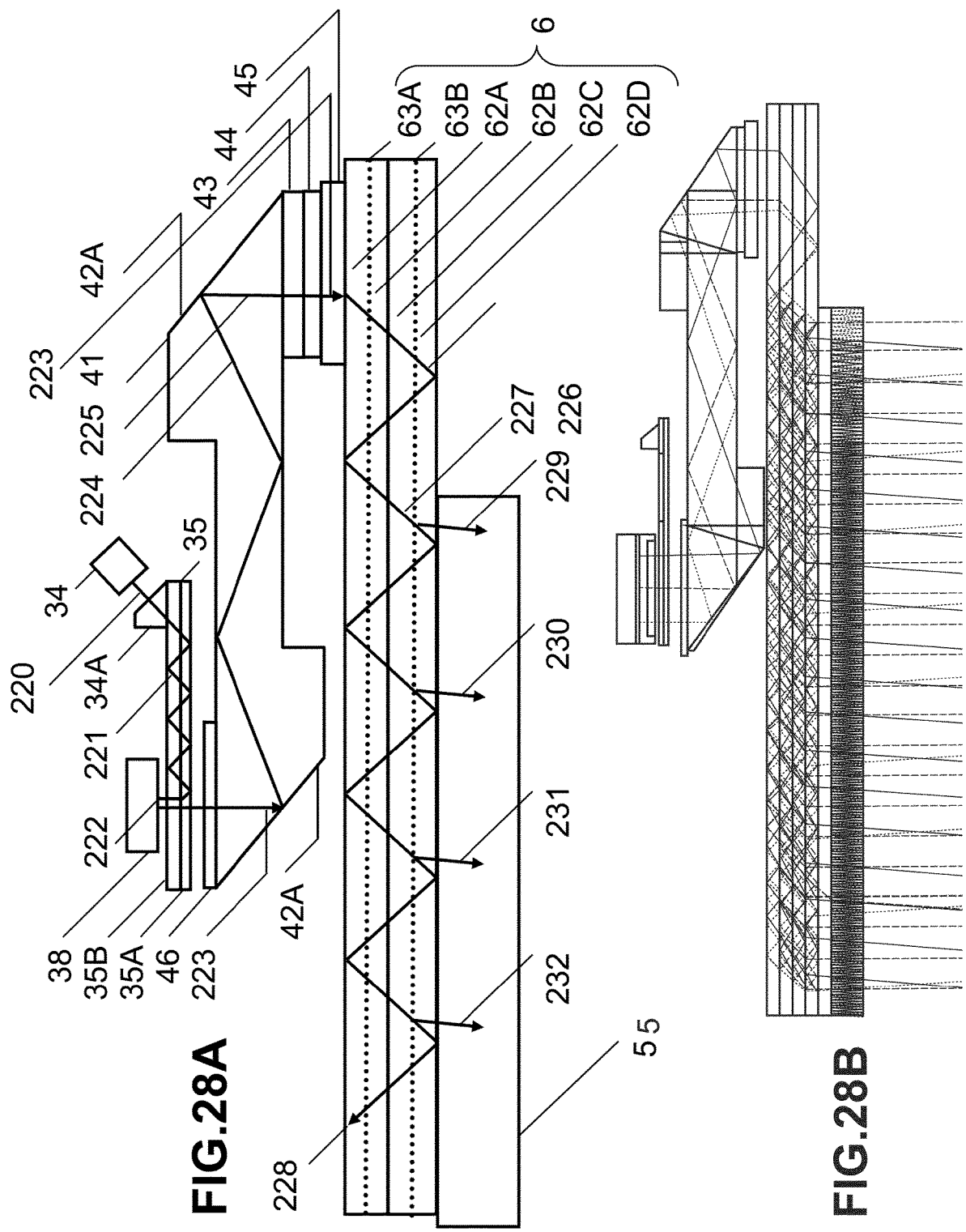

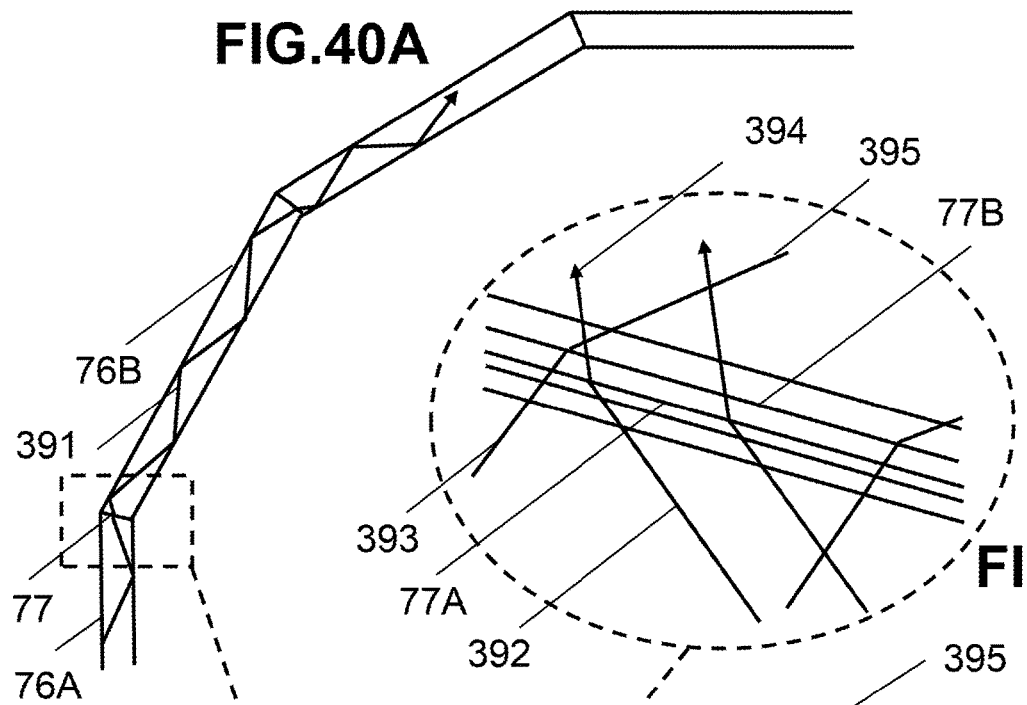
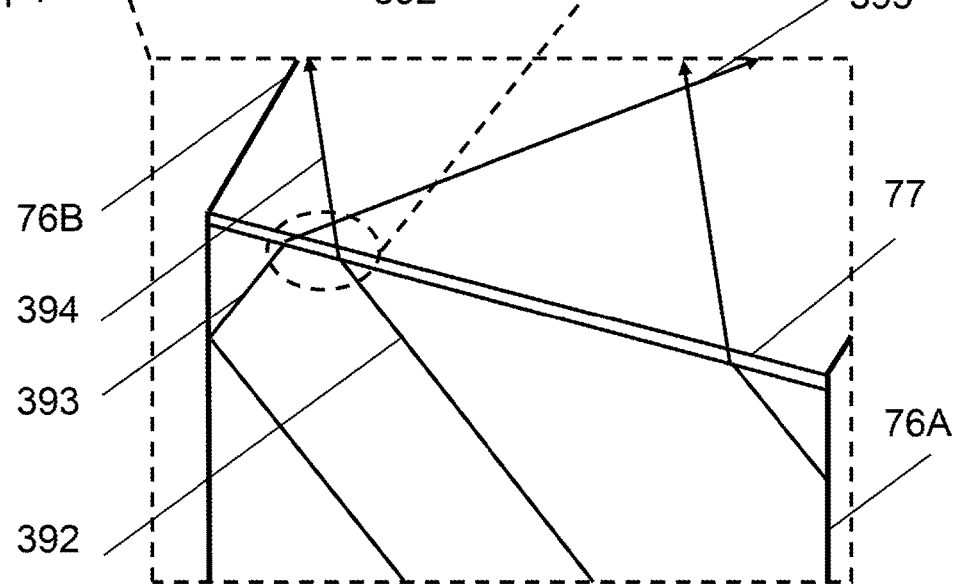
FIG.40A
FIG.40B
FIG.40C

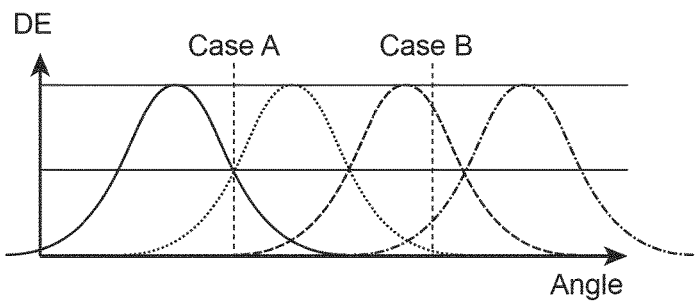
FIG.42A
Spatial Distribution of µT
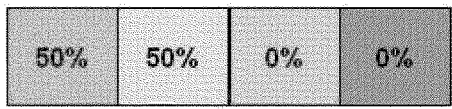
Case A: Top hat function for this field angle. 50% aperture fill.
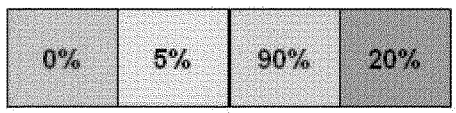
Case B: Tiles have different weighting. Aperture therefore not a top hat function.
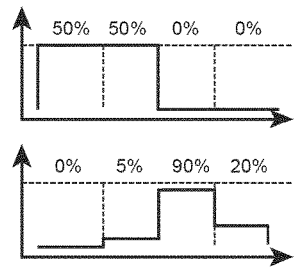
µTs don't need to be square or in order shown.
Also will have 2D distribution.
Structured and random arrangements considered in the following.
FIG.42B

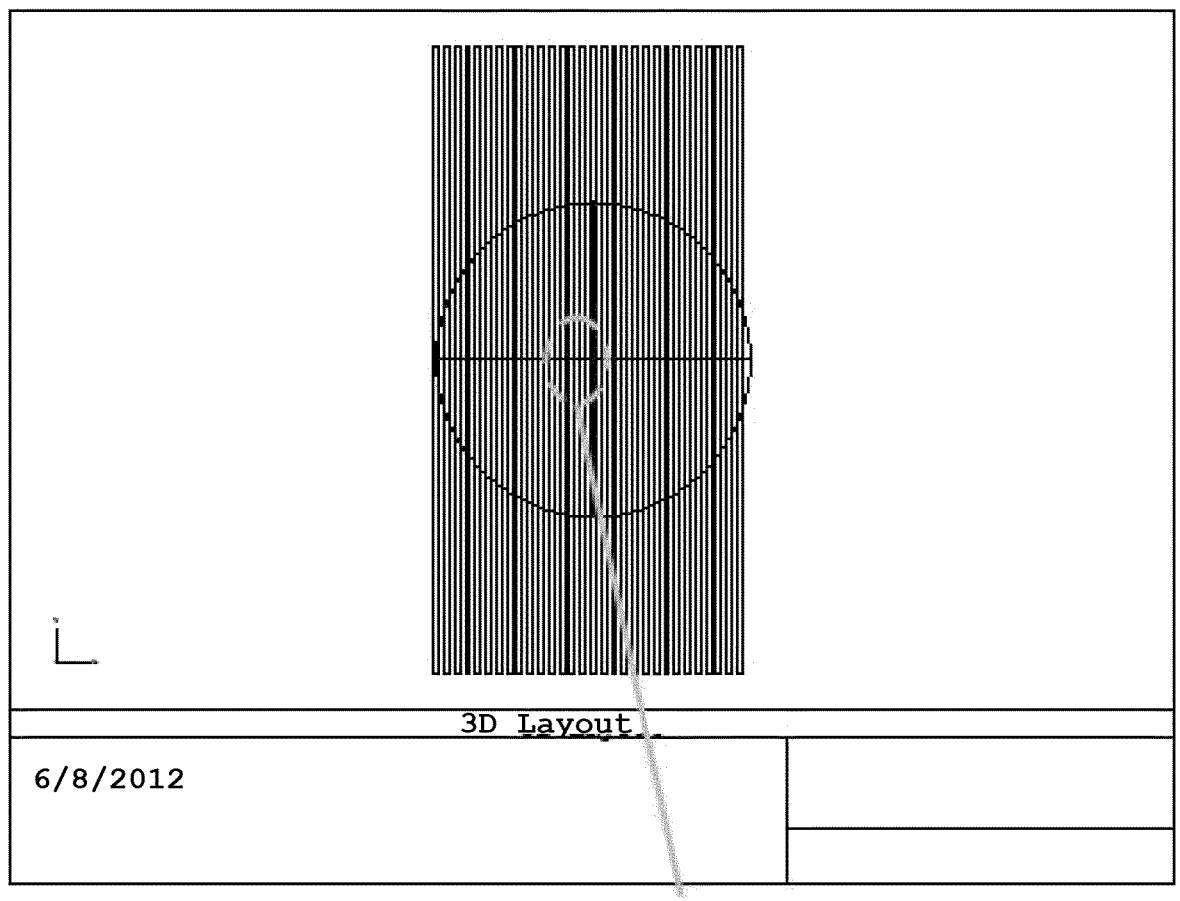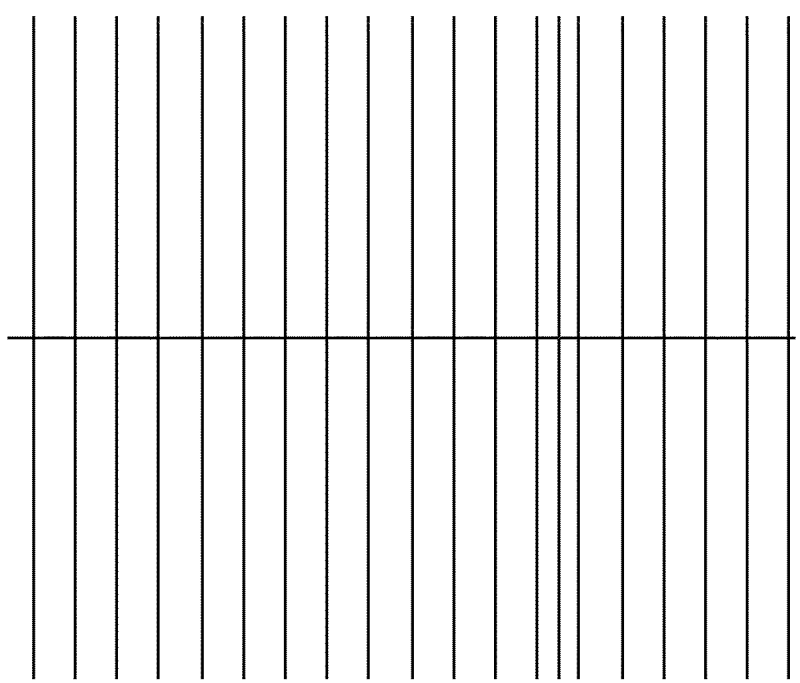
FIG. 43B

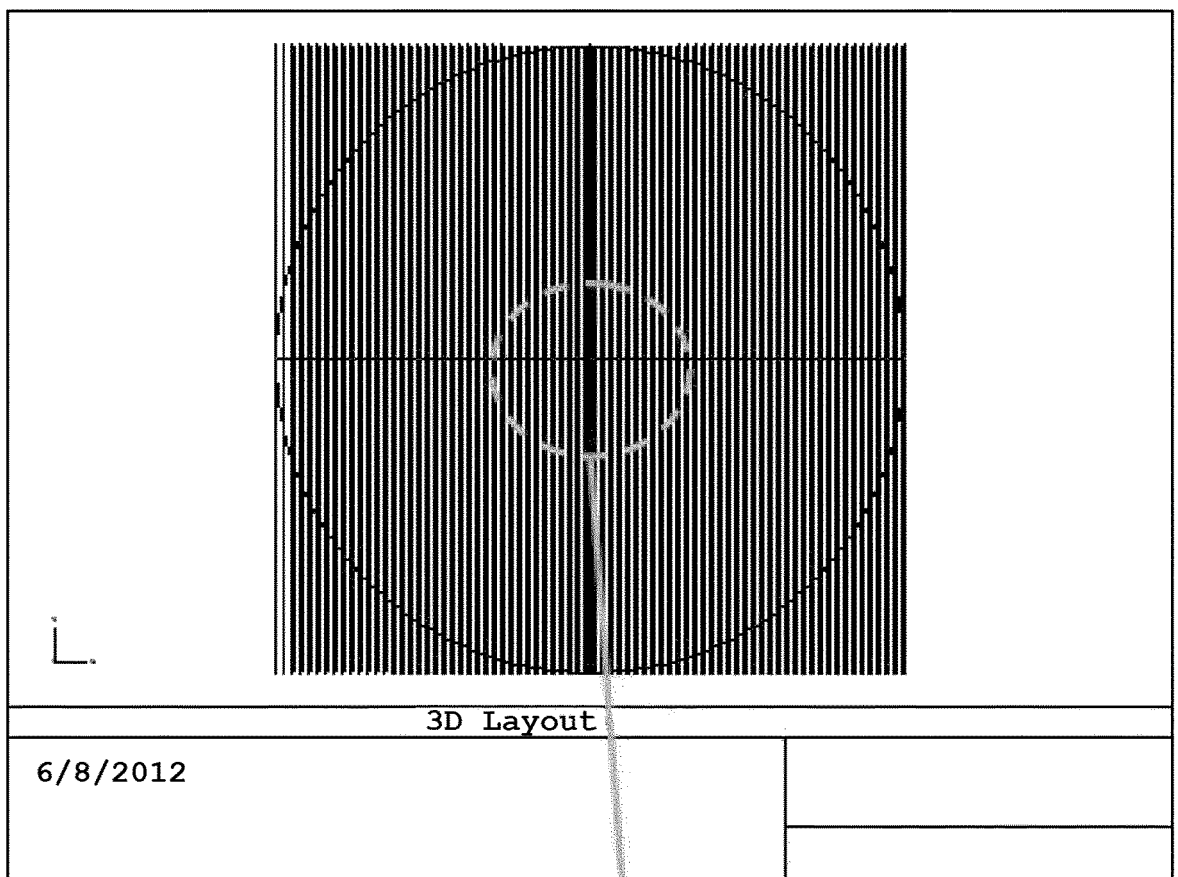
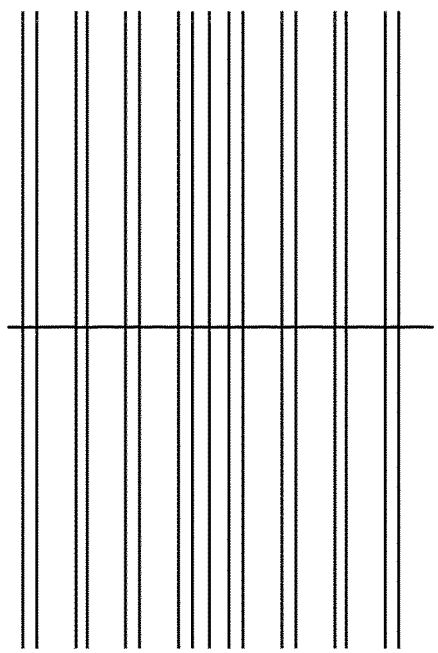
FIG. 44B

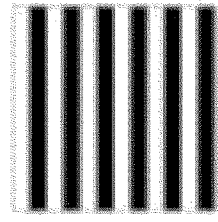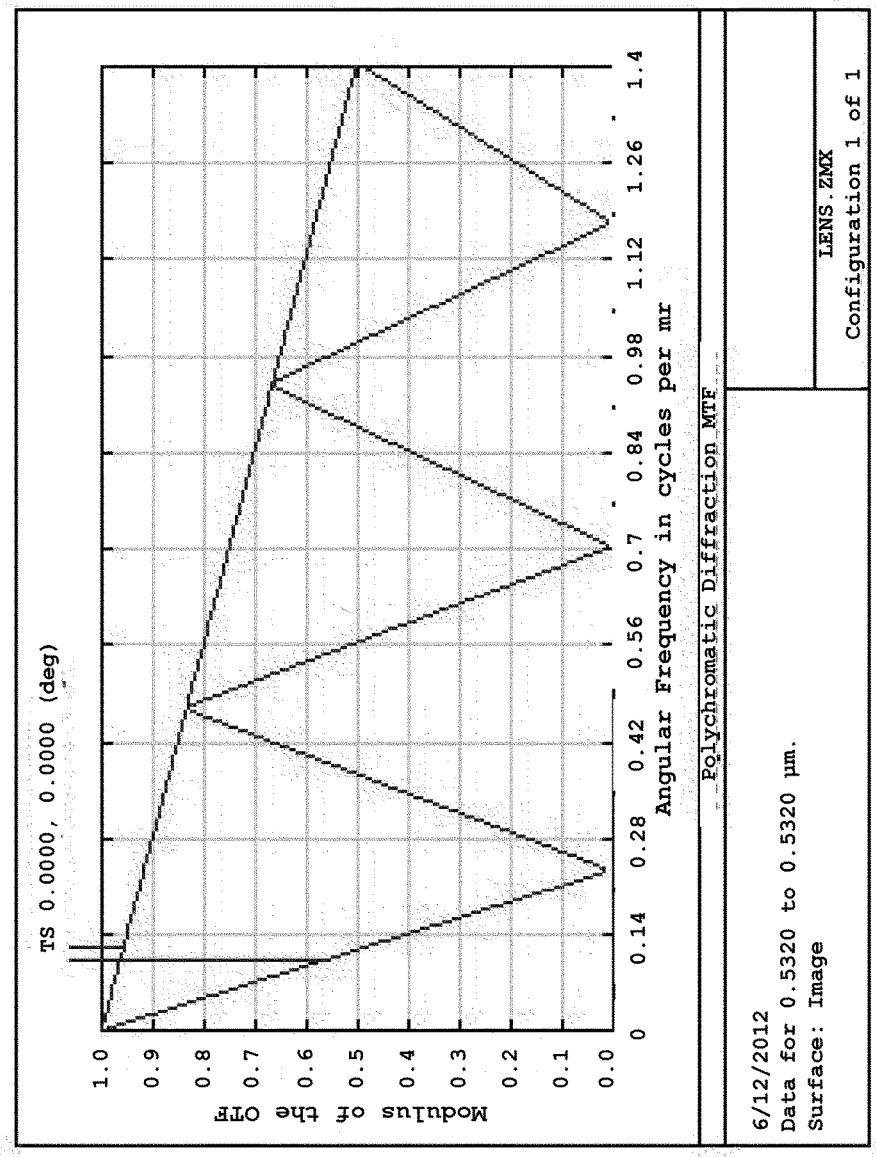
FIG. 58B

Case 1b : repeated on axis
3mm eye pupil @ 30mm eye relief.
Eye relief impacts the spatial frequency of the variation.
Larger eye relief causes higher spatial frequency ripple.
Uniformity magnitude is unaffected.
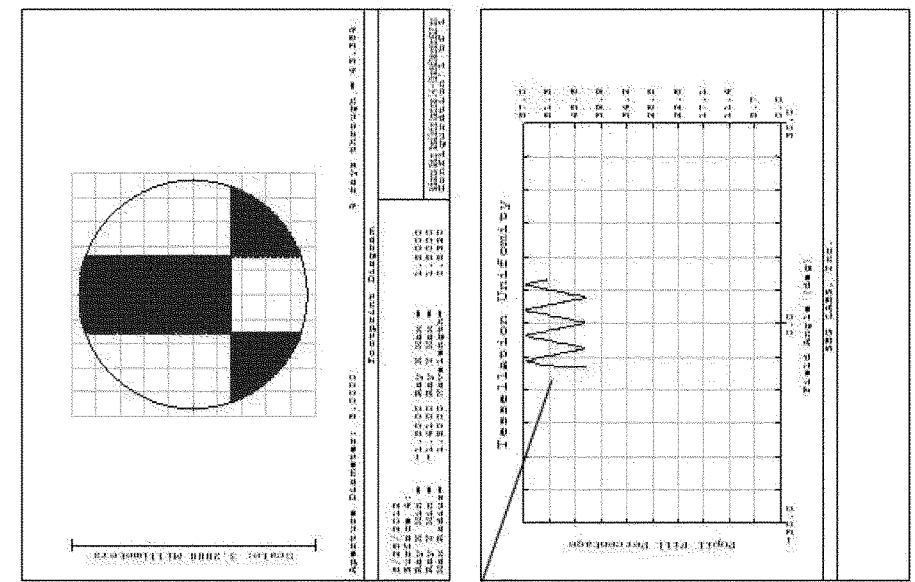
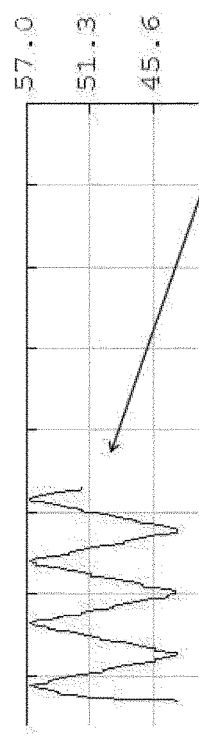
- Max Ripple: 56.6% pupil fill
- Min Ripple: 43.4% pupil fill
- Uniformity: +/-13.2%, 26.4% p-p
FIG. 64

Case 2: Consideration of Max & Min Situations
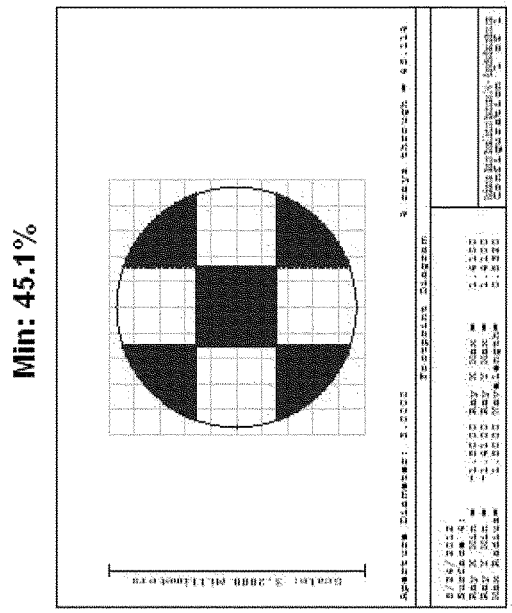
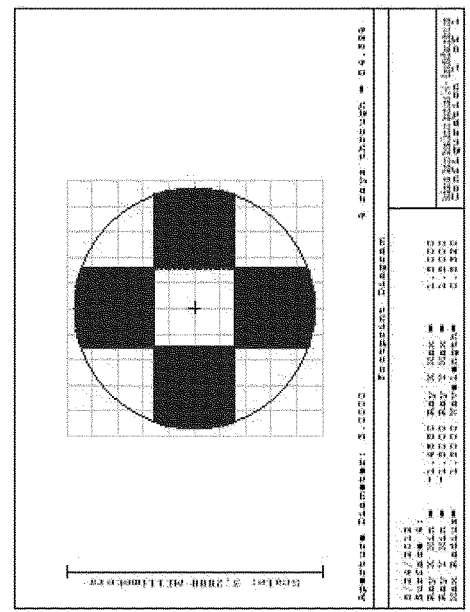
Min: 45.1%  Max: 54.9%
◆ With 1mm tessellations, min to max best uniformity is +/-5% with 50% aperture fill i.e. +/-10% uniformity variation, 20%p-p
FIG. 66

Case 3b: 0.5mm Tessellations with 50% Aperture Fill, On Axis

Represents 6 layer, 12 tile, monochrome reference design but with 0.5mm tessellations Single tile: 50% Aperture Fill
3mm eye pupil

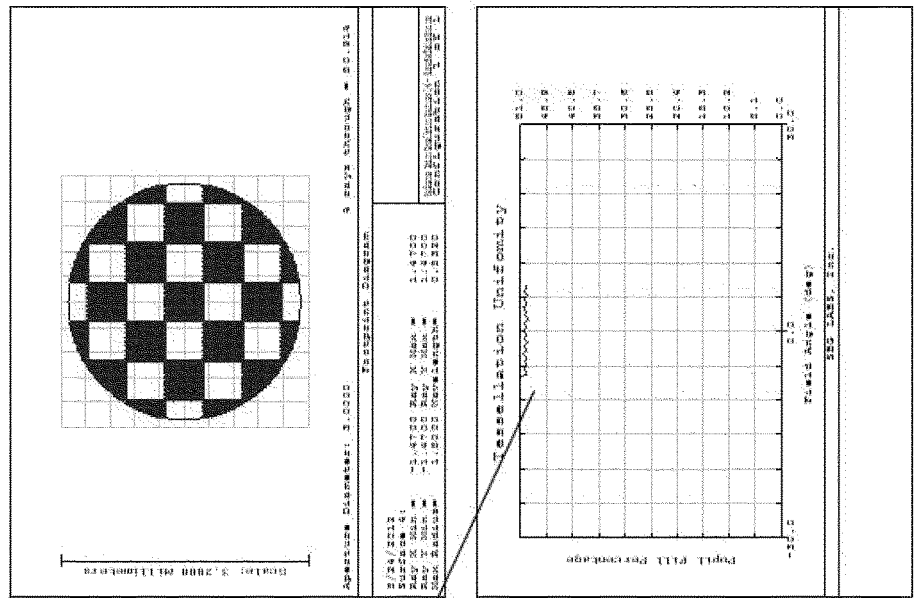

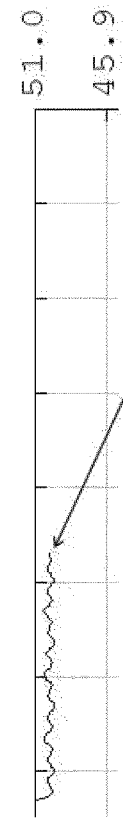

- This simulates 50% aperture fill with 0.5mm wide tessellations.
- Ripple calculated : Max=50.9, Min=49.6. Ripple magnitude is about +/-1.5% (3% P-P).
- The field range measured was ~+/-6.5deg. Off axis, tessellations are foreshortened, and so uniformity improves.
- Ripple frequency is ~1cycle for 1.25deg.

FIG. 68

4mm eye pupil, 0.5mm tessellations, 50% aperture fill
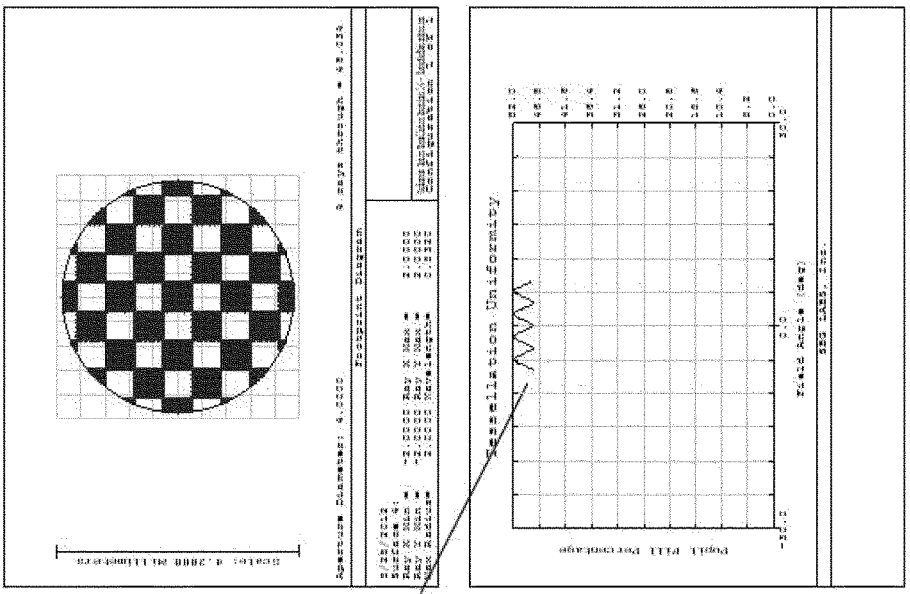
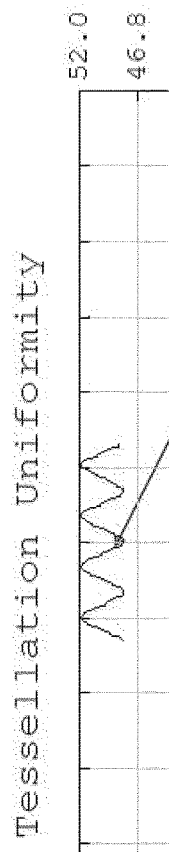
- Max: 51.97%
- Min: 48.03%
- Ripple: +/-2% = 4% p-p
FIG. 69

3mm Eye Pupil, 33% aperture fill [3 layers, 9 tile types]
Represents 3 layer, monochrome reference design but with 0.5mm tessellations
Single tile: 33% Aperture Fill
3mm eye pupil
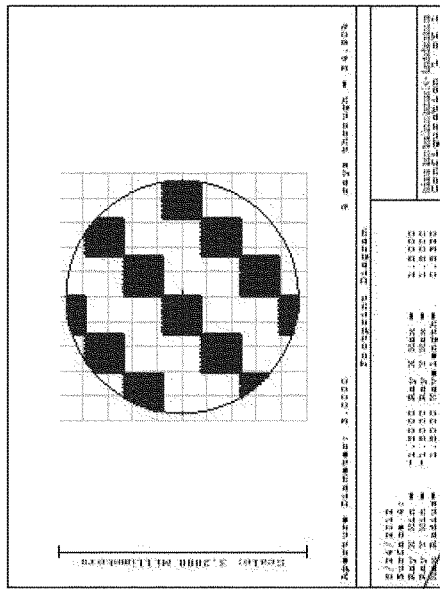
Cartestian grid distribution
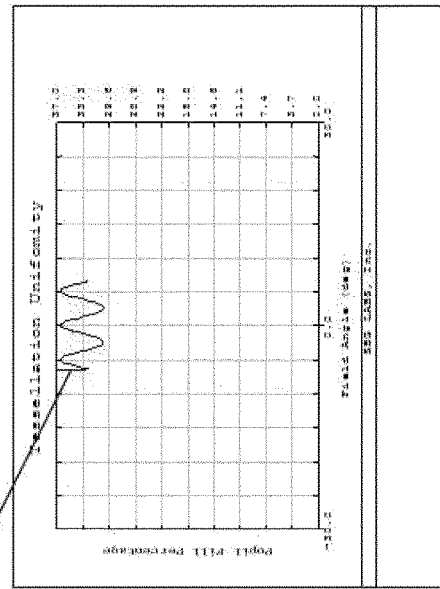
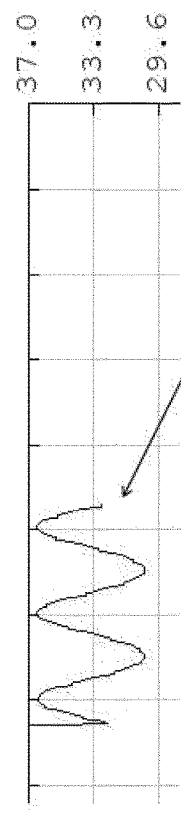
♦ Ripple calculated : Max=36.9, Min=30.4. Ripple magnitude is ~6.5%/33%=+/-9.75%=19.5% P-P.
♦ Ripple frequency is ~1cycle for 5deg.
FIG. 70

3mm Eye Pupil, 33% aperture fill [3 layers, 9 tile types]
Single tile: 33% Aperture Fill
3mm eye pupil
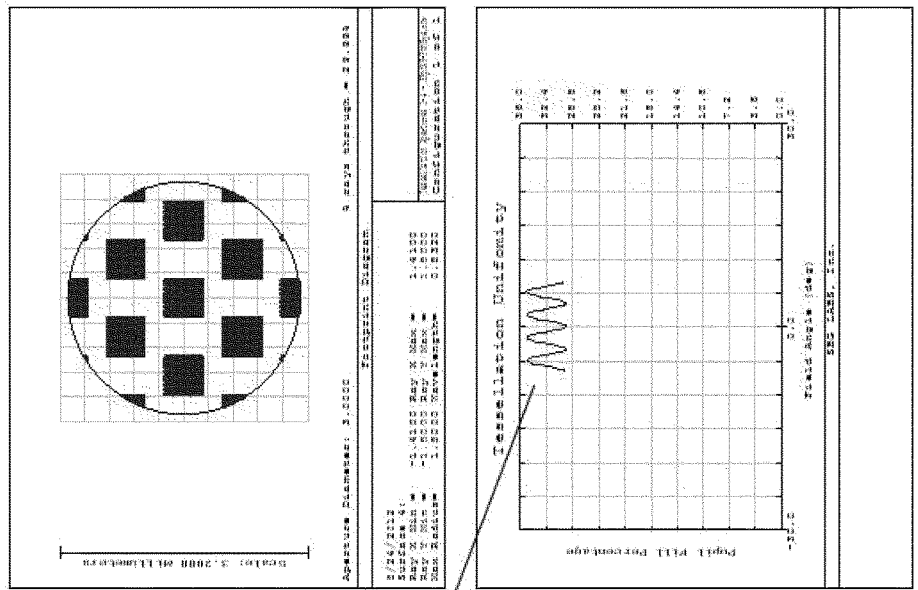
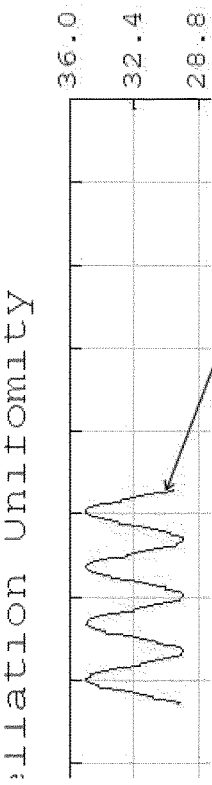
- Ripple Max: 35.2%
- Ripple Min: 29.7%
- Uniformity: 5.5%/33.3%=+/-8.25%=16.5%
FIG. 72

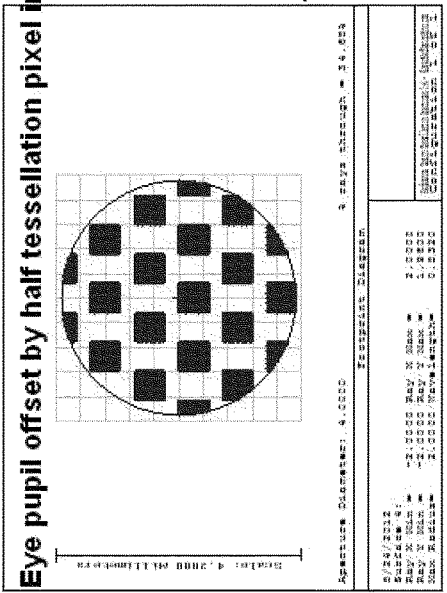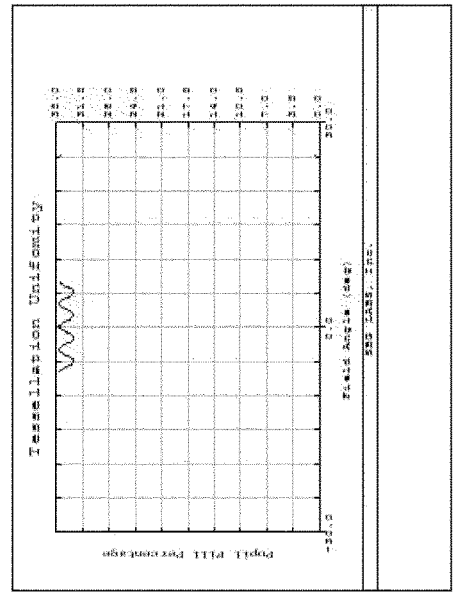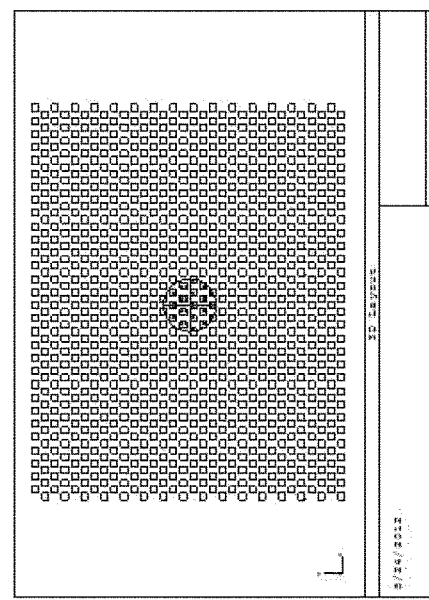
FIG. 75

HOLOGRAPHIC WIDE ANGLE DISPLAY

RELATED APPLICATIONS

This application claims priority from U.S. patent application Ser. No. 13/869,866, now U.S. Pat. No. 9,341,846, filed Apr. 24, 2013, which claims priority from U.S. Provisional Application Ser. No. 61/687,436, filed Apr. 25, 2012, and 61/689,907, filed Jun. 15, 2012, each of which is hereby incorporated by reference in its entirety.

BACKGROUND

There is a need for a compact see through data display capable of displaying image content ranging from symbols and alphanumeric arrays to high-resolution pixelated images. The display should be highly transparent and the displayed image content should be clearly visible when superimposed over a bright background scene. The display should provide full color with an enhanced color gamut for optimal data visibility and impact. A desirable feature is that the display should be as easy to wear, natural and non-distracting as possible with a form factor similar to that of ski goggles or, more desirably, sunglasses. The eye relief and pupil should be big enough to avoid image loss during head movement even for demanding military and sports activities. The image generator should be compact, solid state and have low power consumption.

The above goals are not achieved by current technology. Current wearable displays only manage to deliver see through, adequate pupils, eye relief and field of view and high brightness simultaneously at the expense of cumbersome form factors. In many cases weight is distributed in undesirable place for a wearable display in front of the eye. One common approach to providing see through relies on reflective or diffractive visors illuminated off axis. Microdisplays, which provide high-resolution image generators in tiny flat panels, often do not necessarily help with miniaturizing wearable displays because a general need for very high magnifications inevitably results in large diameter optics. Several ultra low form factor designs offering spectacle-like form factors are currently available but usually demand aggressive trade-offs against field of view (FOV), eye relief and exit pupil.

A long-term goal for research and development in HMDs is to create near-to-eye, color HMDs featuring:
  a) high resolution digital imagery exceeding the angular resolution of standard NVGs over the entire field of view and focused at infinity;
  b) a 80°×40° monocular field-of-view (FOV) HMD, or a 120°×40° binocular FOV HMD with 40° stereoscopic overlap at the center of the FOV;
  c) a high see-through (≥90%) display with an unobstructed panoramic view of the outside world, a generous eye box, and adequate eye relief; and
  d) a light-weight, low-profile design that integrates well with both step-in visors and standard sand, wind and dust goggles.

Although the imagery will be displayed over a certain field of view, the panoramic see-through capability may be much greater than this and generally better than the host visor or goggles. This is an improvement over existing NVGs, where the surrounding environment is occluded outside the 40° field of view.

One desirable head-worn display is one that: (1) preserves situational awareness by offering a panoramic see-through with high transparency; and (2) provides high-resolution, wide-field-of-view imagery. Such a system should also be unobtrusive; that is, compact, light-weight, and comfortable, where comfort comes from having a generous exit pupil and eye motion box/exit pupil (>15 mm), adequate eye relief (≥25 mm), ergonomic center of mass, focus at infinity, and compatibility with protective head gear. Current and future conventional refractive optics cannot satisfy this suite of requirements. Other important discriminators include: full color capability, field of view, pixel resolution, see-through, luminance, dynamic grayscale and low power consumption. Even after years of highly competitive development, HWDs based on refractive optics exhibit limited field of view and are not compact, light-weight, or comfortable.

Head-mounted displays based on waveguide technology substrate guided displays have demonstrated the capability of meeting many of these basic requirements. Of particular relevance is a patent (U.S. Pat. No. 5,856,842) awarded to Kaiser Optical Systems Inc. (KOSI), a Rockwell Collins subsidiary, in 1999, which teaches how light can be coupled into a waveguide by employing a diffractive element at the input and coupled out of the same waveguide by employing a second diffractive element at the output. According to U.S. Pat. No. 5,856,842, the light incident on the waveguide needs to be collimated in order to maintain its image content as it propagates along the waveguide. That is, the light should be collimated before it enters the waveguide. This can be accomplished by many suitable techniques. With this design approach, light leaving the waveguide may be naturally collimated, which is the condition needed to make the imagery appear focused at infinity. Light propagates along a waveguide only over a limited range of internal angles. Light propagating parallel to the surface will (by definition) travel along the waveguide without bouncing. Light not propagating parallel to the surface will travel along the waveguide bouncing back and forth between the surfaces, provided the angle of incidence with respect to the surface normal is greater than some critical angle. For BK-7 glass, this critical angle is ~42°. This can be lowered slightly by using a reflective coating (but this may diminish the see through performance of the substrate) or by using a higher-index material. Regardless, the range of internal angles over which light will propagate along the waveguide does not vary significantly. Thus, for glass, the maximum range of internal angles is ≤50°. This translates into a range of angles exiting the waveguide (i.e.; angles in air) of <40°; generally less, when other design factors are taken into account.

To date, SGO technology has not gained wide-spread acceptance. This may be due to the fact that waveguide optics can be used to expand the exit pupil but they cannot be used to expand the field of view or improve the digital resolution. That is, the underlying physics, which constraints the range of internal angles that can undergo total internal reflection (TIR) within the waveguide, may limit the achievable field of view with waveguide optics to at most 40° and the achievable digital resolution to that of the associated image.

BRIEF SUMMARY OF INVENTION

In view of the foregoing, the Inventors have recognized and appreciated the advantages of a display and more particularly to a transparent display that combines Substrate Guided Optics (SGO) and Switchable Bragg Gratings (SBGs).

Accordingly, provided in one aspect of some embodiments is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another aspect of some embodiments is a method of displaying an image, the method comprising: (i) providing an apparatus comprising: an input image node and a holographic waveguide device comprising (M×N) interspersed multiplicities of grating elements, where M, N are integers; (ii) generating image modulated light (I,J) input image node corresponding to field of view (FOV) tile (I,J), for integers 1≤I≤N and 1≤J≤M; (iii) switching grating elements of prescription matching FOV tile (I,J) to their diffracting states; (iv) illuminating grating elements of prescription matching FOV tile (I,J) with image modulated light (I,J); and (v) diffracting the image modulated light I, J into FOV tile I, J.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 10A is a tessellation pattern comprising hexagons of horizontally biased aspect ratio in one embodiment.

FIG. 10B is a tessellation pattern comprising rectangles of horizontally biased aspect ratio in one embodiment.

FIG. 10C is a tessellation pattern comprising diamond shaped elements of horizontally biased aspect ratio in one embodiment.

FIG. 10D is a tessellation pattern comprising triangles of horizontally biased aspect ratio in one embodiment.

FIG. 23 illustrates the composite tessellation pattern resulting from the superposition of the tiling patterns of FIGS. 19A-22B in one embodiment.

FIG. 24 shows an example of a tessellation pattern in a two layer waveguide for grating elements of one type only in one embodiment.

FIG. 28A is a cross section view showing the Input Image Node and its coupling to the DigiLens waveguide via the Vertical Beam Expander in one embodiment.

FIG. 28B shows a ray trace of the embodiment of FIG. 28A in one embodiment.

FIG. 40A shows a cross section of a curved visor implementation of the invention in which the DigiLens comprises facetted elements in one embodiment.

FIG. 40B shows the optical interface between two of the facetted elements of FIG. 40A in one embodiment.

FIG. 40C illustrates the optical interface between two of the facetted elements of FIG. 40A in more detail in one embodiment.

FIG. 42A is a chart showing the variation of diffraction efficiency with angle for a micro tessellated pattern in one embodiment of the invention in one embodiment.

FIG. 42B shows the micro-tessellation distribution corresponding to the chart of FIG. 42A in one embodiment.

FIG. 43B is a schematic illustration showing the effect of 50% aperture fill produced by the micro tessellation pattern of FIG. 43A in one embodiment.

FIG. 44B is a schematic illustration showing the effect of 25% aperture fill produced by the micro tessellation pattern of FIG. 43A in one embodiment.

FIG. 58B is a chart showing the MTF of a Bitmap Aperture Function in one embodiment.

FIG. 64 is a second illumination uniformity analysis of a first implementation tessellation pattern in one embodiment.

FIG. 66 is a fourth illumination uniformity analysis of a first implementation tessellation pattern in one embodiment.

FIG. 68 is a sixth illumination uniformity analysis of a first implementation tessellation pattern in one embodiment.

FIG. 69 is a seventh illumination uniformity analysis of a first implementation tessellation pattern in one embodiment.

FIG. 70 is an eighth illumination uniformity analysis of a first implementation tessellation pattern in one embodiment.

FIG. 72 is a tenth illumination uniformity analysis of a first implementation tessellation pattern in one embodiment.

FIG. 74 is a twelfth illumination uniformity analysis of a first implementation tessellation pattern in one embodiment.

FIG. 75 is a thirteenth illumination uniformity analysis of a first implementation tessellation pattern in one embodiment in one embodiment.

DETAILED DESCRIPTION

Figure 1:
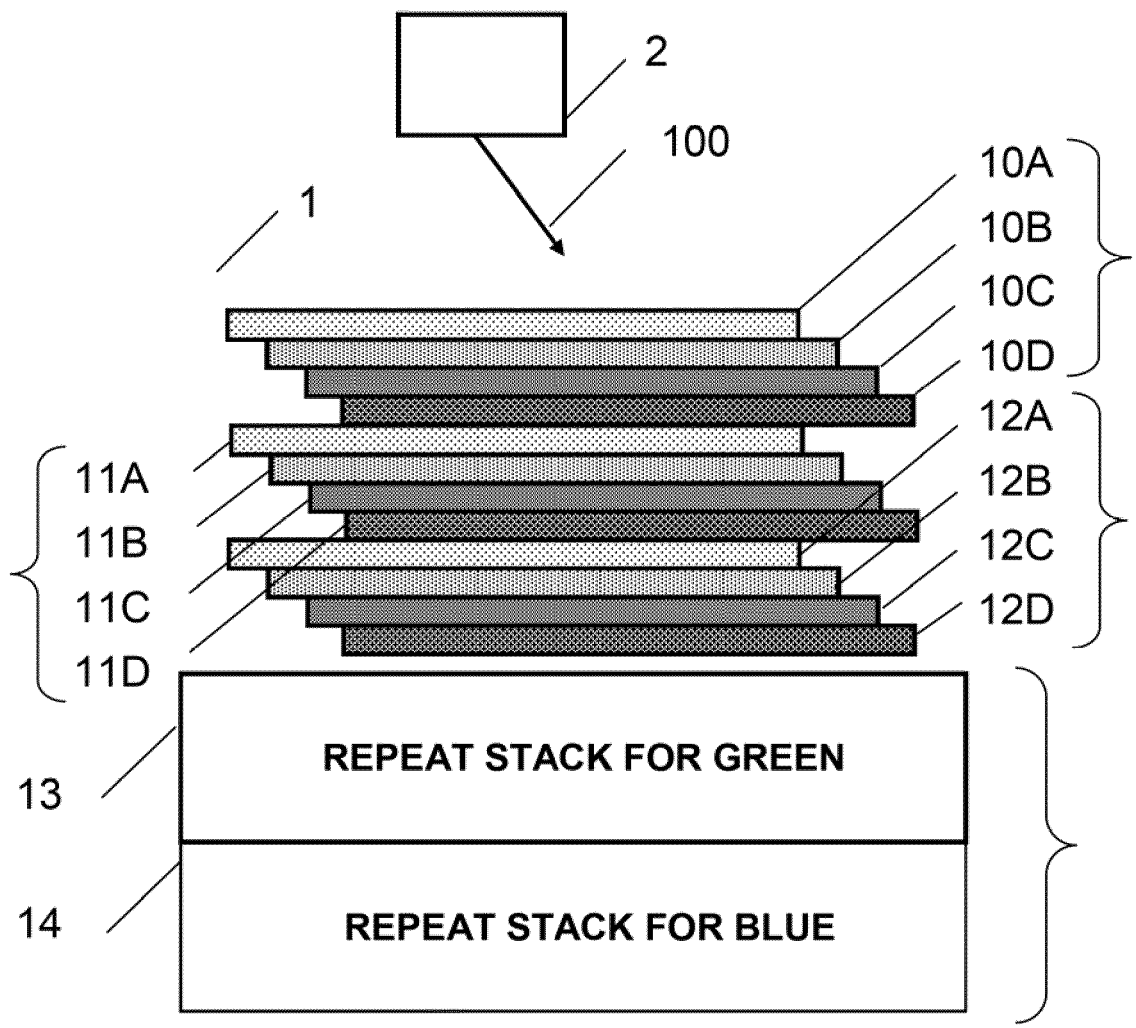
FIG. 1 is a schematic illustration of a color waveguide display architecture using stacked gratings where each grating prescription corresponds to waveguide light being diffracted into a unique field of view tile.

Following below are more detailed descriptions of various concepts related to, and embodiments of, an inventive display. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various Embodiments

Provided in one embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile. The first and second multiplicities of the grating elements may comprise an SBG in a passive mode or a switching mode.

Provided in another embodiment is an apparatus for displaying an image, comprising: an input image node configured to provide at least a first and a second image modulated lights; a beam expander; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile.

Provided in another embodiment is an apparatus for displaying an image, comprising: an input image node configured to provide at least a first and a second image modulated lights; and a holographic waveguide device configured to propagate the at least one of the first and second image modulated lights in at least a first direction. The holographic waveguide device may comprise: at least a first and second interspersed multiplicities of grating elements disposed in at least one layer, the first and second grating elements having respectively a first and a second prescriptions. The first and second image modulated lights may be modulated respectively with first field of view (FOV) and second FOV image information. The first multiplicity of grating elements may be configured to deflect the first image modulated light out of the at least one layer into a first multiplicity of output rays forming a first FOV tile, and the second multiplicity of grating elements may be configured to deflect the second image modulated light out of the layer into a second multiplicity of output rays forming a second FOV tile. At least one of the first and second multiplicities of the grating elements may be tessellated in a predetermined pattern.

In one embodiment, at least one of the first and second multiplicities of the grating elements comprise an SBG that is in a switching mode or in a passive mode.

In one embodiment, at least one of the first and second multiplicities of the grating elements are electrically switchable.

In one embodiment, at least one of the first and second multiplicities of the grating elements have a non-diffracting state and a diffracting state having a diffraction efficiency lying between a predetermined minimum level and a maximum level.

In one embodiment, all elements in the first or second multiplicities of grating elements are configured to be switched.

In one embodiment, at least one of the first and second multiplicities of the grating elements have a diffracting state, and when in the diffracting state. The first grating elements are configured to deflect the first image modulated light out of the at least one layer into the first multiplicity of output rays forming a first FOV tile. The second grating elements are configured to deflect the second image modulated light out of the layer into the second multiplicity of output rays forming a second FOV tile.

In one embodiment, the at least one layer is sandwiched between transparent substrates to which patterned electrodes are applied.

In one embodiment, the at least one layer is sandwiched between transparent substrates to which patterned electrodes are applied, and at least one of the patterned electrodes comprises a first multiplicity of electrode elements overlapping the first multiplicity of the first grating elements and a second multiplicity of electrode elements overlapping the second multiplicity of the second grating elements.

In one embodiment, at least one of the first and second multiplicities of the grating elements have a diffraction efficiency that is spatially dependent.

In one embodiment, at least one of the first and second multiplicities of the grating elements have a diffraction efficiency that increases with distance along a length of the waveguide.

In one embodiment, within the at least one layer the grating elements have integer N1 different prescription interspersed in a first band, abutted to the left and right, in sequence, by bands containing elements of integer N2 different prescriptions where N1>N2, N3 different prescriptions where N2>N3, and integer N4 different prescriptions where N3>N4. In one embodiment, at least one of the first and second multiplicities of grating elements have 12 different prescriptions interspersed in a first band, abutted to the left and right, in sequence, by bands containing elements of 9 different prescriptions, 6 different prescriptions, and 1 prescription.

In one embodiment, each the FOV tile is configured to provide an image at infinity.

In one embodiment, each the FOV tile is configured to provide an image at a far point of the human eye.

In one embodiment, the holographic waveguide device comprises at least one of beam splitter lamina, a quarter wave plate, and a grating device for polarization recovery.

In one embodiment, the image modulated light from at least one grating element of a given prescription is present within an exit pupil region bounded by the instantaneous aperture of the human eye pupil. In one embodiment, the image modulate light from at least three grating elements of a given prescription is present.

In one embodiment, the FOV tiles abut in FOV space to form a rectangular FOV.

In one embodiment, the FOV tiles abut in FOV space to provide a continuous field of view.

In one embodiment, at least two the FOV tiles overlap.

In one embodiment, the FOV tiles abut to provide a FOV of approximately 40 degrees horizontally by 30 degrees vertically.

In one embodiment, the FOV tiles abut to provide a FOV of approximately 60 degrees horizontally by 30 degrees vertically.

In one embodiment, wherein the FOV tiles abut to provide a FOV of approximately 80 degrees horizontally by 80 degrees vertically.

In one embodiment, the input image node further comprises a despeckler.

In one embodiment, at least one of the first and second multiplicities of the grating elements are recorded in HPDLC.

In one embodiment, at least one of the first and second multiplicities of the grating elements are reverse mode SBGs.

In one embodiment, the holographic waveguide device is curved.

In one embodiment, at least one of the first and second multiplicities of grating elements have varying thickness.

In one embodiment, the holographic waveguide device comprises faceted sections abutting edge to edge.

In one embodiment, the holographic waveguide device comprises faceted sections abutting edge to edge and embedded in a plastic continuously curved volume.

In one embodiment, the holographic waveguide device comprises plastic.

In one embodiment, the holographic waveguide device is configured to provide exit pupil expansion in the first direction, and the beam expander is configured to provide exit pupil expansion in a second direction.

In one embodiment, the holographic waveguide device is configured to provide exit pupil expansion in the first direction, and the beam expander is configured to provide exit pupil expansion in a second direction that is orthogonal to the first direction.

In one embodiment, the beam expander further comprises: an input port for image modulated light from the input image node; an output port; and at least one waveguide layer configured to propagate light in a second direction. The at least one waveguide layer may comprise at least one grating lamina configured to extract the modulated light from a substrate along the second direction into the first direction through the output port.

In one embodiment, the beam expander further comprises at least one waveguide layer that comprises at least two grating lamina disposed adjacently.

In one embodiment, the beam expander further comprises at least one waveguide layer that comprises at least two overlapping grating lamina.

In one embodiment, the beam expander incorporates at least one of a beam splitter lamina, a quarter wave plate, and a grating device for polarization recovery.

In one embodiment, the first and second image modulated lights are presented sequentially.

In one embodiment, at least one of the first and second modulated image lights undergoes total internal reflection (TIR) within the waveguide device.

In one embodiment, the input image node comprises at least one of a microdisplay, a light source configured to illuminate the microdisplay, a processor for writing image data to the microdisplay, and a collimation lens, a relay lens, a beam splitter, and a magnification lens.

In one embodiment, the first and second multiplicities of the grating elements are tessellated in a predetermined pattern.

In one embodiment, the predetermined pattern is at least one of a periodic pattern, a non-periodic pattern, a self-similar pattern, a non-self-similar tiling pattern, and randomly distributed pattern. In one embodiment, a non-periodic pattern may be a Penrose tiling pattern. In another embodiment, a self-similar pattern may be a Penrose tiling pattern.

In one embodiment, all elements in the first or second multiplicities of grating elements are configured to be switched into a diffracting state simultaneously.

In one embodiment, at least one of the first and second multiplicities of the grating elements have at least one axis of symmetry.

In one embodiment, at least one of the first and second multiplicities of the grating elements have a shape that comprises at least one of a square, triangle and diamond.

In one embodiment, elements of the first multiplicity of grating elements have a first geometry and elements of the second multiplicity of grating elements have a second geometry.

In one embodiment, at least one of the first and second grating elements have at least two different geometries.

In one embodiment, all grating elements in the at least one the layer are optimized for one wavelength.

In one embodiment, at least one of the first and second grating elements in the at least one layer are optimised for at least two wavelengths.

In one embodiment, at least one of the first and second grating elements have multiplexed prescriptions optimized for at least two different wavelengths.

In one embodiment, at least one of the first and second grating elements have multiplexed prescriptions optimized for at least two different diffraction efficiency angular bandwidths.

In one embodiment, at least one of the first and second image modulated lights is collimated.

In one embodiment, at least one of the first and second image modulated lights is polarized.

In one embodiment, the apparatus may further comprise an illumination source comprising a laser providing light of at least one wavelength.

In one embodiment, the holographic waveguide device is configured to provide a transparent display.

Provided in some embodiments are devices comprising the apparatus as described herein. The device may be a part of a reflective display. The device may be a part of a stereoscopic display in which the first and second image modulated light provides left and right eye perspective views. The device may be a part of a real image forming display. The device may be a part of at least one of HMD, HUD, and HDD. The device may be a part of a contact lens.

In one embodiment, the input image node comprises at least one of a microdisplay, a light source configured to illuminate the microdisplay, a processor for writing image data to the microdisplay, and a collimation lens, a relay lens, a beam splitter and a magnification lens.

Provided in another embodiment is a method of displaying an image, the method comprising: (i) providing an apparatus comprising: an input image node and a holographic waveguide device comprising (M×N) interspersed multiplicities of grating elements, where M, N are integers; (ii) generating image modulated light (I,J) input image node corresponding to field of view (FOV) tile (I,J), for integers 1≤I≤N and 1≤J≤M; (iii) switching grating elements of prescription matching FOV tile (I,J) to their diffracting states; (iv) illuminating grating elements of prescription matching FOV tile (I,J) with image modulated light (I,J); and (v) diffracting the image modulated light I, J into FOV tile I, J.

In one embodiment, the method may further comprise repeating (ii)-(v) until achieving full FOV tiled.

In one embodiment, the method may further comprise sampling the input image into a plurality of angular intervals, each of the plurality of angular intervals having an effective exit pupil that is a fraction of the size of the full pupil.

In one embodiment, the method may further comprise improving the displaying of the image by modifying at least one of the following of the at least one grating lamina of at least one of the first and second optical substrates: grating thickness, refractive index modulation, k-vector, surface grating period, and hologram-substrate index difference.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

At least some embodiments provided herein overcome the challenges of tiling large FOVs using a multiplicity of different grating prescriptions in a waveguide HMD of the type disclosed in U.S. Pat. No. 8,233,204. In one embodiment, grating angular bandwidth constraints could limit the size of FOV tiles to around 10°×10° leading to unmanageably large grating stacks as the number of vertical and horizontal FOV tiles increased. Attempting full color would increase the number of layers by a factor of 3.

One important feature of the embodiments described herein is that instead of stacking gratings of different prescriptions, they are chopped up into small elements which are then interspersed into tessellation patterns in one or more overlapping layers.

One embodiment of a tessellated display may comprise an Input Image Node (T N); a first beam expander waveguide (usually vertical); and a second beam expander waveguide (usually horizontal) which also serves as an eyepiece. In one embodiment, the eyepiece combines the tessellation and beam expansion functions. Each waveguide may contain input and output Bragg gratings. Each of the waveguides may comprise more than one grating layer. In color embodiments, a separate monochromatic waveguide may be used for each primary color. Another option for providing color is to record multiplexed gratings, in which holograms with different color prescriptions are superimposed, into a waveguide. Multiplexing may also be used to combine gratings of different angular bandwidth.

Many different tessellation schemes are possible including periodic (i.e., invariant under lateral displacement), non-periodic, self similar and random schemes. The patterns may be designed to provide more detail in near the centre FOV. Embodiments provided herein encompass passive or switchable tessellation solutions and include hybrid solutions that combine passive and switchable elements.

In one embodiment, rays diffracted from each tessellation element form a footprint in the exit pupil. Typically, there must be at least two such footprints within an instantaneous eye pupil area. The precise number will depend on factors such as tessellation size and shape. In one embodiment, tessellation may present significant design and fabrication challenges. The tiny (few millimetre) grating elements result in resolution loss and illumination ripple, both of which have proved difficult to correct. The holographic recording and electrode patterning of tessellated holographic arrays may be difficult with current processes. These challenges may be overcome by using the passive grating elements. In one embodiment, bandwidth may be increased in the tangential plane by making gratings thinner, while broad bandwidth in the orthogonal, sagittal, plane may be achieved. Tessellation may offer a route to larger FOVs if the above design and fabrications problems can be solved. A FOV of 80°×80° in color is a reasonable goal.

One embodiment uses separate vertical and horizontal beam expansion waveguides to provide an enlarged exit pupil (or eye box). In one embodiment, collimated image light from the IIN is fed into the first beam expansion waveguide with a FOV defined by the microdisplay and collimating optics. One embodiment allows the input or "coupling" optics to be configured in many different ways ranging from classical optical lens-mirror designs to more compact designs based entirely on diffractive (holographic)

optics. One embodiment may be implemented using all-passive gratings (although the use of switchable gratings is preferred for large FOVs). Conventional passive gratings would not work. One benefit of using passive SBGs is that the refractive index modulation of the grating can be tuned from very low to very high values with a correspondingly broad range of diffraction efficiencies. The high index modulation of SBGs results from the alternating bands of polymer-rich and LC-rich regions that form the Bragg fringes. Alternatively, active gratings may also be used, wherein the active gratings may be tuned from very low to very high values with a correspondingly broad range of diffraction efficiencies.

The vertical and horizontal beam expanders may be based on lossy waveguides; that is, ones designed to extract light out of the waveguide uniformly along its length. As demonstrated in U.S. application Ser. No. 13/844,456, filed Mar. 15, 2013, this may be achieved by varying the thickness (and modulation) across the grating. In one embodiment, in its simplest case this entails creating a wedged grating (by inclining the cell walls) such that the hologram thickness increases in the direction of propagation. Generally, the grating thickness may vary from 1.0-1.2 microns up to 2.8-3.0 microns, the lower thickness producing the lowest efficiency (and largest angular bandwidth). Some embodiments may allow more sophisticated control of extraction by varying the thickness in orthogonal directions, using two wedge angles, or in a more general fashion by applying curvature to one or both faces of the grating.

In one embodiment, beam expansion gratings are very thin (well below 3 microns), which results in very broad diffraction efficiency angular bandwidth which, in turn. By optimising thickness and refractive index modulation it is possible to meet all of the desired grating characteristics needed in the display—e.g., very high efficiency for coupling into gratings and large dynamic range for the efficient, uniform extraction needed for beam expansion.

Image sampling can be used to enhance image transfer efficiency and form factor. Coupling wide FOV image light into a waveguide would normally result in some loss of image angular content owing to the limited range of angles that can be efficiently propagated down a waveguide. Some of this light may couple out of the waveguide. At least some embodiments described herein may overcome this challenge by sampling the input image into multiple angular intervals, each of which has an effective exit pupil that is a fraction of the size of the full pupil, the thickness of the waveguide being reduced correspondingly.

One feature of the embodiments provided herein is the possibility of combining fixed frequency surface gratings at the input and output of each waveguide with rolled k-vectors. The surface grating may be intersection of the Bragg fringes with the substrate edge and accounts (approximately) for the basic ray optics of the waveguide. The k-vector is the direction normal to the Bragg grating and accounts for the diffraction efficiency vs. angle characteristics of the grating. By varying the k-vector direction along the waveguide propagation direction (k-vector rolling), it is possible to, firstly, provide efficient coupling of image light into the waveguide and, secondly, ensure that once coupled-in, all of the desired angular content is transmitted down the waveguide with high efficiency. The k-vector rolling would desirably be augmented by grating thickness control as discussed above.

In general the propagation of angular content down the waveguides can be optimized by fine tuning of one or more of the following: grating thickness; refractive index modulation; k-vector rolling; surface grating period; and the hologram-substrate index difference. The tessellation pattern may include infrared sensitive elements for implementing a waveguide eye tracker.

SBG Device

One way to create a much larger field of view is to parse it into a set of smaller fields of view (each compatible with the optical limitations of the waveguide) and to (time) sequentially display them rapidly enough that the eye perceives them as a unified wide-angle display. One way to do this is by using holographic elements that can be sequentially switched on and off very rapidly. One desirable solution to providing such switchable holographic elements is a device knows as a Switchable Bragg Grating (SBG).

The optical design benefits of diffractive optical elements (DOEs) include unique and efficient form factors and the ability to encode complex optical functions such as optical power and diffusion into thin layers. Bragg gratings (also commonly termed volume phase gratings or holograms), which offer high diffraction efficiencies, have been widely used in devices such as Head Up Displays. An important class of Bragg grating devices is known as a Switchable Bragg Grating (SBG). SBG is a diffractive device formed by recording a volume phase grating, or hologram, in a polymer dispersed liquid crystal (PDLC) mixture. Typically, SBG devices are fabricated by first placing a thin film of a mixture of photopolymerizable monomers and liquid crystal material between parallel glass plates or substrates. One or both glass substrates support electrodes, including for example transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by, for example, the applied voltage over a continuous range from near 100% efficiency with no voltage applied to essentially zero efficiency with a sufficiently high voltage applied.

SBGs may be used to provide transmission or reflection gratings for free space applications. SBGs may be implemented as waveguide devices in which the HPDLC forms either the waveguide core or an evanescently coupled layer in proximity to the waveguide. In one particular configuration to be referred to here as Substrate Guided Optics (SGO) the parallel glass plates used to form the HPDLC cell provide a total internal reflection (TIR) light guiding structure. Light is "coupled" out of the SBG when the switchable grating diffracts the light at an angle beyond the TIR condition. SGOs are currently of interest in a range of display and sensor applications. Although much of the earlier work on HPDLC has been directed at reflection holograms transmission devices are proving to be much more versatile as optical system building blocks.

The HPDLC used in SBGs may comprise liquid crystal (LC), monomers, photoinitiator dyes, and coinitiators. The mixture may include a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (i.e., light with the polarization vector in the plane of incidence) but have nearly zero diffraction efficiency for S polarized light (i.e., light with the polarization vector normal to the plane of incidence. A glass light guide in air will propagate light by total internal reflection if the internal incidence angle is greater than about 42 degrees. Thus, typically the embodiments using transmission SBGs described herein will use SBGs design to diffract input P-polarized light entering the waveguide into TIR angles of about 42 to about 70 degrees, or diffract TIR light at said angles into output light paths.

Normally SBGs diffract when no voltage is applied and are switching into their optically passive state when a voltage is application other times. However SBGs can be designed to operate in reverse mode such that they diffract when a voltage is applied and remain optically passive at all other times. Methods for fabricating reverse mode SBGs may be any suitable methods, such as for example those disclosed in PCT/GB2012/000680 by Popovich et al. The same reference also discloses how SBGs may be fabricated using flexible plastic substrates to provide the benefits of improved ruggedness, reduce weight and safety in near eye applications.

The invention will now be further described by way of example only with reference to the accompanying drawings. It will be apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description repeated usage of the phrase "in one embodiment" does not necessarily refer to the same embodiment.

One important feature of the embodiments provided herein is the realization that one way to create a much larger field of view is to parse it into a set of smaller fields of view (each compatible with the optical limitations of the waveguide) and to (time) sequentially display them so fast that the eye perceives them as a unified image.

One way to do this is with holographic elements that can be sequentially switched on and off very rapidly. U.S. Provisional Patent Application No. 61/687,436, filed 25 Apr. 2012, shows that multiple SBGs can be stacked together in the same waveguide and activated in rapid succession to time-sequentially tile a high-resolution, ultra-wide-field of view. Moreover, each subfield of view has the full digital resolution of the associated imager, allowing the formation of images that approach or even exceed the visual acuity limit of the human eye.

While the tiling disclosed in this earlier filing overcomes the twin deficiencies of standard guided-wave architectures (i.e., limited field of view and limited pixel resolution), it has limitations when it is necessary to tile vertically and horizontally over large fields of view. For monochrome displays with modest FOV and expansion in only one direction, tiling can be accomplished by simply stacking the grating planes. However, when the field of view is expanded in both directions and color is added, the number of layers needed with this approach quickly becomes impractical. For example, consider FIG. 1 which shows is a schematic illustration of a beam defection system for providing a display. The display is based on the principle of using a stack 1 of electrically switchable gratings SBGs to deflect input light 100 from an image generator 2 into FOV regions or tiles. In one embodiment, each SBG is essentially a planar grating beam deflector that deflects incident TIR light into output light forming a unique FOV tile. The SBG elements 10A-10D provide a first row of four FOV tiles, elements 11A-11D provide a second row of four FOV tiles, and elements 12A-12D provide a third row of four FOV tiles, Advantageously, the image light is collimated and may be delivered to the SBG stack by, for example, a light guide or Substrate Guided Optics. The substrates used to containing the SBGs may provide the light-guiding substrate. FIG. 2 shows how a horizontal field of view can be generated using 4 SBGs 10A-10D configured in four separate layers. One input SBG is to provide for directing input image light from the image generator into a TIR path. The input image generator may comprise a laser module, microdisplay and optics for collimation and beam expansion. The output SBGs may be staggered horizontally to provide image continuity in FOV space. FIG. 2 shows the limiting rays in one plane for the SBG group 3 corresponding to one row of FOV tiles 10A-10D. The limiting rays 101A-101D and the maximum angular extent θ1 relative to the normal 102, 103 the display are shown. The rays define the exit pupil 104.

In one embodiment, each subfield of view is limited by the diffraction efficiency and angular bandwidth of the SBG. SBG grating devices may have angular bandwidths in air of approximately ±5° (subject to material properties, index modulation beam geometry and thickness). In one embodiment, larger angles can be achieved in practice by using thinner SBGs. In one embodiment the SBG may have a thickness less than or equal to about 4 µm—e.g., less than or equal to about 3.5 µm, 3 µm, 2.5 µm, 2 µm, 1.5 µm, 1 µm, 0.5 µm or smaller. The increased bandwidth resulting from thinner SBGs may result in lower peak diffraction efficient. In one embodiment, it may be desired to increase the refractive indeed modulation.

In one embodiment, the top SBG 10A provides a field of view of −20° to −10°; the next SBG 10B provides the field of view-10° to 0°; the next SBG 10C provides the field of view 0° to 10°; the and the lower SBG 10D provides the field of view 10° to 20°; one provides the right 20°. Each output put FOV provides a FOV tile of horizontal extent 10 degrees and a vertical extent set by the input collimation optics and the waveguide limitations typically 10 degrees. When the SBG elements are rapidly displayed in sequence (SBGs have a switching speed of as little as, for example, 35 microseconds), the eye integrates the separate optical outputs, and a 40° horizontal field of view by 10 degree vertical field of view is perceived. Each time a new output SBG is activated the input image generator generally indicated by 2 is update with a new digital image. In one embodiment, the input image generator provides an image of approximately 1000 pixels horizontal by 800 pixels vertical resolution. Hence the complete perceived image has a resolution of 4000×800 pixels. The tiles may abut in FOV space through the exit pupil defined by the overlapping light rays from the SBG layers. A HMD based on the above principles is disclosed in a PCT Application No.: PCT/GB2010/000835 with International Filing Date: 26 Apr. 2010 by the present inventors entitled COMPACT HOLOGRAPHIC EDGE ILLUMINATED EYEGLASS DISPLAY which is incorporated by reference herein in its entirety.

Figure 2:
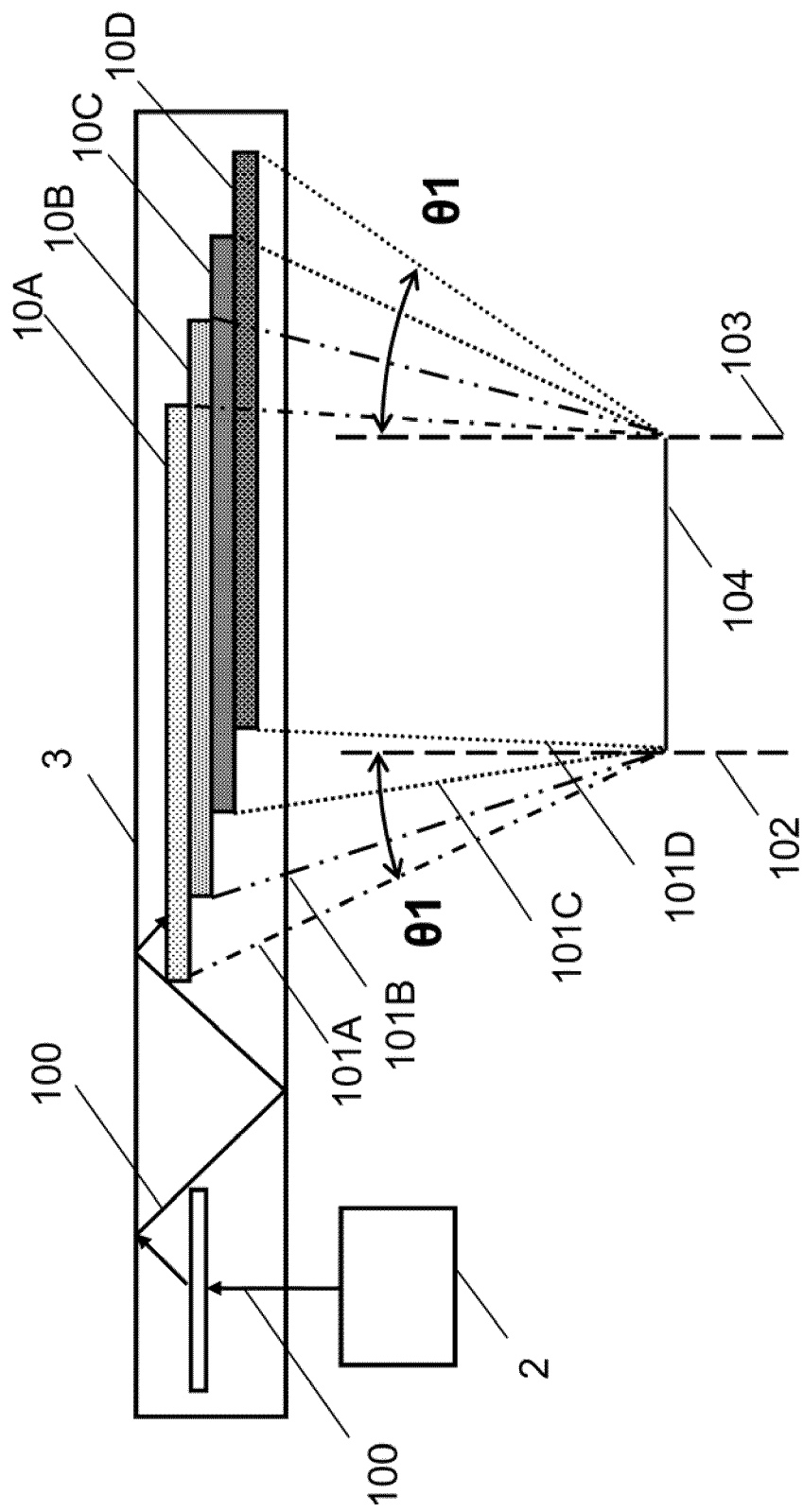
FIG. 2 is a schematic cross section view of a waveguide display in one embodiment using stacked gratings indicating the FOV provided by each grating.

The stacking approach shown in FIG. 1 may be suitable for relatively modest FOV. In one embodiment, horizontal field of view of around 60 degrees by 10 degree vertical is feasible. As the field of view increases, the number of SBG layers needed becomes impractical: six layers is the current practical limit before the performance of the display is compromised by scatter, absorption, and other optical losses. If additional layers for blue and green are added as schematically indicated by 13, 14, the number of tiles would be increased by ×3.

One method to avoid using separate RGB SBGs is to use multiplexed SBGs, in which the illumination is provided from opposite ends of the lightguide as R and B/G illumination, compromising the color gamut somewhat. However, multiplexed gratings raise issues of fabrication complexity and cross talk.

One benefit of the embodiments described herein is minimizing the need for very large numbers of SBG layers. One embodiment provides compressing the stack by interlacing the SBGs, as shown in FIG. 3, as opposed to simply stacking the gratings, as illustrated in FIGS. 1-2. Referring to the simple stacking scheme discussed above (inset), it can be seen that the optical process which would ordinarily need a stack of four holographic planes to produce one color channel can be accomplished with a single layer of interleaved gratings. Note that in FIGS. 1-3, the shading patterns of the holograms is merely for the purposes of distinguish the four different types and does not represent the geometry of the gratings.

Figure 3A:
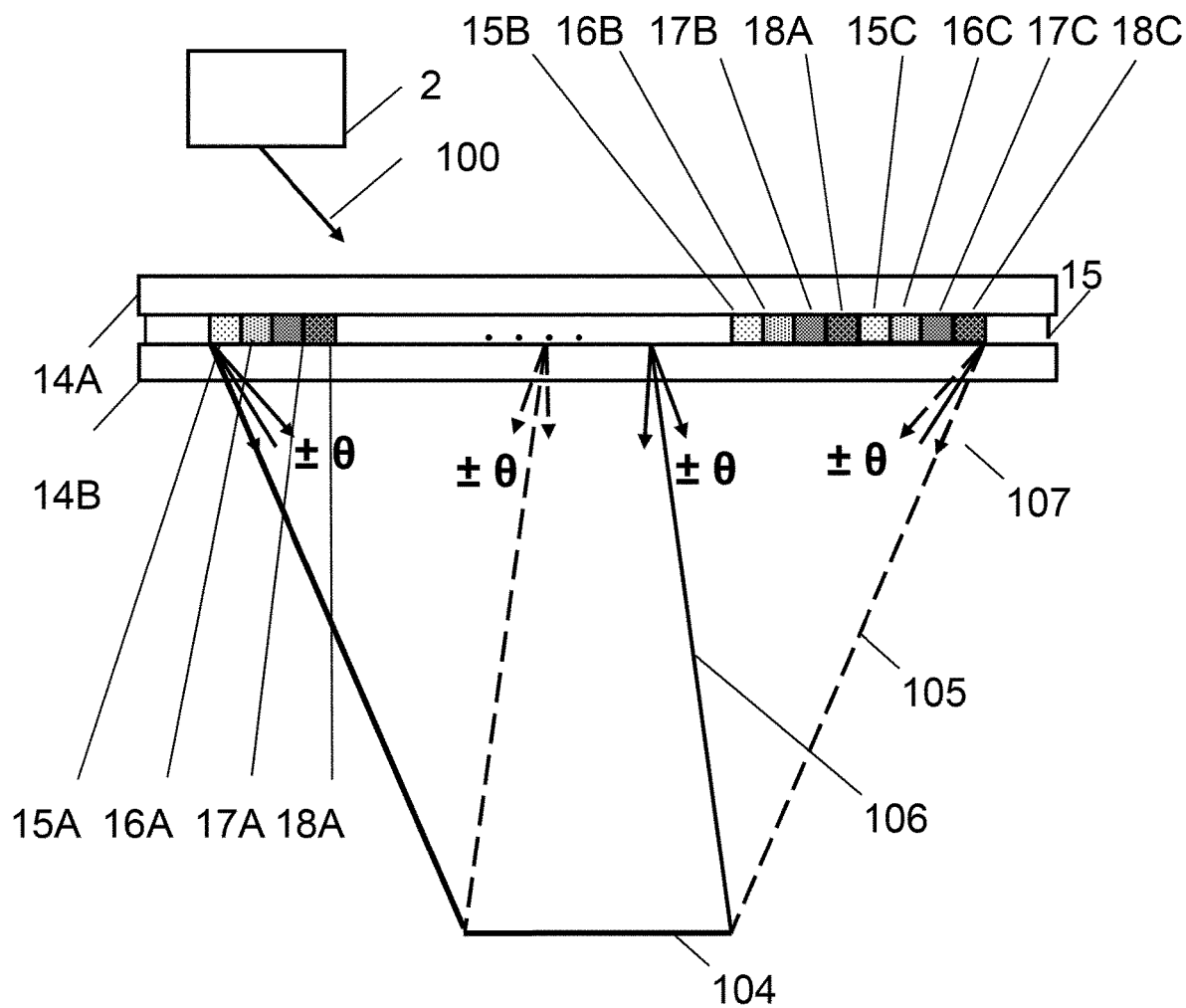
FIG. 3A is a schematic cross section view of a tessellated waveguide display in one embodiment showing a detail of the tessellation pattern.

Turning first to the schematic side elevation view of FIG. 3A, there is provided an apparatus for displaying an image comprising a multiplicity of groups of selectively switchable beam deflecting elements. In a preferred embodiment, the beam deflectors are SBGs having a first diffracting state and a second diffracting state. The first diffracting state may exhibit high diffraction efficiency and the second diffraction state may exhibit low diffraction efficiency.

In one embodiment, the SBGs may operate in reverse mode such that they diffract when a voltage is applied and remain optically passive at all other times. The SBGs may be implemented as continuous SBG lamina separated by thin (as thin as 100 microns) substrate layers. In one embodiment, the substrate may comprise plastic. In one embodiment the substrate may comprise plastic substrates with transmissive conductive coatings (instead of ITO).

For simplicity four groups of SBG elements indicated by the numerals 15-18 are illustrated, each group comprising four elements labelled by the characters A-D. The repetition of the pattern of SBG elements is indicated by the dotted line. The number of groups of beam deflecting elements or the number of elements per group is not limited. The elements are forming in a thin HPDLC grating lamina 15 sandwiched by the transparent substrates 14A, 14B. Transparent electrodes are applied to opposing faces of the substrates with at least one of the electrodes being patterned to overlap the SBG elements.

Figure 3B:
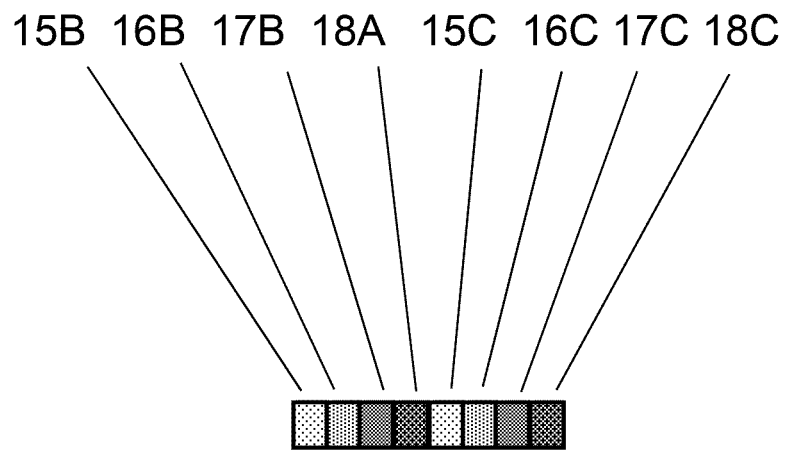
FIG. 3B is a schematic cross section view of a tessellated waveguide display in one embodiment showing a detail of the tessellation pattern in which the grating elements are uniformly interspersed.
Figure 3C:
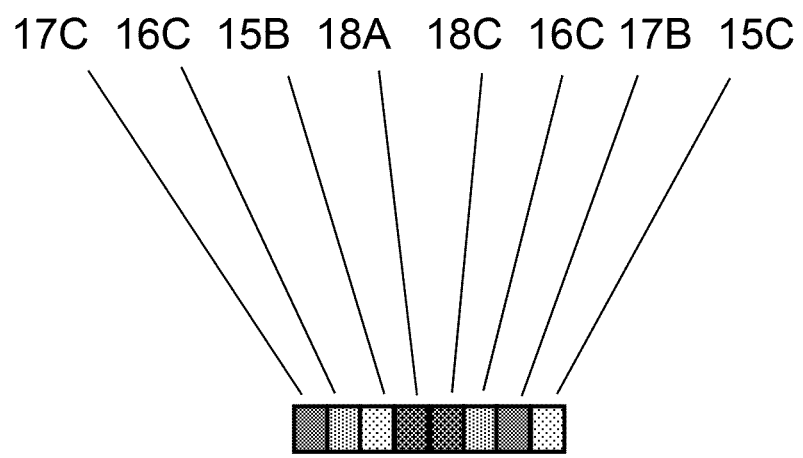
FIG. 3C is a schematic cross section view of a tessellated waveguide display in one embodiment showing a detail of the tessellation pattern in which the grating elements are randomly interspersed.
Figure 4:
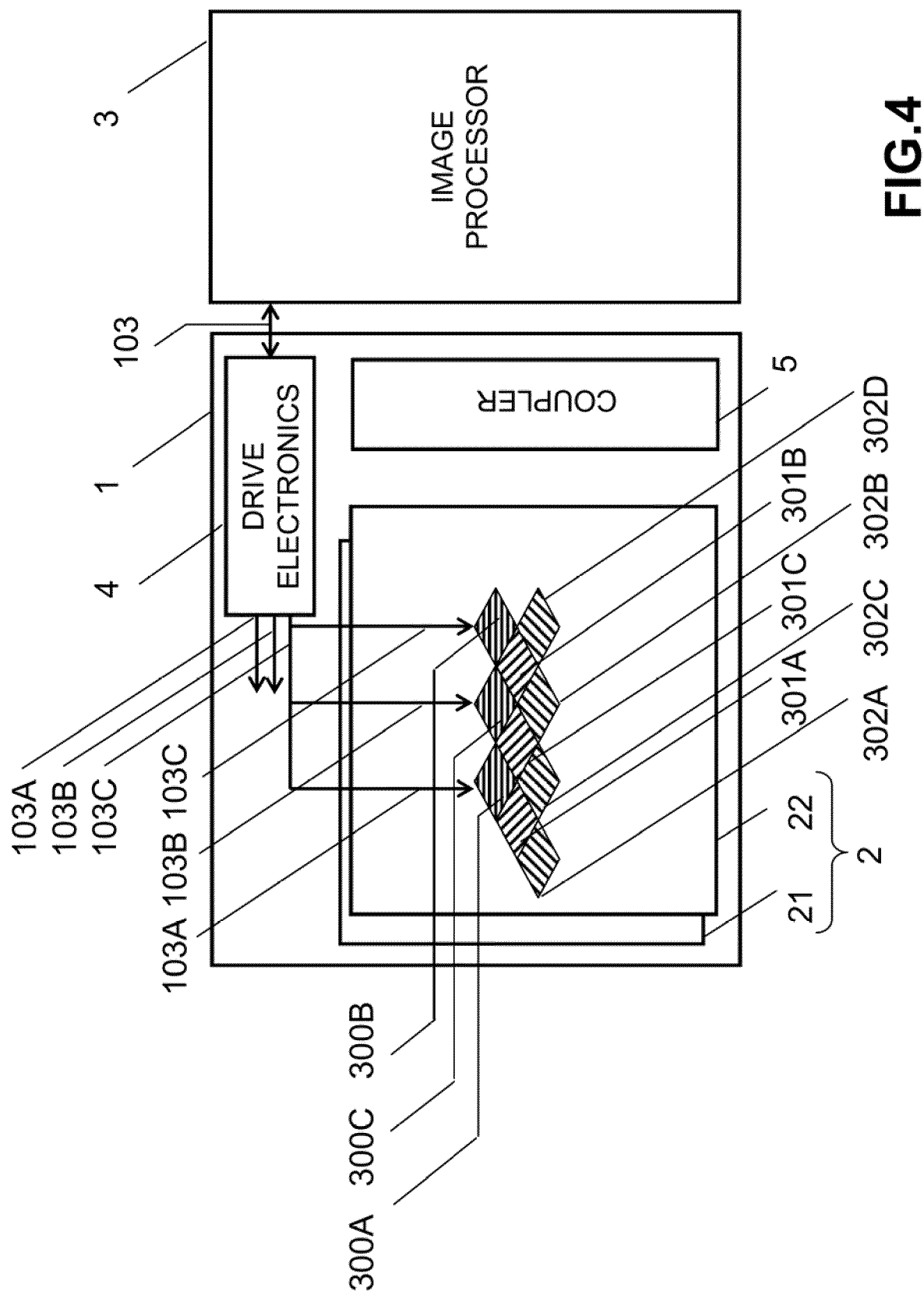
FIG. 4 is a schematic front elevation view of the function elements of a tessellated waveguide display in one embodiment.

An input image generator, which will be described in more detail later, provides collimated image light generally indicated by 100. Each group of beam deflecting elements diffracts image light into a multiplicity of rays providing a set of FOV tiles. Elements corresponding to a given tile will have a unique grating prescription. The rays may define an exit pupil according to geometrical optical principles. The limiting rays from the group 15 and 18 in the projection of the drawing are indicated by 107, 108. Each element has a diffraction efficiency angular bandwidth ±θ. Comparing FIG. 3 with FIG. 2, it should be apparent that the embodiment of FIG. 3 is equivalent to interspersing the SBG layers shown in FIG. 2 within a single SBG lamina. In one embodiment, the first multiplicity of beam deflecting elements and the second multiplicity of beam deflecting elements are uniformly interspersed a shown in FIG. 3B. In one embodiment, the first multiplicity of beam deflecting elements and the second of multiplicity beam deflecting elements are randomly interspersed as shown in FIG. 3C.

FIG. 3 shows the principles of an HMD. A display based on the above principles may comprise two sub systems: a color waveguide (which herein also refers to a DigiLens) and a device configured to inject an input image into the color waveguide (also referred herein to an Image Injection Node).

Figure 5:
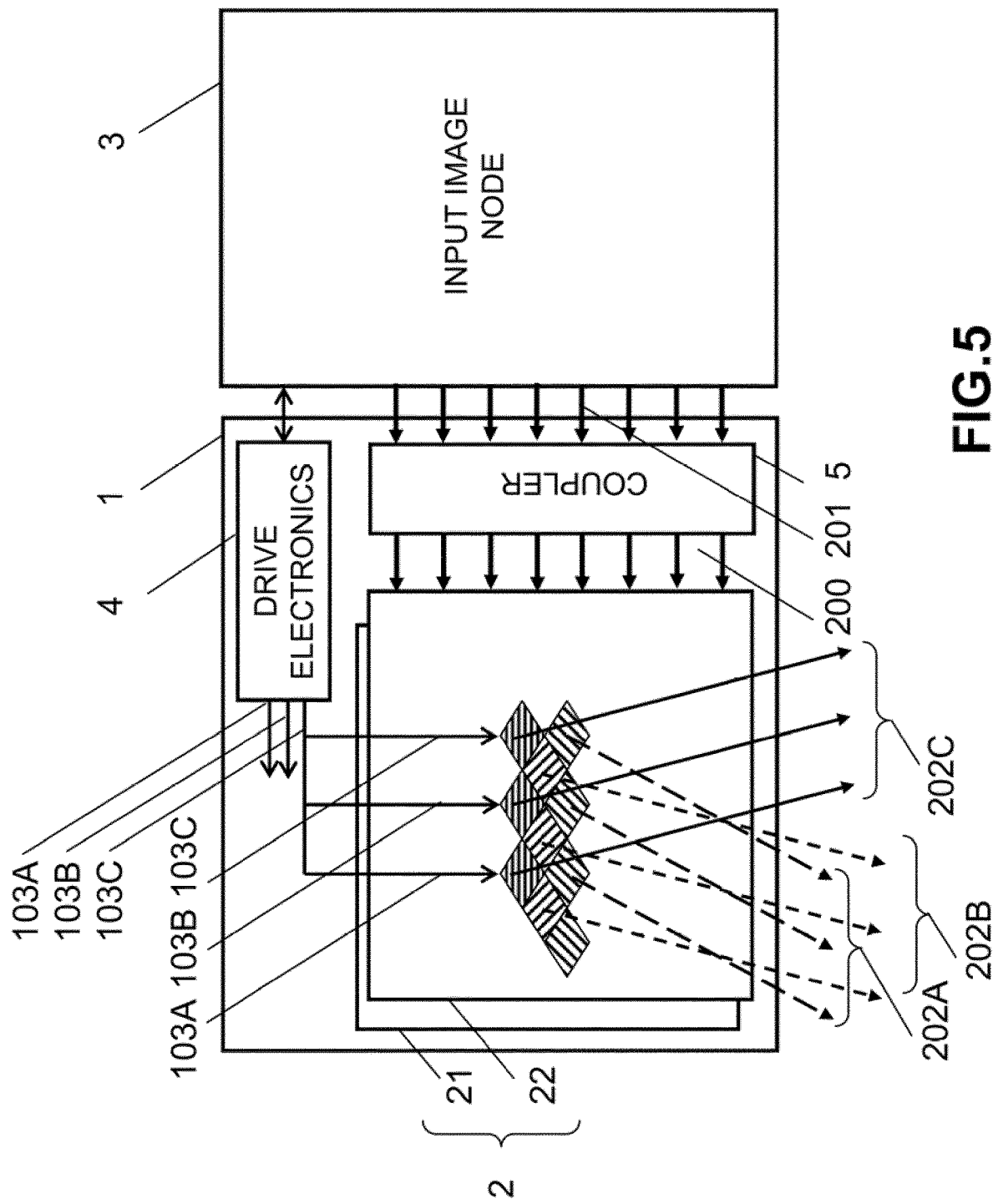
FIG. 5 is a schematic front elevation view of a tessellated waveguide display in one operational state in one embodiment.

The basic principles of the display in one embodiment are illustrated in more detail using the front elevation views of FIGS. 4-7. In a color display, the DigiLens comprises a stack of three separate RGB waveguides each providing a red, green or blue color imaging channel. In one embodiment, each waveguide is further divided into two holographic layers (to be referred to as a doublet). In one embodiment, the description will assume double layers unless stated otherwise. Hence in FIG. 4 the DigiLens 2 comprises the doublet further comprising layers 21, 22. The apparatus further comprises the IIN 3, DigiLens drive electronics 4, and a coupler for admitting light from the IIN into the DigiLens. The IIN and the DigiLens drive electronics are connected by the communication link 103. Each SBG layer contains arrays of SBGs comprising sets of sub arrays, where the members of any given sub array have one of a predefined set of optical prescriptions, each prescription corresponding to a unique FOV tile. The number of SBG prescriptions equals the number of FOV tiles. In some embodiments, a prescription defines the Bragg grating geometry needed to deflect incident TIR input light from the TIN into output light that defines a FOV tile. For simplicity three sub arrays of SBG elements indicated by the numerals 200-202 are illustrated. Three elements of each sub array are illustrated labelled by the characters A-C. The drive electronics provides voltage outputs 103A-103C. The connections 104A-104C to the SBG elements 300A-300C is shown. The distribution of the array elements depends on the FOV tile with, for example, FOV tiles near the central region of the FOV needing that the corresponding SBG elements are distributed near the center of the DigiLens. The spatial configuration of the array elements will be discussed in more detail later. FIG. 5 shows input collimated image light 200 from the IIN being coupled into the DigiLens to provide the collimated image light 201 at the input to the waveguide 2.

Typical collimated output beams from the waveguide for the SBG sub arrays 200-202 are generally indicated by 202A-202C.

In one embodiment, the SBGs operate in reverse mode such that they diffract when a voltage is applied and remain optically passive at all other times.

The SBGs may be implemented as continuous SBG lamina separated by thin substrate layers (as thin as 100 microns) as shown. This is a planar monolithic design harnessing the full assets of narrow band laser illumination with monolithic holographic optics. The motivation for configuring the SBGs as monochromatic layers is to enable the use of holographic optics and SBG beam splitter to provide a flat, solid state, precision-aligned display, minimizing the need for bulky refractive optics. In one embodiment, the resolution of the display is only limited by that of the microdisplay. The design is scalable to a larger FOV by interlacing more tiles in each layer and/or adding new layers. Likewise the pupil, eye-relief and FOV aspect ratio can be tailored to suit the application.

Figure 6:
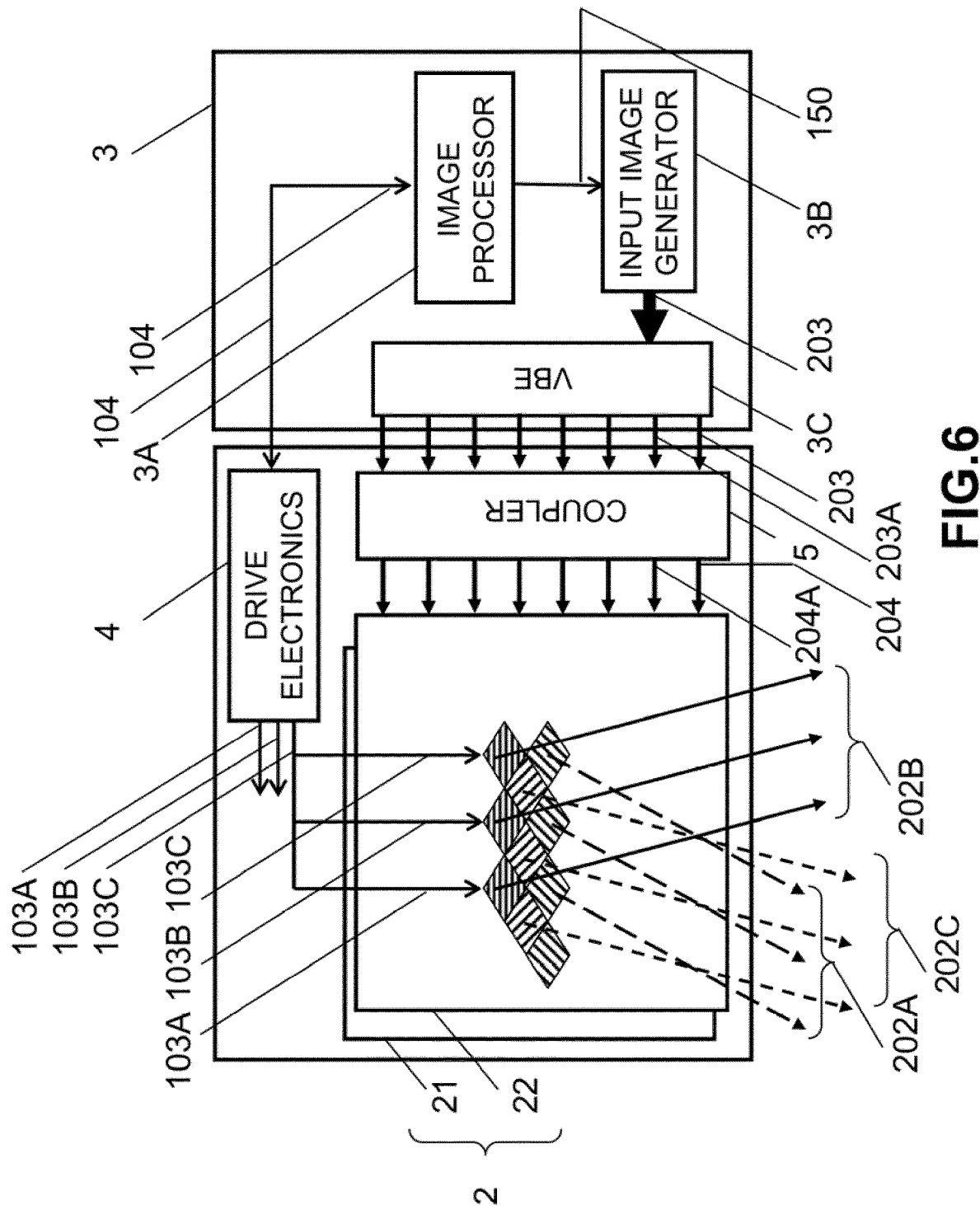
FIG. 6 is a schematic front elevation view of a tessellated waveguide display showing details of the Input Image Node in one embodiment.
Figure 7:
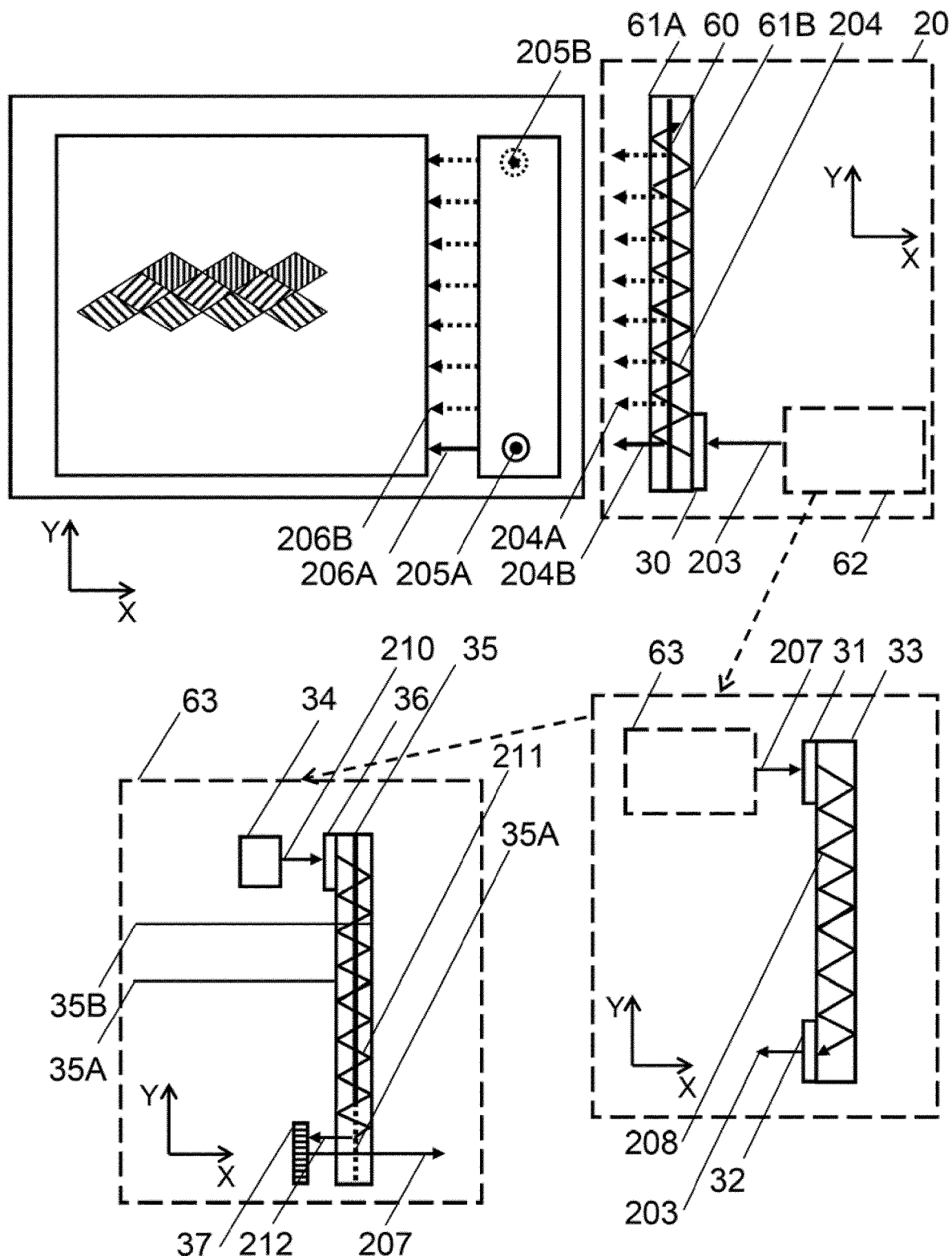
FIG. 7 illustrates the operation of the Input Image Node in one embodiment.

FIG. 6 shows the IIN in more detail in one embodiment. The role of IIN is to form a digital image, collimate it, and inject it into the DigiLens. Two separate optical subsystems may be employed: one to illuminate the microdisplay and one to collimate the image. The IIN may comprise an image processor 3A, input image generator 3B, and a vertical beam expander (VBE) 3C. The image processor provides image data to the input image generator via the communication link 150. The image processor also controls the switching of the SBG elements in the DigiLens by means of an electronic link to the DigiLens drive electronics. The input image generator, which will be discussed in more detail in the following description, may comprise a laser module and microdisplay. Collimated image light 203 from the input generator is coupled into the beam expander 3C, which is itself optically connected to the coupler 5. FIG. 7 illustrates the operation of the IIN in further detail concentrating on the input image generator and the VBE and referring to the XYZ orthogonal coordinate axes provided in the drawings. The front elevation view corresponds to the YX plane, and the Y axes refer to the vertical direction as perceived by the viewer of the display.

The VBE comprises a SBG 60 sandwiched by substrates 61A, 61B. Image light from the image generator undergoes TIR, as indicated by 204 within the waveguide formed by the substrates. The VBE is designed to be lossy. In other words, the diffraction efficiency of the grating is low at the end nearest the image generator and highest at the furthest extremity. One effect is that it couples light, such as 204A, 204B, out towards the couple 5 along its entire length providing a vertical beam expansion (in the Y direction) to match the height of the DigiLens waveguide. Image light may be coupled into the VBE by a grating coupler 31A. Referring to the drawing inset 62, there is further holographic objective 31 and a holographic field lens 32 both optically connected to light guiding device 33. Image light from the microdisplay 207 is admitted to the light bide via the holographic objective and follows the TIR path 208 until it is directed out of the light guide into the VBE by the holographic objective 32 as output light 203. In one embodiment, the light guide 33 includes inclined surfaces at each end. The drawing inset 63 shows the configuration of the laser module and microdisplay. The illumination of the microdisplay 37 may be performed using a diode laser 34, a waveguide, and a SBG beam splitter. The SBG beam splitter may be formed as lamina 36 sandwiched between transparent substrates 35A, 35B forming the waveguide. A slanted SBG grating is recorded in the portion of the lamina 35A overlapping the microdisplay. Collimated P-polarised light 210 from the laser module is admitted into the waveguide by a coupler 36. The coupler may be a prism. In some embodiments, the coupler may be a grating device. The coupled light follows the TIR path 211 up the SBG beam splitter, where according to the properties of SBGs the P-polarised light is diffracted towards the microdisplay. On reflection the light becomes S-polarized and passes through the SBG beam splitter without substantial loss or deviation to emerge from the waveguide as the collimated image light 207.

It should be apparent to those skilled in the art of optical design that many alternative optical configurations and components may be used to provide an IIN according to the principles described herein.

For example, the reflective microdisplay could be replaced by a transmissive device. Alternatively, an emissive display may be used. It should also be apparent that components such as anamorphic lenses and light shaping diffusing elements may be used in certain applications to control image aspect ration and illumination uniformity. The apparatus may further include a despeckler. The IIN may comprise, or be, a diffractive optical device. The processes carried out by the IIN, as employed in pre-existing techniques, may use several refractive lenses, a polarizing beam splitter cube, and a precision housing for aligning and assembling the various components. Not only are the piece parts expensive, but the touch labor is excessive. In addition, the whole assembly is difficult to ruggedize and, in the end, heavy and bulky. Miniaturized components can reduce size and weight, but they also sharply increase component costs and assembly time.

It should further be apparent that the description of the IIN has referred to just one monochromatic microdisplay. In a color display the IIN optical components would need to be replicated for each color. Since the optical design uses substrate guided optics and diffractive optical elements, the combination of the red green and blue channels in one embodiment can be accomplished within a very compact form factor that is only limited by the size of the microdisplay and laser module and the overall system design needs.

Figure 8A:
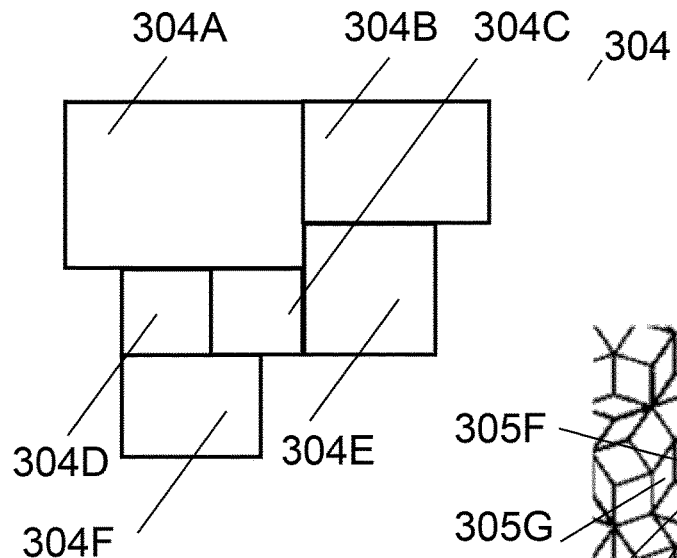
FIG. 8A is a tessellation pattern comprising rectangular elements of differing size and aspect ratio in one embodiment.
Figure 8B:
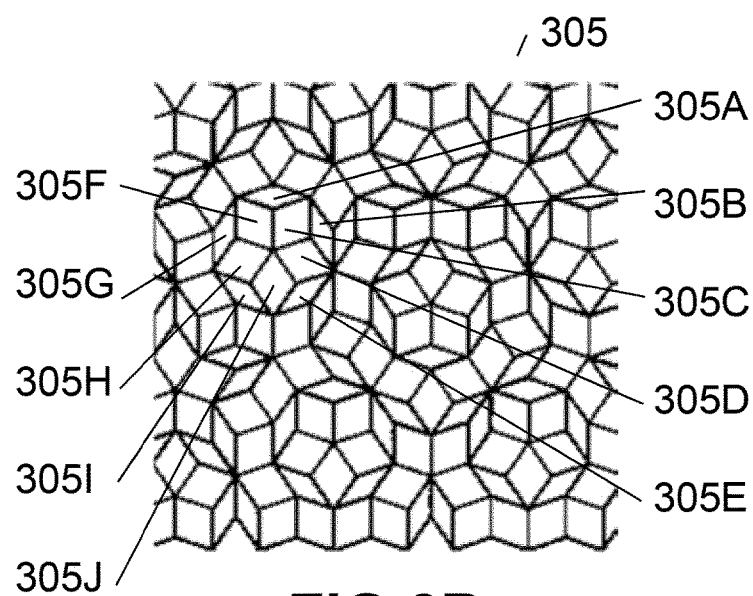
FIG. 8B is a tessellation pattern comprising Penrose tiles in one embodiment.
Figure 8C:
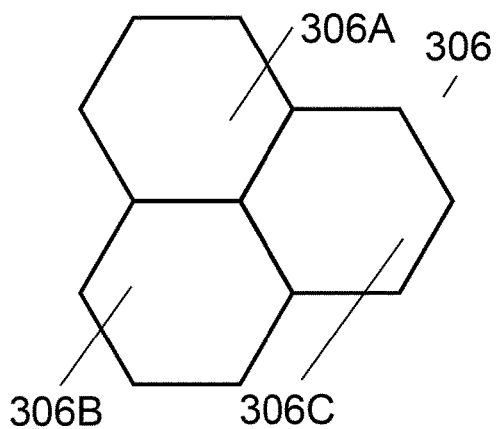
FIG. 8C is a tessellation pattern comprising hexagons in one embodiment.
Figure 8D:
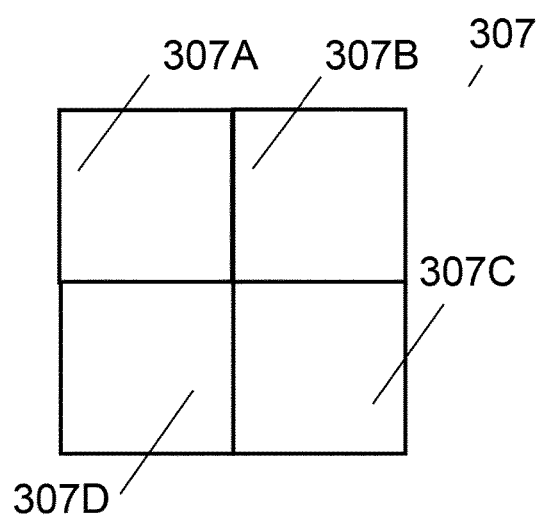
FIG. 8D is a tessellation pattern comprising squares in one embodiment.
Figure 9A:
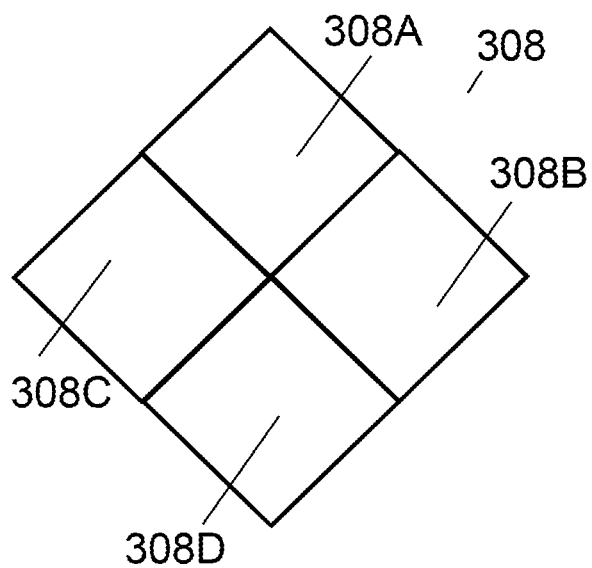
FIG. 9A is a tessellation pattern comprising diamond-shaped elements in one embodiment.
Figure 9B:
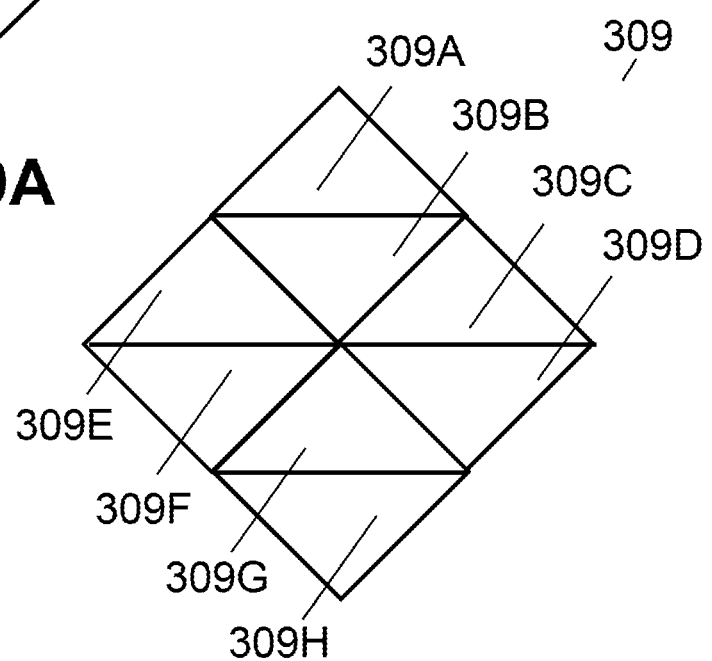
FIG. 9B is a tessellation pattern comprising isosceles triangles in one embodiment.

The interlacing of the SBG elements in the DigiLens may be carried out in many different ways. For example, the interlaced gratings in the embodiment of FIG. 1 may be configured in the fashion of a Venetian blind (as disclosed in Provisional Patent Application No. 61/627,202 by the present inventors). However, the MTF associated with such geometry has notches in it at spatial frequencies traceable to the periodic nature of the interleaving. In one embodiment, introducing a complex tessellation of gratings, this deficiency can be rectified. "Tessellation" in at least some embodiments herein is defined as the process of creating a two-dimensional surface pattern using the repetition of a geometric shape with no overlaps and no gaps. However, it should be noted that the tessellation pattern is not limited to diamond shaped tessellation patterns of the type illustrated in FIG. 4-7. It will be appreciated that patterns based on squares, rectangles, triangles may be used. While a regular patterning is implied in the drawings, it may be advantageous in certain cases to have a randomly distributed pattern. In one embodiment, it may also be possible to use elements of different sizes and geometries in a given pattern. Many possible schemes exist. The elements may have vertically or horizontally biased aspect ratios. In one embodiment, a broader horizontal aspect ratio results in a better horizontal resolution. As will be shown below 1.38 mm.×0.8 mm, diamonds give acceptable resolution. Since there is not expected to be any benefit in having better horizontal resolution than vertical, it may even be adequate to use 1 mm squares (side on), rather than diamonds. For the purposes of mere illustration, the description refers to tessellated tiling based on diamond shaped or square-shaped elements. In one embodiment of tessellated patterns, there will be a small gap to allow for electrode addressing circuitry, as will be discussed later. Examples of SBG element patterning are illustrated in FIGS. 8-10. FIG. 8A shows a tiling pattern 304 comprising rectangular shapes 304A-304F having a multiplicity of vertical and horizontal dimensions. FIG. 8B shows a tiling pattern 305 known as Penrose tiling comprising elements 305A-305J. FIG. 8C shows a tiling pattern 306 based on regular hexagons comprising elements 306A-306C. FIG. 8D shows a tiling pattern 306 based on squares comprising elements 307A-306D. FIG. 9A shows a tiling pattern 308 based on diamond shapes comprising elements 308A-308D. FIG. 9B shows a tiling pattern 309 based on isosceles triangle shapes comprising elements 309A-309D. FIG. 10A shows a tiling pattern 310 based on horizontally elongated hexagons comprising elements 310A-310C. FIG. 10B shows a tiling pattern 311 based on rectangles with horizontally biased aspect ratios comprising elements 311A-311D. FIG. 10C shows a tiling pattern 312 based on rectangles horizontally elongated diamond elements 312A-312D.

In one embodiment, the technology used for fabricating SBG arrays regularly produces features as small as 50 microns (500 dpi), so that interlacing features in the manner described above is not an issue. One important condition is that the distance between gratings of like prescription should be small compared to the size of the eye pupil under bright conditions (assumed to be 3 mm in bright sunlight). In one embodiment, when this condition is met, banding is not observable. Importantly, in one embodiment as the eye moves around in the eye box, light lost from a band moving beyond the pupil of the eye is offset by light gained from another band moving into the pupil. The luminosity variation anticipated from this effect, assuming uniform illumination across the waveguide, is approximately ±1% of the average brightness level. The concept of banding may be most readily understood in embodiments where the SBG elements comprise columns. However, the basic principle may apply to any type of patterning that may be used with any embodiments described herein.

In some embodiments, image light is admitted into one end of the DigiLens only. Each waveguide in the DigiLens may generally comprise two SBG layers. It should be apparent from consideration of the drawings and description that in such embodiments the layers may comprise SBG arrays of identical prescription with one reversed and the image injection node being configured in two symmetrical portions to provide separate image light in opposing paths to the two holographic layers. Such embodiments may need duplication of components and are therefore likely more expensive to implement.

In some embodiments, each DigiLens doublet waveguide is 2.8 mm thick. The SBG layers may in theory be separated by low index substrates or air gaps. In one embodiment, in many practical applications that need TIR beam geometry cannot be supported without an air interface. Note also the thickness of the holograms has been exaggerated. In one embodiment, the gratings may be 3 microns in thickness sandwiched by substrates of thickness 100-200 microns. The thicknesses of the transparent electrodes applied to opposing faces of the substrates are measured in nanometers.

Figure 11:
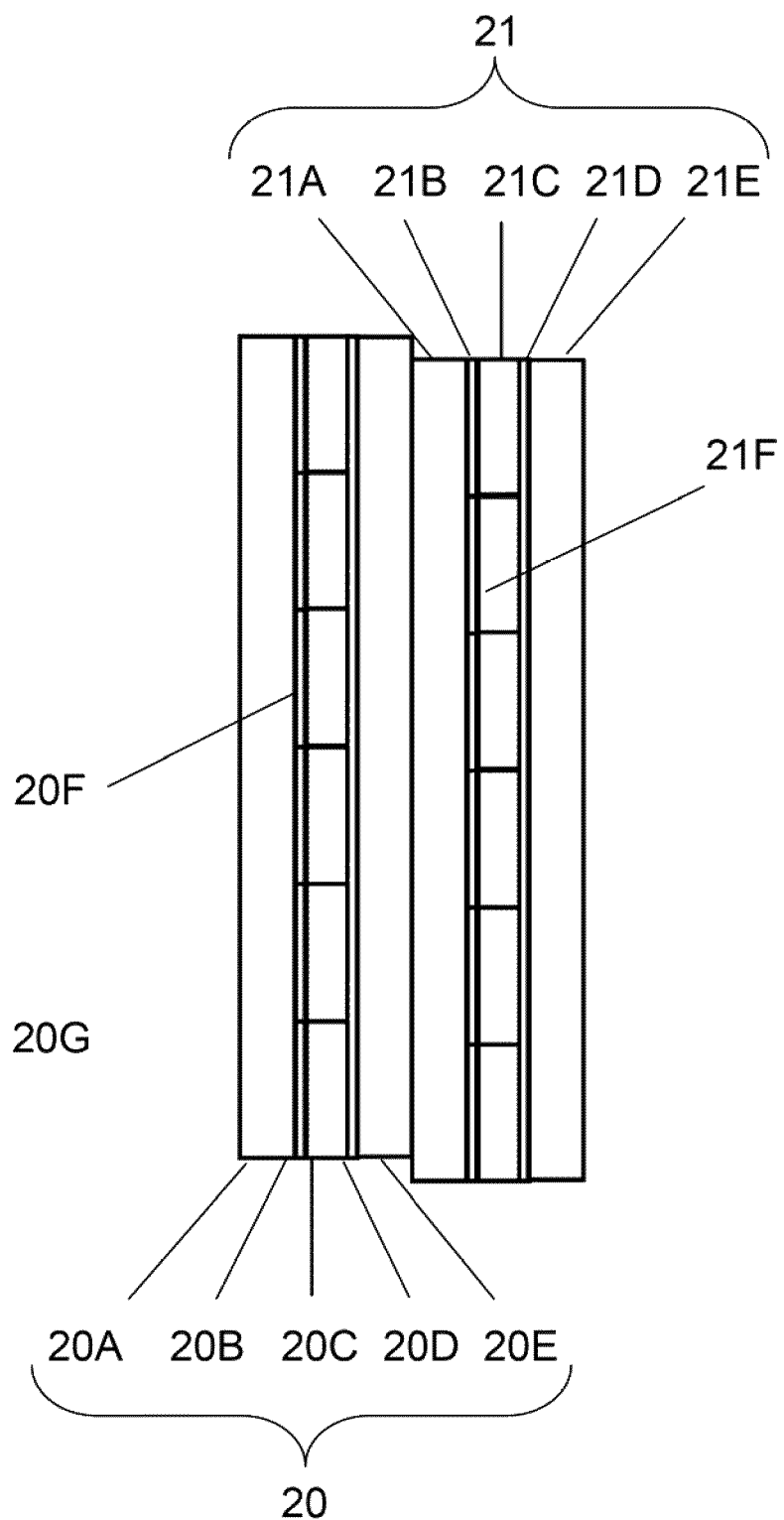
FIG. 11 is a schematic cross sectional view of a tessellated waveguide containing two grating layers in one embodiment.
Figure 12A:
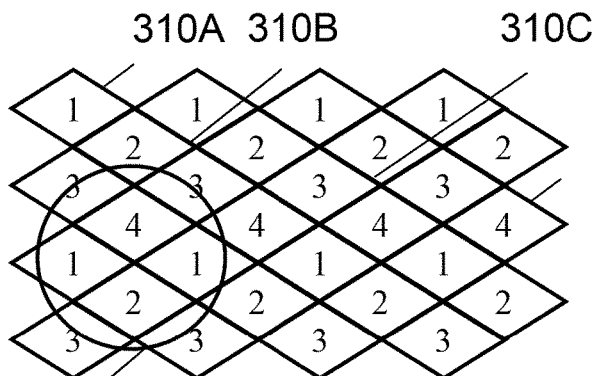
FIG. 12A shows an example of a tessellation pattern comprising four different grating element types with an eye pupil overlaid in one embodiment.
Figure 12B:
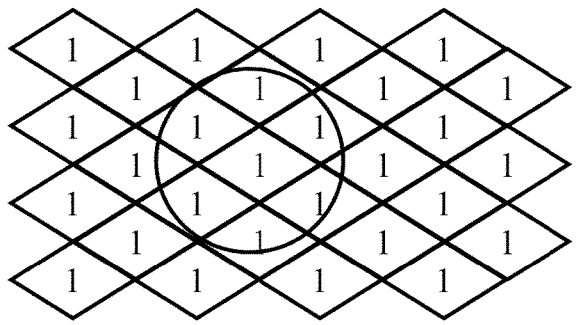
FIG. 12B shows an example of a tessellation pattern comprising one grating element types with an eye pupil overlaid in one embodiment.
Figure 12C:
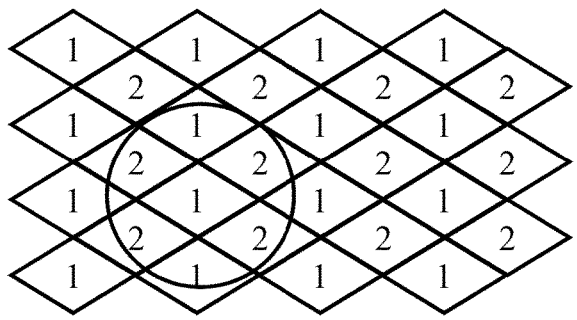
FIG. 12C shows an example of a tessellation pattern comprising two different grating element types with an eye pupil overlaid in one embodiment.
Figure 12D:
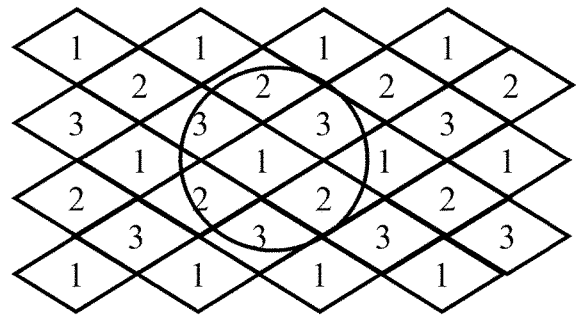
FIG. 12D shows an example of a tessellation pattern comprising three different grating element types with an eye pupil overlaid in one embodiment.

FIG. 11 is a schematic cross-sectional view of a DigiLens waveguide comprising two layers 20, 21 in one embodiment. Layer 20 comprises transparent substrate 20A, transparent patterned electrode layer 20B, SBG array 20C containing elements such as 20F, a transparent electrode layer 20D, and a second substrate 20E. Layer 21 comprises transparent substrate 21A, transparent patterned electrode layer 21B, SBG array 21C containing elements such as 21F, a transparent electrode layer 21D, and a second substrate 21E. In one embodiment, the substrates 20E and 21A may be combined into a single layer.

Figure 13:
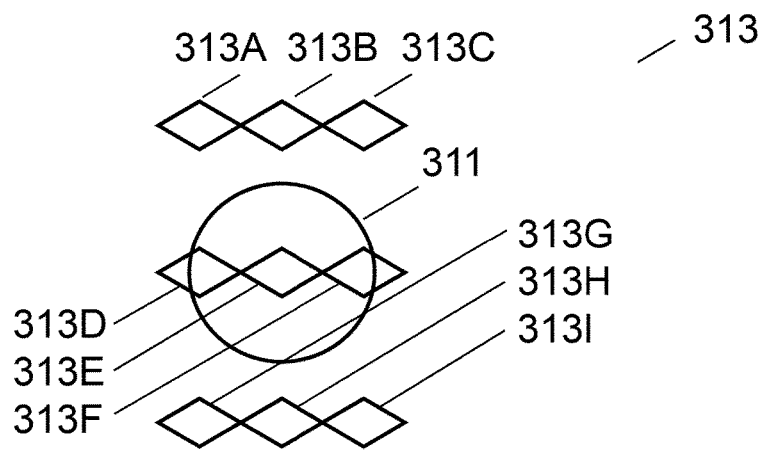
FIG. 13 shows an example of a tessellation pattern for one particular grating element type with an eye pupil overlaid in one embodiment.
Figure 14:
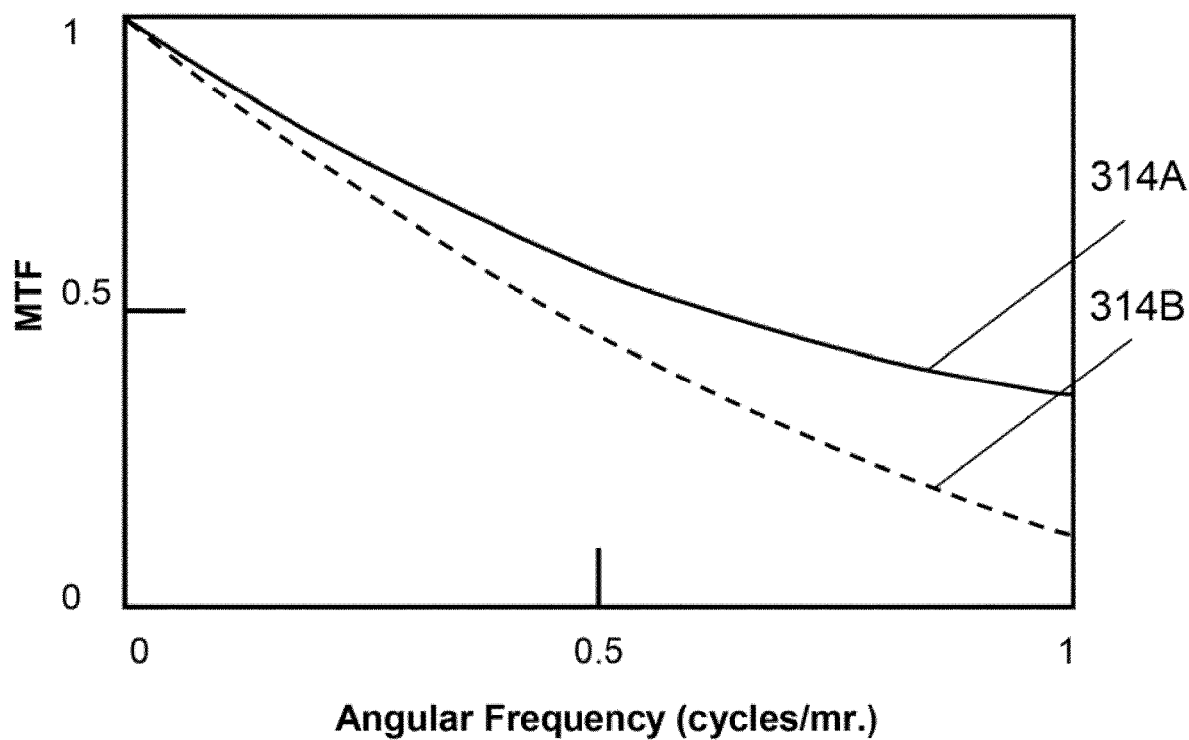
FIG. 14 is a chart showing the MTF versus angular frequency for the tessellation pattern of FIG. 13 in one embodiment.

FIGS. 12A-12D shows examples of tessellation patterns in the regions containing SBG elements of types labelled 1-4. The eye pupil 311 is overlaid. FIGS. 13-14 shows MTF data for one particular SBG element type configured as shown in FIG. 13 at one eye pupil location in the display exit pupil. The SBG elements are labelled by 313A-313I. FIG. 14 shows the MTF curves. In this embodiment, the upper curve 314A is the diffraction limited MTF, and the lower curve is the estimated SBG array MTF allowing for aberrations. The diamond shapes are based on triangles of triangles of side=0.8 mm, and therefore, length=1.38 mm. This architecture is applicable to a 2 layer (1 doublet) monochrome design, or a single color layer in the R, G, B color design. Three stacked doublet layers give the composite performance. The exit pupil 311 is 3 mm in diameter in this embodiment.

Figures 17, 18:
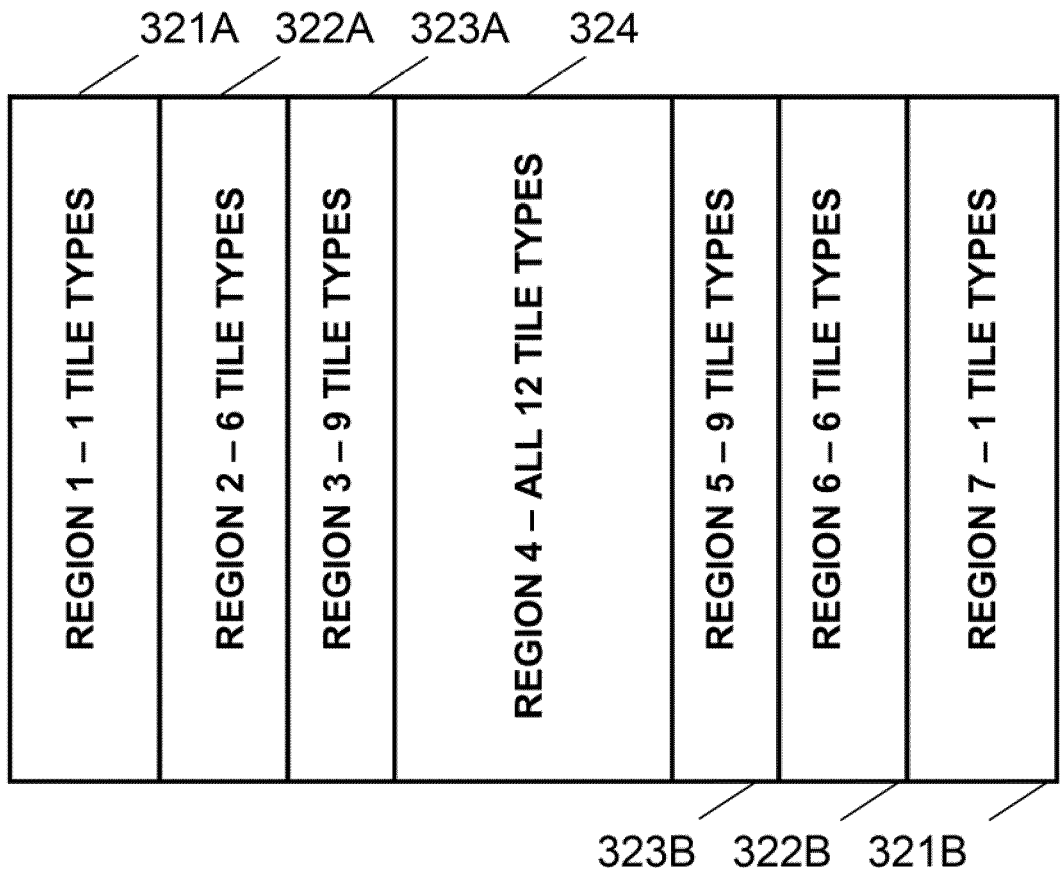
FIG. 17 shows the distribution of tessellation element types within regions labelled by numerals 1-7 used to provide a field of view tiling pattern illustrated in FIG. 18 in one embodiment.
FIG. 18 shows a field of view tiling pattern comprising four horizontal tiles and three vertical tiles.

The DigiLens architecture corresponding to FIGS. 13-14 tiles 12 SGB elements on 2 monochromatic SBG layers. Referring to FIG. 18, the first layer, which is illustrated in FIG. 13, tiles all of the horizontal (lower) tiles: L1-4 and the horizontal (middle) tiles (MID,1), (MID,2). The second layer tiles the horizontal (middle) tiles: (MID,3), (MID,4), and all of the horizontal (upper) tiles: U1-4.

Figure 15:
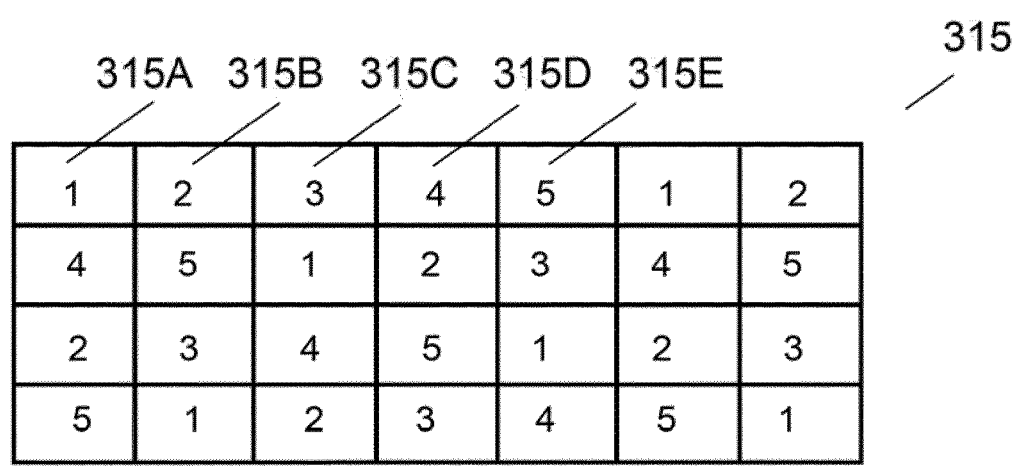
FIG. 15 shows an example of a tessellation pattern using rectangular elements of horizontally biased aspect ratio and comprising elements of five different types in one embodiment.
Figure 16A:
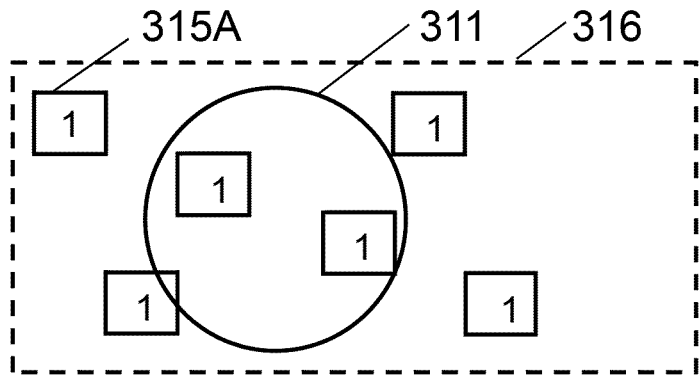
FIG. 16A illustrates the projection into the exit pupil of tessellation elements of a first type corresponding to a first field of view with an eye pupil overlaid in one embodiment.
Figure 16D:
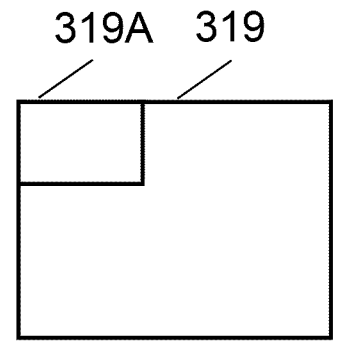
FIG. 16D shows the field of view tile corresponding to the tessellation elements of FIG. 16A in one embodiment.
Figure 16B:
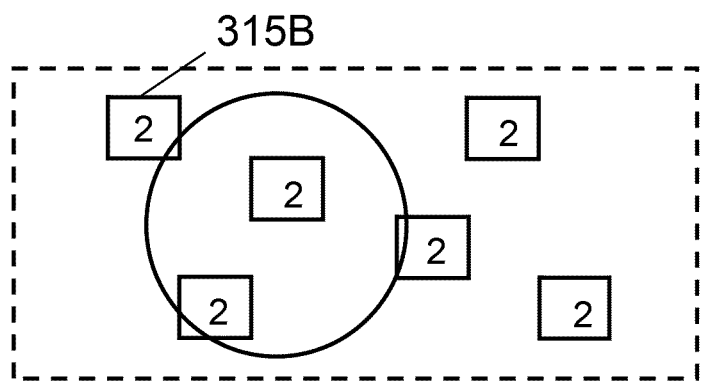
FIG. 16B illustrates the projection into the exit pupil of tessellation elements of a second type corresponding to a second field of view with an eye pupil overlaid in one embodiment.
Figure 16E:
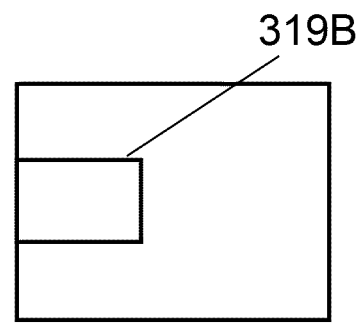
FIG. 16E shows the field of view tile corresponding to the tessellation elements of FIG. 16B.
Figure 16C:
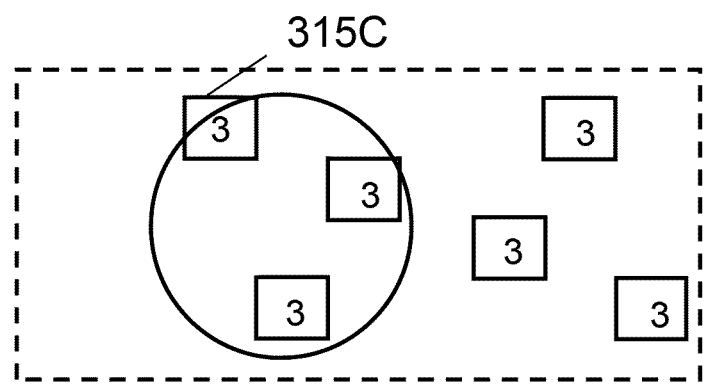
FIG. 16C illustrates the projection into the exit pupil of tessellation elements of a third type corresponding to a third field of view with an eye pupil overlaid in one embodiment.
Figure 16F:
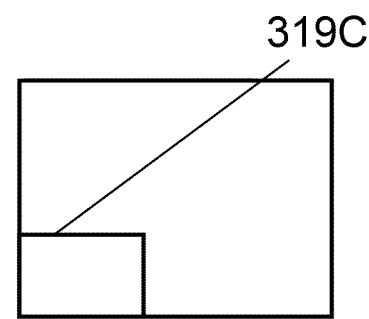
FIG. 16F shows the field of view tile corresponding to the tessellation elements of FIG. 16C in one embodiment.

FIG. 15 shows an example of tiling using rectangular SBGs with horizontally biased aspect ratios. The tiling pattern 315 comprises element types 1-5 also labelled by the numerals 315A-315E.

FIG. 16 illustrates in one embodiment how the DigiLens tiles the FOV in the exit pupil in three consecutive stages of the formation of a monochromatic image. The writing of images of each primary color will follow a similar process. FIGS. 16A-16C show three types of SBG 1-3 also indicated by the labels 315A-315C being activated. The eye pupil 311 and the exit pupil 316 are overlaid in each case. The corresponding FOV tiles 319A-319C in FOV space indicated by the rectangle 319 are shown in FIGS. 16D-16F. Only a small number of SBG elements are illustrated to simplify the understanding of the switching process. Note that all SBG elements of a given type can all couple light out simultaneously owing to the "lossy" coupling between the beam and grating. In other words, the diffraction efficiency of individual elements is modulated to extract a fraction of light the light available from the guided beam. In one embodiment, the first elements the guide beam interacts with have the weakest coupling efficiency, while the elements at the other extremity of the beam path have the strongest.

The area of the pupil filled by light from SBGs of a given type is roughly fixed. As the eye moves from left to right, light is lost from the leftmost SBG elements, but is gained on the right hand edge. The luminosity variation arising from this effect, assuming uniform illumination across all elements, is approximately 2% (+/−1% of the average brightness level).

In some embodiments, the periodicity of the SBG elements could yield unwanted artifacts resulting from diffraction by the element apertures or even interference effects.

The latter is believed to be unlikely because light propagating in the planar waveguide structure will not necessarily be in phase with light from the next aperture because of the unequal optical path lengths inherent in planar waveguide structures. Light exiting each periodic aperture is therefore expected to combine incoherently (even if the coherence length of the laser is reasonably long with respect to the planar waveguide structure) when considered across all SBG elements. In the event that an unwanted artifact does arise from the SBG element, periodicity on the proposed strategy would involve randomizing the elements.

Points across the DigiLens aperture contribute angular information to the 10 mm eye box progressively differently because of the 25 mm eye relief. Points towards the left of the display do not contribute angular content from the right of the FOV, and vice versa. To maximize optical efficiency, the DigiLens in one embodiment may be optimized to fill the desired eyebox at the prescribed eye relief. FIGS. 10A-10D indicate the portions of the SBG aperture that contribute to the eyebox in one embodiment.

Not all positions across the surface of the DigiLens contribute pupil filling content at the eyebox. To fill the 10 mm pupil at 25 mm (eye relief), the minimum size of the outcoupling SBG is just less than 30 mm wide. However, only a very small region in the center of the DigiLens provides content at all field angles, e.g.: −15°±5°, −5°±5°, +5°±5° and +15°±5°. These angular bands correspond to outcoupling SBG columns 1, 2, 3, and 4 (found for each of Upper) (+10°), Mid (+0°) and Down (−10°) fields).

FIG. 17 shows the distribution of SBG tile types for the 3 vertical×4 horizontal FOV tiling pattern of FIG. 18. As shown in the drawing in this case all 12 SBG prescriptions are needed in the centre of the FOV, while the number needed falls to just one at the horizontal limits of the FOV FIG. 18 shows an exemplary FOV tiling pattern that may be used to tile a 52°×30° FOV (assuming each SBG prescription provides 13°×10°). A total of 12 different types of SBG prescriptions need to be provided comprising "UP", "MIDDLE" and "DOWN" elements for vertical tiling and four horizontal tiling prescriptions for each of the vertical tiling SBGs tiles (labeled 1-4). Each type of SBG will be represented by more than one SBG element. Hence to view the FOV tile at [UP,1], it is needed to sequentially activate each element "1" in each column group "UP" in this embodiment.

Figure 19A:
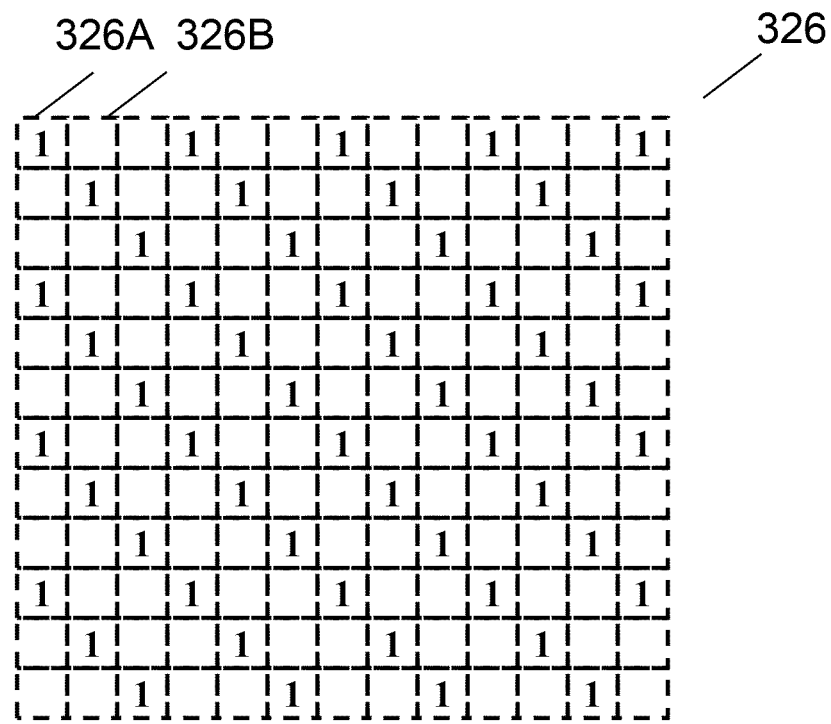
FIG. 19A shows a tessellation pattern comprising elements of one type from regions 1 and 7 in one layer of a two layer waveguide in the embodiment illustrated in FIGS. 17-18 in one embodiment.
Figure 19B:
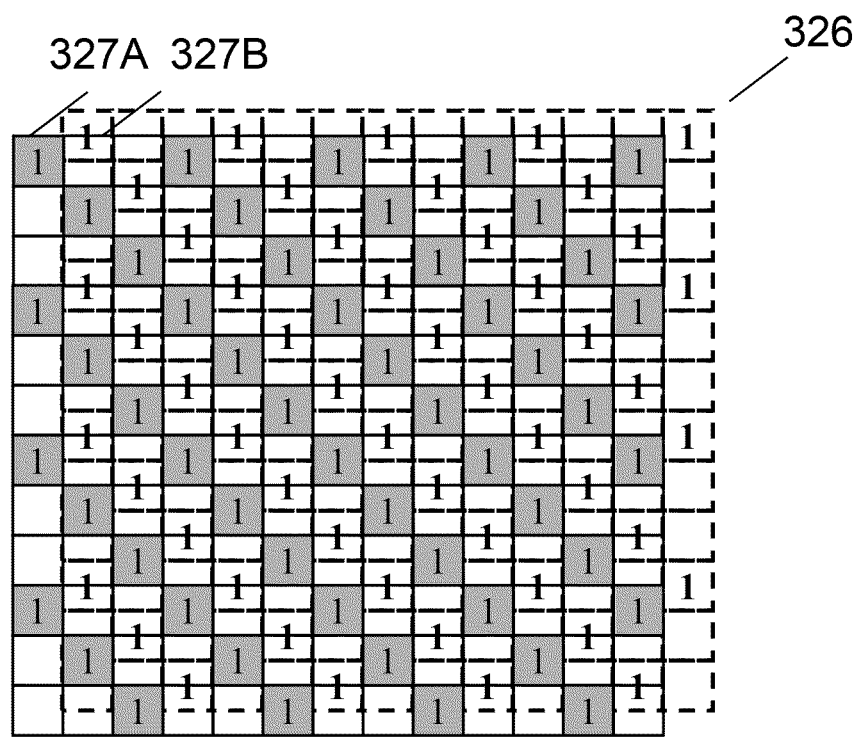
FIG. 19B shows overlaid tessellation patterns from both layers of the waveguide of FIG. 19A in one embodiment.
Figure 20A:
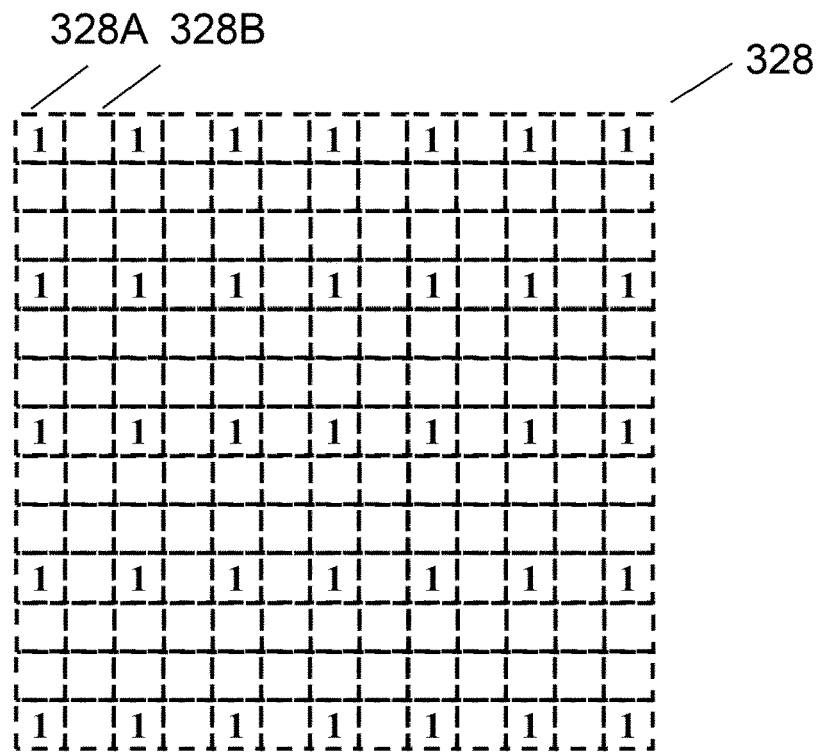
FIG. 20A shows a tessellation pattern comprising elements of one type from regions 2 and 6 in one layer of a two layer waveguide in the embodiment illustrated in FIGS. 17-18 in one embodiment.
Figure 20B:
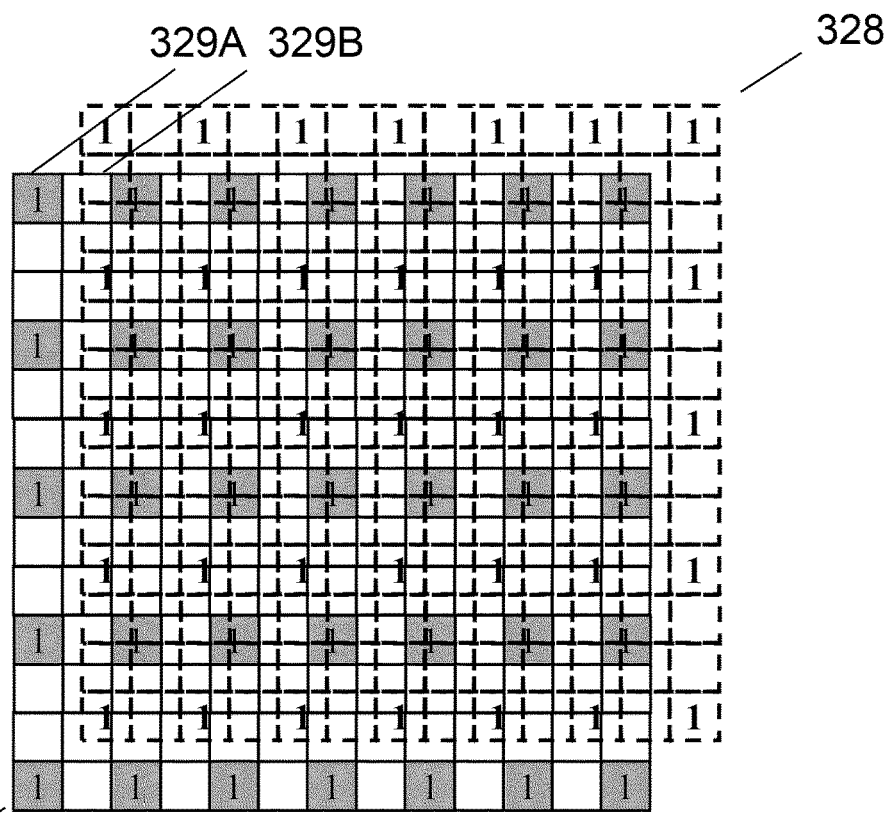
FIG. 20B shows overlaid tessellation patterns from both layers of the waveguide of FIG. 20A in one embodiment.
Figure 21A:
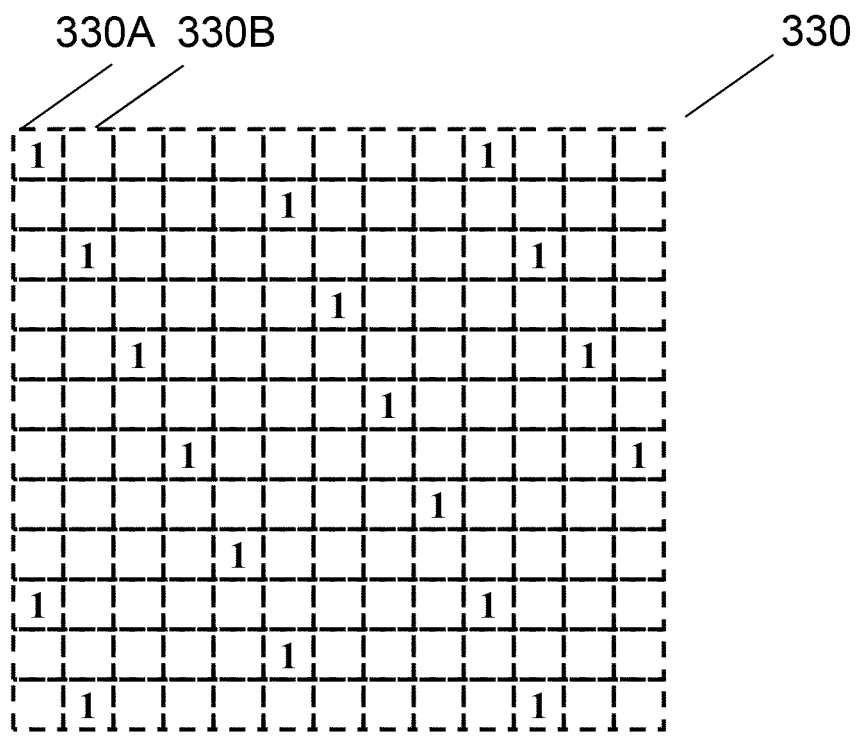
FIG. 21A shows a tessellation pattern comprising elements of one type from regions 3 and 5 in one layer of a two layer waveguide in the embodiment of the invention illustrated in FIGS. 17-18 in one embodiment.
Figure 21B:
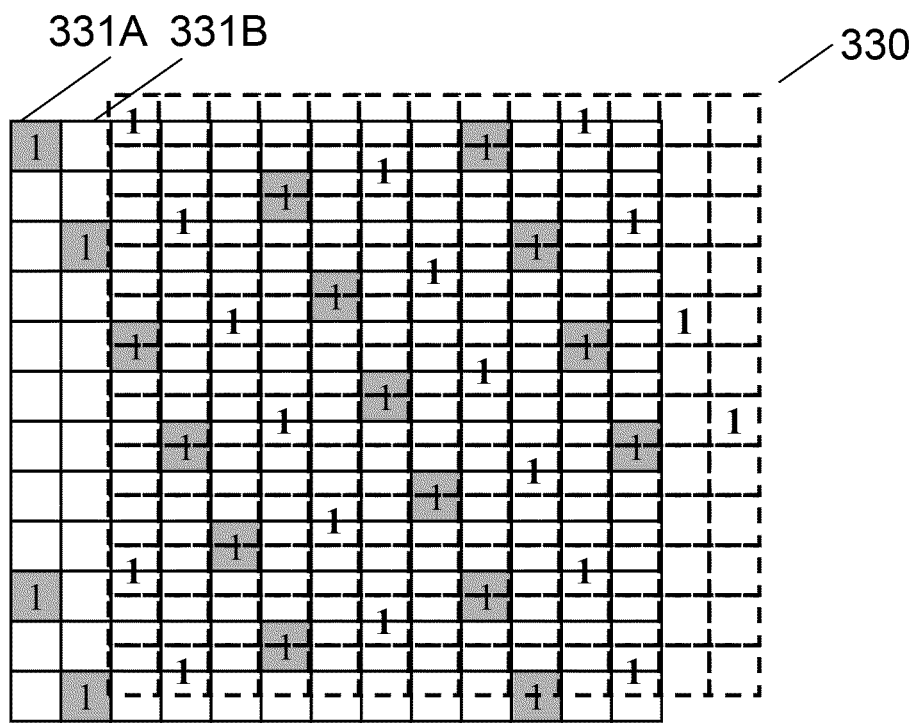
FIG. 21B shows overlaid tessellation patterns from both layers of the waveguide of FIG. 21A in one embodiment.
Figure 22A:
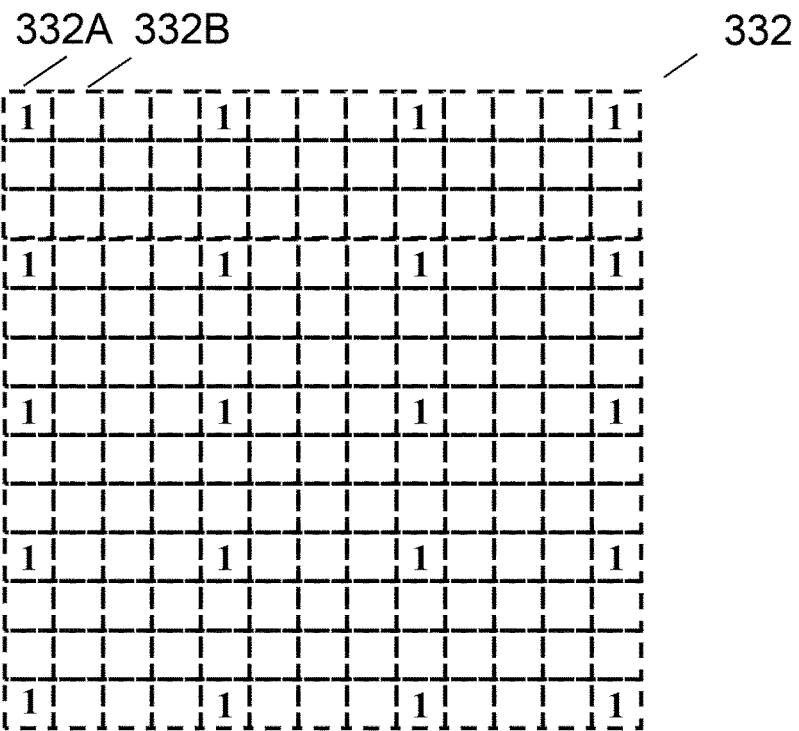
FIG. 22A shows a tessellation pattern comprising elements of one type from region 4 in one layer of a two layer waveguide in the embodiment of the invention illustrated in FIGS. 17-18.
Figure 22B:
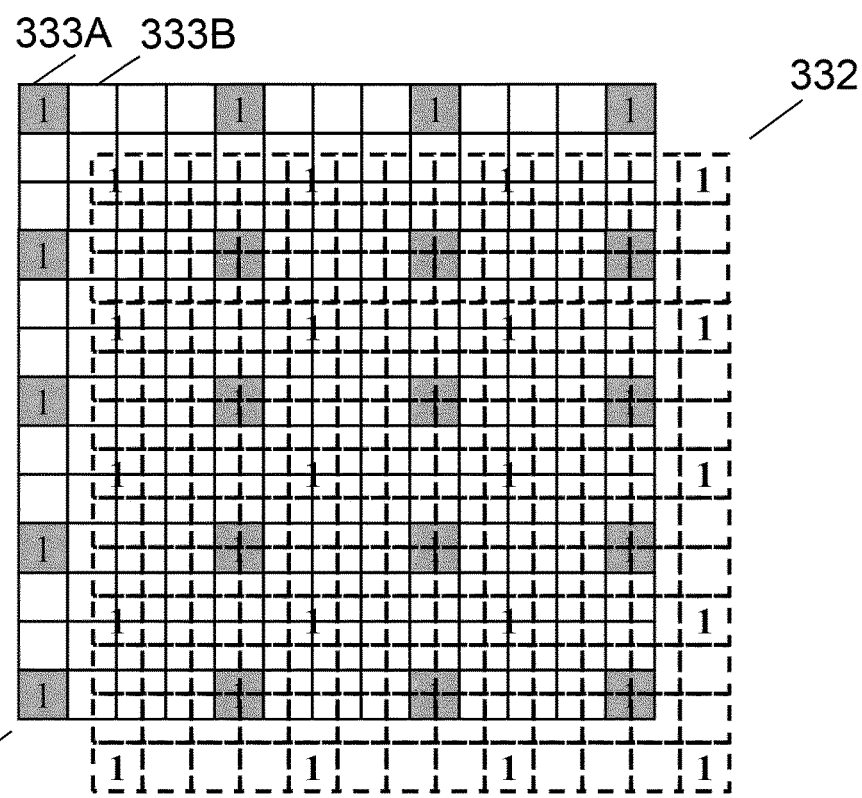
FIG. 22B shows overlaid tessellation patterns from both layers of the waveguide of FIG. 22A in one embodiment.

FIGS. 19-23 illustrate SBG patterns, which correspond to each of the tiling regions defined in FIGS. 17-18. In each case, the single layer pattern and two overlaid patterns for on SBG type are illustrated. Square elements have been assumed in this embodiment. FIG. 19 shows patterns corresponding to regions 1 and 7 (3 tile types). The two layers are indicated by 326, 327, each layer comprising type 1 elements 326A, 327A and spaces 326B, 327B (to be occupied by elements of other types). In this case, one layer achieves 33% aperture fill and one doublet achieves 66% aperture fill. FIG. 20 shows patterns corresponding to regions 2 and 6 (6 tile types). The two layers are indicated by 328, 329, each layer comprising type 1 elements 328A, 329A and spaces 328B, 329B. In this case, one layer achieves 16.7% aperture fill and one doublet achieves 33% aperture fill. FIG. 21 shows patterns corresponding to regions 3 and 5 (9 tile types). The two layers are indicated by 330, 331, each layer comprising type 1 elements 330A, 331A and spaces 330B, 331B. In this case, one layer achieves 11.1% aperture fill and one doublet achieves 22.2% aperture fill. Finally, FIG. 22 shows patterns corresponding to region 4 (12 tile types). The two layers are indicated by 332, 333, each layer comprising type 1 elements 332A, 333A and spaces 332B, 333B. In this case, one layer achieves 8.33% aperture fill and one doublet achieves 16.7% aperture fill.

The resulting composite pattern 340 is shown FIG. 23. An example of the coverage of a single SBG type in a three layer waveguide 341 is shown in FIG. 24.

Figure 25:
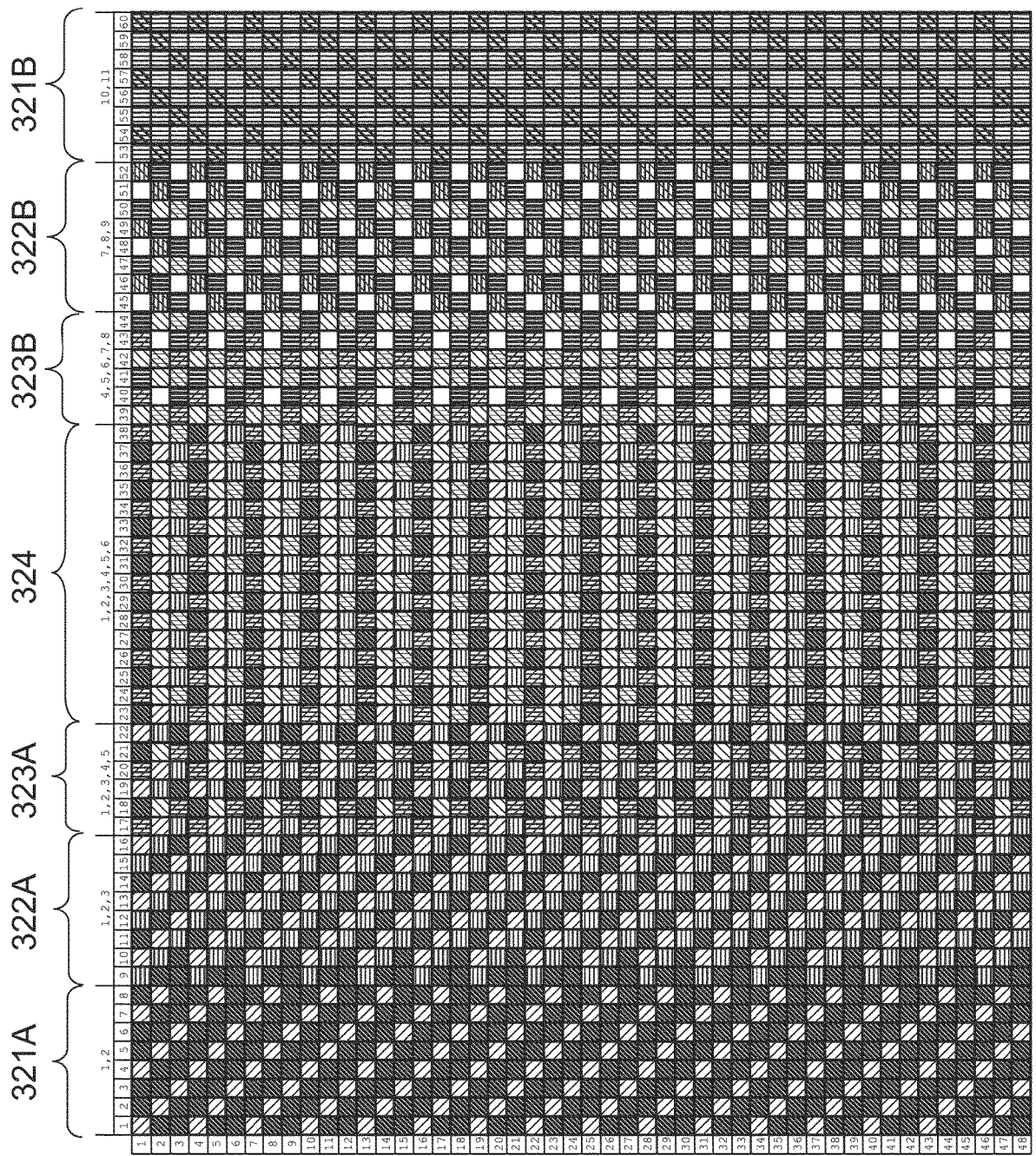
FIG. 25 shows the composite tessellation pattern in a first layer of a two layer waveguide in one embodiment.
Figure 26:
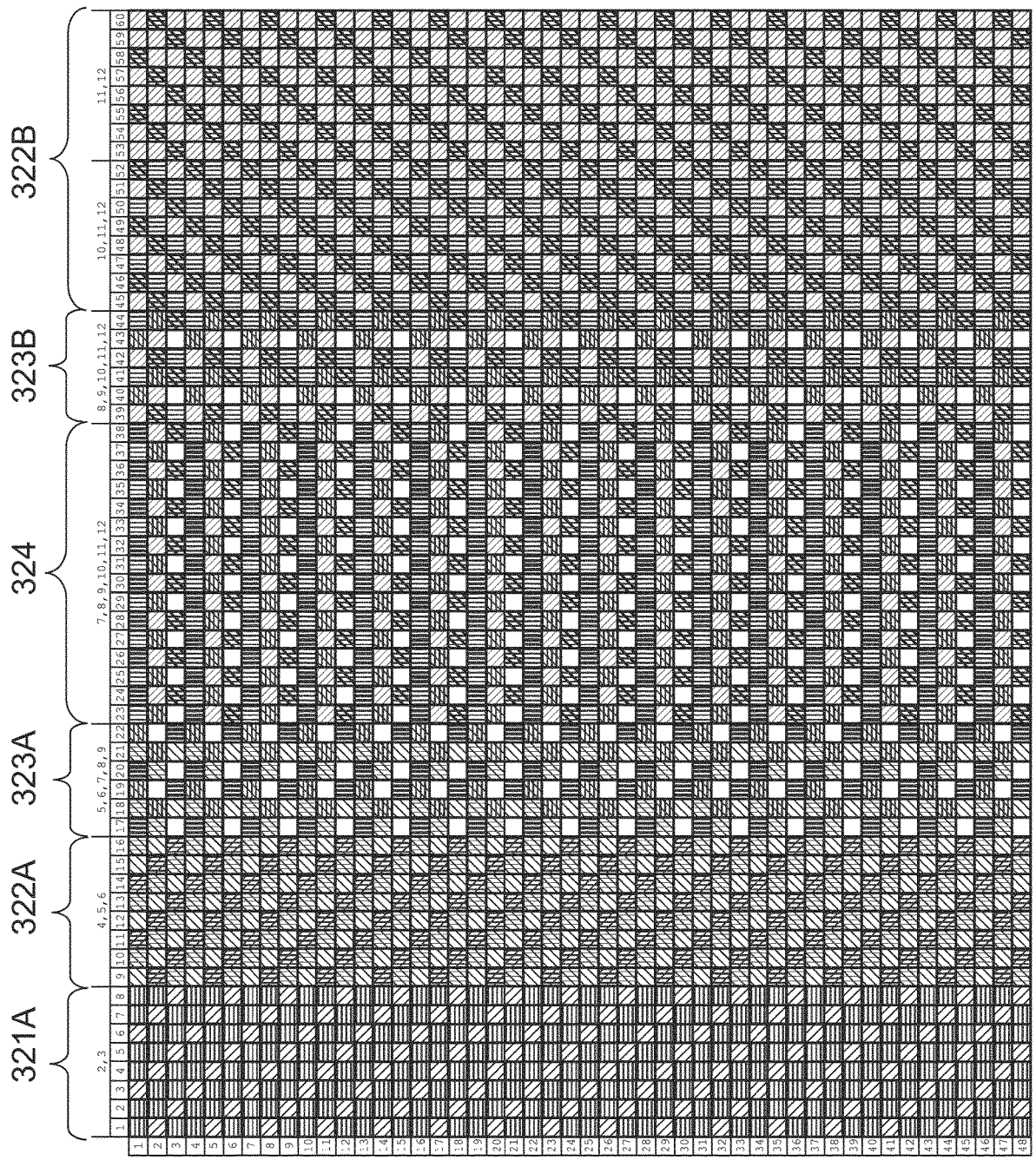
FIG. 26 shows the composite tessellation pattern in a second layer of a two layer waveguide in one embodiment.

FIGS. 25-26 show SBG patterns for each layer of a two layer waveguide in one embodiment.

A typical estimate of the human visual acuity limit is about 1 arc minutes/line pair=60 cyc/deg; this is a generally accepted performance limit and equates to 3.4 cyc/mr. This can be achieved with 20/20 vision under bright conditions where the eye pupil is constricted to 3 mm diameter. The eye is photoreceptor limited. Cone spacing at the fovea can be as small as 2.5 µm, equivalent to 60 cyc/deg. At larger pupil apertures, the eye's performance degrades significantly due to aberration in the eye. At about 3 mm, the eye's performance is close to diffraction limited. It is noted that diffraction limit cut off at 532 nm for an f/5.6 eye (3 mm pupil with f=17 mm) is about 320 lp/m, which is significantly higher than the retina limit. The eye is therefore photoreceptor density limited in this embodiment. In considering this, it is realized that if the eye's pupil, or the display limiting the eye's pupil, is greater than 0.75 mm (equates to 1.4 cyc/mr cut off), then the blur spot size at the retina will not be affected. This establishes a minimum aperture requirement for the display. A 12 µm pitch LCoS microdisplay with 4H×3V tiles, where each tile has 640H×480V pixels may yield 2560H×1440V pixels over 52 degH×30 degV. The display projection magnification from the microdisplay to the retina is approximately 2. Hence the angular size of the microdisplay pixels at the eye is 6.0 µm giving a display 83 cyc/mm Nyquist frequency at the retina (1.4 cyc/mr). Image sharpness may be assessed to be sharp when contrast is maximized (and is high) at the half Nyquist limit (i.e., about 40 cyc/mm in the following plots showing image quality at the retina).

The concern that the periodic structure of the Color Waveguide SBG Layers will act as a diffraction grating has been addressed. Many of the potential sources diffractive artifacts in the Color Waveguide, such as higher order diffraction, zero orders beams in the waveguide, and the apertures of the SBG elements, may be minimized (or even eliminated) on closer inspection SBGs are Volume Bragg gratings, and in one embodiment may not support higher orders as would be found with blazed or thin grating. The absence of higher orders may minimize (or even eliminate) ghost images. In one embodiment, within the waveguide light which continues to be wave guided (in the lossy waveguide) will not 'see' the output apertures of the tiles. Build-up of diffraction orders within the waveguiding beam will therefore not occur. Light output from different SBG element apertures will not be in phase (apart from perhaps in a unique case). The optical path will change as a function of field angle. It is therefore reasonable to expect the outputs from the apertures to be out of phase, and therefore to combine incoherently. Diffractive artifacts are therefore not anticipated.

Earlier concerns about the periodic structure were based on 50 um column widths. The new SBG feature sizes are now in the range 800 um to 1380 um. Diffraction angles predicted by the grating equation are significantly smaller. For example, for 50 um features with a 52° input angle, the diffraction angle would be 1 degree (equivalent to 74 pixels). For 1000 um features at 52° input angle, the diffraction angle reduces to 0.05° (3.7 pixels). In the very worst case, in this embodiment, if a diffractive ghost appears under conditions of say, a very bright object against a dark background, it will appear like near object lens flare, and not as a double image well separated from the original.

Although a despeckler may be incorporated into the TIN to overcome laser speckle, there is a reasonably high expectation that the design is inherently despeckled. Phase diversity should exist across the output SBG apertures. Polarization diversity will further assist with the despeckling, and hence minimize the effects of any diffractive artifacts from the structure. As a further safeguard, noting that it is not essential to have straight edges on the SBG apertures, the edges will be patterned to randomize any artifacts.

Several factors may influence design layout. It may be needed to take into account tessellation limitations to maximize pupil fill. Importantly, it may be needed to have 3, 6, 9, and 12 tile each pattern on 2 layers of a single doublet, and create a maximized pupil fill condition for any position in the display exit pupil for a 3 mm diameter projected eye pupil. The offsets between the SBG patterns in the two layers need not have a non-integer offset to tessellation pattern design in x or y. In one embodiment, an x offset will in effect cause a half pixel on one side or another of a region, and would then need ITO addressing for half of a pixel in that area alone. In one embodiment, it is better to avoid this to retain a uniform addressing pitch. In one embodiment, an offset in y of the pattern would similarly need half pixel vertical addressing. Similarly, it would be desirable to avoid this. It is acceptable to have a half pixel offset in y to maximize coverage, but then all patterns need to have half pixel offset in same direction. In one embodiment, all 12 tile types are employed on each doublet. However, the maximum tile type fill is obtained for 9 tiles types on two layers. We also have cases where 6 tile types and 3 tile types need to be configured, for example, on two layers. Consider, for example, a region where three horizontal tile types to fill eye pupil for a single vertical tile band in one embodiment. Note that other layers of doublets address the other two vertical tile bands. Layers 1 and 2 both contain the same tiles, but in an offset arrangement to achieve the desired pupil filling. A single tile has dimensions: $(H,V)=(0.8*\text{sqrt}(3), 0.8)=(1.386, 0.8)$. The offset on a single layer of 1 tile type is given by: $(dx,dy)=(0.3V)$. The offset of layer 1 with respect to layer 2 is given by: $(dx,dy)=(0.5H, 1.5V)=(0.693, 0.4)$. In the analysis that follows, 1 mm×1 mm squares have been used to simplify the optical modeling; however, the principles are identical no matter the shape. However, it should be noted that certain shapes will pack preferentially.

Figure 27A:
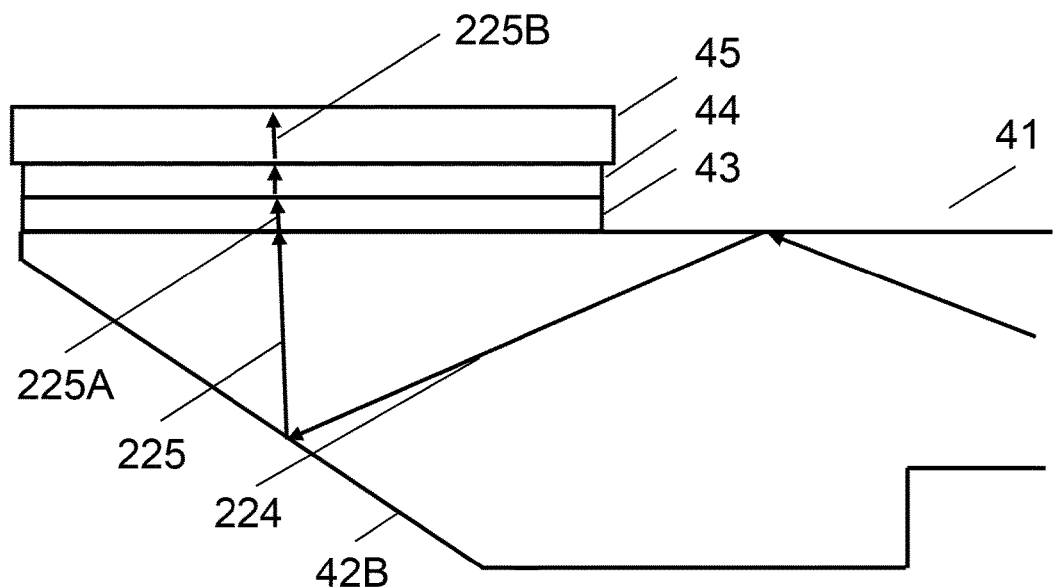
FIG. 27A is a schematic cross section view showing the image output portion of an Input Image Node in one embodiment.
Figure 27B:
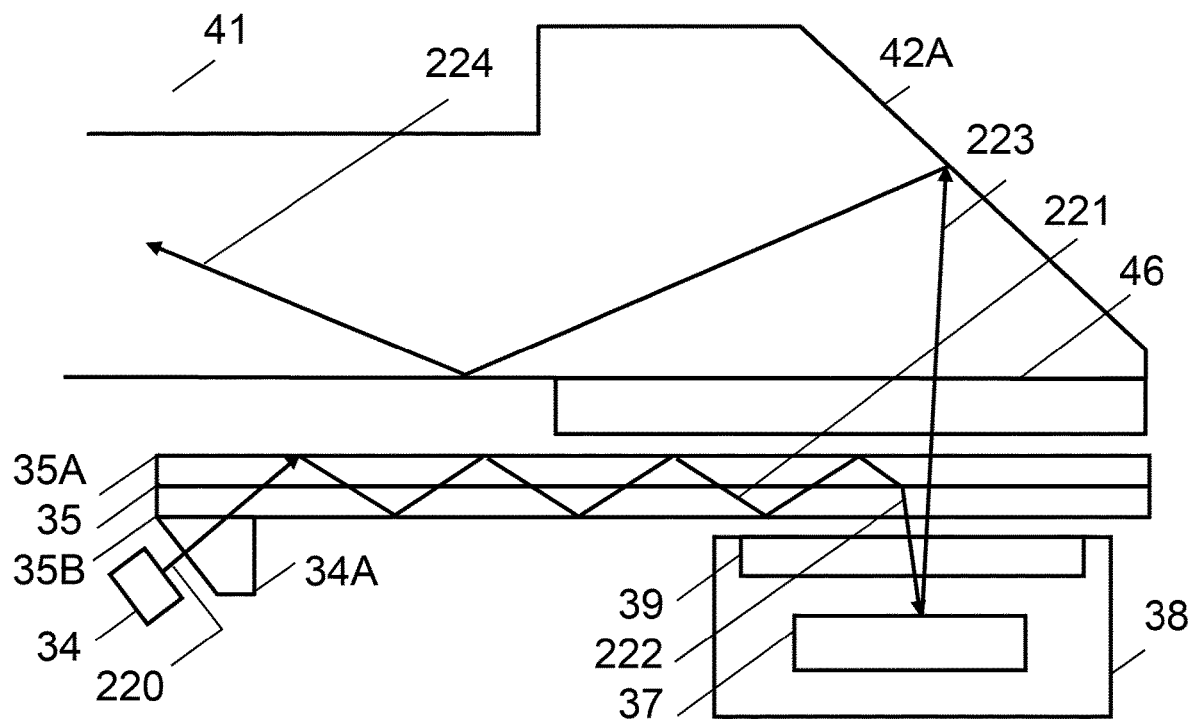
FIG. 27B is a schematic cross section view showing the image input portion of an Input Image Node in one embodiment.
Figure 29:
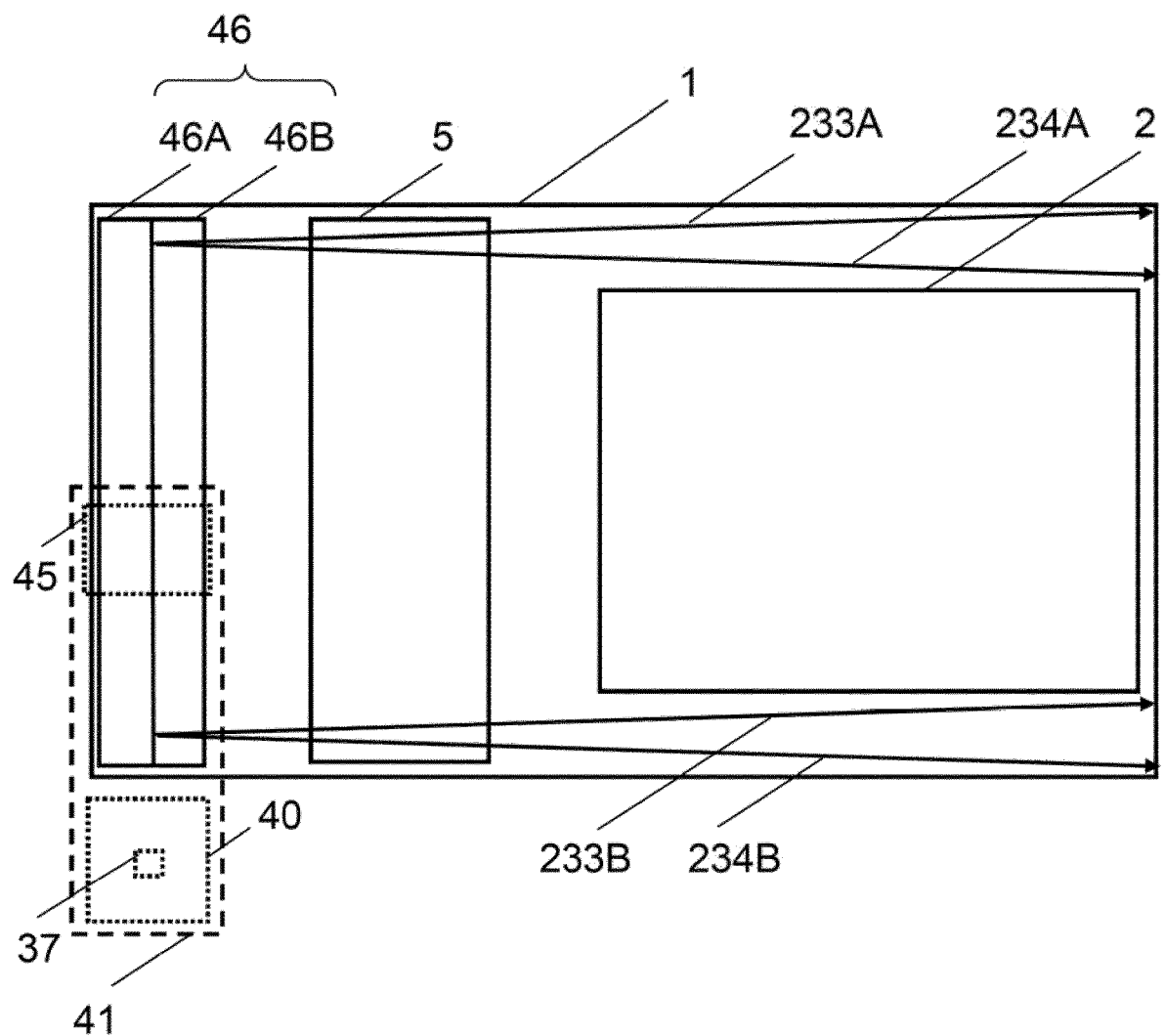
FIG. 29 is a plan view of the DigiLens waveguide and the Vertical Beam Expander in one embodiment.

FIGS. 27-29 illustrate some embodiments of the IIN comprising a input image generator comprising the diode laser module 34, coupling prism 34A, SBG beam splitter layer 35 sandwiched between substrates 35A, 35B, microdisplay module 38, light guide 41 contain include surfaces 42A, 42B, input coupling, holographic objective, spacer half wave plate, holographic field lens.

Advantageously, in one embodiment the IIN provides a telecentric (slightly projected) pupil to allow better coma control and better packaging with the pupil vertical beam expander.

FIG. 28A is a cross sectional view illustrating the coupling from the Input Image Node to the DigiLens via the VBE in one embodiment. FIG. 28B shows a detailed ray trace of the embodiment of FIG. 28A. The VBE may comprise, or is, a lossy grating extracting light from the beam over a distance corresponding to the height of the DigiLens. At the objective input, the light is well ordered in that light across the pupil is arranged in tight field bundles. At the far end of the VBE, the different numbers of bundles of light with different field angles may cause the bundles to be more distributed. At the objective end, the pink ray with the highest waveguide angle may be furthest from the rest of the VBE waveguide. The steepest ray in waveguide starts furthest to the left. This may help keep the passive input coupler (and VBE thickness) down. At the far end (fully to the left) coupling out of the VBE into the waveguide is hampered by the loss of order, as found at the input. To prevent a doubling in the thickness of the waveguide, a 50/50 active coupler is used in one embodiment at the VBE to DigiLens coupling stage.

FIG. 29 is a plan view of the DigiLens and the VBE showing how the latter is split into two switchable elements. This reduces the waveguide thickness. Each DigiLens doublet waveguide is 2.8 mm thick. Without the switch, the thickness doubles such that the total waveguide thickness increases from around 10 mm, to about 18 mm. FIG. 10 shows rays traced from the VBE to the DigiLens.

Several embodiments provided herein may have to be well suited for substrate guided optics. First, component costs may be reduced. The optical complexity is contained in the various holographic optical elements. Once the non-recurring engineering (NRE) associated with creating a set of masters is complete, the replication costs are relatively insignificant, as compared to the recurring material costs associated with discrete refractive components. Second, assembly time may be reduced. Not only is part count reduced, but the assembly process is also much faster. The planar structures can be cost-effectively laminated together with very high optical precision using alignment fiducials. The touch labor is greatly reduced, as compared to that of building a piece-part assembly to exacting standards. Third, the optical precision is greater. One of the biggest challenges in designing a new optical design is controlling the roll-up of tolerances on the piece parts, the mechanical housings, and the assembly procedure. With holographic optical elements (HOEs), "gold standards" can be assembled by senior engineers and this level of quality captured in the HOE masters during the NRE phase. Beside the fact that optical alignment of the HOEs can be accomplished with great precision, the individual HOEs are more tolerant of variations in alignment. Thus, the overall yield of high quality devices is much higher. Lastly, size and weight are greatly reduced by this monolithic design, as is the ruggedness of the entire subsystem.

One important performance parameter is the see-through transmission of the display. The variables that have an impact on transmission are the ITO coating (0.995), the AR coatings (0.99), and the absorption of the substrates and holographic layers. There will also be Fresnel losses at the interfaces between the waveguides and the low-index bonding layers. In one embodiment, the desired transmission for the color display is >70%, with an objective of >90%. Assuming three waveguides per display and two substrates per waveguide, the calculated transmission is 93%, meeting the stipulated objective. In one embodiment, the design described herein may use 100-micron glass substrates. With three waveguides and three substrates per waveguide (note: two holographic layers may need three substrates), the total thickness of the display of the color display may be still less than 1 mm. The thicknesses of the holographic layers (including the coatings) are negligible; each contributes only 4-5 microns to the overall thickness. Since weight is always an issue, this may be an important feature of the embodiments described herein. In one embodiment where the substrate comprises plastic, the weight may be further reduced.

In one embodiment, the SBGs operate in reverse mode such that they diffract when a voltage is applied and remain optically passive at all other times. The SBGs may be implemented as continuous SBG lamina separated by thin (as thin as 100 micron) substrate layers as shown. Ultimately the design goal is to use plastic substrates with transmissive conductive coatings (to replace ITO). Plastic SBG technology suitable for the present application is being developed in a parallel SBIR project. In this embodiment, this is a planar monolithic design harnessing the full assets of narrow band laser illumination with monolithic holographic optics Configuring the SBGs as monochromatic layers may enable the use of holographic optics and SBG beam splitter technology to provide a flat solid state precision aligned display totally eliminating the need for bulky refractive optics. The resolution of the display is only limited by that of the LCoS panels.

The design is scalable to a larger FOV by interlacing more tiles in each layer and/or adding new layers. Similarly, the pupil, eye-relief, and FOV aspect ratio can be tailored to suit the application. The design can be scaled down to a smaller FOV.

Figure 30A:
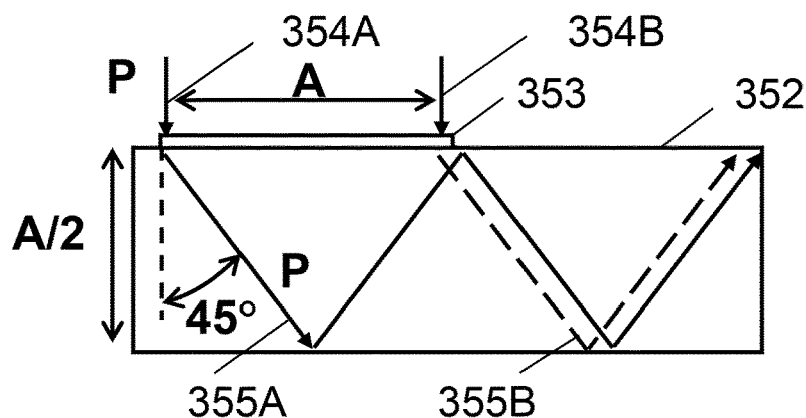
FIG. 30A shows a waveguide 252 with input rays directed into the TIR paths by a coupling grating in one embodiment.
Figure 30B:
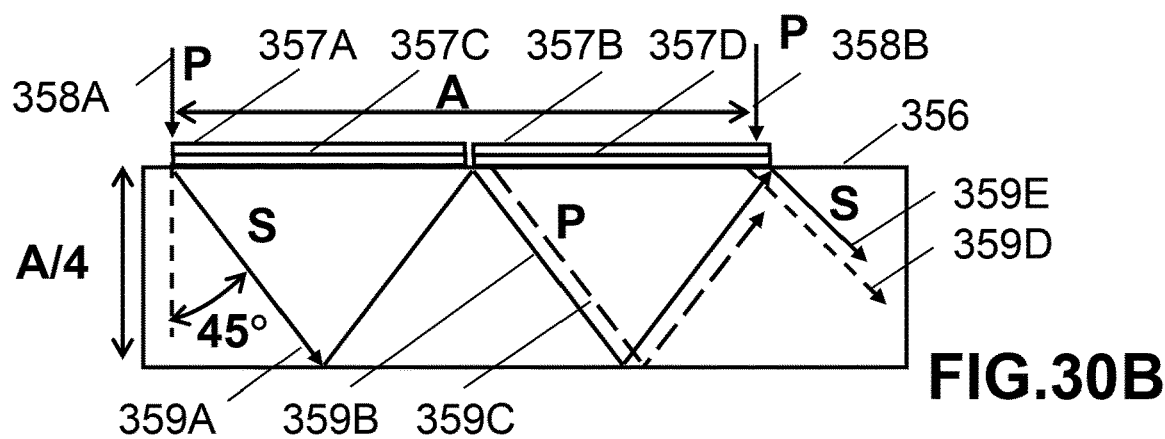
FIG. 30B shows a waveguide in one embodiment having input coupling optics comprising the first and second gratings disposed adjacent each other, the half wave film sandwiched by the waveguide and the first grating; and a polarizing beam splitter (PBS) film sandwiched by the waveguide and the second.

FIGS. 30A-30B illustrate a scheme for polarization recycling for use with at least some embodiments described herein. This may be relevant in the event that polarization is not maintained with an SBG outcoupling waveguide, either by virtue of the properties of the SBG material (current or one developed in future), or where a polarization rotation component is deliberately introduced in the waveguide. Specifically, a thinner DigiLens waveguide can be used if linearly polarized light is input into the DigiLens waveguide (i.e., light coupled from VBE into the waveguide), and light is converted to a mixture of S and P polarized light. This may allow up to a factor of two times reduction thinness of the waveguide. FIG. 30A shows a waveguide 252 with input rays 354A, 354B directed into the TIR paths labelled by 355A, 355B by a coupling grating 353. The light may be of any polarization. However, for a SBG input grating P-polarzation may be desirable in one embodiment. The coupling grating aperture is A. For only explanation purpose, the TIR angle has been chosen to be 45° so that the thickness of the waveguide required for the limiting input ray to just skirt the edge of the coupling grating after the first TIR bounce is A/2.

Referring to FIG. 30B, the waveguide 356 has input coupling optics comprising the first and second gratings 357A, 357B disposed adjacent each other, the half wave film 357C sandwiched by the waveguide and the first grating; and a polarizing beam splitter (PBS) film 357D sandwiched by the waveguide and the second. The PBS is design to transmit P-polarized light and reflect S-polarized light. Again the TIR angle is chosen to be 45° only for illustration purpose. Input P-polarized collimated light 358A, 358B is coupled in to the waveguide via the first grating and half wave film (HWF) to provide S-polarized light 359A, and via the second grating and PBS to provide P-polarized light 359C, 359D. Comparing the embodiments of FIG. 30A and FIG. 30B, it should be apparent that in the second the input coupling aperture can be the equal to the length of two TIR bounces owing to the polarization recovery by the HWF and PBS. In the embodiment of FIG. 30A. the input couplet cannot be longer than one TIR bounce because grating reciprocity would result in the light being diffracted downwards out of the waveguide. One benefit of the embodiment of FIG. 30B is that the waveguide thickness can be reduced by 50%; that is, for a coupler length equal to A the waveguide thickness (for 45° TIR) is A/4. At this in some embodiments, S and P lights in the waveguide are not separated. Typically, the input light will be divergent resulting in the S and P light quickly becoming spatially mixed. However, if the waveguide rotates the polarization, because more P is out coupled, there will be more conversion of S to P than P to S, thus yielding a net gain. The polarization rotation may arise from the reflective characteristics of the waveguide walls and from the birefringence of the holographic material where SBGs are used. In one embodiment, polarization rotation is provided by applying a quarter wave film (QWF) to the lower face of the waveguide. HWFs and QWFs may be about 0.125 mm thick. A typical adhesive layer may be about 75 microns. Hence in some embodiments, the polarization control films do not contribute significantly to the overall waveguide thickness. In certain cases the films can be can be immersed in an adhesive layer used for lamination.

Figure 31:
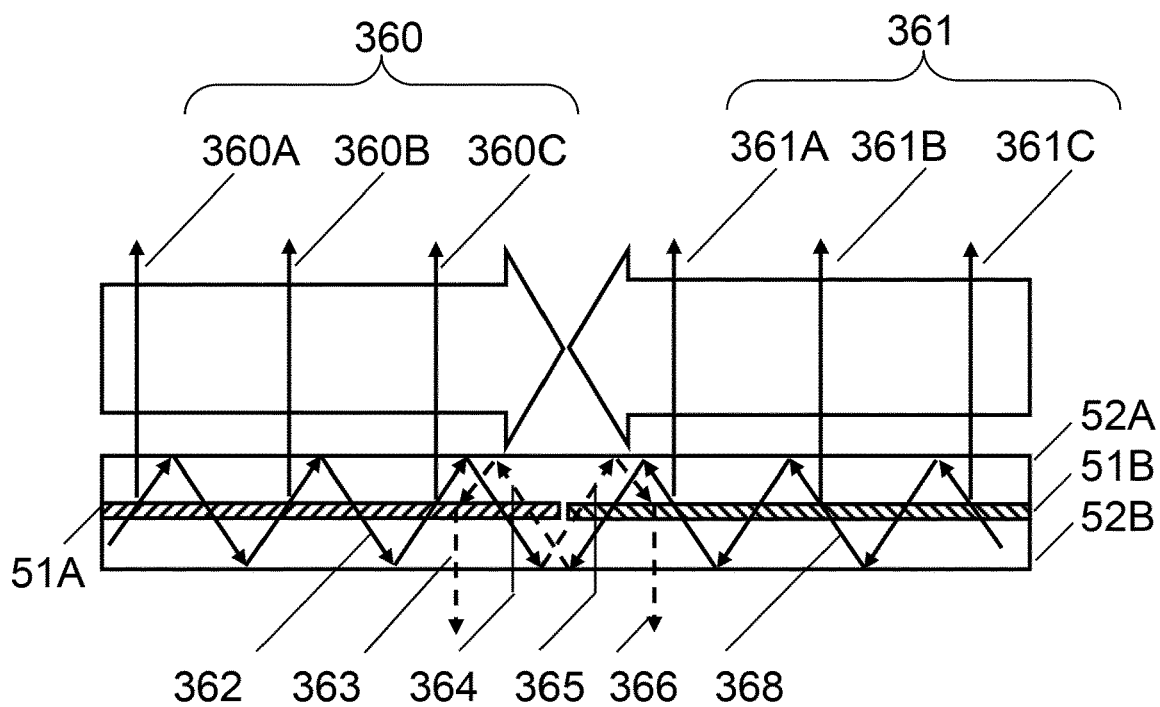
FIG. 31 is a schematic cross section of a portion of a waveguide used in the invention in which light is extracted from the waveguide in opposing directions in one embodiment.

FIG. 31 illustrates a counter-propagation waveguide for use in some embodiments. The waveguide comprises adjacent grating laminas 51A, 51B of identical but opposing prescriptions sandwiched by substrates 52A, 52B. Wave guided light 362 propagating from left to right interacts with the grating 51A to provide continuously extracted light 360A-360C to provide the expanded output beam 360. Wave guided light 368 propagating from right to left interacts with the grating 51B to provide continuously extracted light 361A-361C to provide the expanded output beam 361. Note that a small amount of light that is not extracted from each of the left/right propagation directions will interact with an opposing grating and get diffracted out of the grating in the opposite direction to that of the expanded beams 360,361, as indicated by the rays 363-366.

Figure 32:
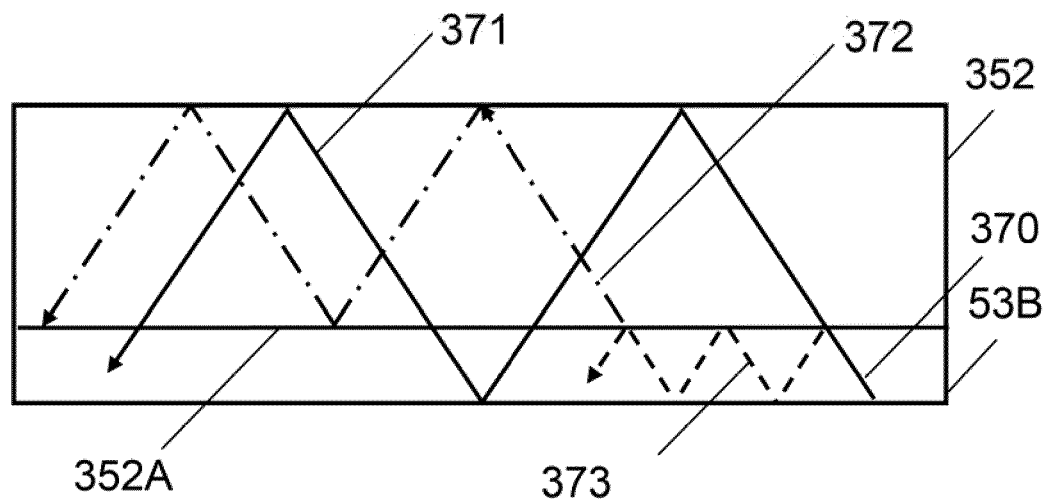
FIG. 32 is a schematic cross section of a portion of a waveguide used in the invention incorporating a beam splitter layer for improving illumination uniformity in one embodiment.

FIG. 32 illustrates the use of a beam splitter in a waveguide in one embodiment to achieve uniformity. This principle may be applied both expansion axes. As a further refinement, a beam splitter offset may be employed in waveguide (i.e., not in middle of waveguiding surfaces, but offset from waveguide midpoint to maximize uniformity following multiple bounce interactions). A yet further refinement is to use different reflectivities in beam splitter to optimize and tailor beam mixing. Not to be bound by any particular theory, but by varying the reflectivity % of the beam splitter to something other than 50/50, or by varying the transmission/reflection split along a B/S length, the pupil fill can be homogenized and optimized. For example, in FIG. 32 the waveguide 353 contains a beam splitter layer 352. In some embodiments, the beam splitter may be provided using a thin film coating. A TIR ray such as 370 may then undergo beam splitting, which results in waveguiding occurring between the upper and lower walls of the waveguide; between the upper wall of the waveguide and the beam splitter, and between the beam splitter and the lower wall of the waveguide as indicated by rays 371-373.

The IIN stop is formed by controlling the profile of the input illumination. In at least some embodiments there is no hard physical stop in the projection optics. The benefits of projected stop include decreased waveguide thickness. The stop is projected midway up the VBE to minimize aperture diameter within the VBE, and hence minimizing the aperture width of the VBE to DigiLens waveguide coupler (e.g., reducing the width of the $1^{st}$ axis expander) limits the thickness of the $2^{nd}$ axis expansion optic.

FIGS. 33-36 show details of an ITO in some embodiments addressing architecture for use in a DigiLens.

Figure 33:
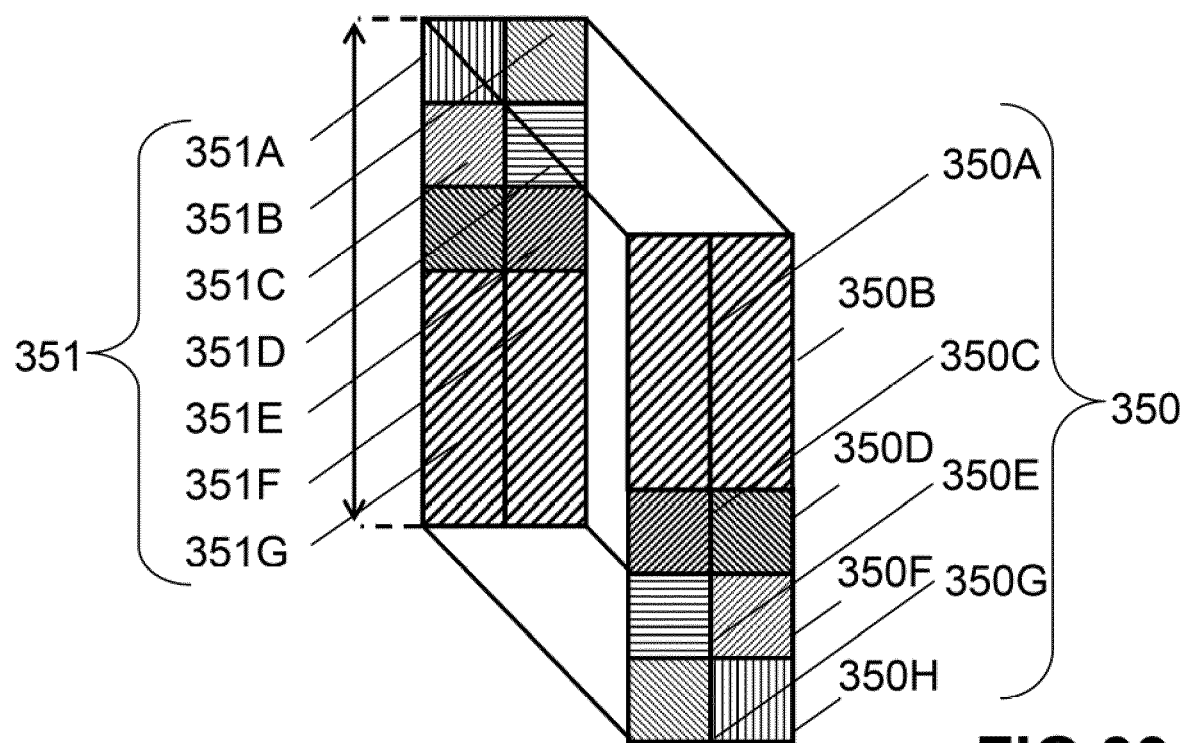
FIG. 33 illustrates a method of reducing the number of wiring tracks in an electrode layer using dual sided addressing in one embodiment.

FIG. 33 shows a method of reducing the number of tracks in a given ITO layer, which method uses dual sided addressing of ITO, and super pixel addressing to reduce the number of tracks by approximately one third. The pixels are provide in a first group 35.0 comprising: elements of dimension 3 units×1 unit such as the ones labelled by 350A, 350B; and elements of dimension 1 unit×1 unit, such as the ones labelled 350C-350H, and a second overlapping inverted group 351 of identical pixel geometry as indicated by 351A-351G.

Figure 34:
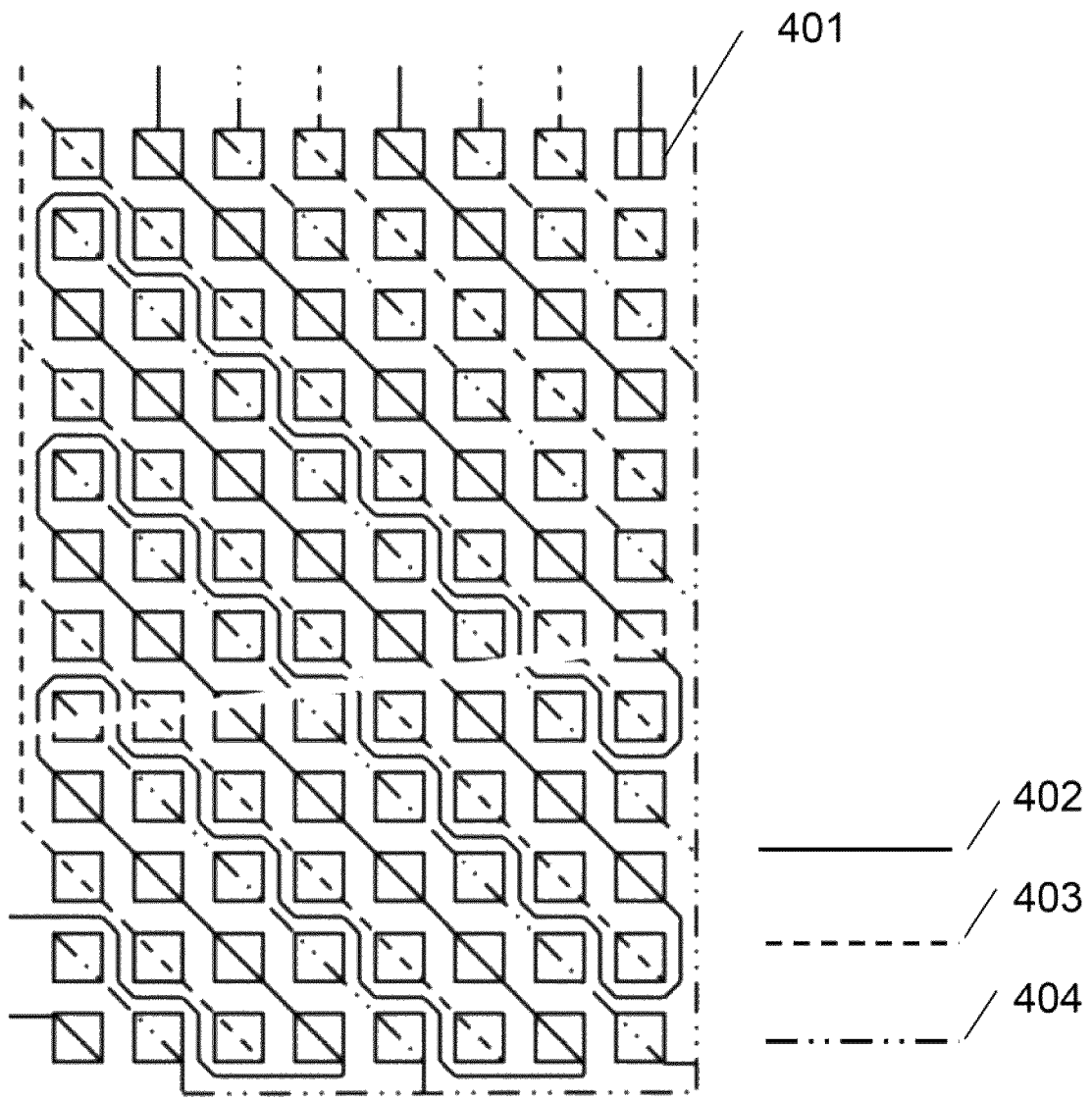
FIG. 34 illustrates one scheme for interleaving electrode wiring tracks in a tessellated waveguide in one embodiment.
Figure 35:
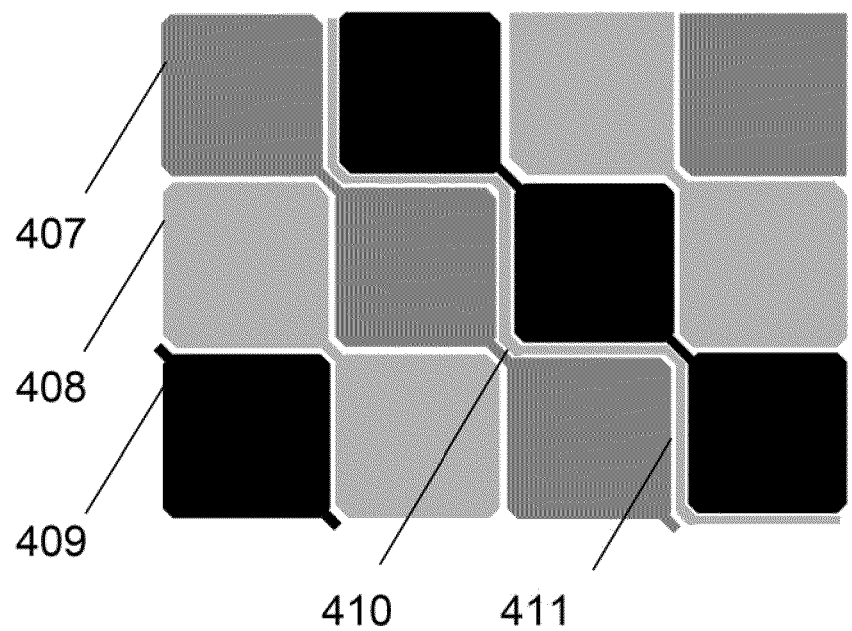
FIG. 35 illustrates another scheme for interleaving electrode wiring tracks in a tessellated waveguide in one embodiment.
Figure 36:
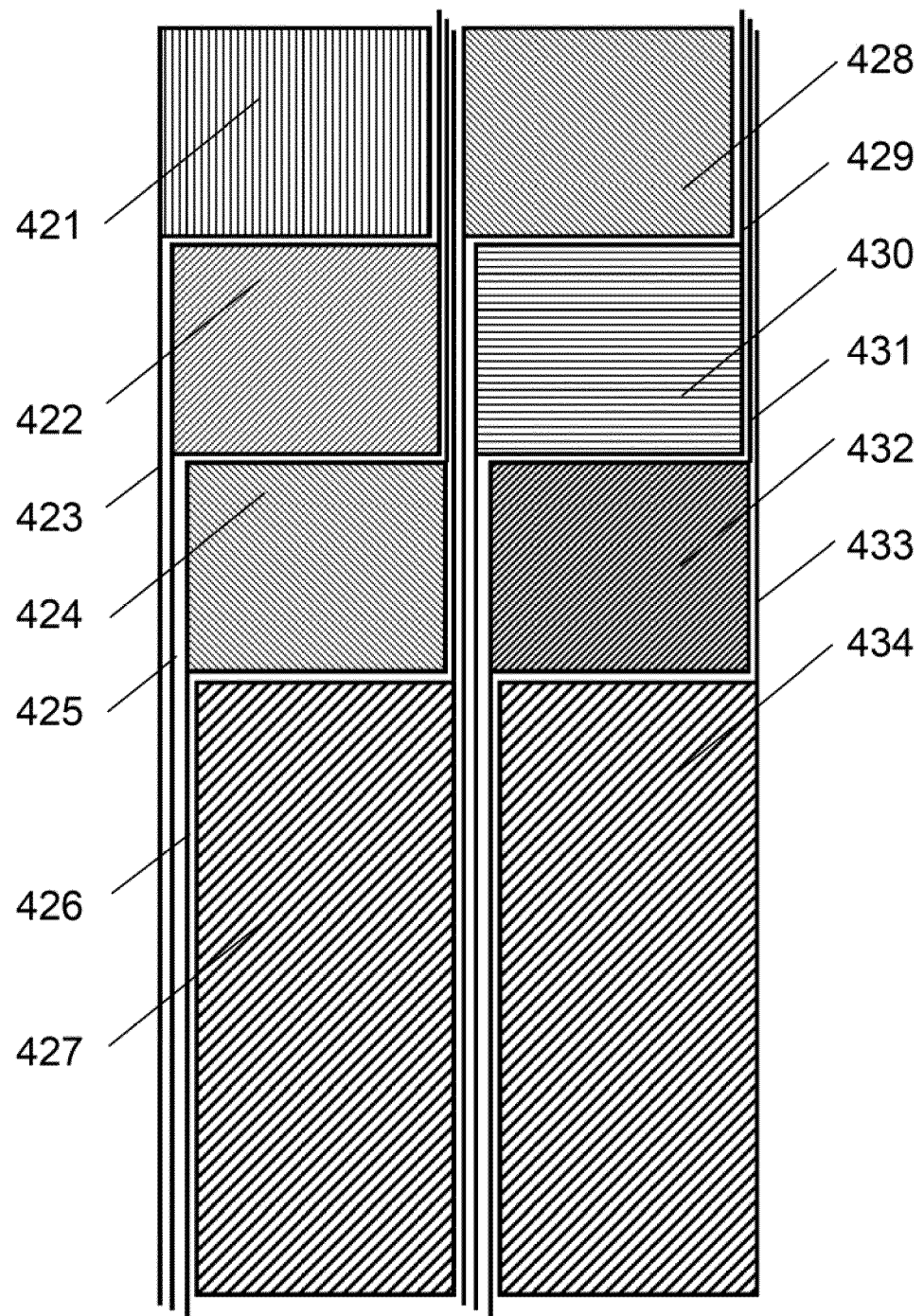
FIG. 36 illustrates a further scheme for interleaving electrode wiring tracks in a tessellated waveguide in one embodiment.

FIGS. 34-36 show how interleaving of electrode wiring tracks may be used to permit a 2D electrode structure to address (switch) multiple different tessellation types. FIG. 34 shows a wiring scheme used in embodiment, in which electrode elements such as 401 are connected by tracks 402-404. FIG. 35 shows a wiring scheme in another embodiment with electrodes 407-409 and track portions 410,411 indicated. FIG. 36 shows the electrodes and tracks of the embodiment of FIG. 33 in more details with the elements and tracks indicated by the numerals 421-434.

The electrode architecture may benefit in terms of reduction of part complexity from using identical pattern technique, and flip symmetry to create full addressing network. This is not needed to make design work, but may limit number of parts that need to be designed and handled.

In one embodiment, a graduated reflection profile underneath SBG layer is used to control (or assist) with grating DE variation along length (normally achieved in SBG grating using index modulation). This may be useful in cases such as the VBE where low percentage of light is out coupled in the first bounce, but high percentage is coupled out at the other end of the expander.

In one embodiment, 1D expansion engines are used to double input power and/or minimize 1D aperture width.

Figure 37A:
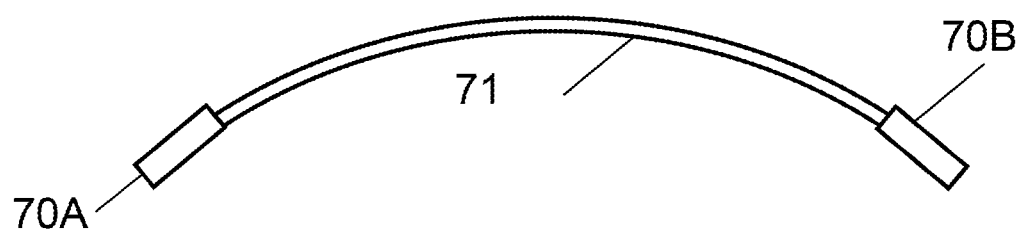
FIG. 37A shows a schematic plan view of a curved visor implementation of the invention in one embodiment.
Figure 37B:
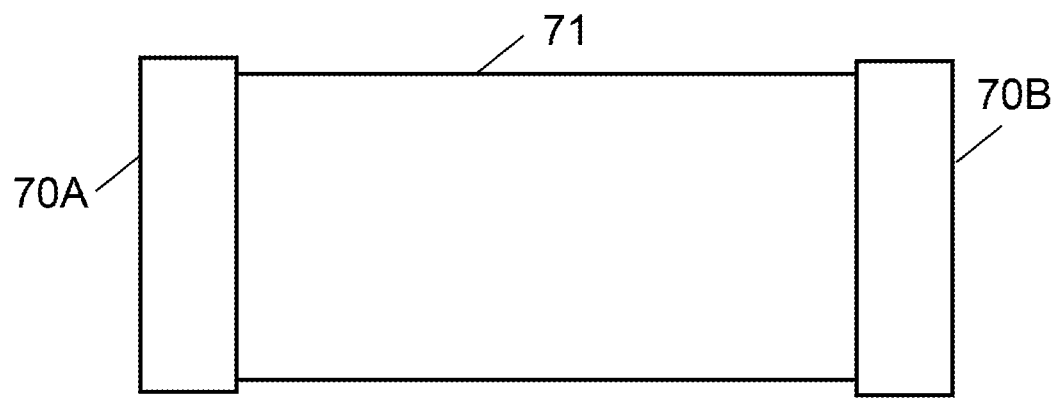
FIG. 37B shows a schematic side elevation view of a curved visor implementation of the invention in one embodiment.

In one embodiment, the display is configured as a "visor". The color waveguide is curved in at least one plane. In general, such an embodiment may have a large (30 mm) eye relief and a large exit pupil. The large exit pupil may reduce (or even eliminate) the need for IPD adjustment. FIG. 37A-37B are schematic plan and side elevation views of a curved visor comprising a DigiLens 71 and optical-electronic modules 70A, 70B to either sides. One module will comprise the IIN. The second module may contain auxiliary optics and electronics.

Figure 38:
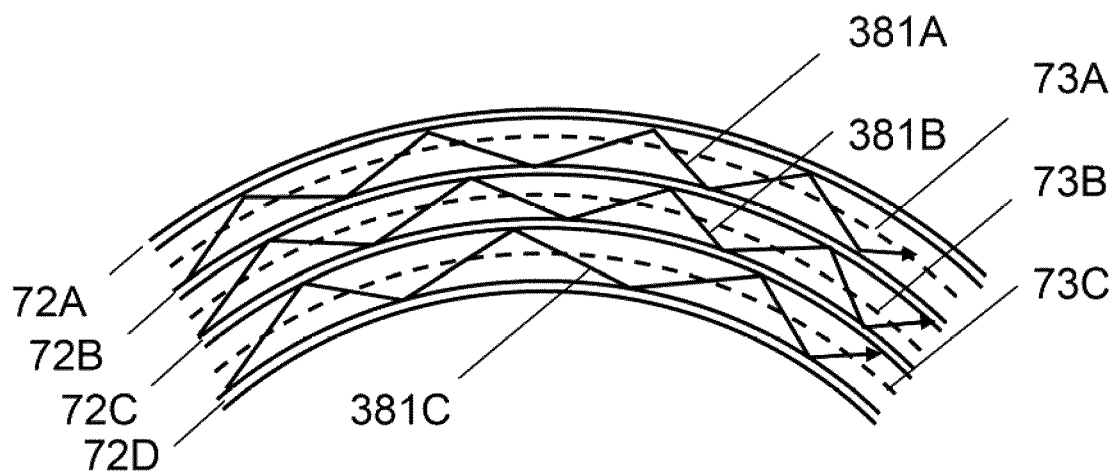
FIG. 38 show a cross section of a curved visor implementation of the invention in which the DigiLens comprises laminated optically isolated waveguides in one embodiment.
Figure 39:
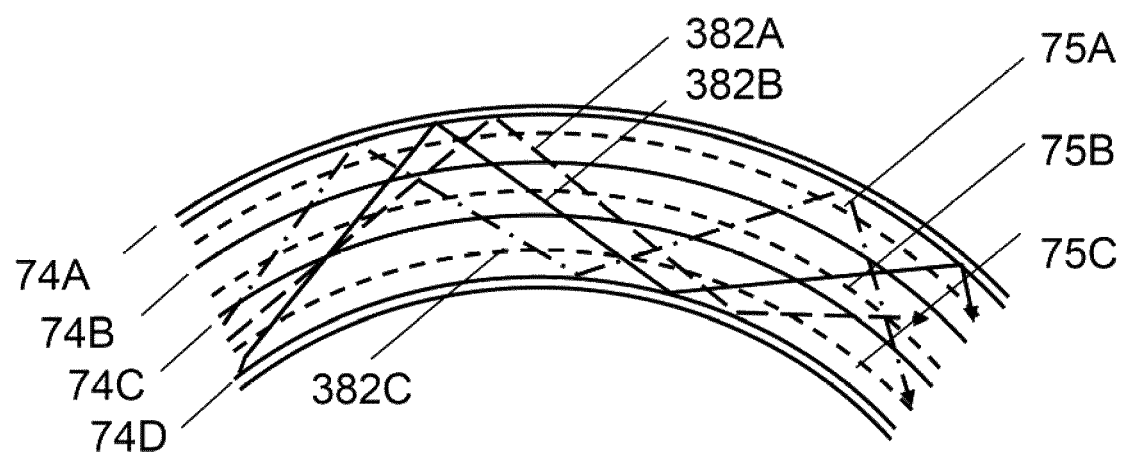
FIG. 39 show a cross section of a curved visor implementation of the invention in which the DigiLens comprises laminated grating layers that form a single waveguiding structure in one embodiment.

FIG. 38 shows the DigiLens of a curved visor in one embodiment in more detail. The DigiLens may comprise laminated waveguides, each containing SBG arrays 73A-73C. In this case the three SBG layers are isolated from each other by the cladding layers 72A-72D. The ray paths are indicated by 381A-381C. In the embodiment of FIG. 39, the SBG layers are stacked without cladding layers to form a single waveguiding structure. The ray paths are indicated by 382A-382C.

Figure 41:
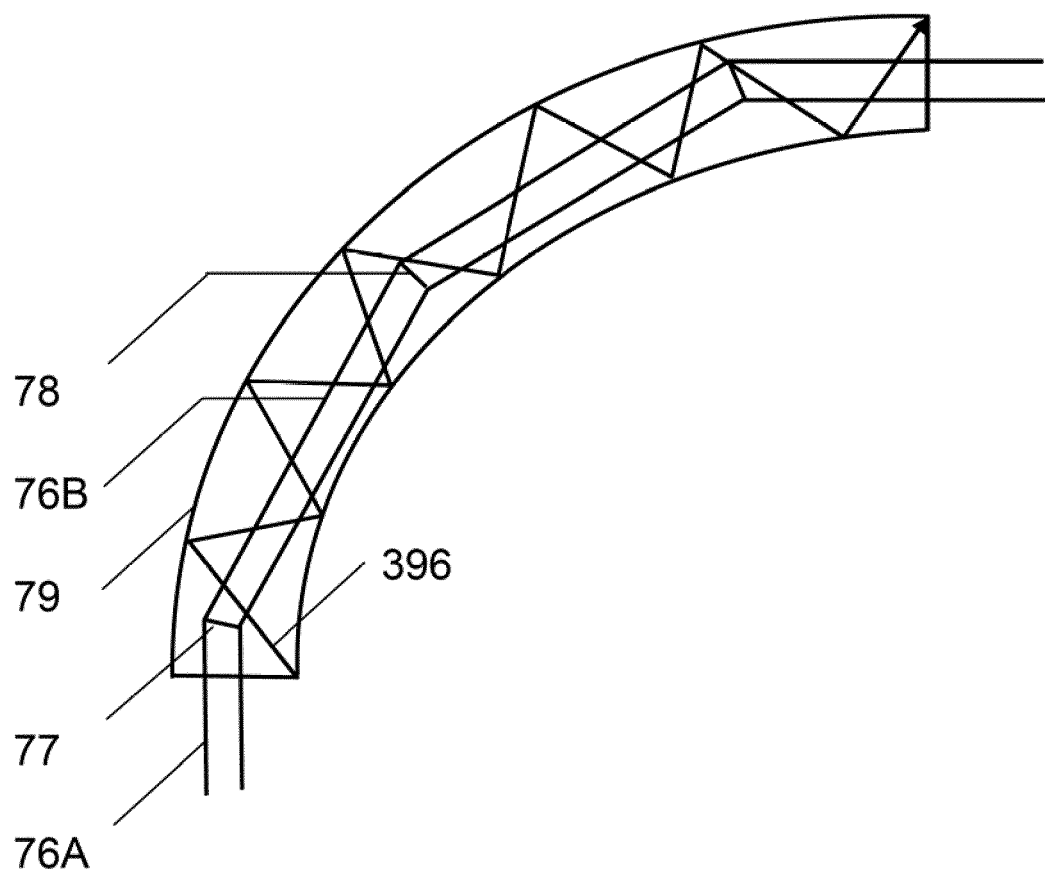
FIG. 41 show a cross section of a curved visor implementation of the invention in which the DigiLens comprises facetted elements embedded in a curved lightguide in one embodiment.

In one embodiment as shown in FIG. 40, a visor DigiLens is shaped facetted planar elements 76A, 76B allowing the waveguides to be planar. As shown in the insets B and C, gratings 77A, 77B are provided at the optical interfaces 77 between the facets to control the beam angles to ensure efficient coupling of guided image light to the SBG array elements. The gratings 77A, 77B may be Bragg gratings. In one embodiment as shown in FIG. 41, a facetted DigiLens comprising planar facets, such as 76A, 76B, is embedded with a curved lightguide 79.

The embodiments may rely on monochromatic waveguides. However it should be apparent from consideration of the description that in alternative embodiments the waveguides could operate on more than color. Such embodiments may involve a more complicated IIN design.

In at least some embodiments the multilayer architectures described herein may not be used with conventional holograms, because they would interfere with each other. Thus, SBG, which can be switched clear to allow time-domain integration of the field of view, may be employed to overcome this challenge.

One embodiment described herein is related to a HMD, such as one with the following specification:
 a) 180° see-through visibility;
 b) full color;
 c) 52°×30° FOV;
 d) 30 mm×30 mm eye box;
 e) 2560×1440 resolution;
 f) Snellen 20/20 acuity;
 g) 30 mm eye relief;
 h) universal IPD;
 i) binocular; and
 j) polycarbonate optics.

One important feature of at least some of the embodiments described herein is that they provide the benefit of see-through. The latter is of great importance in Head Up Displays for automobile, aviation and other transport applications; private see-through displays such for security sensitive applications; architectural interior signage and many other applications. With the addition of a holographic brightness enhancing film, or other narrow band reflector affixed to one side of the display, the purpose of which is to reflect the display illumination wavelength light only, the see-through display can be made invisible (and hence secure) in the opposite direction of view. The reflected display illumination may be effectively mirrored and therefore blocked in one direction, making it desirable for transparent desktop display applications in customer or personal interview settings common in bank or financial services settings.

Although some of the embodiments above describe wearable displays, it will be clear that in any of the above embodiments the eye lens and retina may be replaced by any type of imaging lens and a screen. Any of the above described embodiments may be used in either directly viewed or virtual image displays. Possible applications range from miniature displays, such as those used in viewfinders, to large area public information displays. The above described embodiments may be used in applications where a transparent display is desired. For example, some embodiments may be employed in applications where the displayed imagery is superimposed on a background scene such as heads up displays and teleprompters. Some embodiments may be used to provide a display device that is located at or near to an internal image plane of an optical system. For example, any of the above described embodiments may be used to provide a symbolic data display for a camera viewfinder in which symbol data is projected at an intermediate image plane and then magnified by a viewfinder eyepiece. One embodiment may be applied in biocular or monocular displays. Another embodiment may also be used in a stereoscopic wearable display. Some embodiments may be used in a rear projection television. One embodiment may be applied in avionic, industrial and medical displays. There are applications in entertainment, simulation, virtual reality, training systems and sport.

Any of the above-described embodiments using laser illumination may incorporate a despeckler device for eliminating laser speckle disposed at any point in the illumination path from the laser path to the eyeglass. Advantageously, the despeckler is an electro-optic device. Desirable the despeckler is based on a HPDLC device.

REFERENCES

The following patent applications are incorporated by reference herein in their entireties:

U.S. Provisional Patent Application No. 61/627,202 with filing date 7 Oct. 2011 by the present inventors entitled WIDE ANGLE COLOR HEAD MOUNTED DISPLAY which is also referenced by the Applicant's docket number;

PCT Application No. US2008/001909, with International Filing Date: 22 Jul. 2008, entitled LASER ILLUMINATION DEVICE; PCT Application No. US2006/043938, entitled METHOD AND APPARATUS FOR PROVIDING A TRANSPARENT DISPLAY;

PCT Application No. PCT/GB2010/001982 entitled COMPACT EDGE ILLUMINATED EYEGLASS DISPLAY; PCT Application No. PCT/GB2010/000835 with International Filing Date: 26 Apr. 2010 entitled Compact holographic edge illuminated eyeglass display;

PCT Application No. PCT/GB2010/002023 filed on 2 Nov. 2010 entitled APPARATUS FOR REDUCING LASER SPECKLE; U.S. patent application: Ser. No. 10/555,661 filed 4 Nov. 2005 entitled SWITCHABLE VIEWFINDER DISPLAY;

U.S. Provisional Patent Application No. 61/344,748 with filing date 28 Sep. 2010 entitled Eye Tracked Holographic Edge Illuminated Eyeglass Display;

U.S. Provisional Patent Application 61/573,066 with filing date 24 Aug. 2011 by the present inventors entitled HOLOGRAPHIC POLYMER DISPERSED LIQUID CRYSTAL MATERIALS AND DEVICES;

U.S. Provisional Patent Applications No. 61/457,835 with filing date 16 Jun. 2011 entitled HOLOGRAPHIC BEAM STEERING DEVICE FOR AUTOSTEREOSCOPIC DISPLAYS; PCT Application No. US2008/001909, with International Filing Date: 22 Jul. 2008, entitled LASER ILLUMINATION DEVICE;

PCT Application No. PCT/GB2010/002023 filed on 2 Nov. 2010 by the present inventors entitled APPARATUS FOR REDUCING LASER SPECKLE;

U.S. Provisional Patent Application No. 61/573,121 with filing date 7 Sep. 2011 by the present inventors entitled METHOD AND APPARATUS FOR SWITCHING HPDLC ARRAY DEVICES which is also referenced by the Applicant's docket number;

PCT Application No. PCT/GB2010/000835 with International Filing Date: 26 Apr. 2010 entitled COMPACT HOLOGRAPHIC EDGE ILLUMINATED EYEGLASS DISPLAY; and U.S. Provisional Patent Application 61/573,082 with filing date 29 Aug. 2011 by the present inventors entitled CONTACT IMAGE SENSORS.

Micro-Tessellations

One set of embodiments uses Micro Tessellations. The performance of microtessellations gratings in the context of a Switchable Bragg Grating DigiLens™ waveguide device will now be explored. Tessellation is a pattern of repeating shapes that fit together without gaps. Use of the term 'tessellation' may refer to a single element of a tessellation pattern. In the practical application of tessellations pertaining to DigiLens™ devices tessellation also means the creation of patterns without substantial gaps between tessellation elements—i.e., where there is high overall aperture fill factor.

A tessellation element is a region (aperture) of diffraction grating or diffraction gratings, which may be a switchable diffraction grating (SBG). The tessellation will diffract light over all regions of the tessellation at the same time. The diffraction grating may be switchable or non-switchable.

Micro-Tessellation: this is a small tessellation that exists within a larger primary tessellation element. The microtessellations within a primary tessellation may have different grating prescriptions. Micro-tessellation elements that exist within a primary tessellation element all diffract at the same time. The performance of tessellations and their impact on MTF has been described in earlier documents, wherein a single grating was written into the tessellation.

Microtessellations within a Primary Tessellation Structure

Performance considerations of interest are: MTF (resolution) and uniformity of field angles.

In a tiled substrate guided (SGO), a single field of view will exist in the waveguide. At any given moment in time, this will carry field of view information for a portion of the overall field of view. In the case of an eye display, this is a portion of the projected field that is out coupled from the SGO. The out-coupling gratings need to out-couple this field of view content such that the eye can see this field of view information across the eye box, desirably with the same flux entering the eye for each field angle and for all field angles at any position of the eye pupil within the eyebox. From earlier work it is recognized that larger tessellations yield superior MTF (resolution) performance, and field of view irradiance on the eye's pupil is more uniform with smaller tessellations. Outcoupling gratings angular bandwidth leads to a fall off in the output light with field angle. A minimum tessellation size to yield sufficient resolution is dependent on the system resolution sought. However, a minimum tessellation aperture size of 0.5 mm to 1 mm width (or diameter) will approximately be needed to support 0.7 to 1.4 lp/mr resolutions, with larger apertures being preferred in one embodiment. This particularly affects high spatial frequency performance.

A tessellation is a region of the out-coupling grating that, when in a diffracting state, will diffractively out-couple the light at all points in that tessellation aperture region at the same time. The regions within a tessellation may contain with one grating prescription or a plurality of grating prescriptions. This plurality of grating prescriptions may be achieved either by multiplexing the gratings (grating prescriptions share the same area of the tessellation), or by having spatially discrete regions of the tessellation into which is written a single grating only. A microtessellation is small tessellation that is switched at the same time as other small tessellation areas. The case of spatially discrete microtessellations (µT) is examined following.

µT gratings may be designed to have angular bandwidth overlap with the neighboring µTs (in angular field). Modeling micro-tessellations for a given field angle in one embodiment is described below. One case to consider is FoV overlap of micro-tessellations causing different field angles to be output at different points. Another case to consider is equal irradiance of eye pupil from multiple micro-tessellations for a given field angle. Some field angles would output light equally from multiple micro-tessellations, thereby providing the same irradiance of the eye pupil. It is assumed that some micro-tessellations would then provide less, or no, irradiance of the eye pupil. A top hat model would be appropriate to model this case.

Unequal irradiance of eye pupil from multiple micro-tessellations for a given field angle is investigated. To model this case, an unequal aperture weighting needs to be modeled. For any given single field angle, the output from micro-tessellations to micro-tessellations may not be a smooth function, but rather a step function, as shown in the spatial distribution plots below.

Non-Limiting Working Examples

The modeling that follows firstly evaluated the equal irradiance case for 25%, 50% and 75% aperture fill. Most field angle cases will not be top hat, and must be evaluated with a representative field angle weighting function for different micro-tessellations.

A typical angular distribution is shown in FIG. 42A. The corresponding spatial distribution is shown in FIG. 42B. In Case A, a top hat function for this field angle gives 50% aperture fill. In Case B, the tiles have different weighting. Aperture therefore is not a top hat function. Note that micro tessellations do not need to be square or in the order as shown and may have any shape or order, such as a 2D distribution.

Structured and random arrangements were investigated. The following Figures show Non-Random, Regular Repeating Micro-Tessellation Patterns.

Figure 43A:
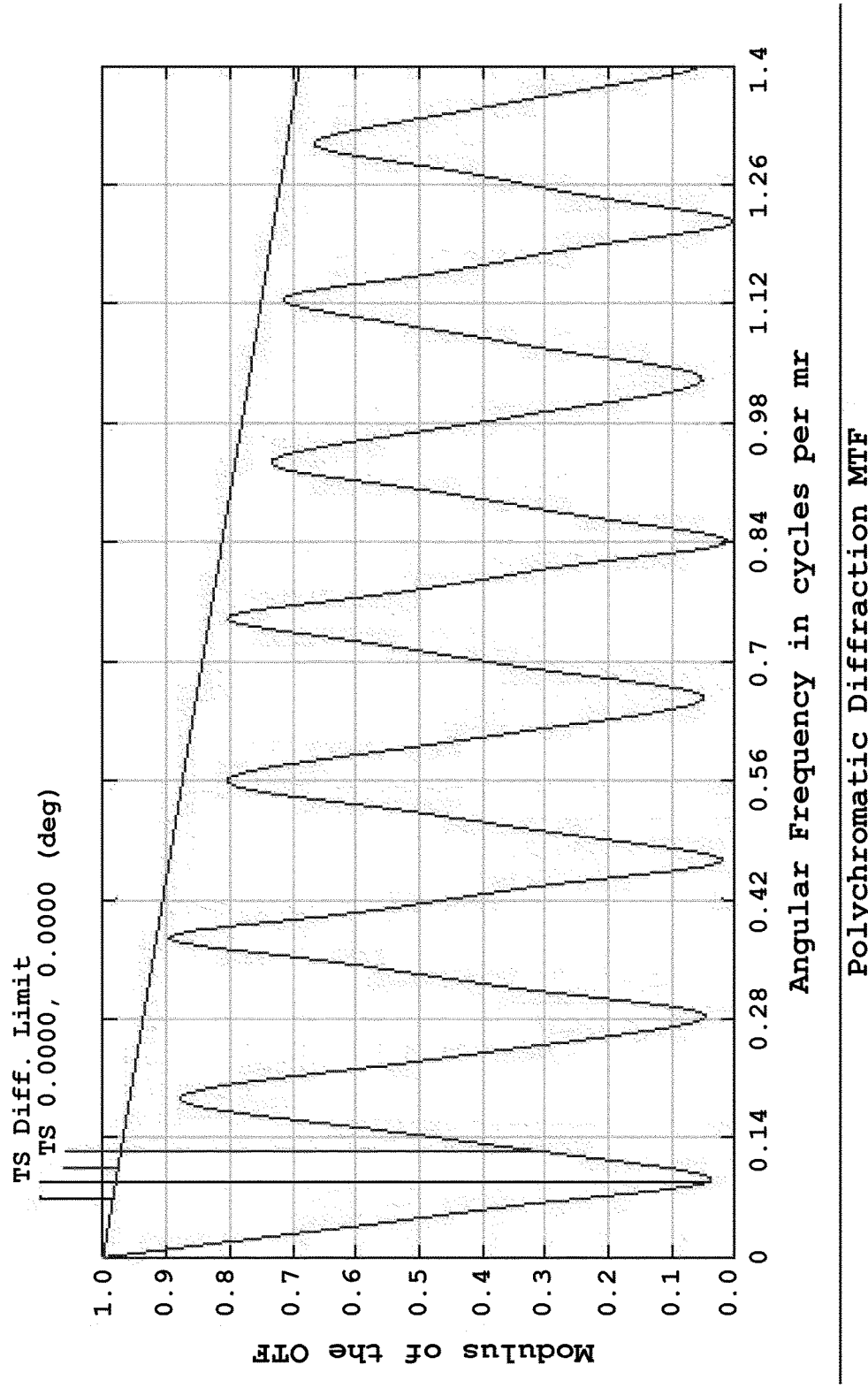
FIG. 43A is a chart showing a MTF plot for a regular micro tessellation pattern with 50% aperture fill in one embodiment.
Figure 44A:
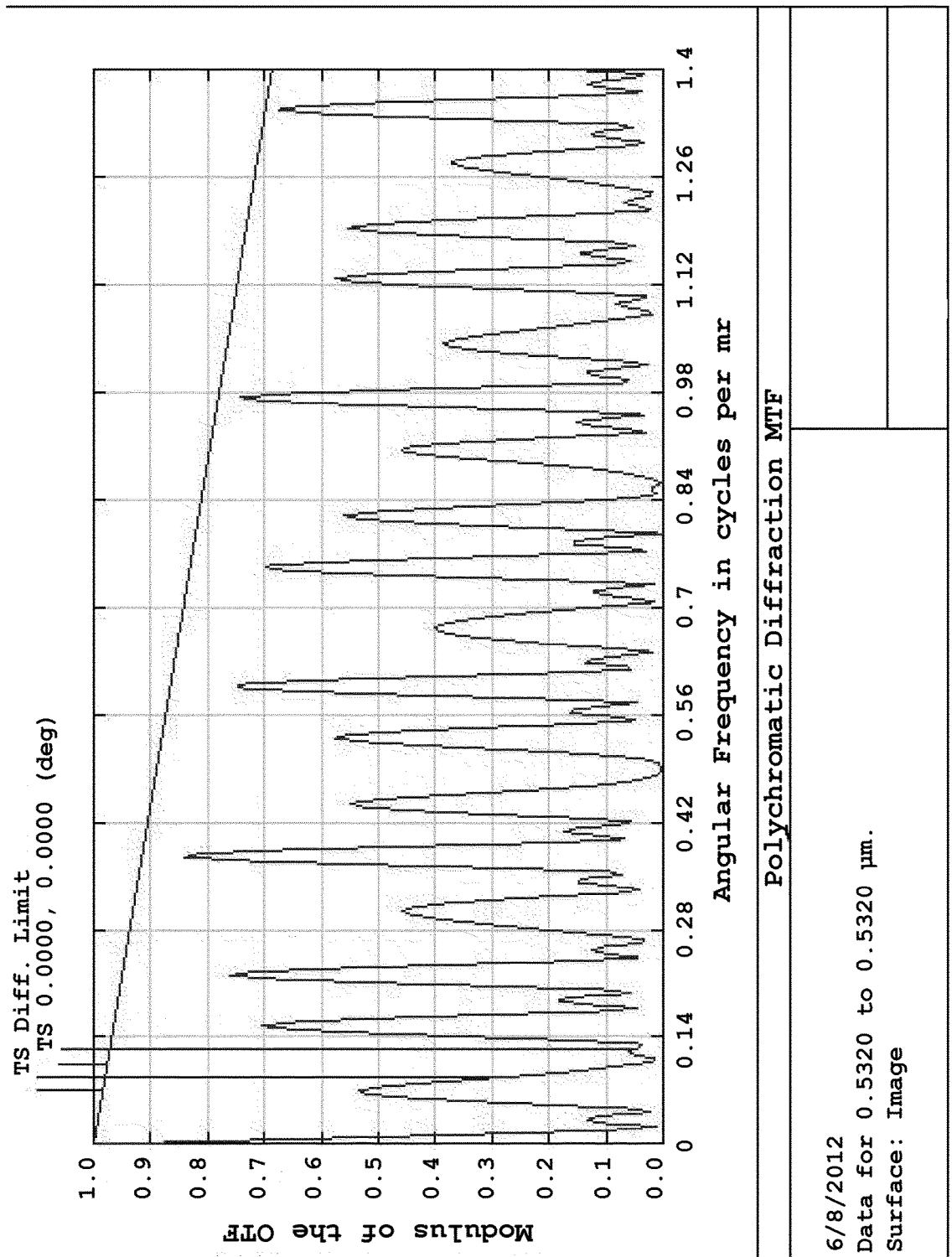
FIG. 44A is a chart showing a MTF plot for a regular micro tessellation pattern with 25% aperture fill in one embodiment.
Figure 45A:
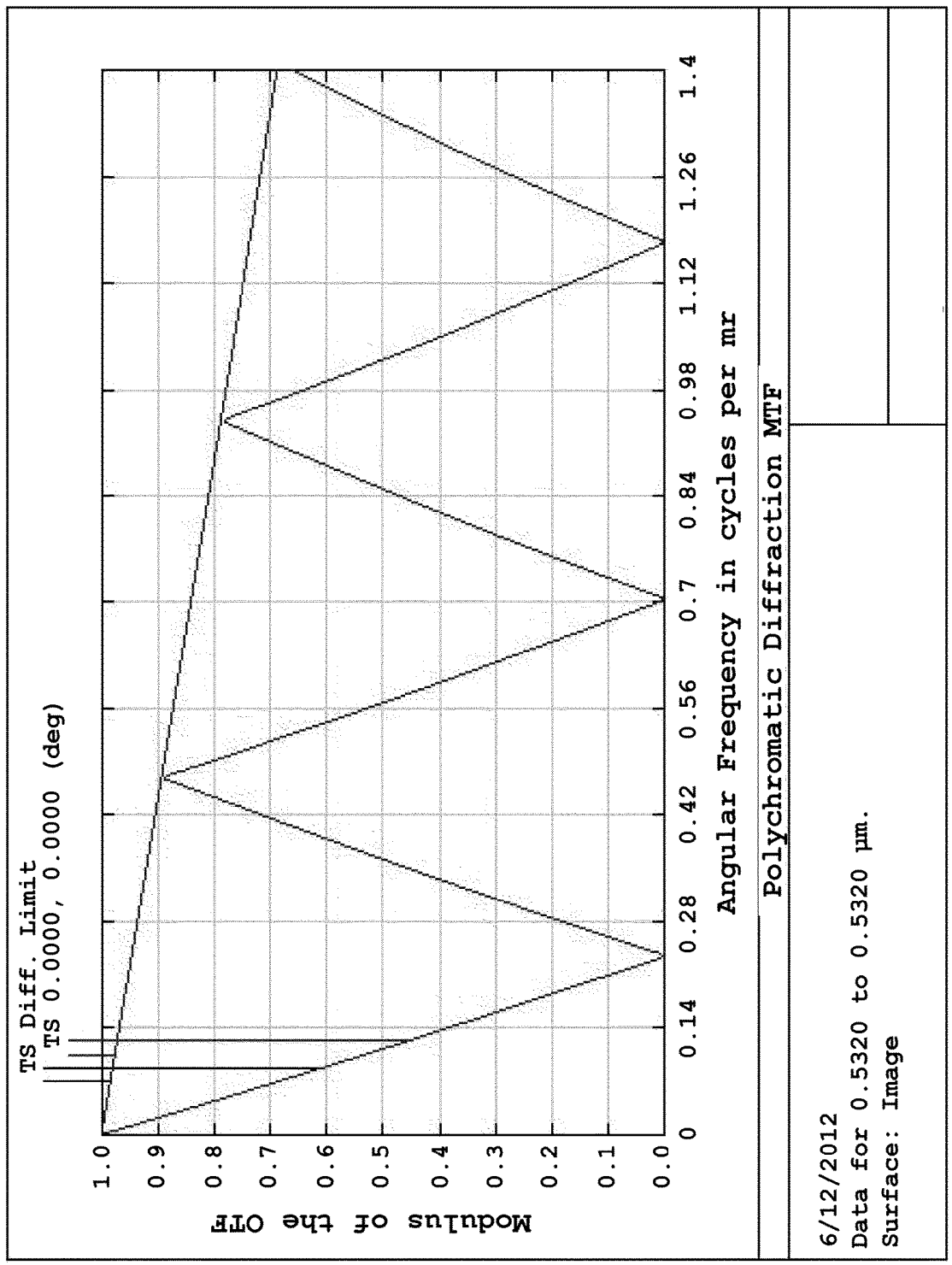
FIG. 45A is a chart showing a MTF plot for a regular micro tessellation pattern with 50% aperture fill in one embodiment.
Figure 45B:
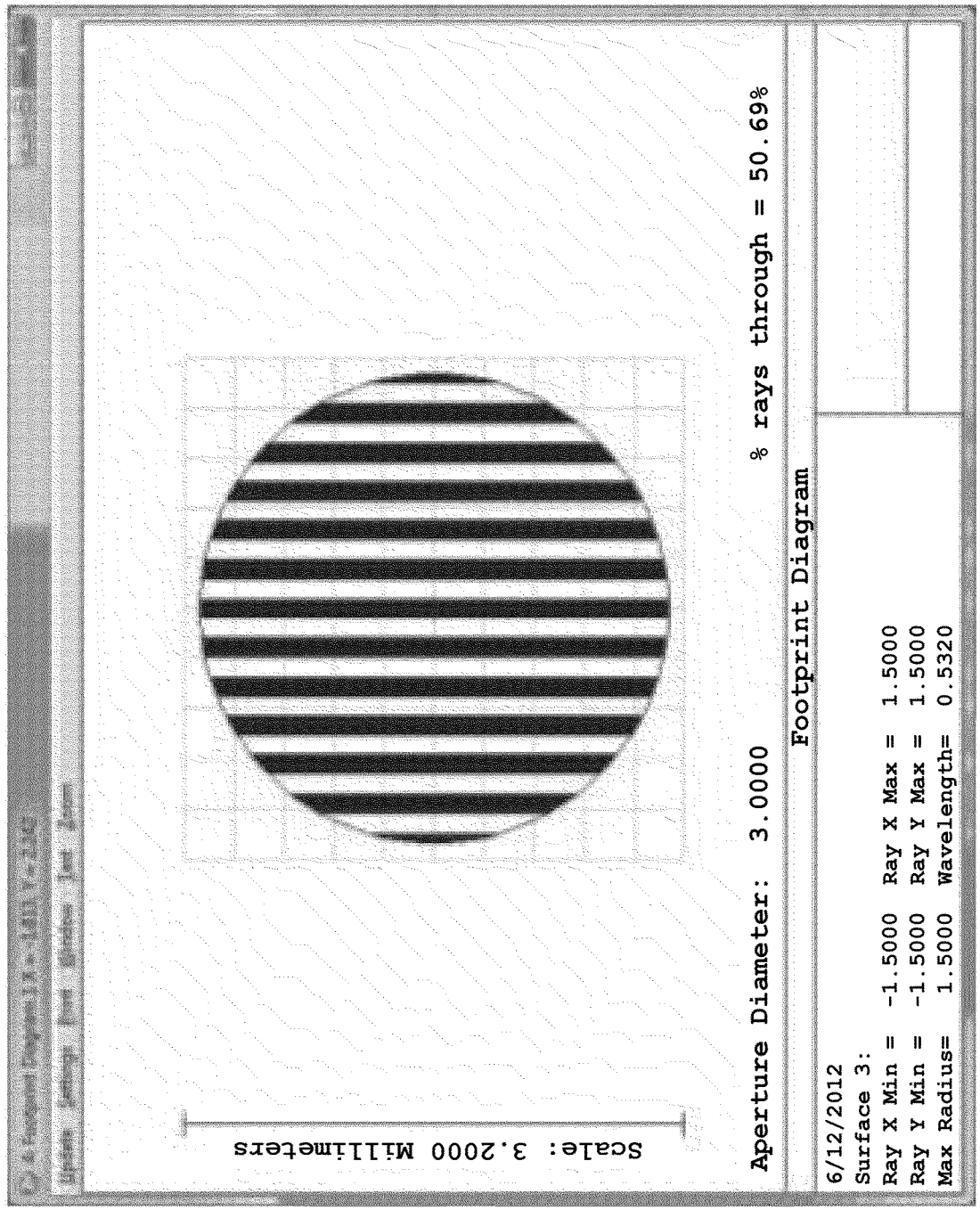
FIG. 45B is a footprint diagram for the case of FIG. 45A in one embodiment.

FIG. 43 illustrates MTF curves (FIG. 43A) and a 3D layout drawing FIG. 43B showing the effects of 50% aperture fill: 50 um apertures on a 100 um pitch, 3 mm eye pupil. It was assumed 10 um apertures on 40 um pitch (25% fill factor) and green light (532 nm) only. Note the high modulation in the resulting frequency space. FIG. 44 shows the effects of 25% aperture fill: 10 um apertures on 40 um pitch, 3 mm eye pupil. MTF and 3D layout plots are provided. 10 um apertures on 40 um pitch (25% fill factor). Green (532 nm) are assumed. FIG. 45 shows the effects 50% aperture fill: 125 um apertures on 250 um pitch, 3 mm eye pupil using a MTF plot (FIG. 45A) and a footprint diagram (FIG. 45B). 125 um stripe apertures on 250 um pitch (50% fill factor) and Green (532 nm) are assumed. The non-randomized, regular periodic structures exhibit dips in the MTF through out the angular frequency range of interest, typically: 1.4 cyc/mr.

Random Micro-Tessellation Patterns were considered next. Results from periodic aperture functions show 'holes' in the MTF. The following investigates randomization of the eye pupil fill using micro tessellations. Tessellation % fill of 25%, 50% and 75% are considered. For this initial analysis, the tessellation was considered to be 100% of the eye pupil. Later cases consider a 1 mm square tessellation that contains micro tessellations with a 3 mm eye pupil.

Figure 46A:
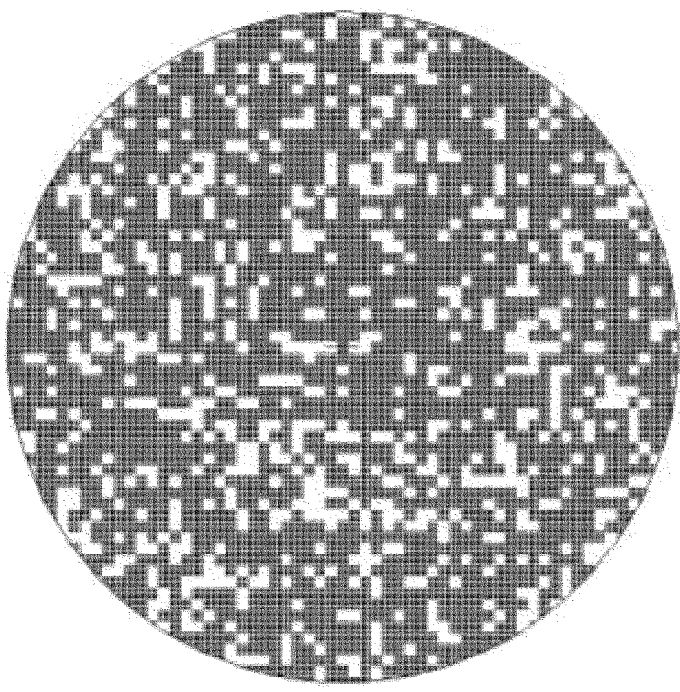
FIG. 46A is a footprint diagram showing the effect of 75% aperture fill for 50 micron micro tessellations in one embodiment.
Figure 46B:
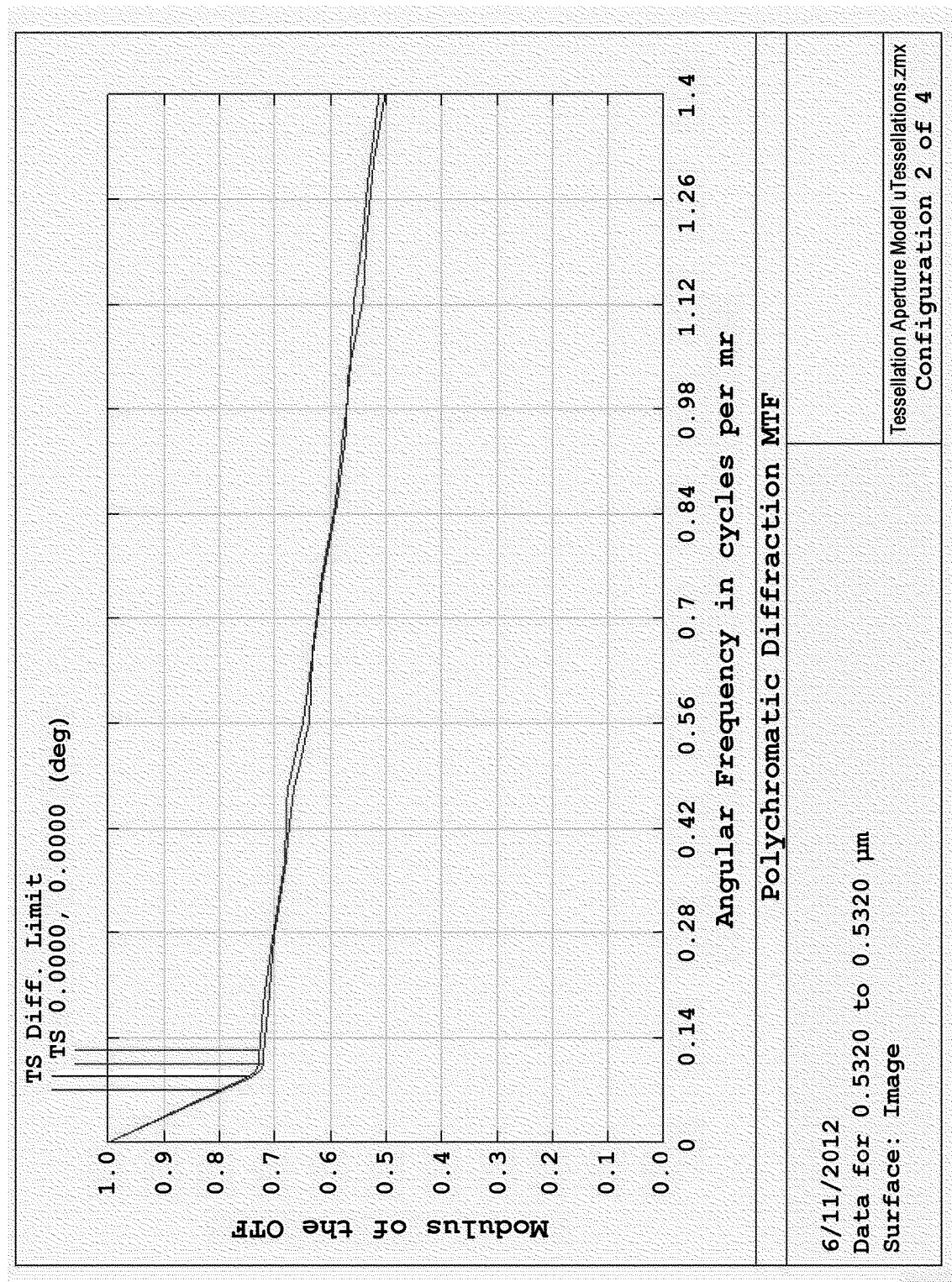
FIG. 46B is a chart showing a MTF plot illustrating the effect of 75% aperture fill for 50 micron micro tessellations in one embodiment.
Figure 47A:
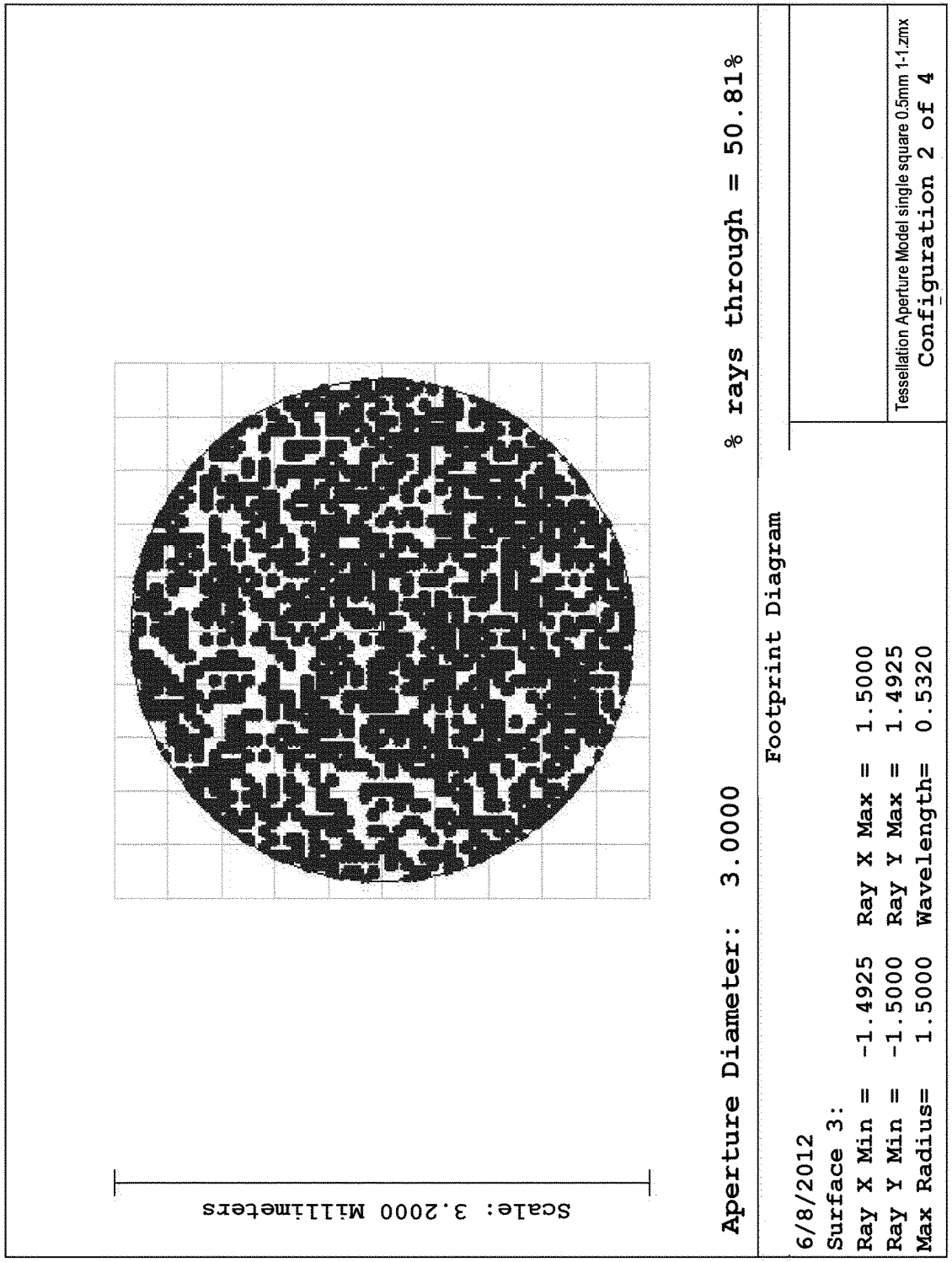
FIG. 47A is a footprint diagram showing the effect of 50% aperture fill for 50 micron micro tessellations in one embodiment.
Figure 47B:
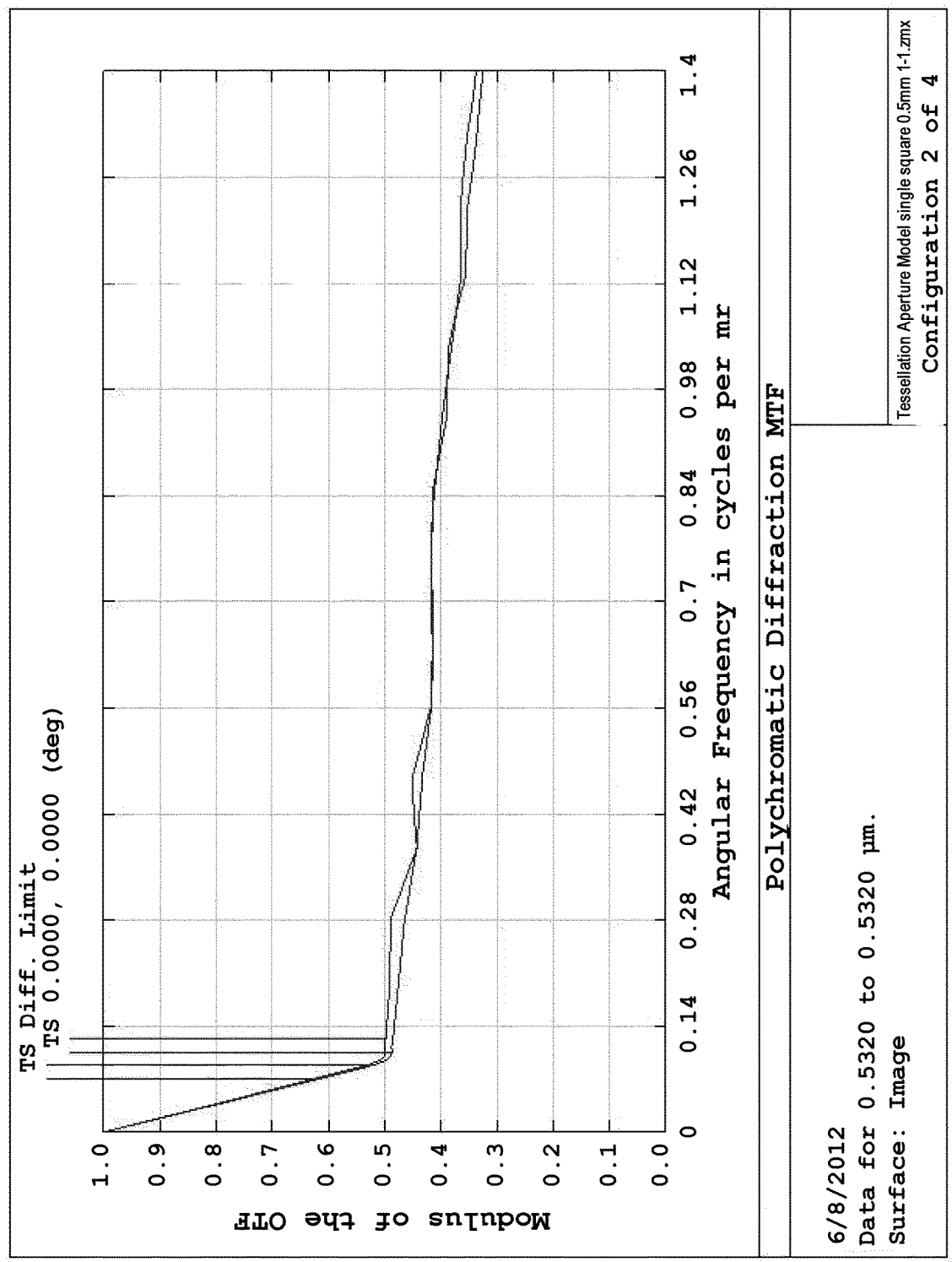
FIG. 47B is a chart showing a MTF plot illustrating the effect of 50% aperture fill for 50 micron micro tessellations in one embodiment.
Figure 48A:
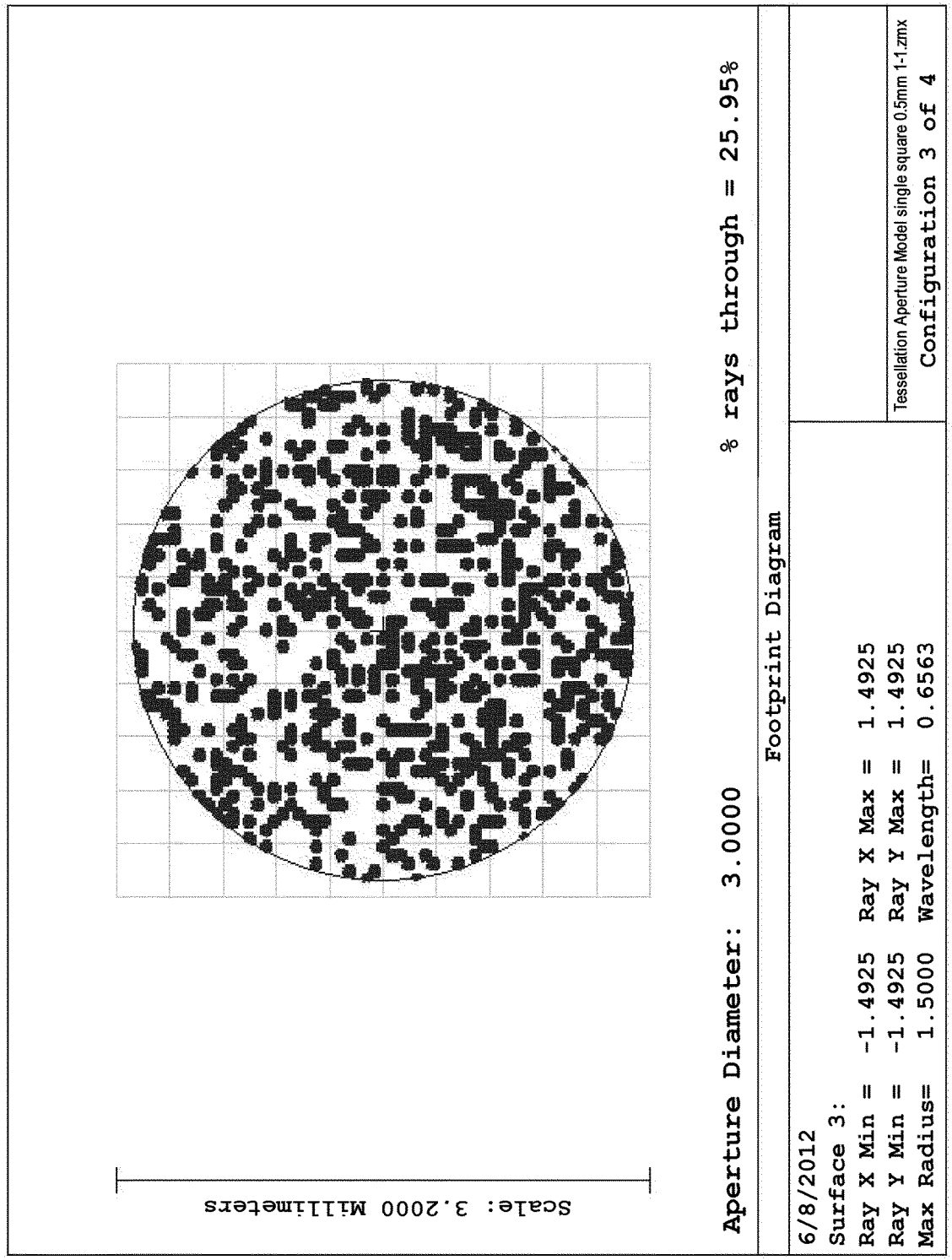
FIG. 48A is a footprint diagram showing the effect of 25% aperture fill for 50 micron micro tessellations in one embodiment.
Figure 48B:
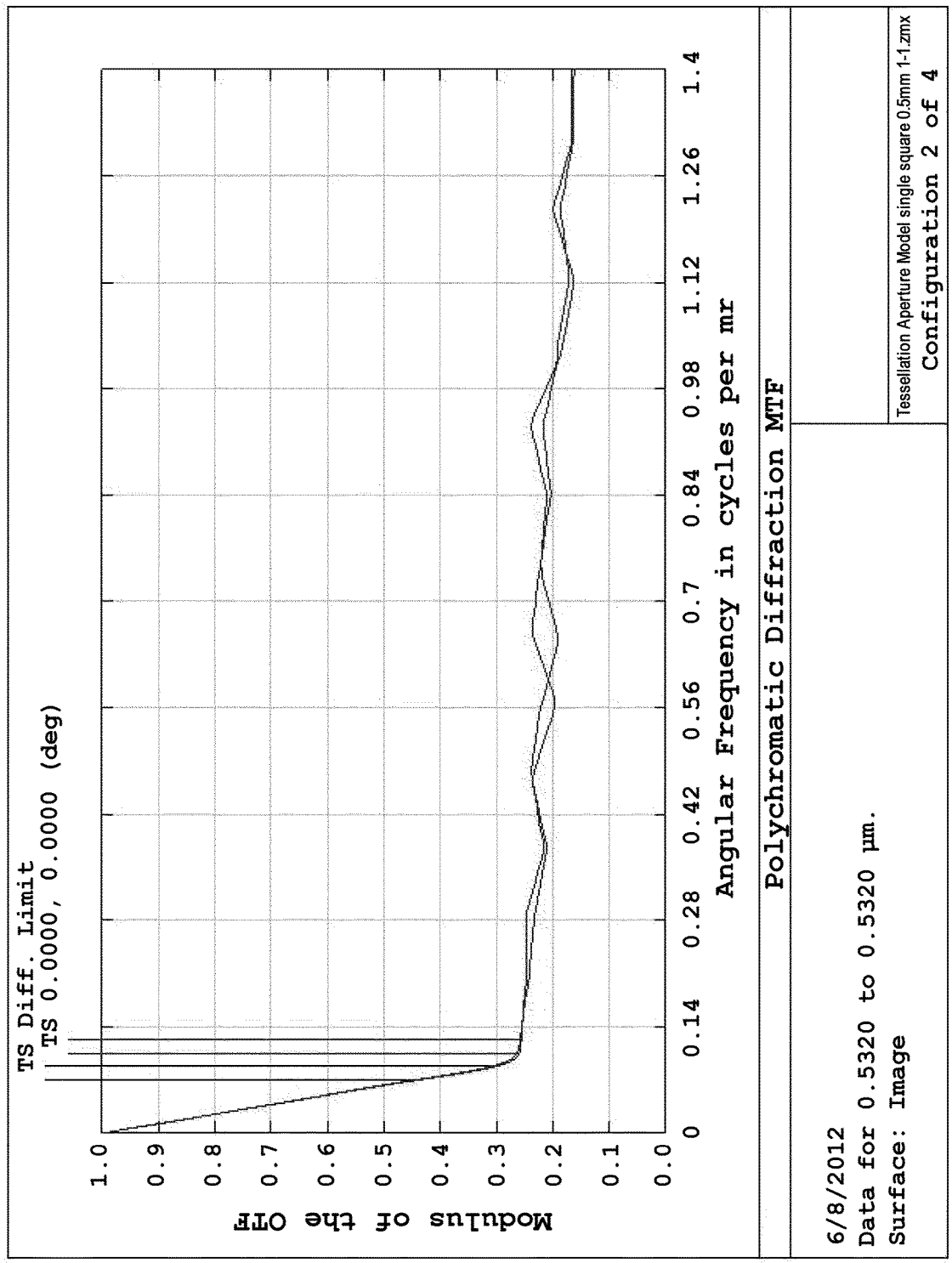
FIG. 48B is a chart showing a MTF plot illustrating the effect of 25% aperture fill for 50 micron micro tessellations in one embodiment.

The following illustrations illustrate the characteristics of 50 micron micro-tessellations. FIG. 46A is a footprint diagram showing the effect of 75% aperture fill of 50 um micro tessellations in 3 mm eye pupil. FIG. 46B is a MTF plot showing the effect of 75% aperture fill of 50 um micro tessellations in 3 mm eye pupil FIG. 47A is a footprint diagram showing the effect of 50% aperture fill of 50 um micro tessellations in 3 mm eye pupil FIG. 47B is a MTF plot showing the effect of 50% aperture fill of 50 um micro tessellations in 3 mm eye pupil FIG. 48A is a footprint diagram showing the effect of 25% aperture fill of 50 um micro tessellations in 3 mm eye pupil FIG. 48B is a MTF plot showing the effect of 25% aperture fill of 50 um micro tessellations in 3 mm eye pupil.

Figure 49A:
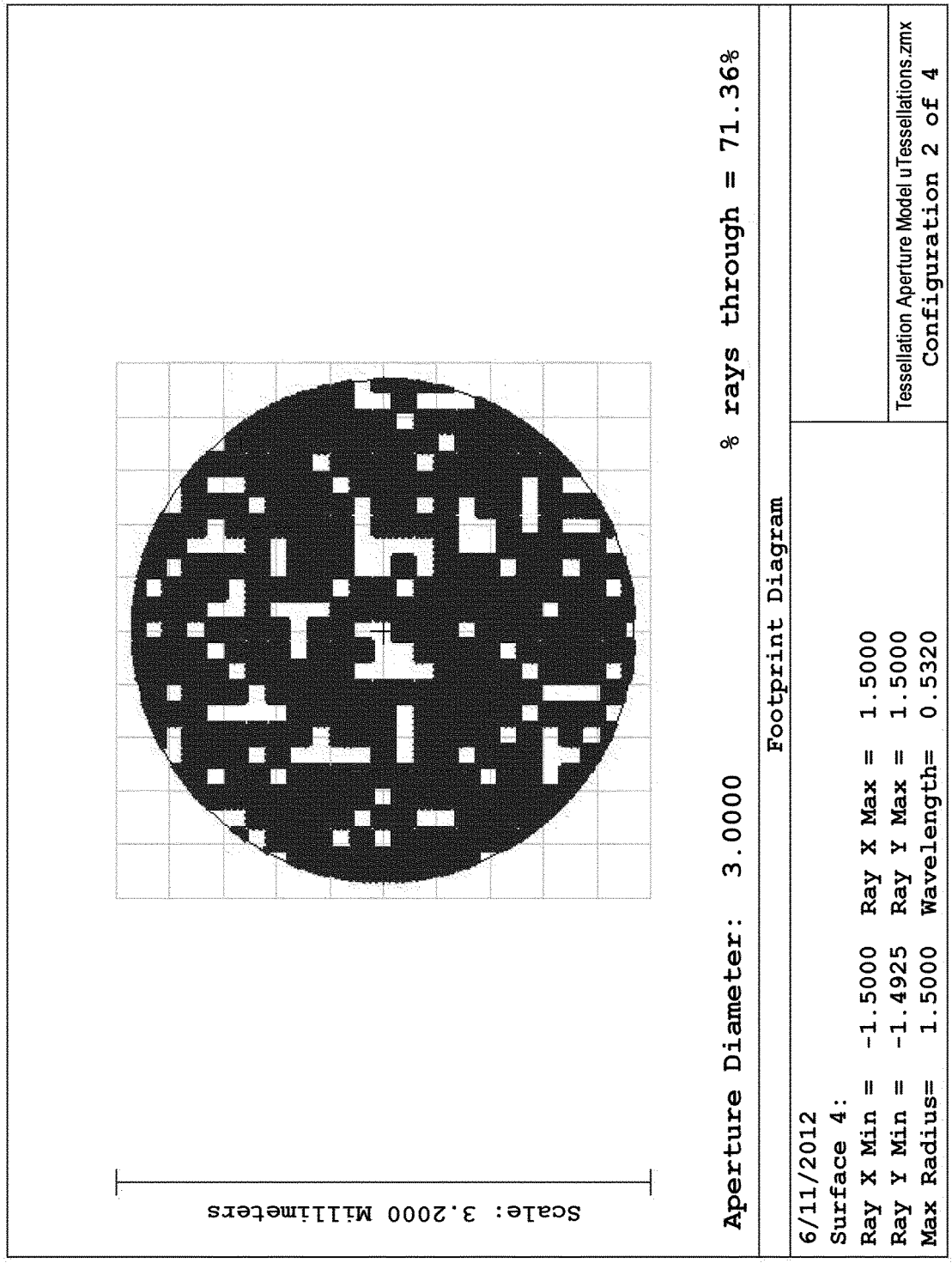
FIG. 49A is a footprint diagram showing the effect of 75% aperture fill for 125 micron micro tessellations in one embodiment.
Figure 49B:
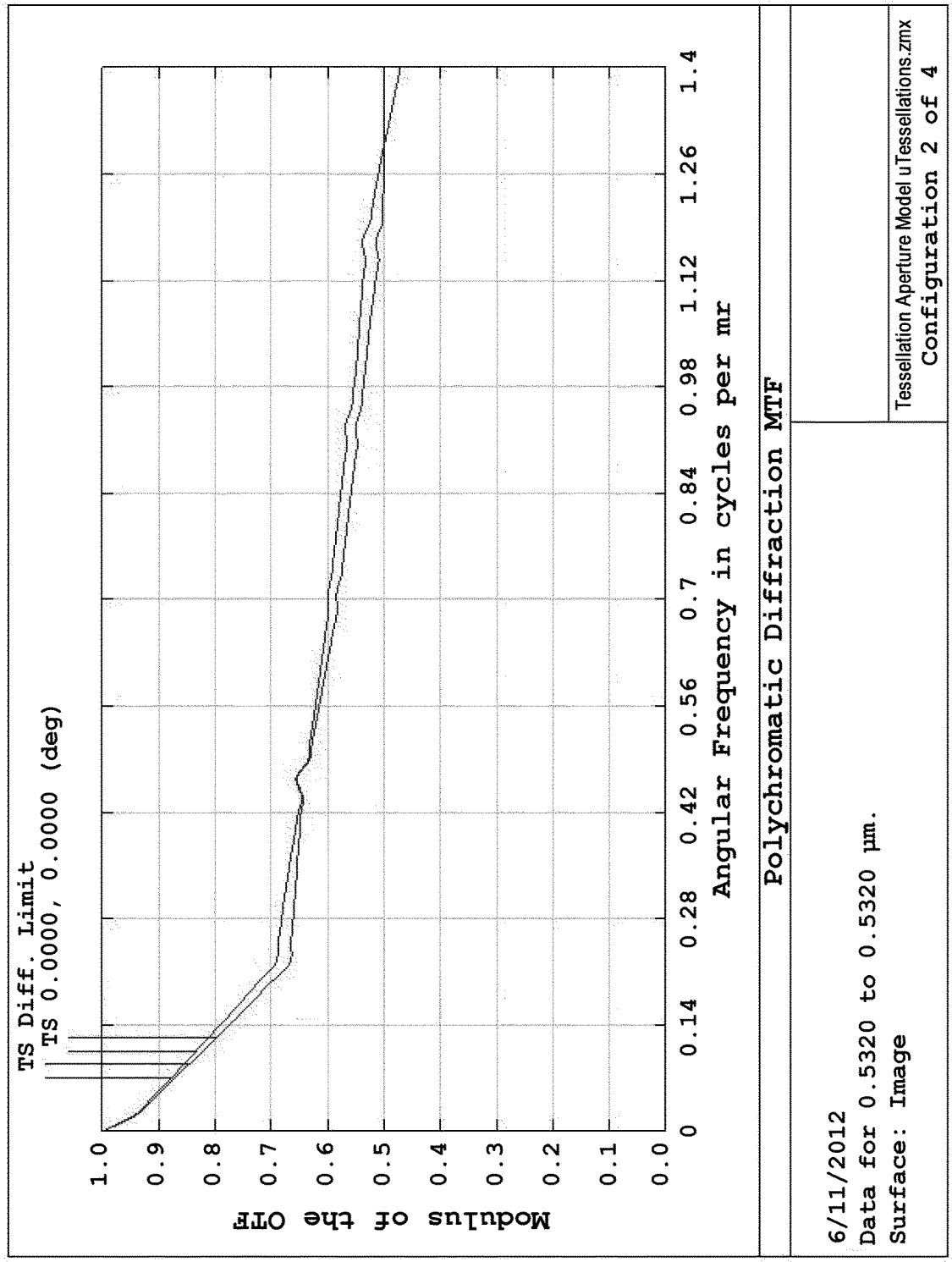
FIG. 49B is a chart showing a MTF plot illustrating the effect of 75% aperture fill for 125 micron micro tessellations in one embodiment.
Figure 50A:
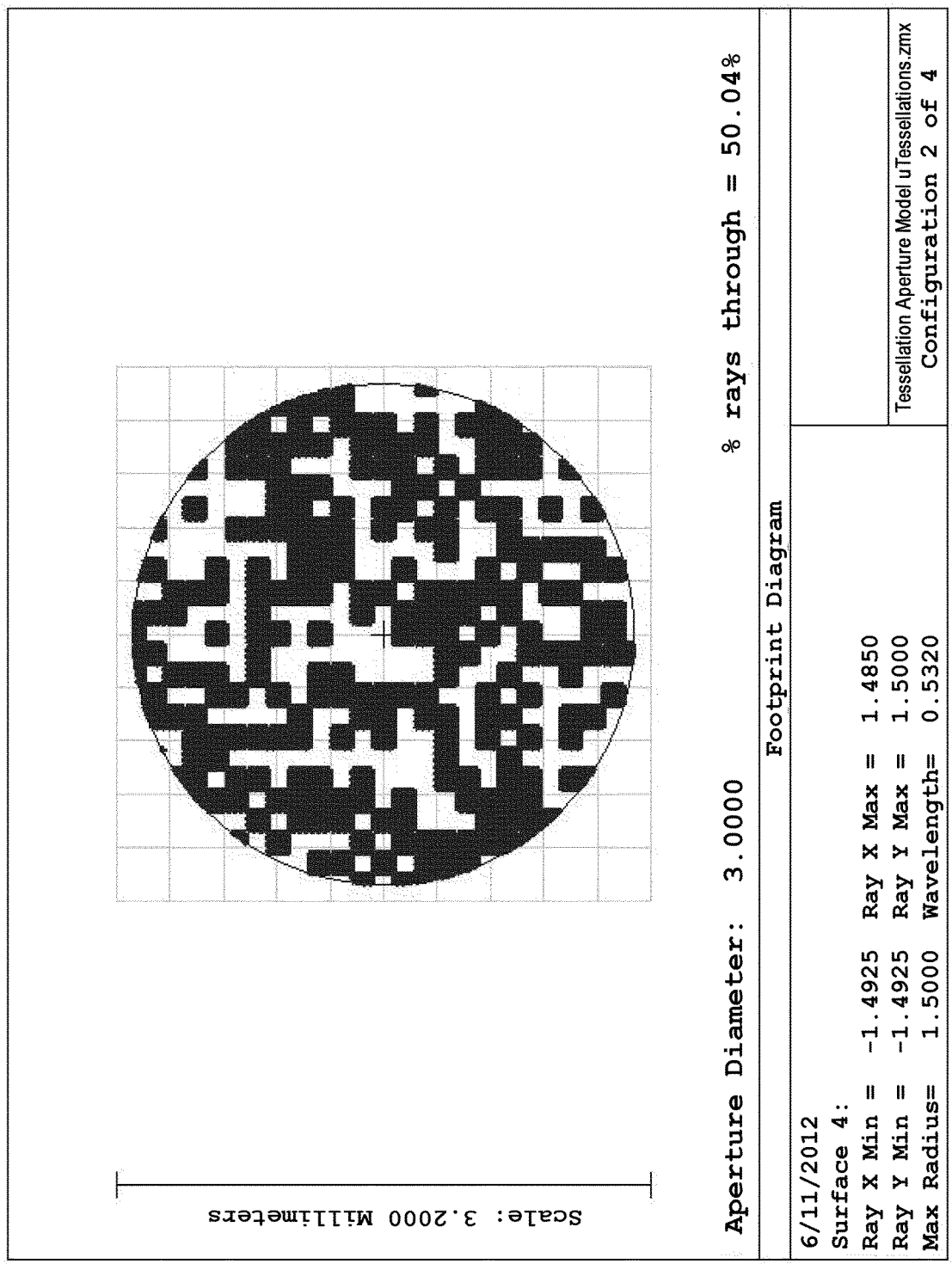
FIG. 50A is a footprint diagram showing the effect of 50% aperture fill for 125 micron micro tessellations in one embodiment.
Figure 50B:
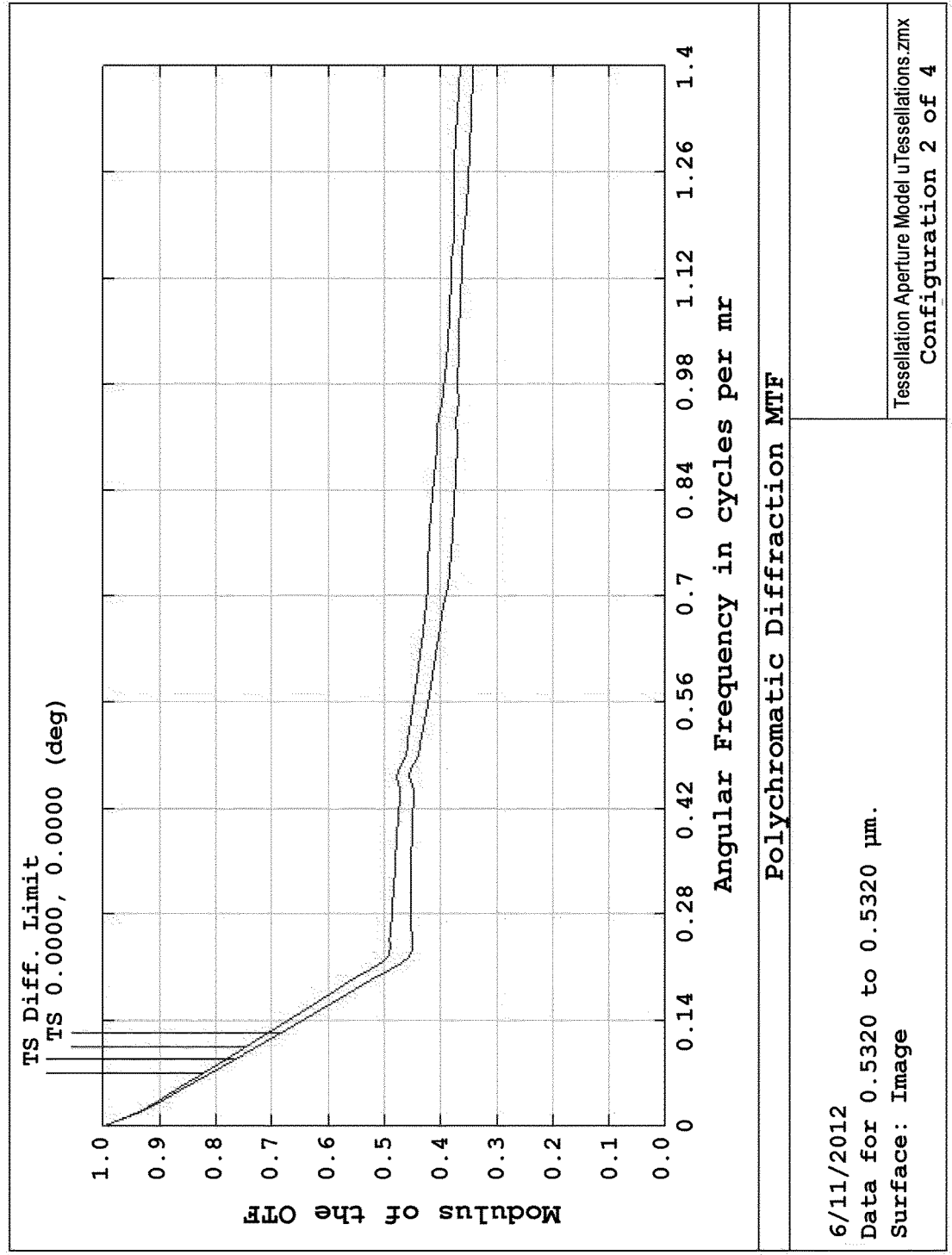
FIG. 50B is a chart showing a MTF plot illustrating the effect of 50% aperture fill for 125 micron micro tessellations in one embodiment.
Figure 51A:
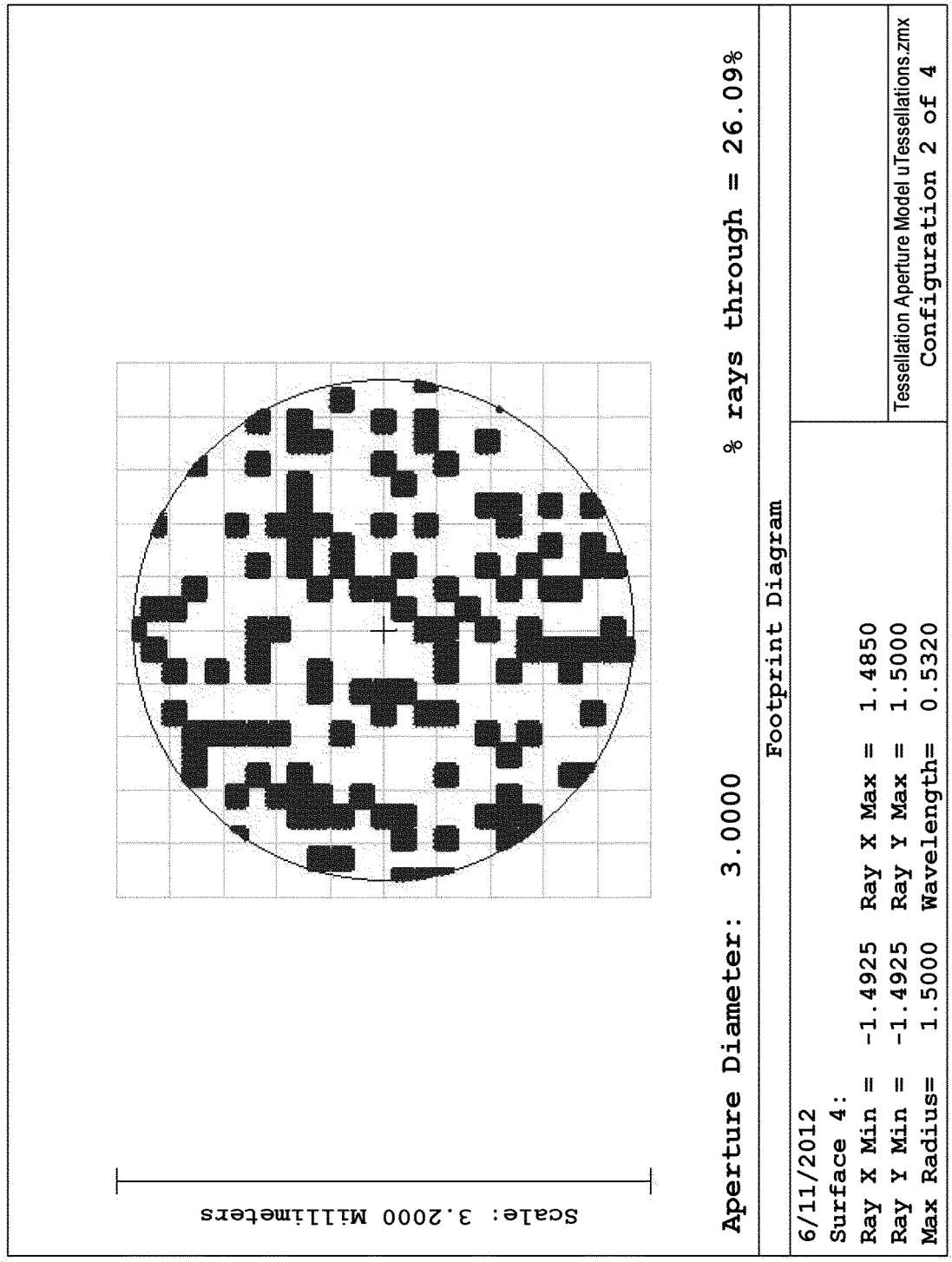
FIG. 51A is a footprint diagram showing the effect of 25% aperture fill for 125 micron micro tessellations in one embodiment.
Figure 51B:
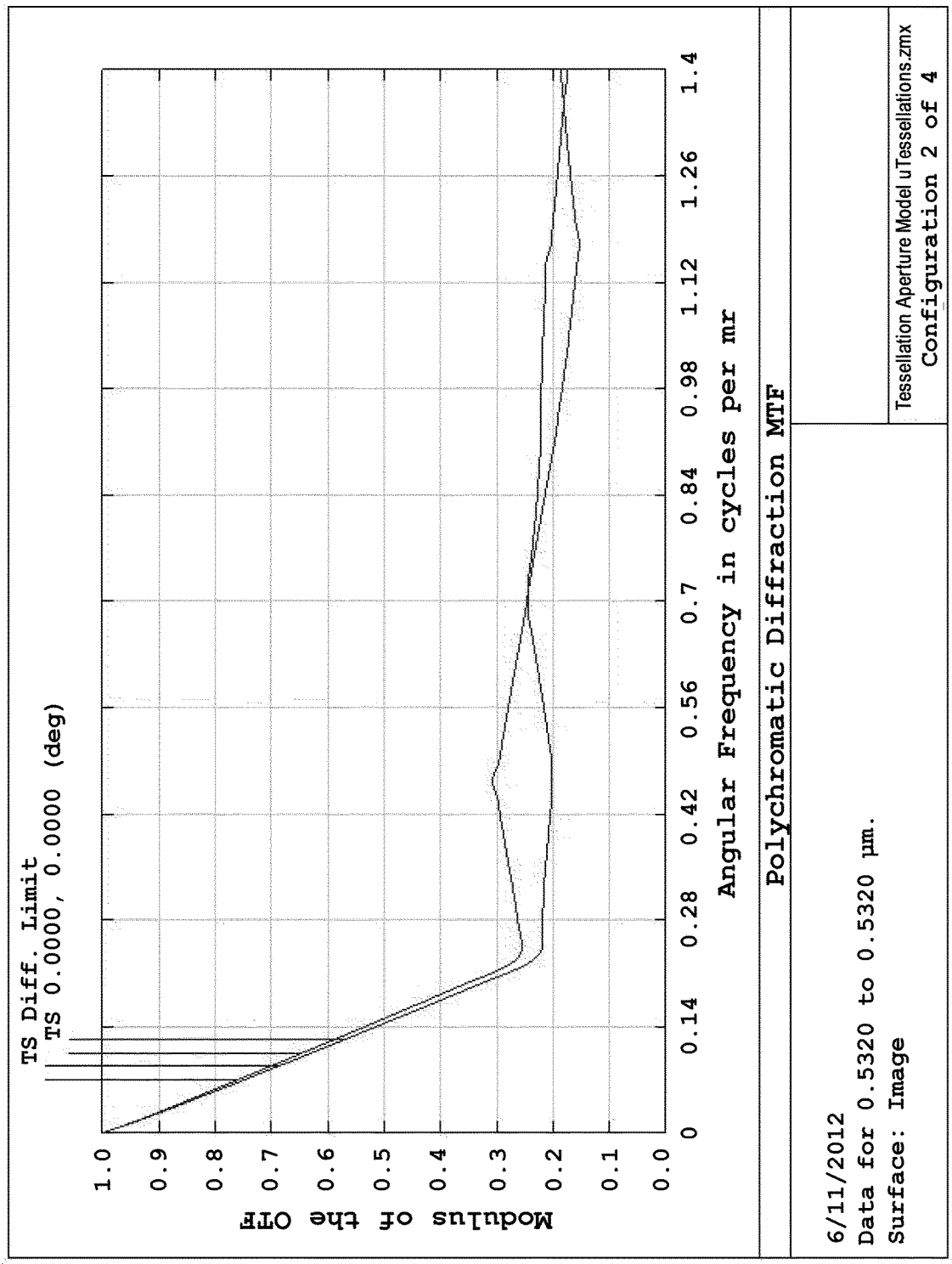
FIG. 51B is a chart showing a MTF plot illustrating the effect of 25% aperture fill for 125 micron micro tessellations in one embodiment.

125 micron micro-tessellation was investigated next. FIG. 49A is a footprint diagram showing the effect of 75% Aperture Fill of 125 um micro tessellations 3 mm Eye Pupil. FIG. 49B is a footprint diagram showing the effect of 75% Aperture Fill of 125 um micro tessellations 3 mm Eye Pupil. FIG. 50A is a footprint diagram showing the effect of 50% Aperture Fill of 125 um micro tessellations 3 mm Eye Pupil. FIG. 50B is a MTF plot showing the effect of 50% Aperture Fill of 125 um micro tessellations 3 mm Eye Pupil. FIG. 51A is a footprint diagram showing the effect of 25% Aperture Fill of 125 um micro tessellations 3 mm Eye Pupil. FIG. 51B is a MTF plot showing the effect of 25% Aperture Fill of 125 um micro tessellations 3 mm Eye Pupil.

Figure 52A:
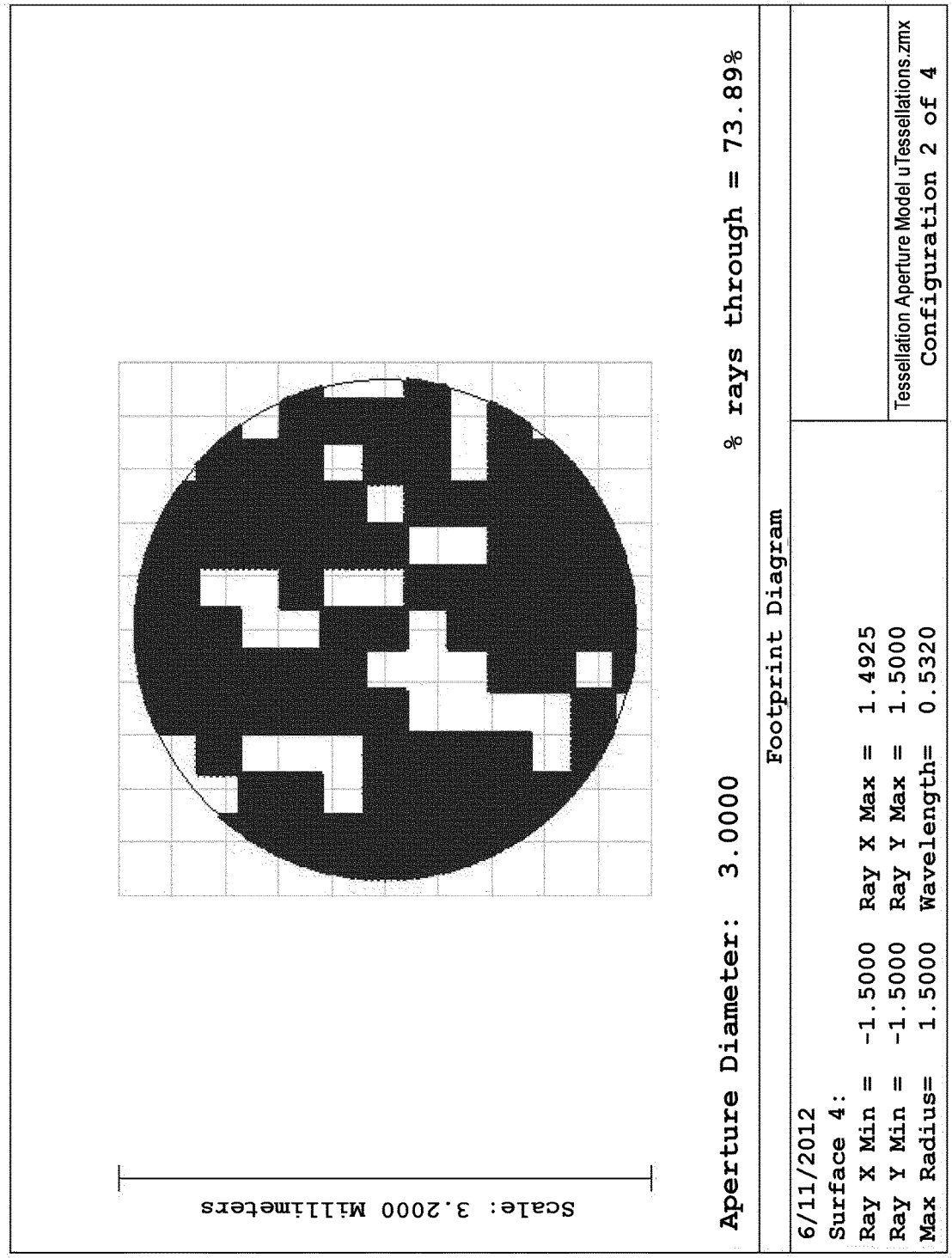
FIG. 52A is a footprint diagram showing the effect of 75% aperture fill for 250 micron micro tessellations in one embodiment.
Figure 52B:
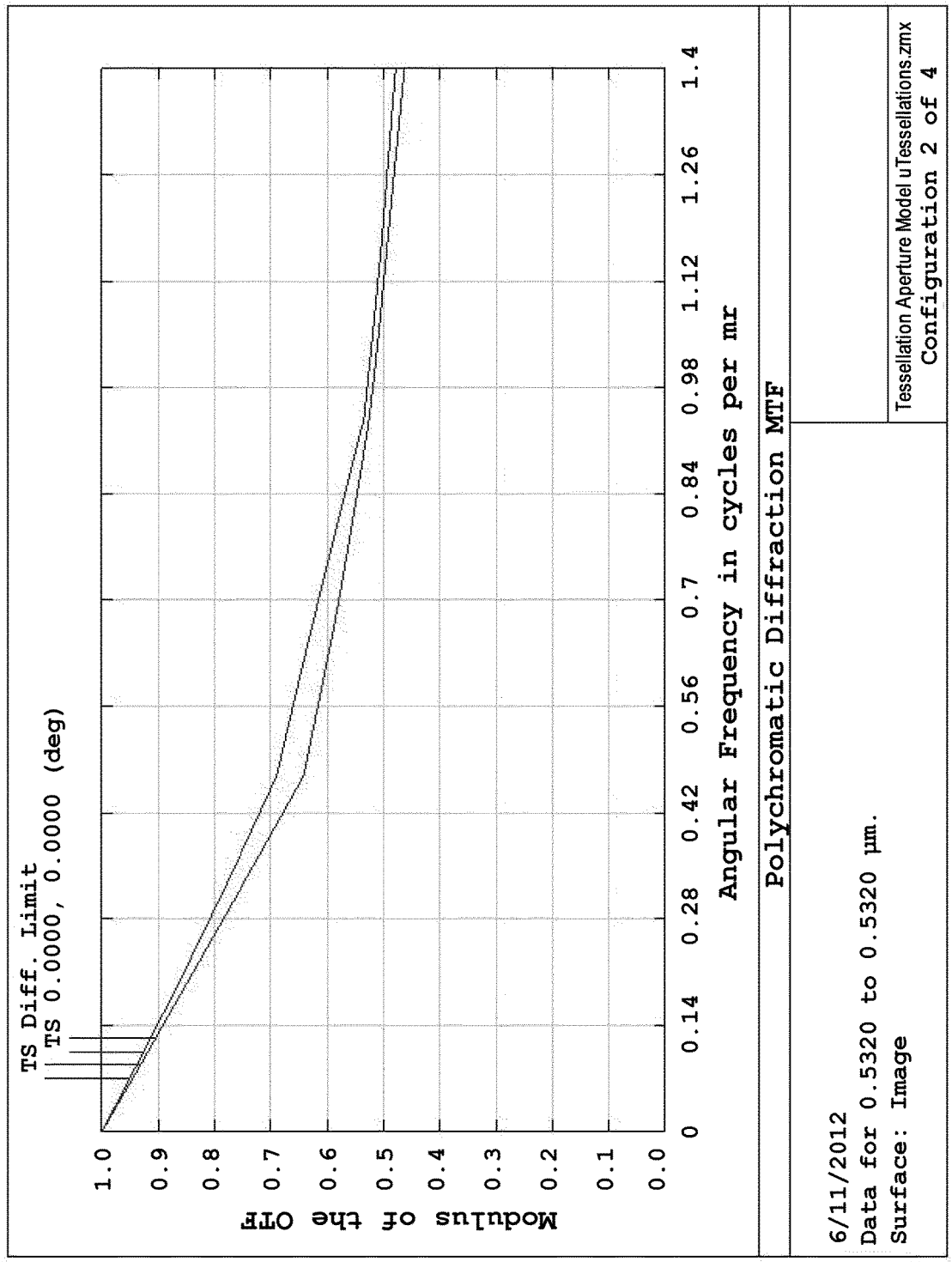
FIG. 52B is a chart showing a MTF plot illustrating the effect of 75% aperture fill for 250 micron micro tessellations in one embodiment.
Figure 53A:
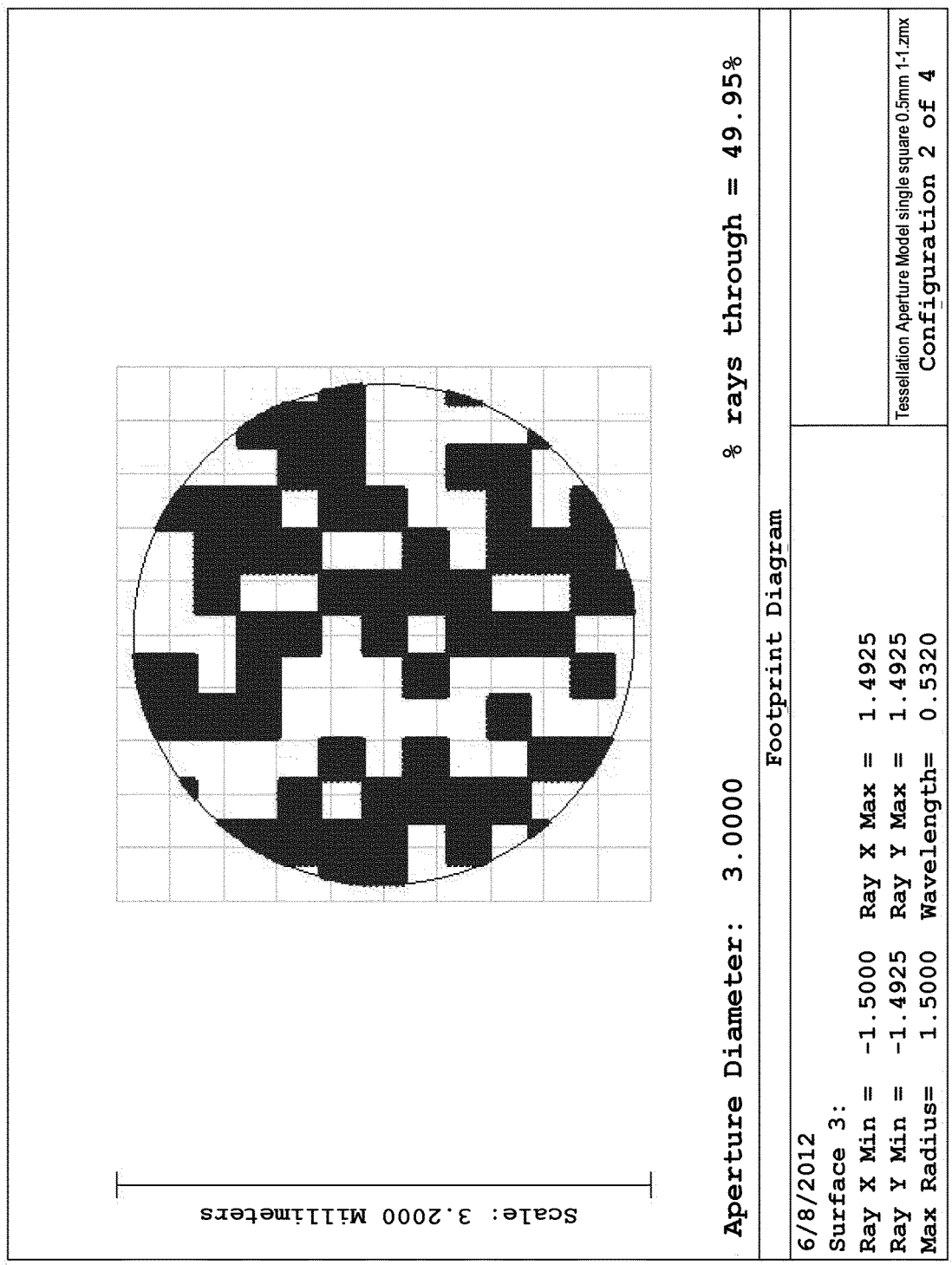
FIG. 53A is a footprint diagram showing the effect of 50% aperture fill for 250 micron micro tessellations in one embodiment.
Figure 53B:
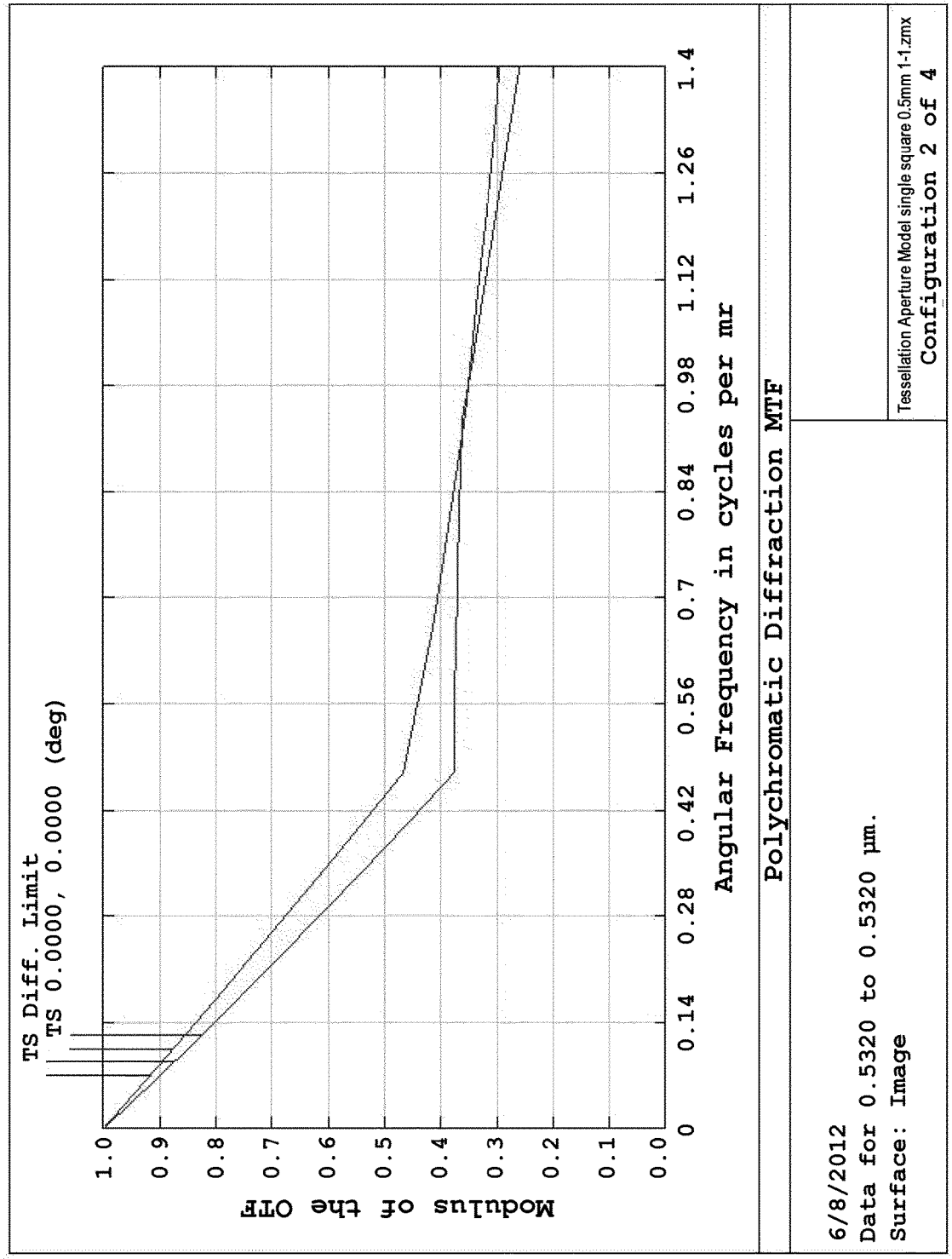
FIG. 53B is a chart showing a MTF plot illustrating the effect of 50% aperture fill for 250 micron micro tessellations in one embodiment.
Figure 54A:
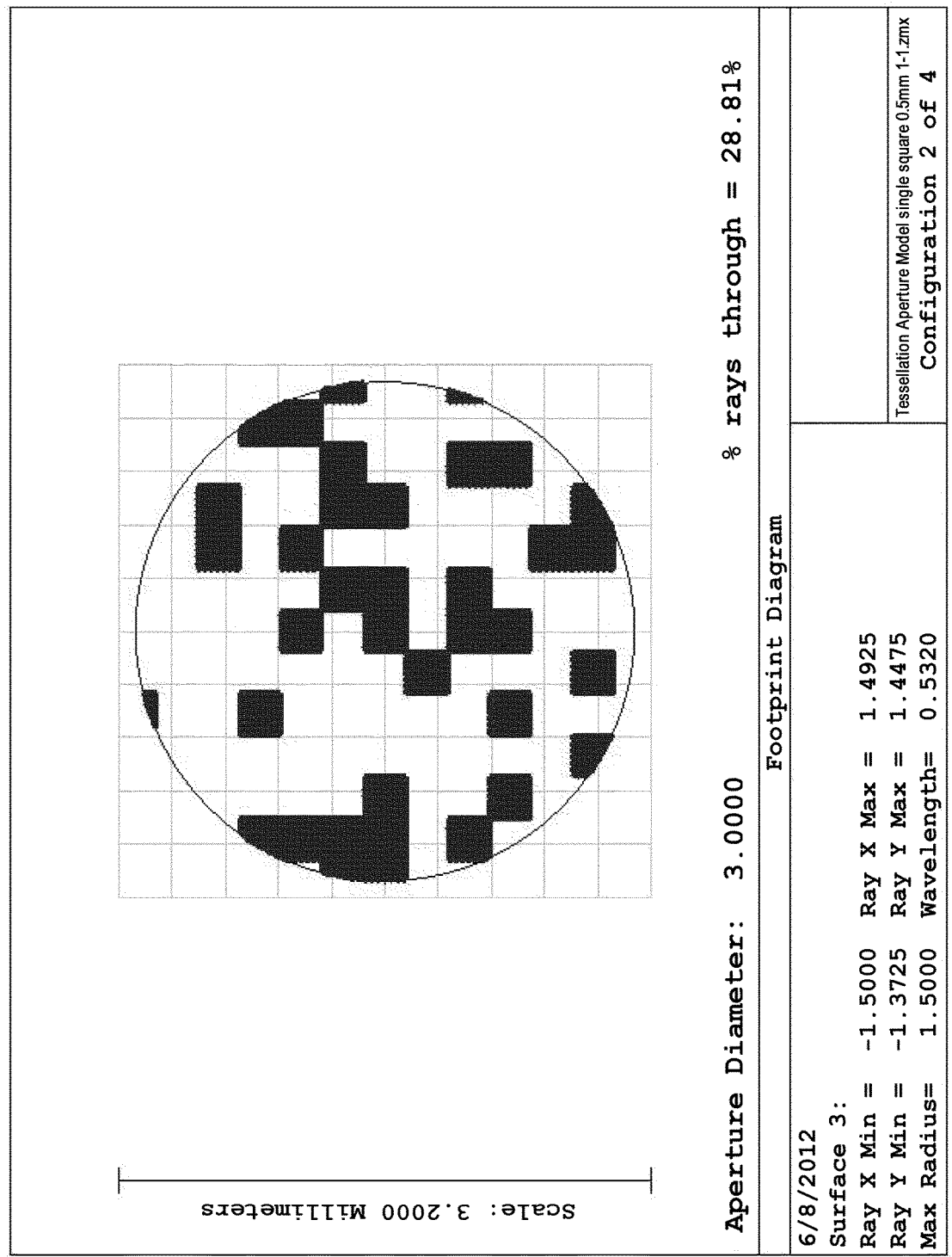
FIG. 54A is a footprint diagram showing the effect of 25% aperture fill for 250 micron micro tessellations in one embodiment.
Figure 54B:
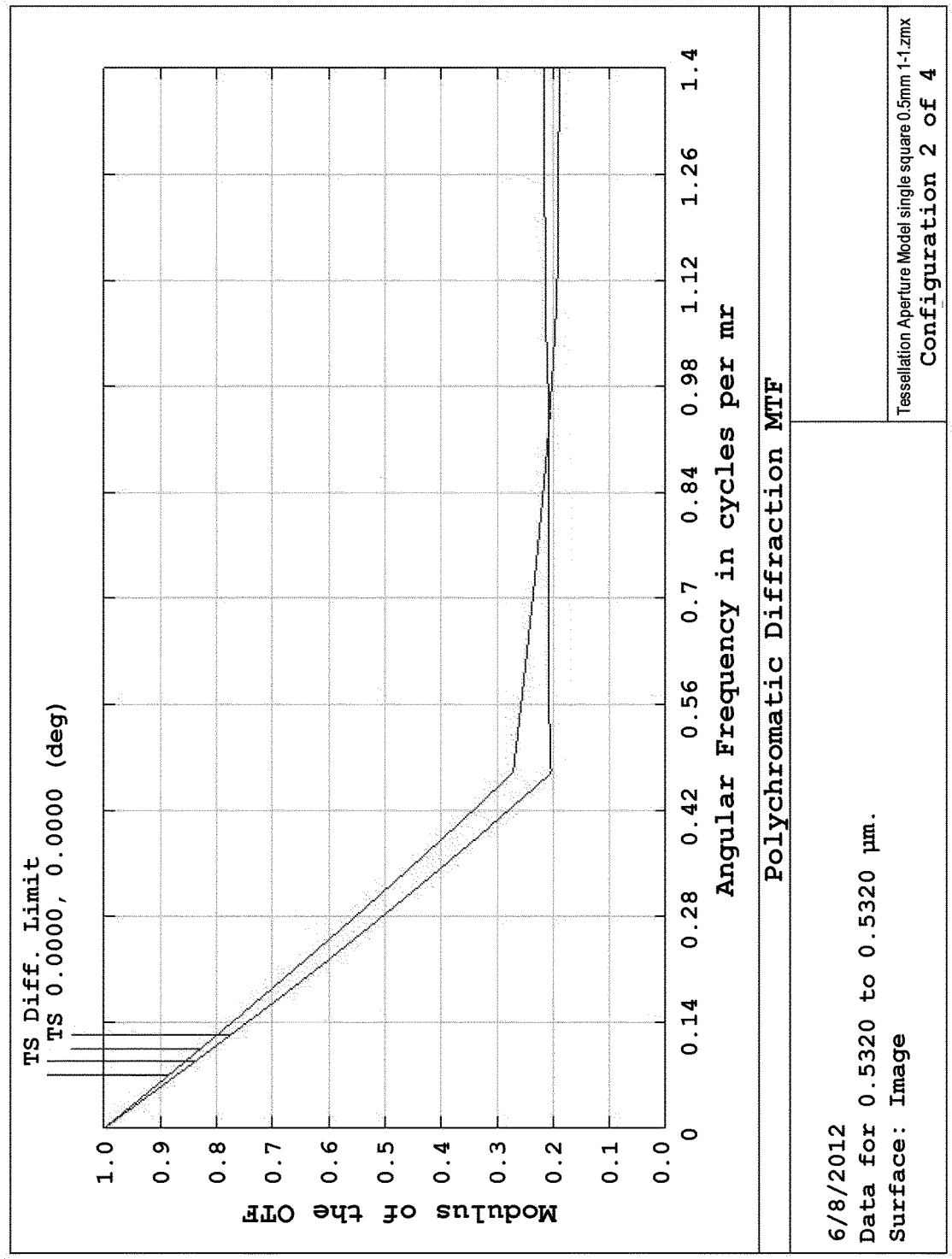
FIG. 54B is a chart showing a MTF plot illustrating the effect of 25% aperture fill for 250 micron micro tessellations in one embodiment.

250 micron micro-tessellations were investigated next. FIG. 52A is a footprint diagram showing the effect of 75% Aperture Fill of 250 um micro tessellations 3 mm Eye Pupil. FIG. 52B is a footprint diagram showing the effect of 75% Aperture Fill of 250 um micro tessellations 3 mm Eye Pupil. FIG. 53A is a footprint diagram showing the effect of 50% Aperture Fill of 250 um micro tessellations 3 mm Eye Pupil. FIG. 53B is a MTF plot showing the effect of 50% Aperture Fill of 250 um micro tessellations 3 mm Eye Pupil. FIG. 54A is a footprint diagram showing the effect of 25% Aperture Fill of 250 um micro tessellations 3 mm Eye Pupil. FIG. 54B is a MTF plot showing the effect of 25% Aperture Fill of 250 um micro tessellations 3 mm Eye Pupil.

Figure 55A:
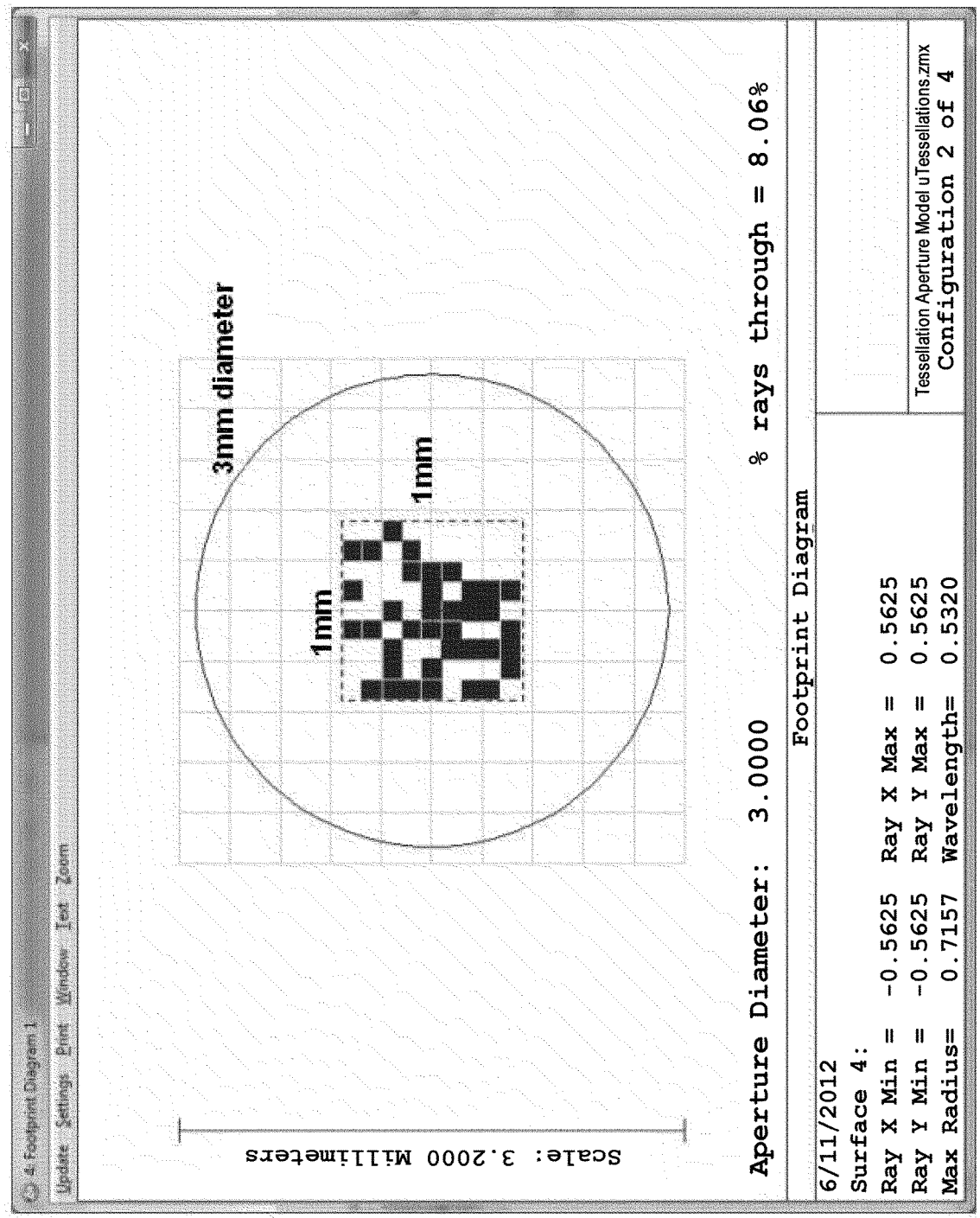
FIG. 55A is a footprint diagram showing the effect of 1 mm tessellation at 50% aperture fill for 125 micron micro tessellations for a 3 mm eye pupil diameter in one embodiment.
Figure 55B:
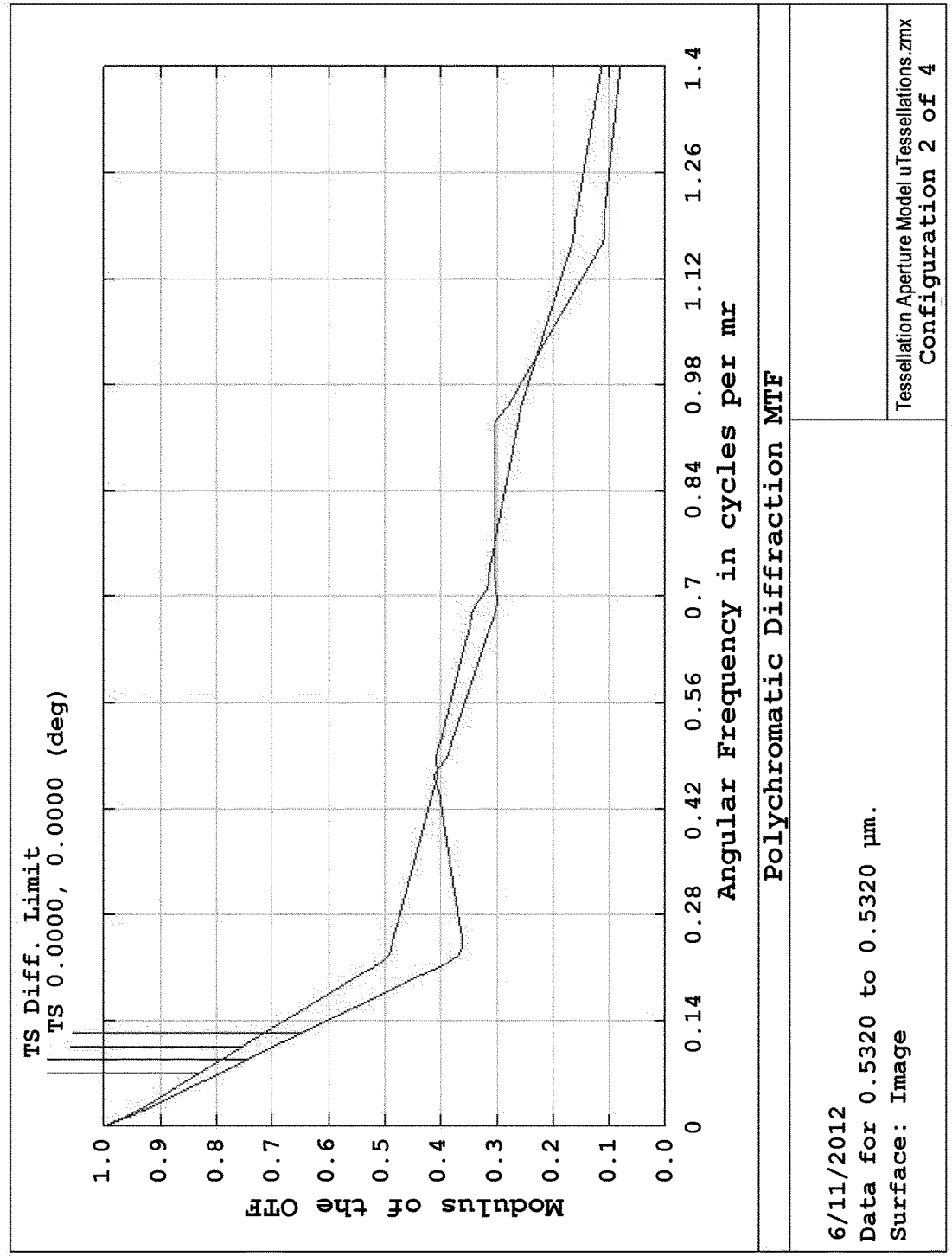
FIG. 55B is a chart showing a MTF plot illustrating the effect of 1 mm tessellation at 50% aperture fill for 125 micron micro tessellations for a 3 mm eye pupil diameter in one embodiment.
Figure 56A:
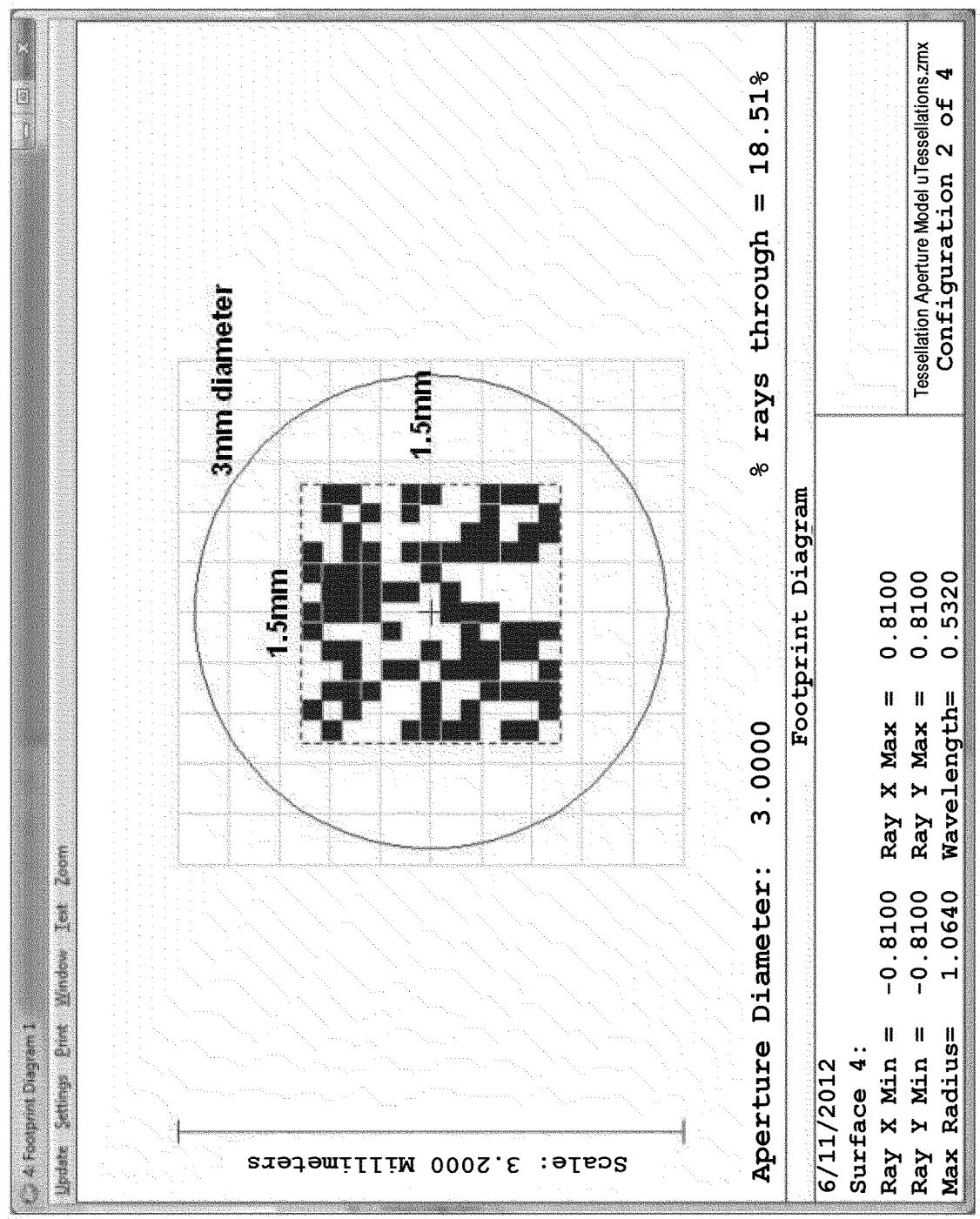
FIG. 56A is a footprint diagram showing the effect of 1.5 mm tessellation at 50% aperture fill for 125 micron micro tessellations for a 3 mm eye pupil diameter in one embodiment.
Figure 56B:
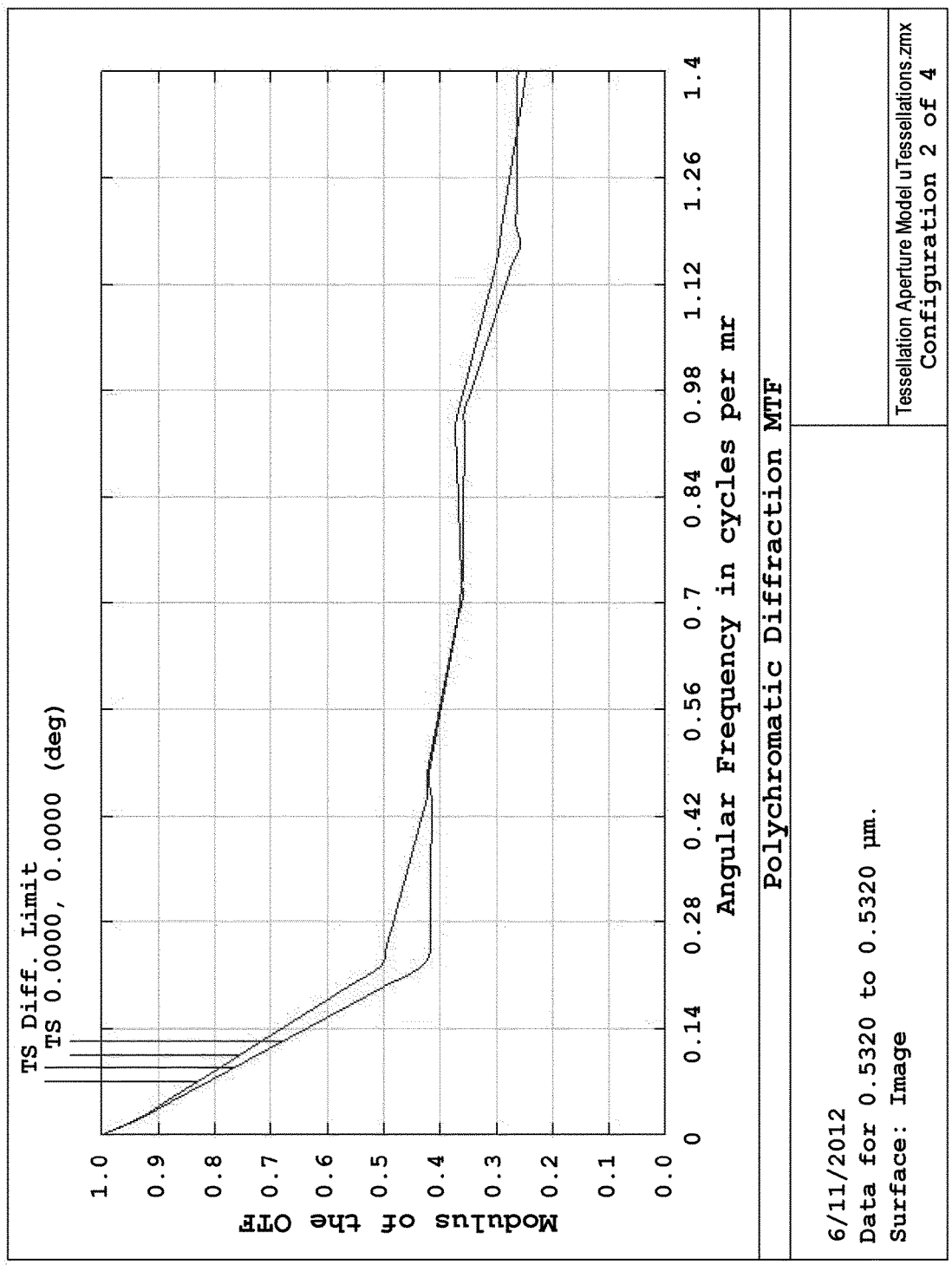
FIG. 56B is a chart showing a MTF plot illustrating the effect of 1.5 mm tessellation at 50% aperture fill for 125 micron micro tessellations for a 3 mm eye pupil diameter in one embodiment.
Figure 57A:
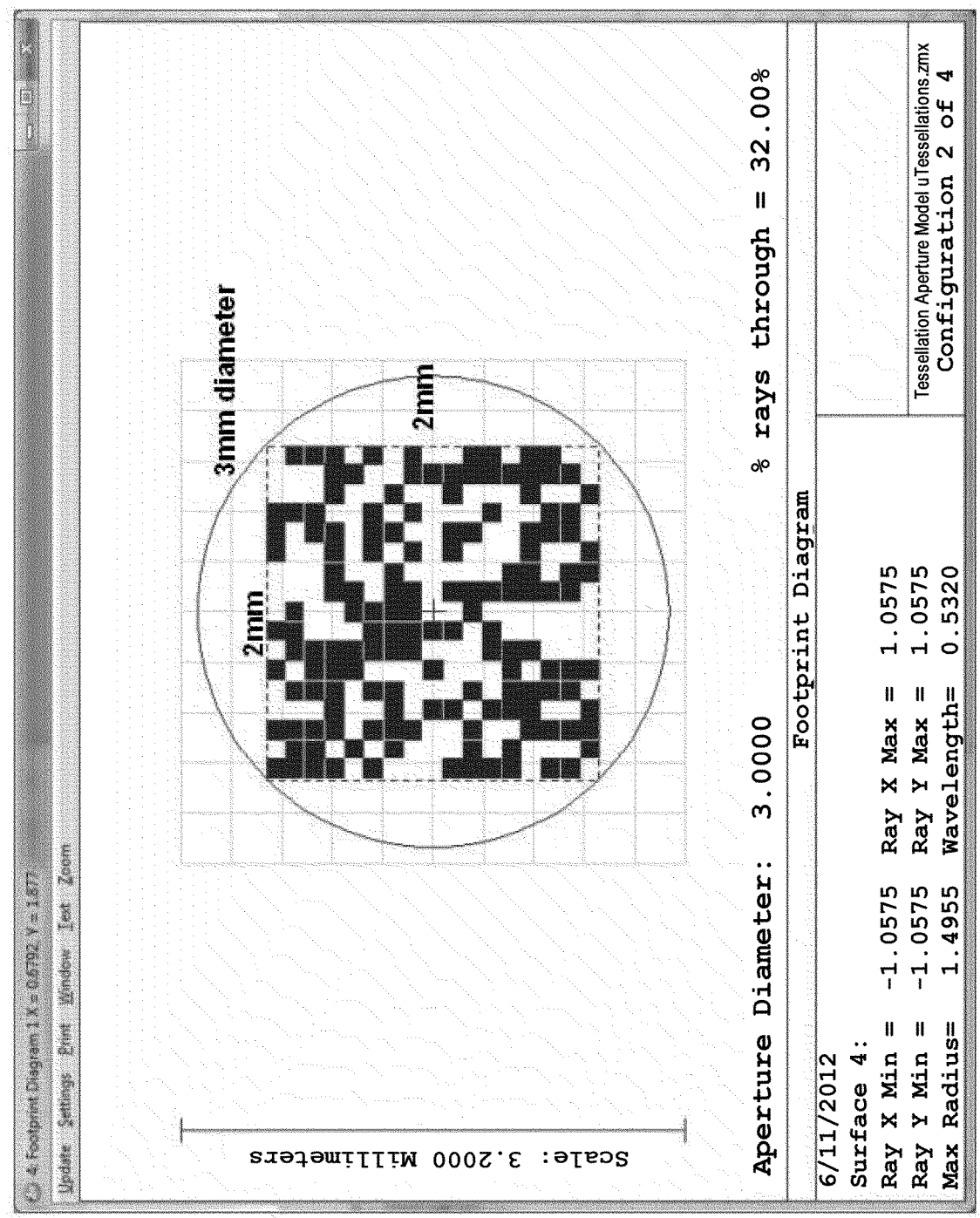
FIG. 57A is a footprint diagram showing the effect of 3 mm tessellation at 50% aperture fill for 125 micron micro tessellations for a 3 mm eye pupil diameter in one embodiment.
Figure 57B:
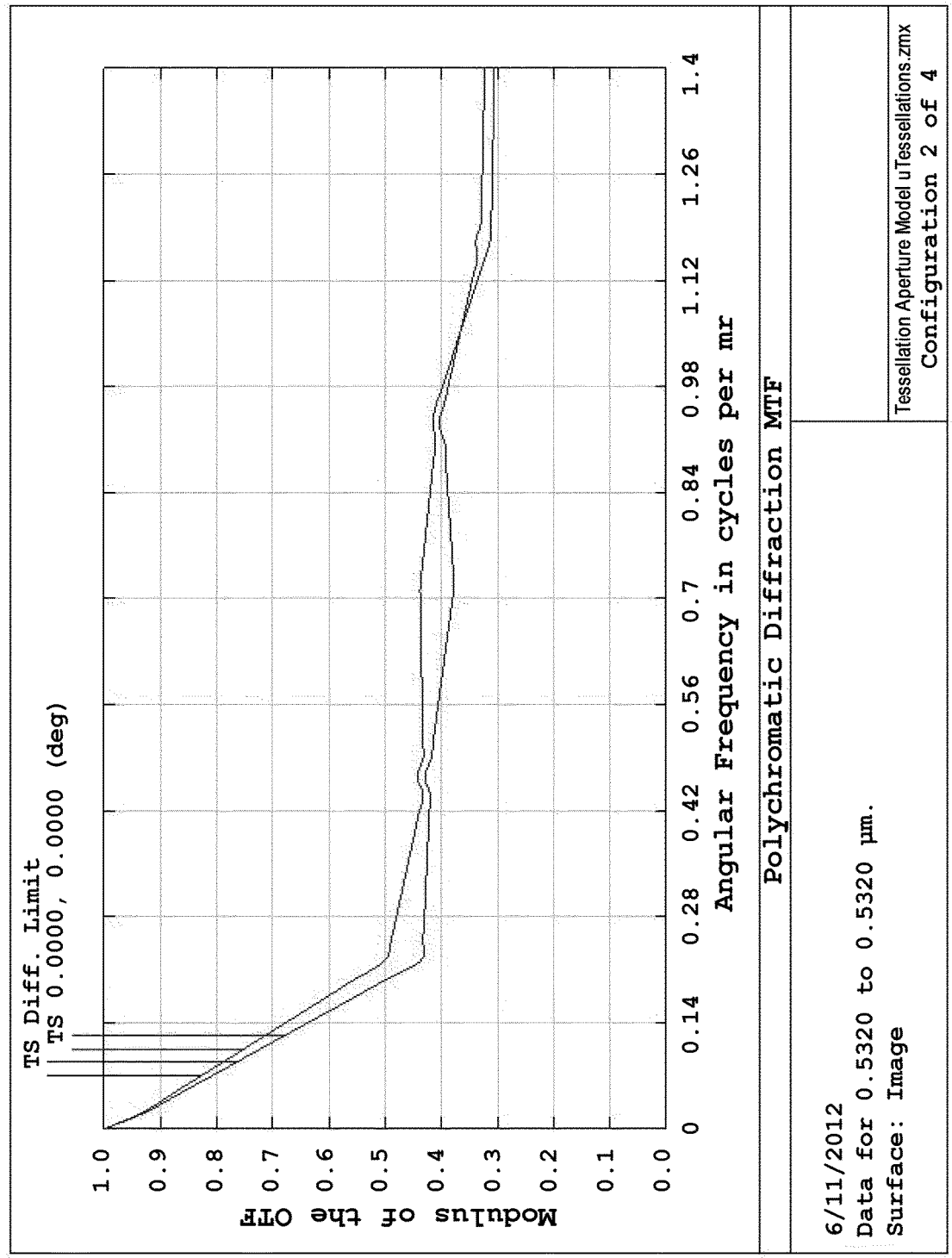
FIG. 57B is a chart showing a MTF plot illustrating the effect of 3 mm tessellation at 50% aperture fill for 125 micron micro tessellations for a 3 mm eye pupil diameter in one embodiment.

Tessellations smaller than the eye pupil diameter and micro tessellations were also investigated. FIG. 55A is a footprint diagram showing the effect of 1 mm tessellation with 50% fill of 125 um micro tessellations using 3 mm Eye Pupil Diameter. FIG. 55B is a MTF plot showing the effect of 1 mm tessellation with 50% fill of 125 um micro tessellations using 3 mm Eye Pupil Diameter. FIG. 56A is a footprint diagram showing the effect of 1.5 mm tessellation with 50% fill of 125 um micro tessellations using 3 mm eye pupil diameter. FIG. 56B is a footprint diagram showing the effect of 1 mm tessellation with 50% fill of 125 um micro tessellations using 3 mm eye pupil diameter. FIG. 57A is a footprint diagram showing the effect of 1 mm tessellation with 50% fill of 125 um micro tessellations using 3 mm eye pupil diameter. FIG. 57B is a MTF Plot showing the effect of 1 mm tessellation with 50% fill of 125 um micro tessellations using 3 mm eye pupil diameter.

Spatially randomized variable transmission apertures were investigated. The first step is checking the model validity: change from UDAs to Bitmap Greyscale Transmission Apertures. Horizontal strips over 1.5 mm aperture (125 μm μTs) in 3 mm diameter eye pupil.

Figure 58A:
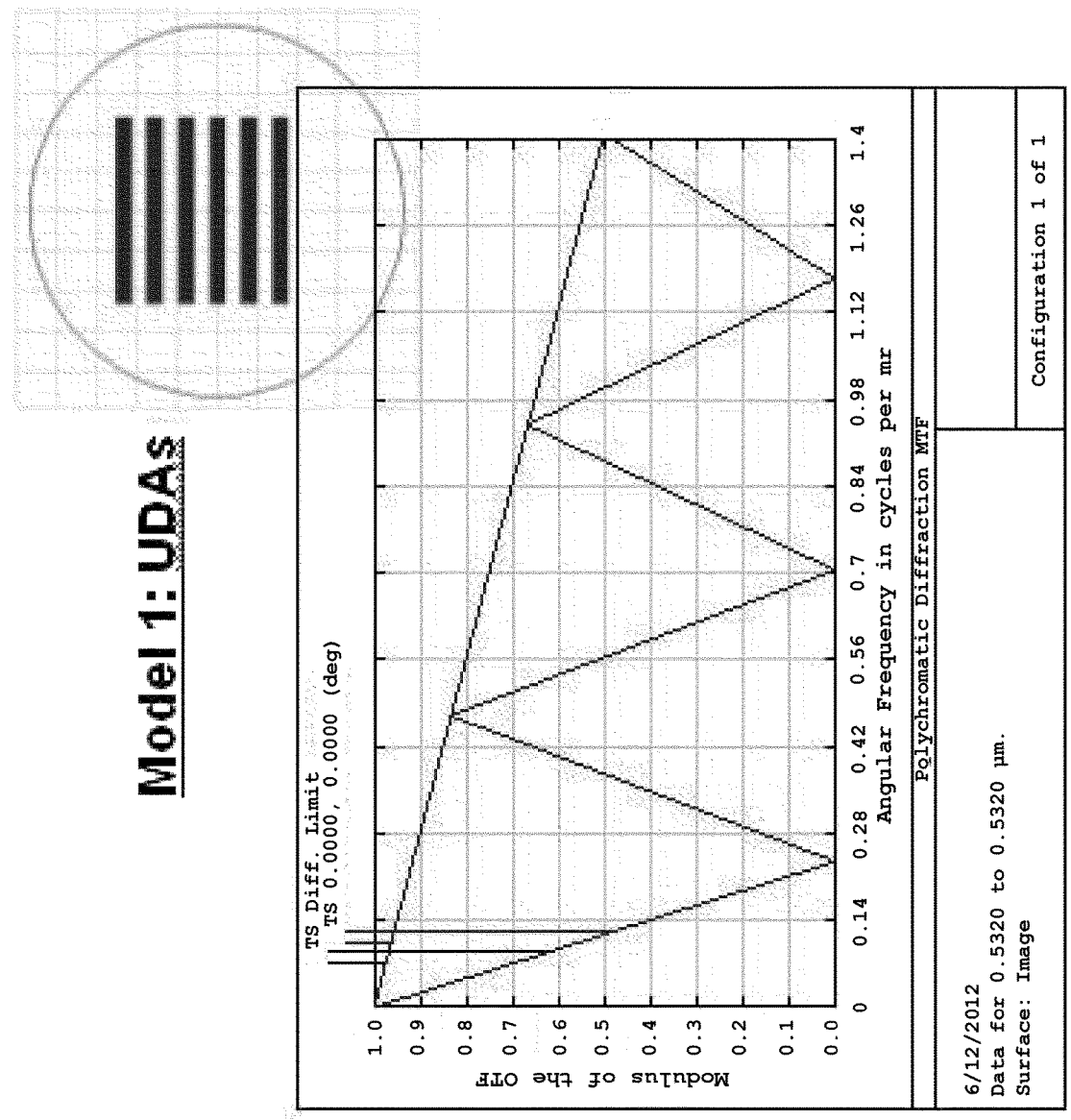
FIG. 58A is a chart showing the MTF of a User Defined Aperture in one embodiment.

The following modeling techniques were compared: Implement model as UDAs (User Defined Apertures); implement models using bitmap model as transmission aperture. Here bitmap levels are binary. The MTF results predicted are identical, so modeling tools equivalent. FIG. 58A shows a MTF plot of a UDA. FIG. 58B shows a Bitmap Aperture Function.

Figure 59B:
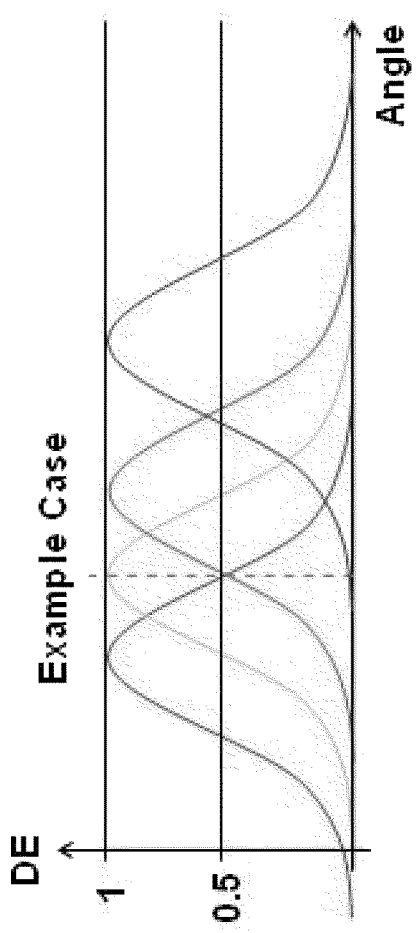
FIG. 59B is a chart showing diffraction efficiency versus angle for the embodiment of FIG. 59A in one embodiment.
Figure 59A:
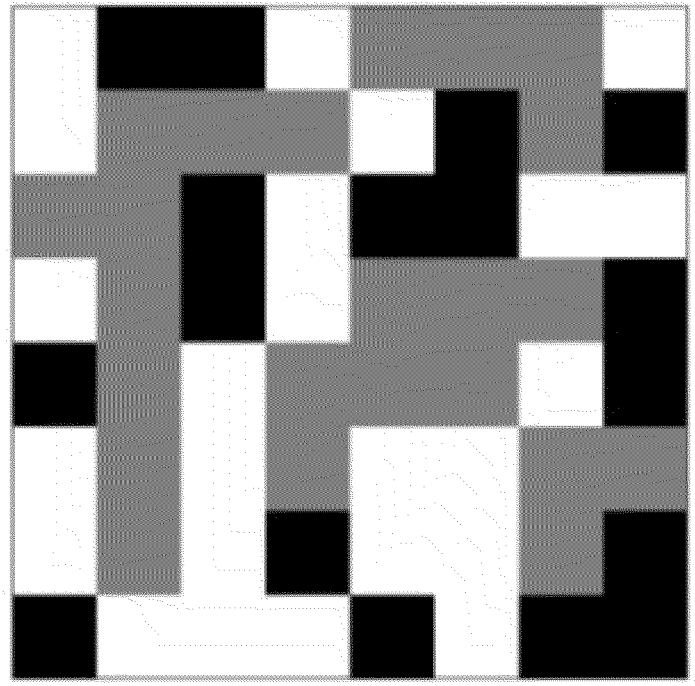
FIG. 59A is a Bitmap Aperture Function in one embodiment of the invention in one embodiment.

FIG. 59 shows 1.0 mm tessellation using 125 um micro tessellations randomly positioned with variable transmission and 3 mm eye pupil. Using a variable aperture transmissions improves the model to better represent non-top hat model cases (which are the majority of tessellations). DE values of 0%, 50% and 100% are equivalent to the field angle case shown in FIG. 59A.

It is noted that this represents the spatially broadest possible case of 3 overlapping gratings—i.e., the field angle is output by 75% of the primary tessellation area (albeit that there is a 50% contribution from two of micro-tessellations). 4 tile types are represented here. Transmission values of each were: 50%; 100%; 50%; 0%. Micro tessellation apertures are 125 um squares. The grid was 8×8 pixels, so the tessellation aperture is 1 mm×1 mm square.

Figure 60:
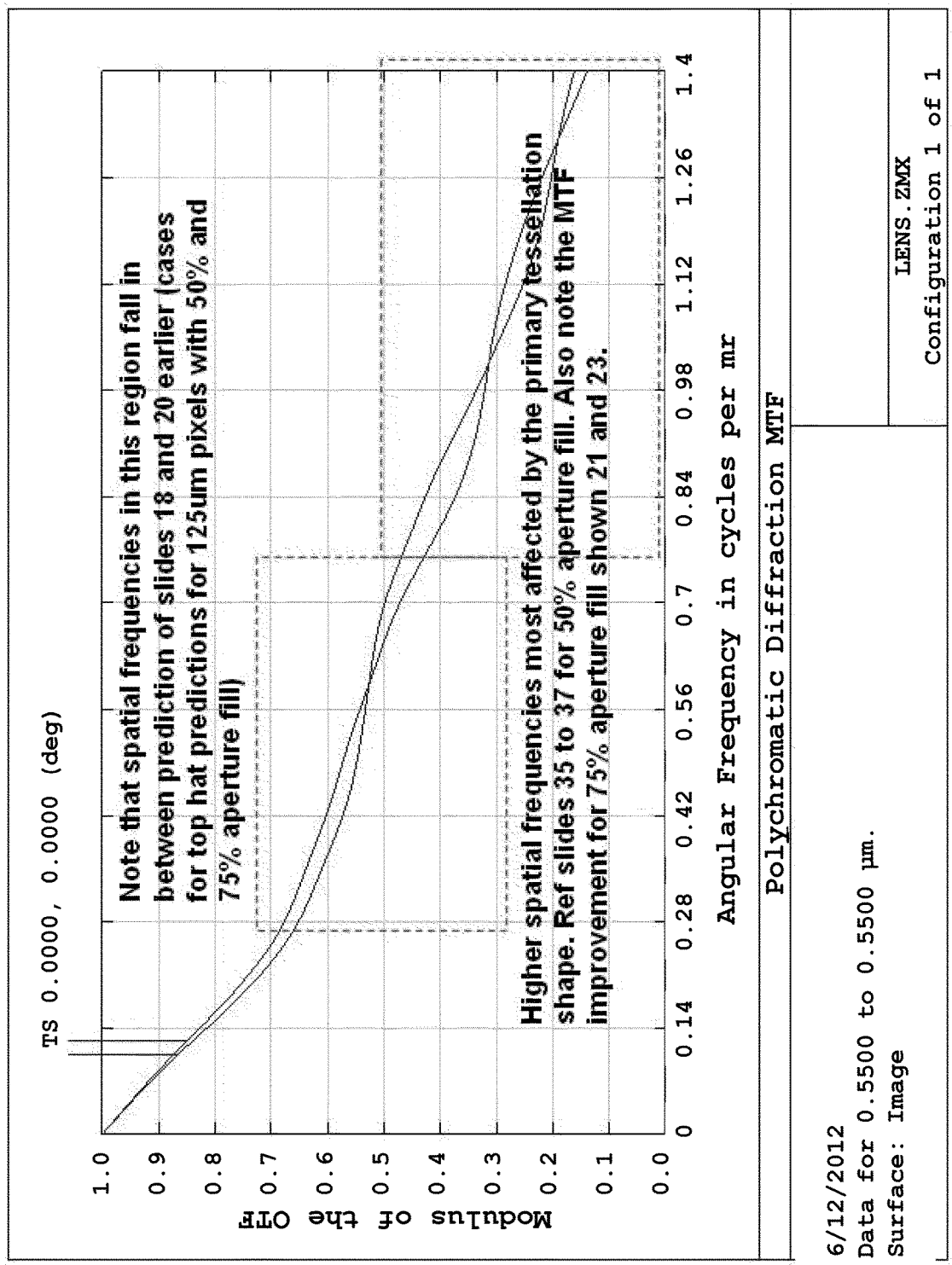
FIG. 60 is a MTF plot showing the effect of 1.0 mm tessellation using 125 um micro tessellations randomly positioned with variable transmission and a 3 mm eye pupil in one embodiment.

FIG. 60 is a MTF plot showing the effect of 1.0 mm tessellation using 125 um μTs randomly positioned with variable transmission and a 3 mm eye pupil. Note that spatial frequencies in the upper boxed region fall in between prediction shown in the figures relating to top hat predictions for 125 um pixels with 50% and 75% aperture fill). Higher spatial frequencies shown in the lower boxed region are most affected by the primary tessellation shape. The reader is referred to the figures showing for 50% aperture fill. It should also be noted that there is MTF improvement for 75% aperture fill.

Figure 61:
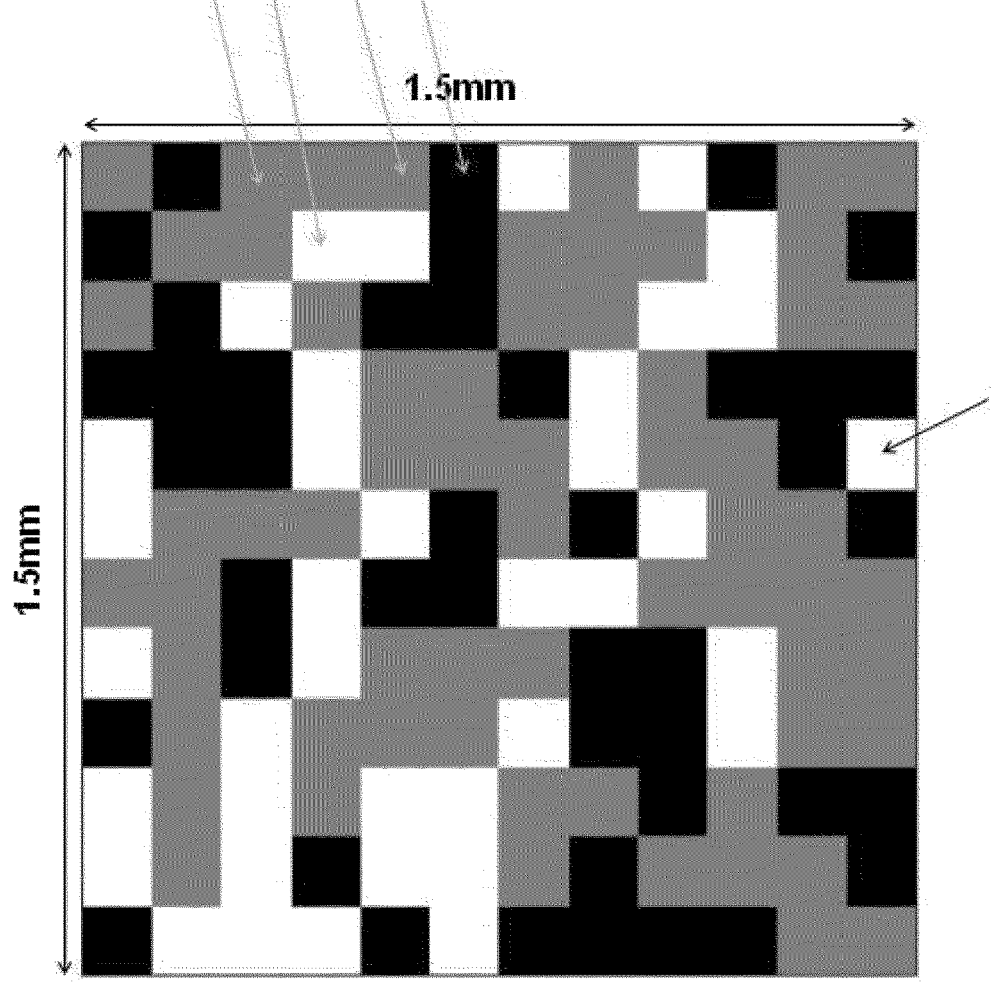
FIG. 61 is a Bitmap Aperture Function in one embodiment.

Referring next to FIG. 61, a 1.5 mm tessellation using 125 um micro tessellations randomly positioned with variable transmission and 3 mm eye pupil was considered. Four different tile types are represented in FIG. 61. The transmission values of each were: 50%; 100%; 50%; 0%. The micro tessellations apertures were 125 um squares. The grid is 12×12 pixels, so the tessellation aperture is 1.5 mm×1.5 mm square.

Figure 62:
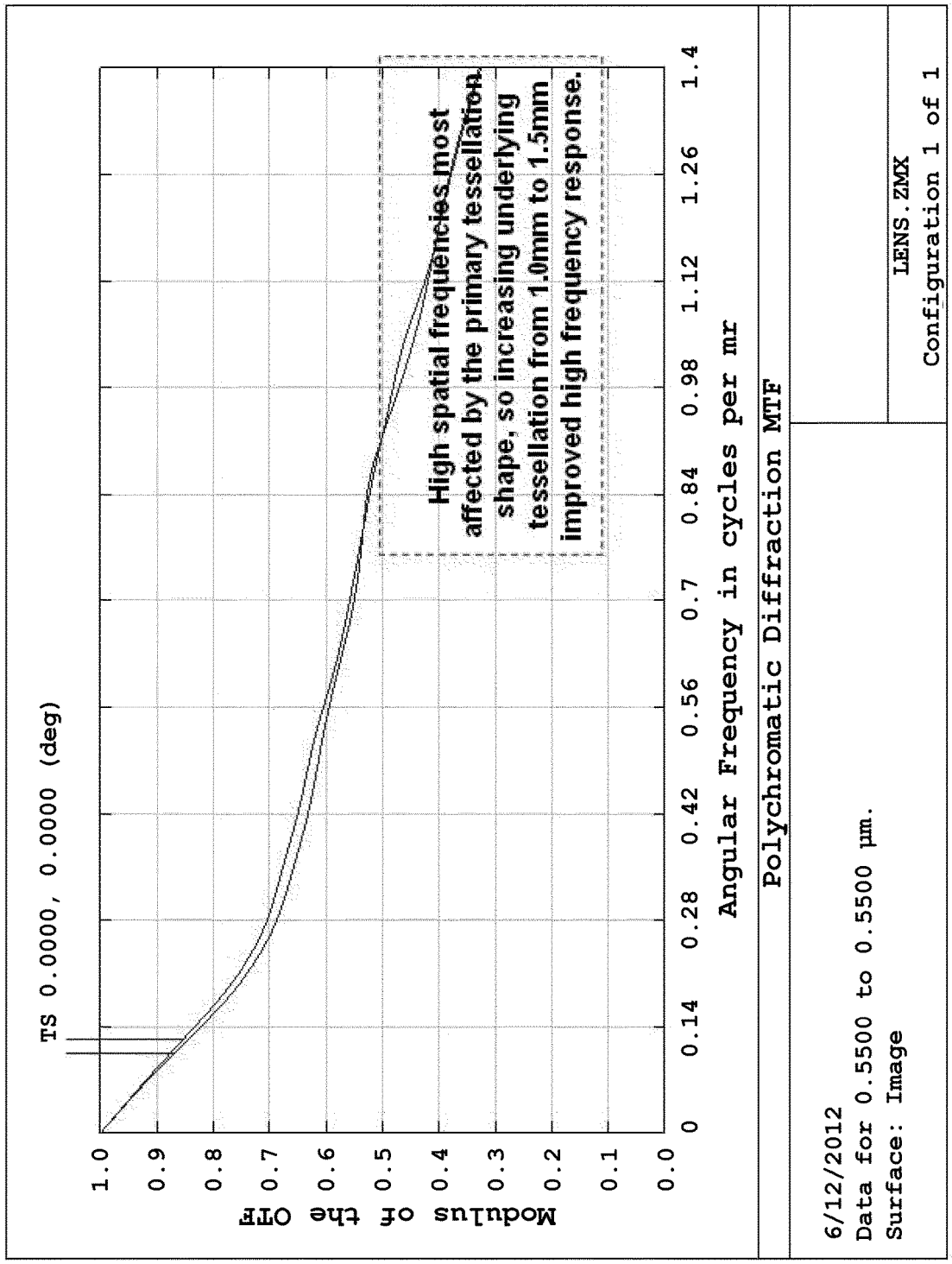
FIG. 62 is a MTF plot showing the effect of 1.5 mm tessellation using 125 um micro tessellations randomly positioned with variable transmission and a 3 mm eye pupil in one embodiment.

FIG. 62 is a MTF showing the effect of 1.5 mm tessellation using 125 um micro tessellations randomly positioned with variable transmission and 3 mm eye pupil. It should be noted that high spatial frequencies most affected by the primary tessellation shape, so increasing underlying tessellation from 1.0 mm to 1.5 mm improved high frequency response.

In summary:
a) Diffraction effects of micro tessellations need to be accounted for.
b) Diffraction effects of micro tessellations are distinct from the diffraction effects of the underlying primary tessellation pattern.
c) Use of µTs degrades MTF compared to that of an single tessellation that does not contain micro tessellations. However, micro tessellations enable the tessellation to have a larger angular bandwidth, thereby reducing the overall number of tessellations desired. In turn this permits larger tessellations.
d) A regular pattern of µTs will lead to an MTF modulation that leads to unacceptable dips in the MTF frequency response.
e) MTF dips can be averaged out by spatially randomizing the micro tessellations. Note that the µTs need to be sufficiently small to permit reasonable randomization. About an 8:1 ratio of tessellation to µT width appears to be sufficient, although this has not been explored fully.
f) The amount of angular field overlap between tessellations is crucial to the successful implementation of µTs. In cases modeled the ABW of micro tessellations is at least half of the overall tessellation ABW. Greater overlap will lead to improved MTF performance because this effectively increases the available aperture for a given field angle.
g) Tools are now established to model trade off cases for different grating configurations.

Implementation of micro-tessellation structures with spatial randomization across a tessellation provides additional design flexibility. In effect tessellation angular bandwidth (ABW) is enhanced at the expense of MTF. Results show that Randomization of micro tessellation features permits homogenization (roughly an averaging) of MTF oscillations found in non-randomized patterns. Furthermore, MTF at spatial frequencies that are of less interest can be sacrificed for improved tessellation ABW. Different cases of relevant overlapping gratings need to be considered. The MTF supported by micro-tessellation is dependent on micro-tessellation size and overlapping %. The ABW of representative cases of overlapping tessellations need to be considered in more detail, in conjunction with the fold gratings desired to support the desired architecture. Micro-tessellations with feature sizes of 50 µm, 125 µm and 250 µm have been considered in the context of a 3 mm eye pupil and 0.5 mm, 1.0 mm and <3 mm sized primarily tessellation elements. These are practical numbers to work with in the context of a near eye display. Tessellations may however be any size or shape, and micro-tessellation may be any size or shape smaller than the primary tessellation.

Figure 63:
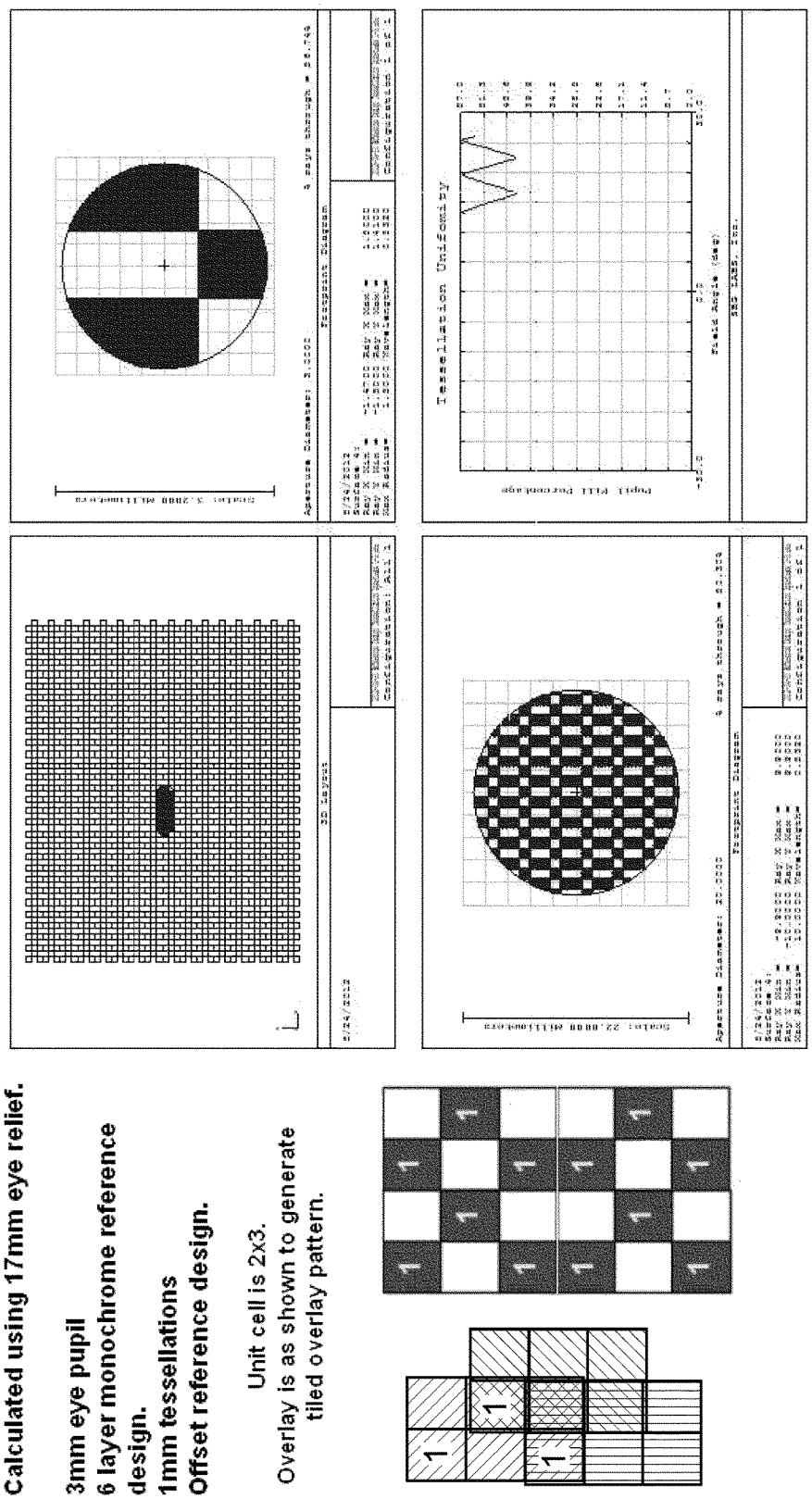
FIG. 63 is a first illumination uniformity analysis of a first implementation tessellation pattern in one embodiment.

An Illumination Uniformity Analysis of the tessellation pattern was conducted next. Referring to FIG. 63, Case 1, which comprises 1 mm tessellations, was considered. The fill per the overlaid reference designs in the Figure. FIG. 63 represents 6 layer, 12 tile, monochrome reference design. It was assumed a single tile with 50% Aperture Fill. It was further assumed: 17 mm eye relief; 3 mm eye pupil; 6 layer monochrome reference design; 1 mm tessellations, and an offset reference design. The unit cell is 2×3. The overlay is shown in the FIG. 63 to generate the tiled overlay pattern. With 1 mm tessellations, min to max best uniformity is +/−12% with 50% aperture fill i.e. +/−12% uniformity variation=24% p-p.

FIG. 64 shows Case 1*b* repeated on axis for a 3 mm eye pupil at 30 mm eye relief. Eye relief impacts the spatial frequency of the variation. The larger eye relief causes higher spatial frequency ripple. Uniformity magnitude is unaffected. The maximum ripple is 56.6% of pupil fill. Minimum ripple is 43.4% of pupil fill. Uniformity is +/−13.2%, 26.4% peak-to-peak.

Figure 65:
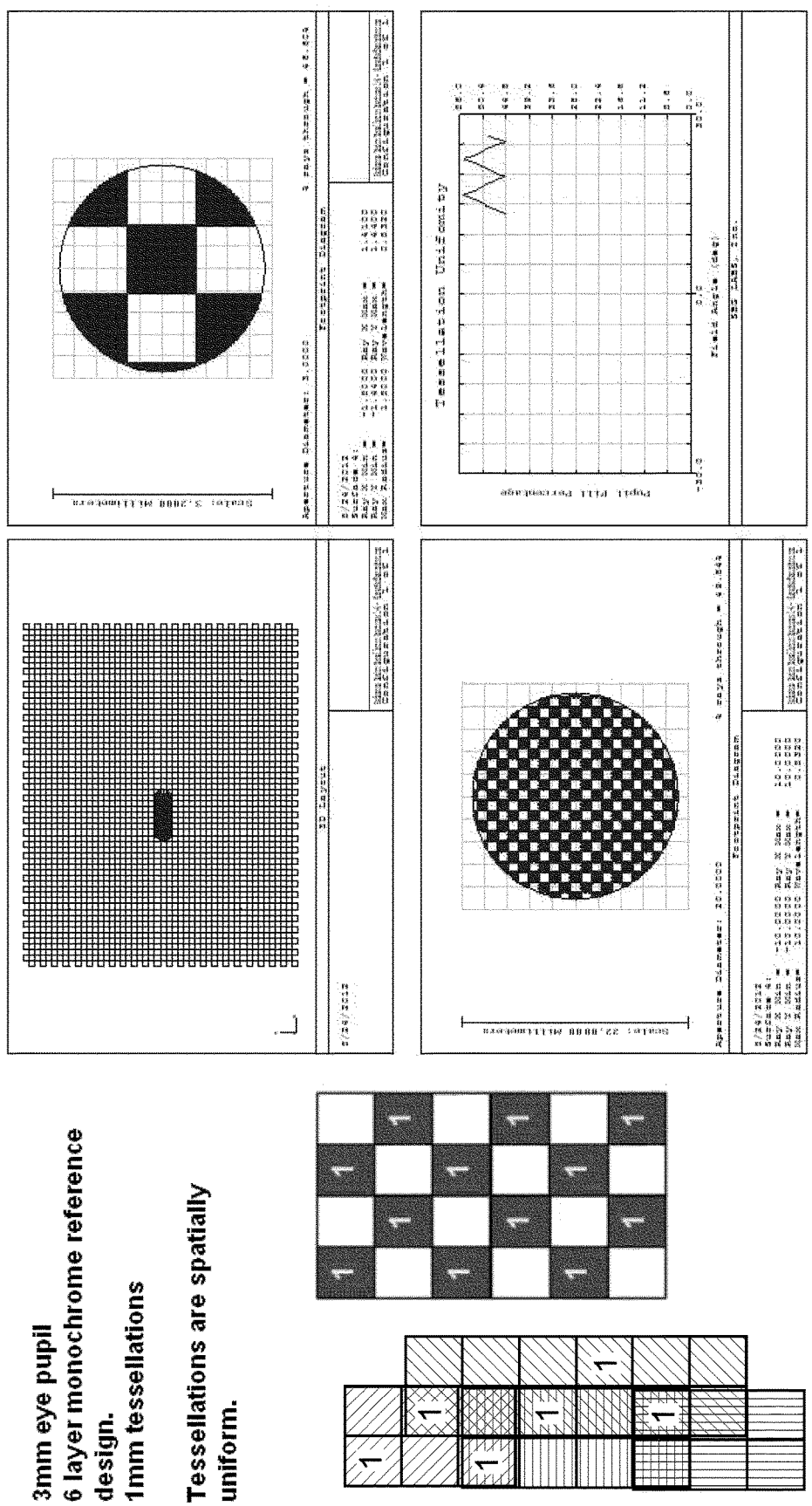
FIG. 65 is a third illumination uniformity analysis of a first implementation tessellation pattern in one embodiment.

FIG. 65 shows Case 2: 1 mm tessellations; fill optimized. The Figures represent a 6 layer, 12 tile monochrome reference design with grating positions reoptimized. A single tile has 50% aperture fill. A 3 mm eye pupil and 1 mm tessellations were assumed. The tessellations are spatially uniform.

FIG. 66 illustrates Case 2: consideration of maximum and minimum situations. Footprint diagrams corresponding to a minimum 45.1% and a maximum 54.9% are shown. With 1 mm tessellations, minimum to maximum best uniformity is +/−5% with 50% aperture fill, i.e., +/−10% uniformity variation (20% p-p).

Figure 67:
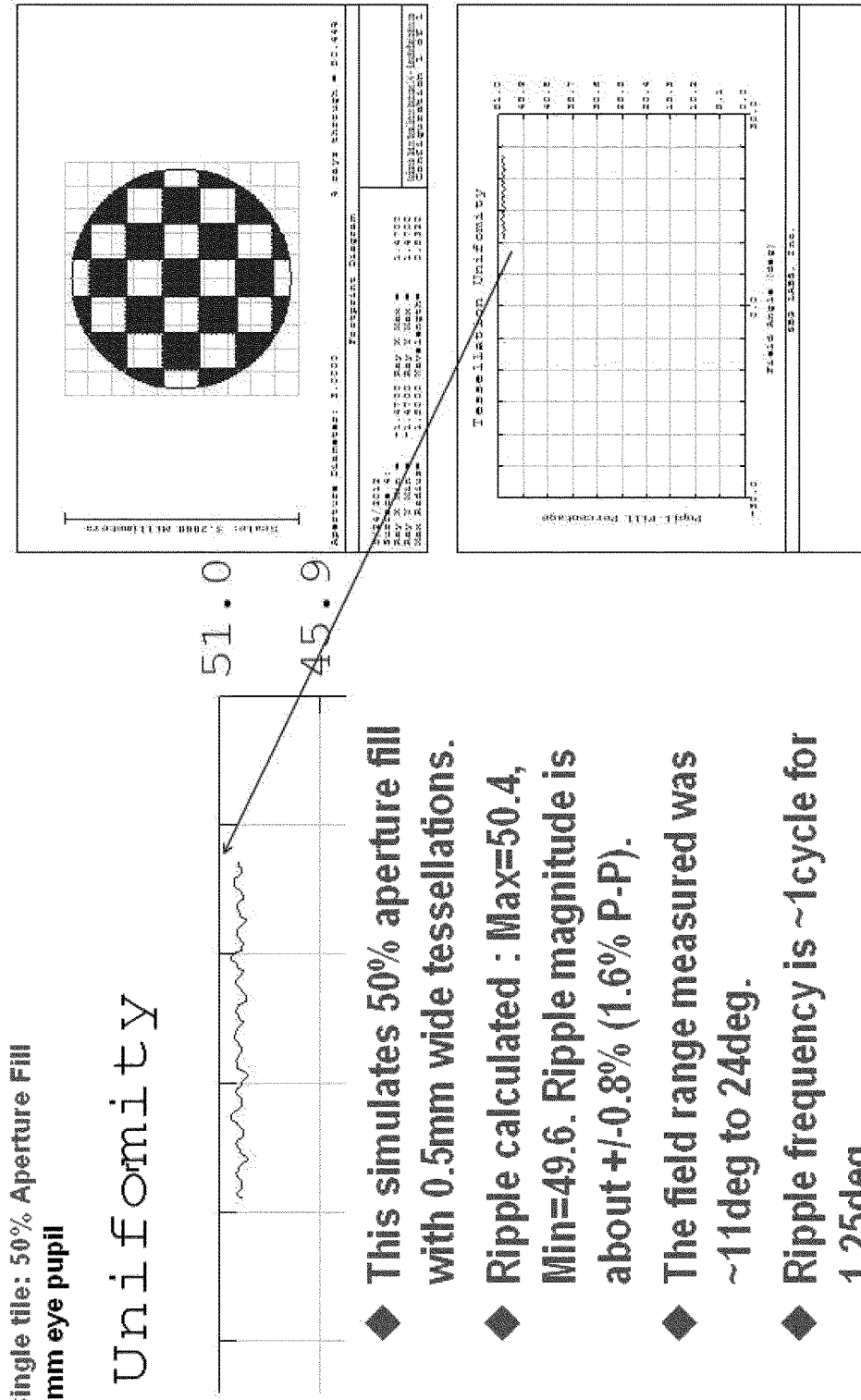
FIG. 67 is a fifth illumination uniformity analysis of a first implementation tessellation pattern in one embodiment.

FIG. 67 illustrates Case 3: 0.5 mm tessellations with 50% aperture fill, off axis. FIG. 67 represents a 6 layer, 12 tile, monochrome reference design but with 0.5 mm tessellations. A single tile: 50% aperture fill and 3 mm eye pupil are assumed. This calculation simulates 50% aperture fill with 0.5 mm wide tessellations. Ripple is calculated as: maximum=50.4; minimum=49.6. Ripple magnitude is about +/−0.8% (1.6% P-P). The field range measured was ~11 deg to 24 deg. Ripple frequency is ~1 cycle for 1.25 deg.

FIG. 68 illustrates Case 3*b*: 0.5 mm tessellations with 50% aperture fill, on axis. FIG. 68 represents a 6 layer, 12 tile, monochrome reference design but with 0.5 mm tessellations. A single tile: 50% aperture fill; and 3 mm eye pupil were assumed. This simulates 50% aperture fill with 0.5 mm wide tessellations. Ripple was calculated as: maximum=50.9; minimum=49.6. Ripple magnitude is about +/−1.5% (3% P-P). The field range measured was ~+/−6.5 deg. Off axis, tessellations are foreshortened, and thus uniformity improves. Ripple frequency is ~1 cycle for 1.25 deg.

FIG. 69 illustrates a 4 mm eye pupil, 0.5 mm tessellations, 50% aperture fill. As shown in the drawings the characteristics are: maximum: 51.97%; minimum: 48.03%; and ripple: +/−2% (=4% p-p).

FIG. 70 illustrates a 3 mm eye pupil, 33% aperture fill (3 layers, 9 tile types). FIG. 70 represents 3 layer, 9 tile, monochrome reference design but with 0.5 mm tessellations. A single tile: 33% Aperture Fill; and a 3 mm eye pupil were assumed. Ripple was calculated at: maximum=36.9; minimum=30.4. Ripple magnitude is ~6.5%/33%=+/−9.75% (=19.5% P-P). Ripple frequency is ~1 cycle for 5 deg.

Figure 71:
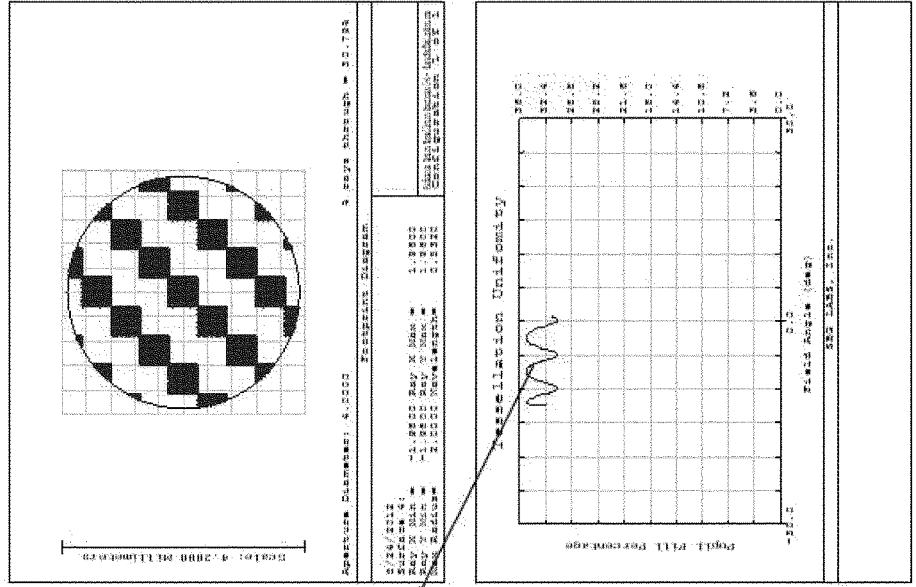
FIG. 71 is a ninth illumination uniformity analysis of a first implementation tessellation pattern in one embodiment.

FIG. 71 illustrates a 4 mm eye pupil, 33% aperture fill (3 layers, 9 tile types). A single tile: 33% Aperture Fill and 4 mm eye pupil were assumed. Ripple was calculated as: maximum=35; minimum=30.8. Ripple magnitude is ~4.2%/33%=+/−6.3%=12.6% P-P. The ripple frequency is ~1 cycle for 5 deg.

FIG. 72 illustrates a 3 mm eye pupil, 33% aperture fill (3 layers, 9 tile types). A single tile: 33% aperture fill and 3 mm eye pupil were assumed. The computed characteristics are: ripple maximum: 35.2%; ripple minimum: 29.7%; uniformity: 5.5%/33.3%=+/−8.25%=16.5%.

Figure 73:
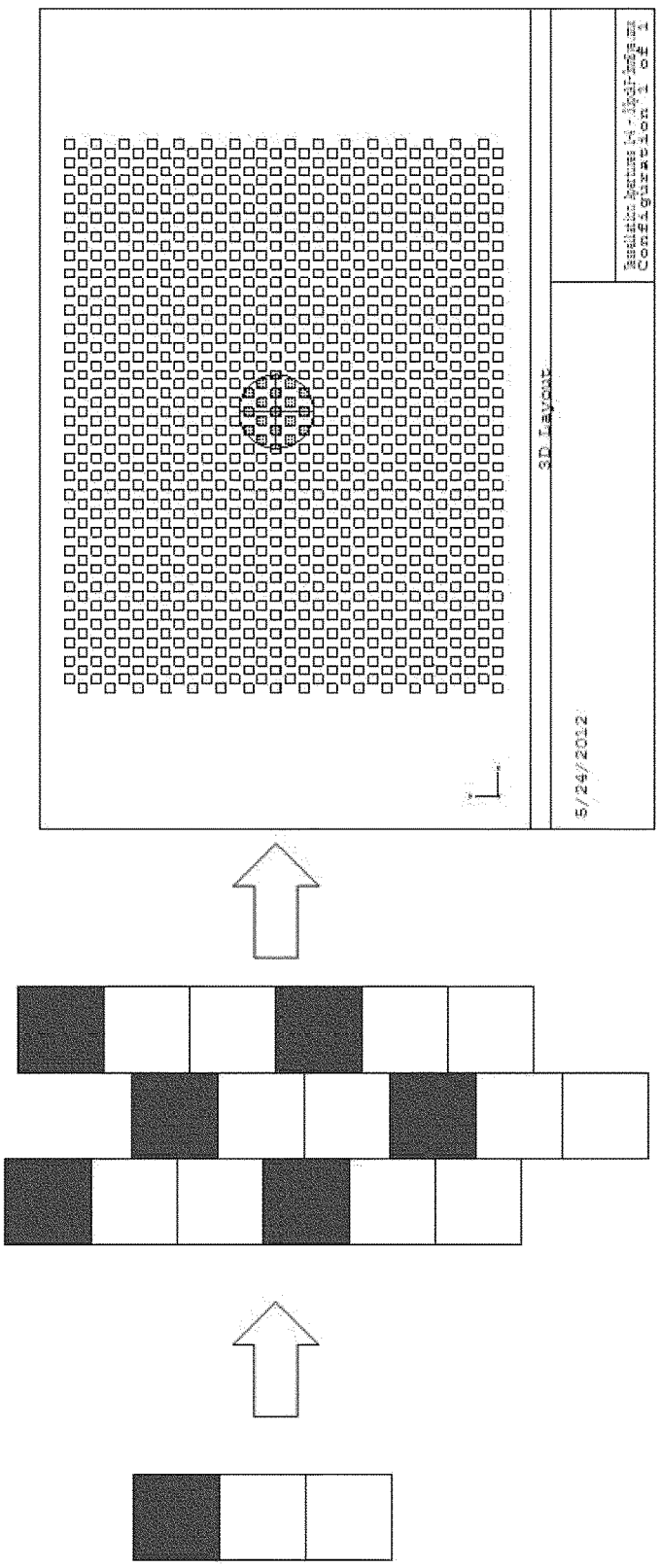
FIG. 73 is an eleventh illumination uniformity analysis of a first implementation tessellation pattern in one embodiment.

FIG. 73 illustrates how a unit cell forms an evenly distributed pattern.

Figure 74:
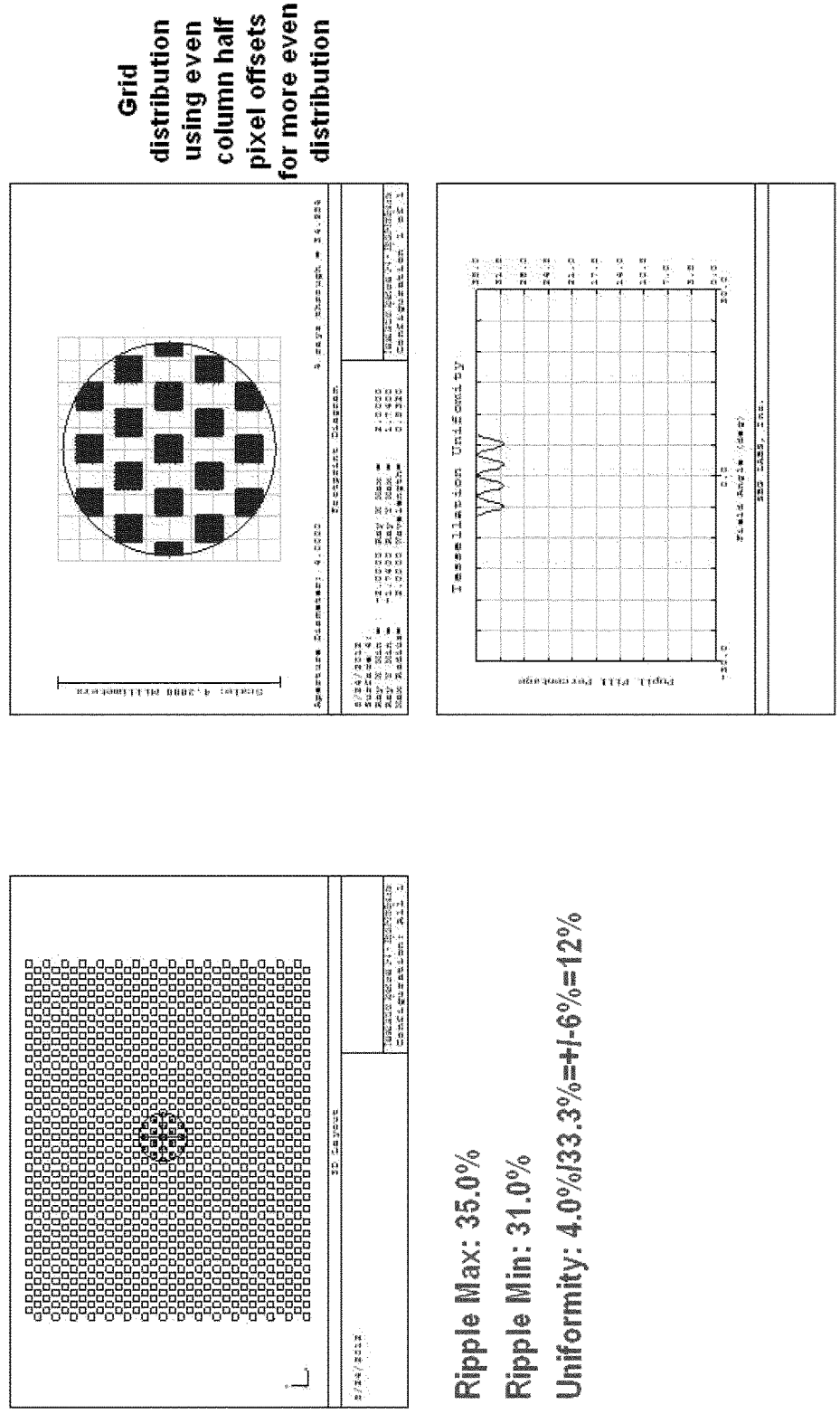

FIG. 74 is a recalculation of the embodiment using a 4 mm eye pupil, 33% aperture fill (3 layers, 9 tile types). This needs the pattern to have 1×3 unit cell, with even columns offset by 0.5 pixel.

A grid distribution using even column half pixel offsets gives a more even distribution. The computed characteristics are: ripple maximum: 35.0%; ripple minimum: 31.0%; uniformity: 4.0%/33.3%=+/−6%=12%.

FIG. 75 illustrates a 4 mm eye pupil, 33% aperture fill (3 layers, 9 tile types). This embodiment needs the pattern to have 1×3 unit cell, with even columns offset by 0.5 pixel.

Grid distribution using even column half pixel offsets gives a more even distribution. The computed characteristics are: ripple maximum: 34.6%; ripple minimum: 32.7%; uniformity: 1.9%/33.3%=+/−2.85%=5.7%.

A series of reference designs based on micro-tessellation principles have been developed and are summarised below
1. Reference design:
   Monochromatic, 6 layer, 12 tiles (50% aperture fill), 1 mm tessellations:
   3 mm eye pupil: 24% uniformity
2. Reference design with reoptimized grating locations on different layers:
   Monochromatic, 6 layer, 12 tiles (50% aperture fill), 1 mm tessellations:
   3 mm eye pupil: 20% uniformity
3. Reference design using 0.5 mm tessellations:
   Monochromatic, 6 layer, 12 tiles (50% aperture fill), 0.5 mm tessellations:
   3 mm eye pupil: ~3% to 2% uniformity across field.
4. 3 mm eye pupil (Target: C AR Outdoor)
   3 layer, 9 tiles (33% aperture fill), 0.5 mm tessellations: Up to 16.5% uniformity
5. 4 mm eye pupil [Target: C Movie Indoor]
   3 layer, 9 tiles (33% aperture fill), 0.5 mm tessellations: Up to 12% uniformity Achieving 50% aperture fill of a single tile provides significantly improved uniformity over even 33% aperture fill (~5× uniformity improvement on 3 mm eye pupil). For 50% aperture fill, 0.5 mm performs significantly better than a 1 mm tessellation: 3% vs. 20% for a 3 mm eye pupil. 50% aperture fill for 9 tiles need '4.5' (i.e., 5 layers).

Eye pupil irradiance uniformity with field angle improves with decreased primary tessellation element size and increase primary tessellation element aperture fill. It is noted that decreased tile type density on a given layer will then improve the irradiance uniformity with field angle because fewer tile types will increase the aperture fill of any single primary tessellation element type. Decreased primary tessellation element size degrades MTF (resolution). It is noted that decreased primary tessellation element size, and increased density of a primary tessellation element type permits irregular patterns. This in turn permits homogenization of MTF of primary tessellations, and the opportunity to vary the irradiance uniformity field angular ripple frequency. The use of small (micro tessellations) inside the aperture of a primary tessellation may improve the overall angular bandwidth of a primary tessellation element, thereby presenting the opportunity to reduce the number of primary tessellation element types desired.

REFERENCES

The following patent applications are incorporated by reference herein in their entireties:

U.S. Provisional Patent Application No. 61/627,202 with filing date 7 Oct. 2011 by the present inventors entitled WIDE ANGLE COLOR HEAD MOUNTED DISPLAY which is also referenced by the Applicant's docket number;

PCT Application No.: US2008/001909, with International Filing Date: 22 Jul. 2008, entitled LASER ILLUMINATION DEVICE;

PCT Application No.: US2006/043938, entitled METHOD AND APPARATUS FOR PROVIDING A TRANSPARENT DISPLAY;

PCT Application No.: PCT/GB2010/001982 entitled COMPACT EDGE ILLUMINATED EYEGLASS DISPLAY;

PCT Application No.: PCT/GB2010/000835 with International Filing Date: 26 Apr. 2010 entitled Compact holographic edge illuminated eyeglass display;

PCT Application No.: PCT/GB2010/002023 filed on 2 Nov. 2010 entitled APPARATUS FOR REDUCING LASER SPECKLE.

U.S. patent application: Ser. No. 10/555,661 filed 4 Nov. 2005 entitled SWITCHABLE VIEWFINDER DISPLAY.

U.S. Provisional Patent Application No. 61/344,748 with filing date 28 Sep. 2010 entitled Eye Tracked Holographic Edge Illuminated Eyeglass Display;

U.S. Provisional Patent Application 61/573,066 with filing date 24 Aug. 2011 by the present inventors entitled HOLOGRAPHIC POLYMER DISPERSED LIQUID CRYSTAL MATERIALS AND DEVICES;

U.S. Provisional Patent Applications No. 61/457,835 with filing date 16 Jun. 2011 entitled HOLOGRAPHIC BEAM STEERING DEVICE FOR AUTOSTEREOSCOPIC DISPLAYS;

PCT Application No.: US2008/001909, with International Filing Date: 22 Jul. 2008, entitled LASER ILLUMINATION DEVICE PCT Application No.: PCT/GB2010/002023 filed on 2 Nov. 2010 by the present inventors entitled APPARATUS FOR REDUCING LASER SPECKLE.

U.S. Provisional Patent Application No. 61/573,121 with filing date 7 Sep. 2011 by the present inventors entitled METHOD AND APPARATUS FOR SWITCHING HPDLC ARRAY DEVICES which is also referenced by the Applicant's docket number;

PCT Application No.: PCT/GB2010/000835 with International Filing Date: 26 Apr. 2010 entitled COMPACT HOLOGRAPHIC EDGE ILLUMINATED EYEGLASS DISPLAY;

a U.S. Provisional Patent Application 61/573,082 with filing date 29 Aug. 2011 by the present inventors entitled CONTACT IMAGE SENSORS;

U.S. Provisional Patent Application No. 61/573,156 filed on 16 Sep. 2011, entitled "Holographic wide angle near eye display";

U.S. Provisional Patent Application No. 61/573,175 filed on 19 Sep. 2011, entitled "Holographic wide angle near eye display";

U.S. Provisional Patent Application No. 61/573,176 filed on 19 Sep. 2011, entitled "Holographic wide angle near eye display";

U.S. Provisional Patent Application No. 61/573,196 filed on 25 Sep. 2011, entitled "Further improvements to holographic wide angle near eye display";

U.S. Provisional Patent Application No. 61/627,202 filed on 7 Oct. 2011, entitled "Wide angle color head mounted display";

U.S. Provisional Patent Application No. 61/687,436 filed on 25 Apr. 2012, entitled "Improvements to holographic wide angle head mounted display";

CONCLUSION

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. An apparatus for displaying an image, comprising:
   an input image node configured to provide modulated light;
   a plurality of waveguides arranged to propagate the modulated light along the plurality of waveguides in a propagation direction, the plurality of waveguides being in a stacked arrangement, each of the plurality of waveguides having a curved output surface and curved gratings, each of the plurality of waveguides is optimized for a single different optical wavelength; and
   a curved outer cladding layer extending along the curved output surface of an outer most one of the plurality of waveguides;
   wherein each of the plurality of waveguides is configured to deflect the modulated light out of a respective curved output surface of the curved output surfaces via the curved gratings in an output direction different than the propagation direction.

2. The apparatus of claim 1, wherein each of the curved output surfaces is curved in a same plane.

3. The apparatus of claim 1, wherein the plurality of waveguides comprise a color waveguide.

4. The apparatus of claim 1, wherein the curved gratings are Bragg gratings.

5. The apparatus of claim 1, further comprising an optical-electronic module disposed at one end of the plurality of waveguides, wherein the input image node is disposed at an other end of the plurality of waveguides.

6. The apparatus of claim 1, further comprising:
   a curved inner cladding layer extending along a curved inner surface of an inner most one of the plurality of waveguides; and
   a plurality of curved cladding layers, wherein each of the plurality of curved cladding layers are positioned between adjacent waveguides of the plurality of waveguides and directly engage the adjacent waveguides.

7. The apparatus of claim 6, wherein the plurality of curved cladding layers that are positioned between the adjacent waveguides prevent a transfer of light between the adjacent waveguides.

8. The apparatus of claim 1, wherein adjacent waveguides of the plurality of waveguides are not separated by cladding layers.

9. The apparatus of claim 8, wherein the plurality of waveguides directly contact each other.

10. The apparatus of claim 1, wherein the apparatus is a helmet mounted display.

11. The apparatus of claim 1 wherein the plurality of waveguides comprise a visor of a helmet mounted display.

12. A method of displaying an image, comprising:
    providing modulated light to a plurality of waveguides, the plurality of waveguides being in a stacked arrangement, each of the plurality of waveguides having a curved output surface and curved gratings, each of the plurality of waveguides is optimized for a single different optical wavelength;
    propagating the modulated light along the plurality of waveguides in a propagation direction,
    deflecting the modulated light out of a respective of the curved output surfaces of the plurality of waveguides via the curved gratings in an output direction different than the propagation direction for each of the plurality of waveguides;
    wherein a curved outer cladding layer extends along the curved output surface of an outer most one of the plurality of waveguides.

13. The method of claim 12, wherein each of the curved output surfaces is curved in a same plane.

14. The method of claim 12, wherein the plurality of waveguides comprise a color waveguide.

15. The method of claim 12, wherein adjacent waveguides of the plurality of waveguides are separated by cladding layers.

16. The method of claim 12, wherein adjacent waveguides of the plurality of waveguides are not separated by cladding layers.

17. The method of claim 12, further comprising a plurality of curved cladding layers positioned between adjacent ones of the plurality of waveguides.

18. An apparatus for displaying an image, comprising:
    an input image node configured to provide at least first and second image modulated lights; and
    a holographic waveguide device configured to propagate at least one of the first and second image modulated lights in at least a first direction, the holographic waveguide device comprising:
    at least first and second interspersed multiplicities of grating elements disposed in a plane of a layer;
    a curved outer cladding layer; and
    a curved inner cladding layer;
    wherein the first and second image modulated lights are modulated respectively with first field of view (FOV) image information and second FOV image information;
    wherein the first multiplicity of grating elements have k-vectors which vary along a direction of propagation of the first image modulated light and are configured to deflect the first image modulated light out of the plane of the layer, and the second multiplicity of grating elements have k-vectors which vary along the direction of propagation of the second image modulated light and are configured to deflect the second image modulated light out of the plane of the layer;

wherein the holographic waveguide device, and the at least first and second interspersed multiplicities of grating elements are curved along a common plane; and wherein the curved outer cladding layer extends along a curved output surface of the holographic waveguide device and the curved inner cladding layer extends along a curved inner surface of the holographic waveguide device.

19. The apparatus of claim 18, wherein apparatus is a helmet mounted display.

20. The apparatus of claim 18, wherein the curved output surface is convex.

* * * * *